(12) United States Patent
Waldern et al.

(10) Patent No.: US 10,914,950 B2
(45) Date of Patent: Feb. 9, 2021

(54) WAVEGUIDE ARCHITECTURES AND RELATED METHODS OF MANUFACTURING

(71) Applicant: DigiLens Inc., Sunnyvale, CA (US)

(72) Inventors: Jonathan David Waldern, Los Altos Hills, CA (US); Milan Momcilo Popovich, Leicester (GB); Alastair John Grant, San Jose, CA (US)

(73) Assignee: DigiLens Inc., Sunnyvale, CA (US)

(*) Notice: Subject to any disclaimer, the term of this patent is extended or adjusted under 35 U.S.C. 154(b) by 101 days.

(21) Appl. No.: 16/242,979

(22) Filed: Jan. 8, 2019

(65) Prior Publication Data
US 2019/0212557 A1    Jul. 11, 2019

Related U.S. Application Data

(60) Provisional application No. 62/614,947, filed on Jan. 8, 2018, provisional application No. 62/614,949, filed (Continued)

(51) Int. Cl.
*G02B 27/01*   (2006.01)
*F21V 8/00*    (2006.01)
*B60K 35/00*   (2006.01)

(52) U.S. Cl.
CPC ......... *G02B 27/0103* (2013.01); *G02B 6/005* (2013.01); *G02B 6/0026* (2013.01); (Continued)

(58) Field of Classification Search
CPC ........ G02B 27/0172; G02B 2027/0178; G02B 27/0176; G02B 27/0101;
(Continued)

(56) References Cited

U.S. PATENT DOCUMENTS

| 1,043,938 A | 11/1912 | Huttenlocher |
| 2,141,884 A | 12/1938 | Sonnefeld |

(Continued)

FOREIGN PATENT DOCUMENTS

| BR | PI0720469 A2 | 1/2014 |
| CA | 2889727 A1 | 6/2014 |

(Continued)

OTHER PUBLICATIONS

International Search Report and Written Opinion for International Application PCT/GB2009/051676, completed May 10, 2010, dated May 18, 2010, 7 pgs.
(Continued)

*Primary Examiner* — William R Alexander
*Assistant Examiner* — Sharrief I Broome
(74) *Attorney, Agent, or Firm* — KPPB LLP

(57) ABSTRACT

Systems and methods for generating head-up displays (HUDs) using waveguides incorporating Bragg gratings in accordance with various embodiments of the invention are provided. The term HUD is typically utilized to describe a class of displays that incorporates a transparent display that presents data without requiring users to look away from their usual viewpoints. HUDs can be incorporated in any of a variety of applications including (but not limited to) vehicular and near-eye applications, such as googles, eyewear, etc. HUDs that utilize planar waveguides that incorporate Bragg gratings in accordance with various embodiments of the invention can achieve significantly larger fields of view and have lower volumetric requirements than HUDs implemented using conventional optical components.

15 Claims, 88 Drawing Sheets

Related U.S. Application Data on Jan. 8, 2018, provisional application No. 62/615,000, filed on Jan. 8, 2018.

(52) U.S. Cl.
CPC ....... *G02B 6/0065* (2013.01); *G02B 27/0101* (2013.01); *G02B 27/0179* (2013.01); *B60K 35/00* (2013.01); *B60K 2370/334* (2019.05); *B60K 2370/70* (2019.05); *B60K 2370/736* (2019.05); *G02B 2027/011* (2013.01); *G02B 2027/0123* (2013.01); *G02B 2027/0125* (2013.01); *G02B 2027/0132* (2013.01); *G02B 2027/0187* (2013.01)

(58) Field of Classification Search
CPC .... G02B 2027/0118; G02B 2027/0138; G02B 27/017; G02B 2027/014; G02B 27/0093; G02B 5/30; G02B 2027/015; G02B 27/01; G02B 27/0149; G02B 2027/0123; G02B 2027/0154; G02B 2027/013; G02B 2027/0127; G02B 2027/0159; G02B 2027/011; G02B 2027/0169; G06F 3/013; G06F 3/017; G06F 1/163; G06F 3/011; G06F 3/012; G06F 3/005; G06F 3/03545; G06F 3/04883; G06F 5/10; G06F 1/203; G06F 1/206; G06F 3/016; G06F 3/0317; G06F 3/0362; G06F 3/0412; G06F 1/1632; G06F 3/014; G06F 3/0304; G06F 3/041; G06F 3/045; B60K 35/00; B60K 2370/1529; B60K 2370/66; B60K 2370/67; B60K 37/02; B60K 2370/151; B60K 2370/1531; B60K 2370/154; B60K 2370/155; B60K 2370/174; B60K 2370/177; B60K 2370/178; B60K 2370/186; B60K 2370/1868; B60K 2370/191; B60K 2370/194; B60K 2370/25; B60K 2370/334; B60K 2370/52; B60K 2370/785; B32B 2037/1253; B32B 2307/416; B32B 2307/42; B32B 2551/00; B32B 2551/08; B32B 37/1284; B32B 37/24; B32B 38/0008; B32B 17/061; H04N 13/344; H04N 5/332; H04N 5/33; H04N 5/64; H04N 9/045; H04N 13/122; H04N 13/194; H04N 13/239; H04N 13/275; H04N 13/279; H04N 13/30; H04N 13/332; H04N 13/349; H04N 1/6083; H04N 2213/003; H04N 5/2252; H04N 5/7491; H04N 9/3135; H04N 9/3147; H04N 9/3155; G09G 3/3208; G09G 2310/0235; G09G 2320/0626; G09G 2340/0471; G09G 2340/0478; G09G 2360/144; G09G 3/2003; G09G 3/3225; G09G 3/3233; G09G 3/36; G09G 2300/0478; G09G 2310/08; G09G 2320/0252; G09G 2320/041; G09G 2320/10; G09G 2340/0407; G09G 3/001; G09G 3/002; G09G 3/18; G09G 3/32

See application file for complete search history.

(56) References Cited

U.S. PATENT DOCUMENTS

| | | |
|---|---|---|
| 3,482,498 A | 12/1969 | Becker |
| 3,620,601 A | 11/1971 | Leonard et al. |
| 3,741,716 A | 6/1973 | Johne et al. |
| 3,843,231 A | 10/1974 | Borel et al. |
| 3,851,303 A | 11/1974 | Muller |
| 3,885,095 A | 5/1975 | Wolfson et al. |
| 3,940,204 A | 2/1976 | Withrington |
| 3,965,029 A | 6/1976 | Arora |
| 3,975,711 A | 8/1976 | McMahon |
| 4,035,068 A | 7/1977 | Rawson |
| 4,066,334 A | 1/1978 | Fray et al. |
| 4,082,432 A | 4/1978 | Kirschner |
| 4,099,841 A | 7/1978 | Ellis |
| 4,178,074 A | 12/1979 | Heller |
| 4,218,111 A | 8/1980 | Withrington et al. |
| 4,232,943 A | 11/1980 | Rogers |
| 4,248,093 A | 2/1981 | Andersson et al. |
| 4,251,137 A | 2/1981 | Knop et al. |
| 4,309,070 A | 1/1982 | St. Leger Searle |
| 4,322,163 A | 3/1982 | Schiller |
| 4,386,361 A | 5/1983 | Simmonds |
| 4,389,612 A | 6/1983 | Simmonds et al. |
| 4,403,189 A | 9/1983 | Simmonds |
| 4,418,993 A | 12/1983 | Lipton |
| 4,472,037 A | 9/1984 | Lipton |
| 4,523,226 A | 6/1985 | Lipton et al. |
| 4,544,267 A | 10/1985 | Schiller |
| 4,562,463 A | 12/1985 | Lipton |
| 4,566,758 A | 1/1986 | Bos et al. |
| 4,583,117 A | 4/1986 | Lipton et al. |
| 4,643,515 A | 2/1987 | Upatnieks |
| 4,647,967 A | 3/1987 | Kirschner et al. |
| 4,688,900 A | 8/1987 | Doane et al. |
| 4,711,512 A | 12/1987 | Upatnieks |
| 4,714,320 A | 12/1987 | Banbury |
| 4,728,547 A | 3/1988 | Vaz et al. |
| 4,729,640 A | 3/1988 | Sakata et al. |
| 4,743,083 A | 5/1988 | Schimpe |
| 4,749,256 A | 6/1988 | Bell et al. |
| 4,765,703 A | 8/1988 | Suzuki et al. |
| 4,775,218 A | 10/1988 | Wood et al. |
| 4,790,613 A * | 12/1988 | Moss ................... G03H 1/2286 340/461 |
| 4,791,788 A | 12/1988 | Simmonds et al. |
| 4,792,850 A | 12/1988 | Liptoh et al. |
| 4,799,765 A | 1/1989 | Ferrer |
| 4,811,414 A | 3/1989 | Fishbine et al. |
| 4,848,093 A | 7/1989 | Simmonds et al. |
| 4,854,688 A | 8/1989 | Hayford et al. |
| 4,884,876 A | 12/1989 | Lipton et al. |
| 4,890,902 A | 1/1990 | Doane et al. |
| 4,928,301 A | 5/1990 | Smoot |
| 4,933,976 A | 6/1990 | Fishbine et al. |
| 4,938,568 A | 7/1990 | Margerum et al. |
| 4,946,245 A | 8/1990 | Chamberlin et al. |
| 4,960,311 A | 10/1990 | Moss et al. |
| 4,964,701 A | 10/1990 | Dorschner et al. |
| 4,967,268 A | 10/1990 | Lipton et al. |
| 4,970,129 A | 11/1990 | Ingwall et al. |
| 4,971,719 A | 11/1990 | Vaz et al. |
| 4,994,204 A | 2/1991 | Doane et al. |
| 5,004,323 A | 4/1991 | West |
| 5,007,711 A | 4/1991 | Wood et al. |
| 5,009,483 A | 4/1991 | Rockwell et al. |
| 5,016,953 A | 5/1991 | Moss et al. |
| 5,033,814 A | 7/1991 | Brown et al. |
| 5,035,734 A | 7/1991 | Honkanen et al. |
| 5,053,834 A | 10/1991 | Simmonds |
| 5,063,441 A | 11/1991 | Lipton et al. |
| 5,076,664 A | 12/1991 | Migozzi |
| 5,079,416 A | 1/1992 | Filipovich |
| 5,096,282 A | 3/1992 | Margerum et al. |
| 5,099,343 A | 3/1992 | Margerum et al. |
| 5,109,465 A | 4/1992 | Klopotek |
| 5,110,034 A | 5/1992 | Simmonds et al. |
| 5,117,285 A | 5/1992 | Nelson et al. |
| 5,117,302 A | 5/1992 | Lipton |
| 5,119,454 A | 6/1992 | McMahon et al. |
| 5,124,821 A | 6/1992 | Antier et al. |
| 5,139,192 A | 8/1992 | Simmonds et al. |
| 5,142,357 A | 8/1992 | Lipton et al. |
| 5,142,644 A | 8/1992 | Vansteenkiste et al. |
| 5,148,302 A | 9/1992 | Nagano et al. |

(56) References Cited

U.S. PATENT DOCUMENTS

| | | |
|---|---|---|
| 5,151,958 A | 9/1992 | Honkanen |
| 5,153,751 A | 10/1992 | Ishikawa et al. |
| 5,159,445 A | 10/1992 | Gitlin et al. |
| 5,160,523 A | 11/1992 | Honkanen et al. |
| 5,181,133 A | 1/1993 | Lipton |
| 5,183,545 A | 2/1993 | Branca et al. |
| 5,187,597 A | 2/1993 | Kato et al. |
| 5,193,000 A | 3/1993 | Lipton et al. |
| 5,198,912 A | 3/1993 | Ingwall et al. |
| 5,200,861 A | 4/1993 | Moskovich et al. |
| 5,210,624 A | 5/1993 | Matsumoto et al. |
| 5,218,360 A | 6/1993 | Goetz et al. |
| 5,218,480 A | 6/1993 | Moskovich et al. |
| 5,224,198 A | 6/1993 | Jachimowicz et al. |
| 5,239,372 A | 8/1993 | Lipton |
| 5,240,636 A | 8/1993 | Doane et al. |
| 5,241,337 A | 8/1993 | Betensky et al. |
| 5,242,476 A | 9/1993 | Bartel et al. |
| 5,243,413 A | 9/1993 | Gitlin et al. |
| 5,251,048 A | 10/1993 | Doane et al. |
| 5,264,950 A | 11/1993 | West et al. |
| 5,268,792 A | 12/1993 | Kreitzer et al. |
| 5,284,499 A | 2/1994 | Harvey et al. |
| 5,289,315 A | 2/1994 | Makita et al. |
| 5,295,208 A | 3/1994 | Caulfield et al. |
| 5,296,967 A | 3/1994 | Moskovich et al. |
| 5,299,289 A | 3/1994 | Omae et al. |
| 5,303,085 A | 4/1994 | Rallison |
| 5,309,283 A | 5/1994 | Kreitzer et al. |
| 5,313,330 A | 5/1994 | Betensky |
| 5,315,324 A | 5/1994 | Kubelik et al. |
| 5,315,419 A | 5/1994 | Saupe et al. |
| 5,315,440 A | 5/1994 | Betensky et al. |
| 5,317,405 A | 5/1994 | Kuriki et al. |
| 5,327,269 A | 7/1994 | Tilton et al. |
| 5,329,363 A | 7/1994 | Moskovich et al. |
| 5,341,230 A | 8/1994 | Smith |
| 5,343,147 A | 8/1994 | Sager et al. |
| 5,351,151 A | 9/1994 | Levy |
| 5,359,362 A | 10/1994 | Lewis et al. |
| 5,363,220 A | 11/1994 | Kuwayama et al. |
| 5,368,770 A | 11/1994 | Saupe et al. |
| 5,369,511 A | 11/1994 | Amos |
| 5,371,626 A | 12/1994 | Betensky |
| 5,400,069 A | 3/1995 | Braun et al. |
| 5,408,346 A | 4/1995 | Trissel et al. |
| 5,410,370 A | 4/1995 | Janssen |
| 5,416,510 A | 5/1995 | Lipton et al. |
| 5,416,514 A | 5/1995 | Janssen et al. |
| 5,418,584 A | 5/1995 | Larson |
| 5,418,871 A | 5/1995 | Revelli et al. |
| 5,428,480 A | 6/1995 | Betensky et al. |
| 5,437,811 A | 8/1995 | Doane et al. |
| 5,438,357 A | 8/1995 | McNelley |
| 5,452,385 A | 9/1995 | Izumi et al. |
| 5,453,863 A | 9/1995 | West et al. |
| 5,455,693 A | 10/1995 | Wreede et al. |
| 5,455,713 A | 10/1995 | Kreitzer et al. |
| 5,463,428 A | 10/1995 | Lipton et al. |
| 5,465,311 A | 11/1995 | Caulfield et al. |
| 5,471,326 A | 11/1995 | Hall et al. |
| 5,473,222 A | 12/1995 | Thoeny et al. |
| 5,476,611 A | 12/1995 | Nolan et al. |
| 5,481,321 A | 1/1996 | Lipton |
| 5,485,313 A | 1/1996 | Betensky |
| 5,493,430 A | 2/1996 | Lu et al. |
| 5,493,448 A | 2/1996 | Betensky et al. |
| 5,496,621 A | 3/1996 | Makita et al. |
| 5,499,140 A | 3/1996 | Betensky |
| 5,500,671 A | 3/1996 | Andersson et al. |
| 5,500,769 A | 3/1996 | Betensky |
| 5,510,913 A | 4/1996 | Hashimoto et al. |
| 5,515,184 A | 5/1996 | Caulfield et al. |
| 5,516,455 A | 5/1996 | Jacobine et al. |
| 5,524,272 A | 6/1996 | Podowski et al. |
| 5,530,566 A | 6/1996 | Kumar |
| 5,532,736 A | 7/1996 | Kuriki et al. |
| 5,532,875 A | 7/1996 | Betemsky |
| 5,537,232 A | 7/1996 | Biles |
| RE35,310 E | 8/1996 | Moskovich |
| 5,543,950 A | 8/1996 | Lavrentovich et al. |
| 5,559,637 A | 9/1996 | Moskovich et al. |
| 5,572,248 A | 11/1996 | Allen et al. |
| 5,572,250 A | 11/1996 | Lipton et al. |
| 5,576,888 A | 11/1996 | Betensky |
| 5,579,026 A | 11/1996 | Tabata |
| 5,583,795 A | 12/1996 | Smyth |
| 5,585,035 A | 12/1996 | Nerad et al. |
| 5,593,615 A | 1/1997 | Nerad et al. |
| 5,604,611 A | 2/1997 | Saburi et al. |
| 5,606,433 A | 2/1997 | Yin et al. |
| 5,612,733 A | 3/1997 | Flohr |
| 5,612,734 A | 3/1997 | Nelson et al. |
| 5,619,254 A | 4/1997 | McNelley |
| 5,619,586 A | 4/1997 | Sibbald et al. |
| 5,621,529 A | 4/1997 | Gordon et al. |
| 5,621,552 A | 4/1997 | Coates et al. |
| 5,625,495 A | 4/1997 | Moskovich et al. |
| 5,629,259 A | 5/1997 | Akada et al. |
| 5,631,107 A | 5/1997 | Tarumi et al. |
| 5,633,100 A | 5/1997 | Mickish et al. |
| 5,646,785 A | 7/1997 | Gilboa et al. |
| 5,648,857 A | 7/1997 | Ando et al. |
| 5,661,577 A | 8/1997 | Jenkins et al. |
| 5,661,603 A | 8/1997 | Hanano et al. |
| 5,665,494 A | 9/1997 | Kawabata et al. |
| 5,668,614 A | 9/1997 | Chien et al. |
| 5,668,907 A | 9/1997 | Veligdan |
| 5,677,797 A | 10/1997 | Betensky et al. |
| 5,680,231 A | 10/1997 | Grinberg et al. |
| 5,682,255 A | 10/1997 | Friesem et al. |
| 5,686,931 A | 11/1997 | Fuenfschilling et al. |
| 5,686,975 A | 11/1997 | Lipton |
| 5,691,795 A | 11/1997 | Doane et al. |
| 5,694,230 A | 12/1997 | Welch |
| 5,695,682 A | 12/1997 | Doane et al. |
| 5,701,132 A | 12/1997 | Kollin et al. |
| 5,706,108 A | 1/1998 | Ando et al. |
| 5,706,136 A | 1/1998 | Okuyama et al. |
| 5,707,925 A | 1/1998 | Akada et al. |
| 5,710,645 A | 1/1998 | Phillips et al. |
| 5,724,189 A | 3/1998 | Ferrante |
| 5,724,463 A | 3/1998 | Deacon et al. |
| 5,726,782 A | 3/1998 | Kato et al. |
| 5,727,098 A | 3/1998 | Jacobson |
| 5,729,242 A | 3/1998 | Margerum et al. |
| 5,731,060 A | 3/1998 | Hirukawa et al. |
| 5,731,853 A | 3/1998 | Taketomi et al. |
| 5,742,262 A | 4/1998 | Tabata et al. |
| 5,745,266 A | 4/1998 | Smith et al. |
| 5,745,301 A | 4/1998 | Betensky et al. |
| 5,748,272 A | 5/1998 | Tanaka et al. |
| 5,748,277 A | 5/1998 | Huang et al. |
| 5,751,452 A | 5/1998 | Tanaka et al. |
| 5,757,546 A | 5/1998 | Lipton et al. |
| 5,760,931 A | 6/1998 | Saburi et al. |
| 5,764,414 A | 6/1998 | King et al. |
| 5,790,288 A | 8/1998 | Jager et al. |
| 5,790,314 A | 8/1998 | Duck et al. |
| 5,798,641 A | 8/1998 | Spagna et al. |
| 5,808,804 A | 9/1998 | Moskovich |
| 5,812,608 A | 9/1998 | Valimaki et al. |
| 5,822,089 A | 10/1998 | Phillips et al. |
| 5,822,127 A | 10/1998 | Chen et al. |
| 5,825,448 A | 10/1998 | Bos et al. |
| 5,831,700 A | 11/1998 | Li et al. |
| 5,835,661 A | 11/1998 | Tai et al. |
| 5,841,507 A | 11/1998 | Barnes |
| 5,841,587 A | 11/1998 | Moskovich et al. |
| 5,856,842 A | 1/1999 | Tedesco |
| 5,867,238 A | 2/1999 | Miller et al. |
| 5,868,951 A | 2/1999 | Schuck, III et al. |
| 5,870,228 A | 2/1999 | Kreitzer et al. |
| 5,875,012 A | 2/1999 | Crawford et al. |

(56) References Cited

U.S. PATENT DOCUMENTS

| | | |
|---|---|---|
| 5,877,826 A | 3/1999 | Yang et al. |
| 5,886,822 A | 3/1999 | Spitzer |
| 5,892,598 A | 4/1999 | Asakawa et al. |
| 5,892,599 A | 4/1999 | Bahuguna |
| 5,898,511 A | 4/1999 | Mizutani et al. |
| 5,900,987 A | 5/1999 | Kreitzer et al. |
| 5,900,989 A | 5/1999 | Kreitzer |
| 5,903,395 A | 5/1999 | Rallison et al. |
| 5,903,396 A | 5/1999 | Rallison |
| 5,907,416 A | 5/1999 | Hegg et al. |
| 5,907,436 A | 5/1999 | Perry et al. |
| 5,917,459 A | 6/1999 | Son et al. |
| 5,926,147 A | 7/1999 | Sehm et al. |
| 5,929,946 A | 7/1999 | Sharp et al. |
| 5,929,960 A | 7/1999 | West et al. |
| 5,930,433 A | 7/1999 | Williamson et al. |
| 5,936,776 A | 8/1999 | Kreitzer |
| 5,937,115 A | 8/1999 | Domash |
| 5,942,157 A | 8/1999 | Sutherland et al. |
| 5,945,893 A | 8/1999 | Plessky et al. |
| 5,949,302 A | 9/1999 | Sarkka |
| 5,949,508 A | 9/1999 | Kumar et al. |
| 5,956,113 A | 9/1999 | Crawford |
| 5,962,147 A | 10/1999 | Shalub et al. |
| 5,963,375 A | 10/1999 | Kreitzer |
| 5,966,223 A | 10/1999 | Friesem et al. |
| 5,969,874 A | 10/1999 | Moskovich |
| 5,969,876 A | 10/1999 | Kreitzer et al. |
| 5,973,727 A | 10/1999 | McGrew et al. |
| 5,974,162 A | 10/1999 | Metz et al. |
| 5,985,422 A | 11/1999 | Krauter |
| 5,986,746 A | 11/1999 | Metz et al. |
| 5,991,087 A | 11/1999 | Rallison |
| 5,999,089 A | 12/1999 | Carlson et al. |
| 5,999,282 A | 12/1999 | Suzuki et al. |
| 5,999,314 A | 12/1999 | Asakura et al. |
| 6,014,187 A | 1/2000 | Taketomi et al. |
| 6,023,375 A | 2/2000 | Kreitzer |
| 6,042,947 A | 3/2000 | Asakura et al. |
| 6,043,585 A | 3/2000 | Plessky et al. |
| 6,046,585 A | 4/2000 | Simmonds |
| 6,052,540 A | 4/2000 | Koyama |
| 6,061,107 A | 5/2000 | Yang |
| 6,061,463 A | 5/2000 | Metz et al. |
| 6,069,728 A | 5/2000 | Huignard et al. |
| 6,075,626 A | 6/2000 | Mizutani et al. |
| 6,078,427 A | 6/2000 | Fontaine et al. |
| 6,094,311 A | 7/2000 | Moskovich |
| 6,097,551 A | 8/2000 | Kreitzer |
| 6,104,448 A | 8/2000 | Doane et al. |
| 6,107,943 A | 8/2000 | Schroeder |
| 6,115,152 A | 9/2000 | Popovich et al. |
| 6,118,908 A | 9/2000 | Bischel et al. |
| 6,121,899 A | 9/2000 | Theriault |
| 6,127,066 A | 10/2000 | Ueda et al. |
| 6,128,058 A | 10/2000 | Walton et al. |
| 6,133,971 A | 10/2000 | Silverstein et al. |
| 6,133,975 A | 10/2000 | Li et al. |
| 6,137,630 A | 10/2000 | Tsou et al. |
| 6,141,074 A | 10/2000 | Bos et al. |
| 6,141,154 A | 10/2000 | Kreitzer et al. |
| 6,151,142 A | 11/2000 | Phillips et al. |
| 6,154,190 A | 11/2000 | Yang et al. |
| 6,167,169 A | 12/2000 | Brinkman et al. |
| 6,169,594 B1 | 1/2001 | Aye et al. |
| 6,169,613 B1 | 1/2001 | Amitai et al. |
| 6,169,636 B1 | 1/2001 | Kreitzer et al. |
| 6,176,837 B1 | 1/2001 | Foxlin |
| 6,185,016 B1 | 2/2001 | Popovich |
| 6,188,462 B1 | 2/2001 | Lavrentovich et al. |
| 6,191,887 B1 | 2/2001 | Michaloski et al. |
| 6,195,206 B1 | 2/2001 | Yona et al. |
| 6,195,209 B1 | 2/2001 | Kreitzer et al. |
| 6,204,835 B1 | 3/2001 | Yang et al. |
| 6,211,976 B1 | 4/2001 | Popovich et al. |
| 6,222,297 B1 | 4/2001 | Perdue |
| 6,222,675 B1 | 4/2001 | Mall et al. |
| 6,222,971 B1 | 4/2001 | Veligdan et al. |
| 6,249,386 B1 | 6/2001 | Yona et al. |
| 6,259,423 B1 | 7/2001 | Tokito et al. |
| 6,259,559 B1 | 7/2001 | Kobayashi et al. |
| 6,268,839 B1 | 7/2001 | Yang et al. |
| 6,269,203 B1 | 7/2001 | Davies et al. |
| 6,275,031 B1 | 8/2001 | Simmonds et al. |
| 6,278,429 B1 | 8/2001 | Ruth et al. |
| 6,285,813 B1 | 9/2001 | Schultz et al. |
| 6,297,860 B1 | 10/2001 | Moskovich et al. |
| 6,301,056 B1 | 10/2001 | Kreitzer et al. |
| 6,301,057 B1 | 10/2001 | Kreitzer et al. |
| 6,317,083 B1 | 11/2001 | Johnson et al. |
| 6,317,227 B1 | 11/2001 | Mizutani et al. |
| 6,317,228 B2 | 11/2001 | Popovich et al. |
| 6,320,563 B1 | 11/2001 | Yang et al. |
| 6,321,069 B1 | 11/2001 | Piirainen |
| 6,323,970 B1 | 11/2001 | Popovich |
| 6,324,014 B1 | 11/2001 | Moskovich et al. |
| 6,327,089 B1 | 12/2001 | Hosaki et al. |
| 6,330,109 B1 | 12/2001 | Ishii et al. |
| 6,333,819 B1 | 12/2001 | Svedenkrans |
| 6,340,540 B1 | 1/2002 | Ueda et al. |
| 6,351,333 B2 | 2/2002 | Araki et al. |
| 6,356,172 B1 | 3/2002 | Koivisto et al. |
| 6,356,674 B1 | 3/2002 | Davis et al. |
| 6,359,730 B2 | 3/2002 | Tervonen |
| 6,359,737 B1 | 3/2002 | Stringfellow |
| 6,366,281 B1 | 4/2002 | Lipton et al. |
| 6,366,369 B2 | 4/2002 | Ichikawa et al. |
| 6,366,378 B1 | 4/2002 | Tervonen et al. |
| 6,377,238 B1 | 4/2002 | McPheters |
| 6,377,321 B1 | 4/2002 | Khan et al. |
| 6,388,797 B1 | 5/2002 | Lipton et al. |
| 6,392,812 B1 | 5/2002 | Howard |
| 6,409,687 B1 | 6/2002 | Foxlin |
| 6,411,444 B1 | 6/2002 | Moskovich et al. |
| 6,414,760 B1 | 7/2002 | Lopez et al. |
| 6,417,971 B1 | 7/2002 | Moskovich et al. |
| 6,437,563 B1 | 8/2002 | Simmonds et al. |
| 6,445,512 B1 | 9/2002 | Moskovich et al. |
| 6,470,132 B1 | 10/2002 | Nousiainen et al. |
| 6,473,209 B1 | 10/2002 | Popovich |
| 6,476,974 B1 | 11/2002 | Kreitzer et al. |
| 6,483,303 B2 | 11/2002 | Simmonds et al. |
| 6,486,997 B1 | 11/2002 | Bruzzone et al. |
| 6,504,518 B1 | 1/2003 | Kuwayama et al. |
| 6,504,629 B1 | 1/2003 | Popovich et al. |
| 6,509,937 B1 | 1/2003 | Moskovich et al. |
| 6,518,747 B2 | 2/2003 | Sager et al. |
| 6,519,088 B1 | 2/2003 | Lipton |
| 6,522,794 B1 | 2/2003 | Bischel et al. |
| 6,524,771 B2 | 2/2003 | Maeda et al. |
| 6,529,336 B1 | 3/2003 | Kreitzer et al. |
| 6,534,977 B1 | 3/2003 | Duncan et al. |
| 6,545,778 B2 | 4/2003 | Ono et al. |
| 6,550,949 B1 | 4/2003 | Bauer et al. |
| 6,552,789 B1 | 4/2003 | Modro |
| 6,557,413 B2 | 5/2003 | Nieminen et al. |
| 6,559,813 B1 | 5/2003 | DeLuca et al. |
| 6,563,648 B2 | 5/2003 | Gleckman et al. |
| 6,563,650 B2 | 5/2003 | Moskovich et al. |
| 6,567,014 B1 | 5/2003 | Hansen et al. |
| 6,567,573 B1 | 5/2003 | Domash et al. |
| 6,577,411 B1 | 6/2003 | David et al. |
| 6,577,429 B1 | 6/2003 | Kurtz et al. |
| 6,580,529 B1 | 6/2003 | Amitai et al. |
| 6,583,838 B1 | 6/2003 | Hoke et al. |
| 6,583,873 B1 | 6/2003 | Goncharov et al. |
| 6,587,619 B1 | 7/2003 | Kinoshita |
| 6,594,090 B2 | 7/2003 | Kruschwitz et al. |
| 6,597,176 B2 | 7/2003 | Simmonds et al. |
| 6,597,475 B1 | 7/2003 | Shirakura et al. |
| 6,598,987 B1 | 7/2003 | Parikka |
| 6,600,590 B2 | 7/2003 | Roddy et al. |
| 6,608,720 B1 | 8/2003 | Freeman |
| 6,611,253 B1 | 8/2003 | Cohen |

(56) References Cited

U.S. PATENT DOCUMENTS

| | | |
|---|---|---|
| 6,618,104 B1 | 9/2003 | Date et al. |
| 6,625,381 B2 | 9/2003 | Roddy et al. |
| 6,646,772 B1 | 11/2003 | Popovich et al. |
| 6,646,810 B2 | 11/2003 | Harter, Jr. et al. |
| 6,661,578 B2 | 12/2003 | Hedrick |
| 6,667,134 B1 | 12/2003 | Sutherland et al. |
| 6,674,578 B2 | 1/2004 | Sugiyama et al. |
| 6,677,086 B1 | 1/2004 | Sutehrland et al. |
| 6,686,815 B1 | 2/2004 | Mirshekarl-Syahkal et al. |
| 6,690,516 B2 | 2/2004 | Aritake et al. |
| 6,692,666 B2 | 2/2004 | Sutherland et al. |
| 6,699,407 B1 | 3/2004 | Sutehrland et al. |
| 6,706,086 B2 | 3/2004 | Emig et al. |
| 6,706,451 B1 | 3/2004 | Sutherland et al. |
| 6,721,096 B2 | 4/2004 | Bruzzone et al. |
| 6,730,442 B1 | 5/2004 | Sutherland et al. |
| 6,731,434 B1 | 5/2004 | Hua et al. |
| 6,738,105 B1 | 5/2004 | Hannah et al. |
| 6,741,189 B1 | 5/2004 | Gibbons, II et al. |
| 6,744,478 B1 | 6/2004 | Asakura et al. |
| 6,747,781 B2 | 6/2004 | Trisnadi et al. |
| 6,748,342 B1 | 6/2004 | Dickhaus |
| 6,750,941 B2 | 6/2004 | Satoh et al. |
| 6,750,995 B2 | 6/2004 | Dickson |
| 6,757,105 B2 | 6/2004 | Niv et al. |
| 6,771,403 B1 | 8/2004 | Endo et al. |
| 6,776,339 B2 | 8/2004 | Piikivi |
| 6,781,701 B1 | 8/2004 | Sweetser et al. |
| 6,791,629 B2 | 9/2004 | Moskovich et al. |
| 6,791,739 B2 | 9/2004 | Ramanujan et al. |
| 6,804,066 B1 | 10/2004 | Ha et al. |
| 6,805,490 B2 | 10/2004 | Levola |
| 6,821,457 B1 | 11/2004 | Natarajan et al. |
| 6,822,713 B1 | 11/2004 | Yaroshchuk et al. |
| 6,825,987 B2 | 11/2004 | Repetto et al. |
| 6,829,095 B2 | 12/2004 | Amitai |
| 6,830,789 B2 | 12/2004 | Doane et al. |
| 6,833,955 B2 | 12/2004 | Niv |
| 6,836,369 B2 | 12/2004 | Fujikawa et al. |
| 6,844,212 B2 | 1/2005 | Bond et al. |
| 6,844,980 B2 | 1/2005 | He et al. |
| 6,847,274 B2 | 1/2005 | Salmela et al. |
| 6,847,488 B2 | 1/2005 | Travis |
| 6,850,210 B1 | 2/2005 | Lipton et al. |
| 6,853,491 B1 | 2/2005 | Ruhle et al. |
| 6,853,493 B2 | 2/2005 | Kreitzer et al. |
| 6,864,861 B2 | 3/2005 | Schehrer et al. |
| 6,864,927 B1 | 3/2005 | Cathey |
| 6,867,888 B2 | 3/2005 | Sutherland et al. |
| 6,873,443 B1 | 3/2005 | Joubert et al. |
| 6,878,494 B2 | 4/2005 | Sutehrland et al. |
| 6,885,483 B2 | 4/2005 | Takada |
| 6,903,872 B2 | 6/2005 | Schrader |
| 6,909,345 B1 | 6/2005 | Salmela et al. |
| 6,917,375 B2 | 7/2005 | Akada et al. |
| 6,922,267 B2 | 7/2005 | Endo et al. |
| 6,926,429 B2 | 8/2005 | Barlow et al. |
| 6,927,570 B2 | 8/2005 | Simmonds et al. |
| 6,927,694 B1 | 8/2005 | Smith et al. |
| 6,940,361 B1 | 9/2005 | Jokio et al. |
| 6,950,173 B1 | 9/2005 | Sutherland et al. |
| 6,950,227 B2 | 9/2005 | Schrader |
| 6,951,393 B2 | 10/2005 | Koide |
| 6,952,312 B2 | 10/2005 | Weber et al. |
| 6,952,435 B2 | 10/2005 | Lai et al. |
| 6,958,662 B1 | 10/2005 | Salmela et al. |
| 6,958,868 B1 | 10/2005 | Pender |
| 6,963,454 B1 | 11/2005 | Martins et al. |
| 6,972,788 B1 | 12/2005 | Robertson et al. |
| 6,975,345 B1 | 12/2005 | Lipton et al. |
| 6,980,365 B2 | 12/2005 | Moskovich |
| 6,985,296 B2 | 1/2006 | Lipton et al. |
| 6,987,908 B2 | 1/2006 | Bond et al. |
| 6,999,239 B1 | 2/2006 | Martins et al. |
| 7,002,618 B2 | 2/2006 | Lipton et al. |
| 7,002,753 B2 | 2/2006 | Moskovich et al. |
| 7,003,187 B2 | 2/2006 | Frick et al. |
| 7,009,773 B2 | 3/2006 | Chaoulov et al. |
| 7,018,563 B1 | 3/2006 | Sutherland et al. |
| 7,018,686 B2 | 3/2006 | Sutehrland et al. |
| 7,018,744 B2 | 3/2006 | Otaki et al. |
| 7,019,793 B2 | 3/2006 | Moskovich et al. |
| 7,021,777 B2 | 4/2006 | Amitai |
| 7,026,892 B2 | 4/2006 | Kajiya |
| 7,027,671 B2 | 4/2006 | Huck et al. |
| 7,034,748 B2 | 4/2006 | Kajiya |
| 7,053,735 B2 | 5/2006 | Salmela et al. |
| 7,053,991 B2 | 5/2006 | Sandusky |
| 7,054,045 B2 | 5/2006 | McPheters et al. |
| 7,058,434 B2 | 6/2006 | Wang et al. |
| 7,068,405 B2 | 6/2006 | Sutherland et al. |
| 7,072,020 B1 | 7/2006 | Sutherland et al. |
| 7,075,273 B2 | 7/2006 | O'Gorman et al. |
| 7,077,984 B1 | 7/2006 | Natarajan et al. |
| 7,081,215 B2 | 7/2006 | Natarajan et al. |
| 7,088,457 B1 | 8/2006 | Zou et al. |
| 7,088,515 B2 | 8/2006 | Lipton |
| 7,095,562 B1 | 8/2006 | Peng et al. |
| 7,099,080 B2 | 8/2006 | Lipton et al. |
| 7,101,048 B2 | 9/2006 | Travis |
| 7,108,383 B1 | 9/2006 | Mitchell et al. |
| 7,110,184 B1 | 9/2006 | Yona et al. |
| 7,119,965 B1 | 10/2006 | Rolland et al. |
| 7,123,418 B2 | 10/2006 | Weber et al. |
| 7,123,421 B1 | 10/2006 | Moskovich et al. |
| 7,126,418 B2 | 10/2006 | Hunton et al. |
| 7,126,583 B1 | 10/2006 | Breed |
| 7,132,200 B1 | 11/2006 | Ueda et al. |
| 7,133,084 B2 | 11/2006 | Moskovich et al. |
| 7,139,109 B2 | 11/2006 | Mukawa |
| RE39,424 E | 12/2006 | Moskovich |
| 7,145,729 B2 | 12/2006 | Kreitzer et al. |
| 7,149,385 B2 | 12/2006 | Parikka et al. |
| 7,151,246 B2 | 12/2006 | Fein et al. |
| 7,158,095 B2 | 1/2007 | Jenson et al. |
| 7,167,286 B2 | 1/2007 | Anderson et al. |
| 7,175,780 B1 | 2/2007 | Sutherland et al. |
| 7,181,105 B2 | 2/2007 | Teramura et al. |
| 7,181,108 B2 | 2/2007 | Levola |
| 7,184,002 B2 | 2/2007 | Lipton et al. |
| 7,184,615 B2 | 2/2007 | Levola |
| 7,186,567 B1 | 3/2007 | Sutherland et al. |
| 7,190,849 B2 | 3/2007 | Katase |
| 7,198,737 B2 | 4/2007 | Natarajan et al. |
| 7,199,934 B2 | 4/2007 | Yamasaki |
| 7,205,960 B2 | 4/2007 | David |
| 7,205,964 B1 | 4/2007 | Yokoyama et al. |
| 7,206,107 B2 | 4/2007 | Levola |
| 7,212,175 B1 | 5/2007 | Magee et al. |
| 7,230,767 B2 | 6/2007 | Walck et al. |
| 7,230,770 B2 | 6/2007 | Kreitzer et al. |
| 7,242,527 B2 | 7/2007 | Spitzer et al. |
| 7,248,128 B2 | 7/2007 | Mattila et al. |
| 7,256,915 B2 | 8/2007 | Sutherland et al. |
| 7,259,906 B1 | 8/2007 | Islam |
| 7,265,882 B2 | 9/2007 | Sutherland et al. |
| 7,265,903 B2 | 9/2007 | Sutherland et al. |
| 7,268,946 B2 | 9/2007 | Wang |
| 7,285,903 B2 | 10/2007 | Cull et al. |
| 7,286,272 B2 | 10/2007 | Mukawa |
| 7,289,069 B2 | 10/2007 | Ranta |
| RE39,911 E | 11/2007 | Moskovich |
| 7,299,983 B2 | 11/2007 | Piikivi |
| 7,301,601 B2 | 11/2007 | Lin et al. |
| 7,312,906 B2 | 12/2007 | Sutherland et al. |
| 7,313,291 B2 | 12/2007 | Okhotnikov et al. |
| 7,319,573 B2 | 1/2008 | Nishiyama |
| 7,320,534 B2 | 1/2008 | Sugikawa et al. |
| 7,323,275 B2 | 1/2008 | Otaki et al. |
| 7,333,685 B2 | 2/2008 | Stone et al. |
| 7,336,271 B2 | 2/2008 | Ozeki et al. |
| 7,339,737 B2 | 3/2008 | Urey et al. |
| 7,339,742 B2 | 3/2008 | Amitai et al. |
| 7,369,911 B1 | 5/2008 | Volant et al. |

(56) References Cited

U.S. PATENT DOCUMENTS

| | | |
|---|---|---|
| 7,375,870 B2 | 5/2008 | Schorpp |
| 7,375,886 B2 | 5/2008 | Lipton et al. |
| 7,391,573 B2 | 6/2008 | Amitai |
| 7,394,865 B2 | 7/2008 | Borran et al. |
| 7,395,181 B2 | 7/2008 | Foxlin |
| 7,397,606 B1 | 7/2008 | Peng et al. |
| 7,401,920 B1 | 7/2008 | Kranz et al. |
| 7,404,644 B2 | 7/2008 | Evans et al. |
| 7,410,286 B2 | 8/2008 | Travis |
| 7,411,637 B2 | 8/2008 | Weiss |
| 7,413,678 B1 | 8/2008 | Natarajan et al. |
| 7,413,679 B1 | 8/2008 | Sutherland et al. |
| 7,415,173 B2 | 8/2008 | Kassamakov et al. |
| 7,416,818 B2 | 8/2008 | Sutherland et al. |
| 7,418,170 B2 | 8/2008 | Mukawa et al. |
| 7,420,733 B1 | 9/2008 | Natarajan et al. |
| 7,433,116 B1 | 10/2008 | Islam |
| 7,436,568 B1 | 10/2008 | Kuykendall |
| 7,447,967 B2 | 11/2008 | Onggosanusi et al. |
| 7,453,612 B2 | 11/2008 | Mukawa |
| 7,454,103 B2 | 11/2008 | Parriaux |
| 7,457,040 B2 | 11/2008 | Amitai |
| 7,466,994 B2 | 12/2008 | Pihlaja et al. |
| 7,477,206 B2 | 1/2009 | Cowan et al. |
| 7,479,354 B2 | 1/2009 | Ueda et al. |
| 7,480,215 B2 | 1/2009 | Makela et al. |
| 7,482,996 B2 | 1/2009 | Larson et al. |
| 7,483,604 B2 | 1/2009 | Levola |
| 7,492,512 B2 | 2/2009 | Niv et al. |
| 7,496,293 B2 | 2/2009 | Shamir et al. |
| 7,499,217 B2 | 3/2009 | Cakmakci et al. |
| 7,500,104 B2 | 3/2009 | Goland |
| 7,511,891 B2 | 3/2009 | Messerschmidt |
| 7,513,668 B1 | 4/2009 | Peng et al. |
| 7,522,344 B1 | 4/2009 | Curatu et al. |
| 7,525,448 B1 | 4/2009 | Wilson et al. |
| 7,528,385 B2 | 5/2009 | Volodin et al. |
| 7,545,429 B2 | 6/2009 | Travis |
| 7,550,234 B2 | 6/2009 | Otaki et al. |
| 7,567,372 B2 | 7/2009 | Schorpp |
| 7,570,322 B1 | 8/2009 | Sutherland et al. |
| 7,570,405 B1 | 8/2009 | Sutherland et al. |
| 7,570,429 B2 | 8/2009 | Maliah et al. |
| 7,572,555 B2 | 8/2009 | Takizawa et al. |
| 7,573,640 B2 | 8/2009 | Nivon et al. |
| 7,576,916 B2 | 8/2009 | Amitai |
| 7,577,326 B2 | 8/2009 | Amitai |
| 7,579,119 B2 | 8/2009 | Ueda et al. |
| 7,583,423 B2 | 9/2009 | Sutherland et al. |
| 7,588,863 B2 | 9/2009 | Takizawa et al. |
| 7,589,900 B1 | 9/2009 | Powell |
| 7,589,901 B2 | 9/2009 | DeJong et al. |
| 7,592,988 B2 | 9/2009 | Katase |
| 7,593,575 B2 | 9/2009 | Houle et al. |
| 7,597,447 B2 | 10/2009 | Larson et al. |
| 7,599,012 B2 | 10/2009 | Nakamura et al. |
| 7,600,893 B2 | 10/2009 | Laino et al. |
| 7,602,552 B1 | 10/2009 | Blumenfeld |
| 7,605,719 B1 | 10/2009 | Wenger et al. |
| 7,605,774 B1 | 10/2009 | Brandt et al. |
| 7,605,882 B1 | 10/2009 | Sutherland et al. |
| 7,616,270 B2 | 11/2009 | Hirabayashi et al. |
| 7,617,022 B1 | 11/2009 | Wood et al. |
| 7,618,750 B2 | 11/2009 | Ueda et al. |
| 7,619,739 B1 | 11/2009 | Sutherland et al. |
| 7,619,825 B1 | 11/2009 | Peng et al. |
| 7,629,086 B2 | 12/2009 | Otaki et al. |
| 7,639,208 B1 | 12/2009 | Ha et al. |
| 7,639,911 B2 | 12/2009 | Lee et al. |
| 7,643,214 B2 | 1/2010 | Amitai |
| 7,656,585 B1 | 2/2010 | Powell et al. |
| 7,660,047 B1 | 2/2010 | Travis et al. |
| 7,672,055 B2 | 3/2010 | Amitai |
| 7,672,549 B2 | 3/2010 | Ghosh et al. |
| 7,710,622 B2 | 5/2010 | Takabayashi et al. |
| 7,710,654 B2 | 5/2010 | Ashkenazi et al. |
| 7,724,441 B2 | 5/2010 | Amitai |
| 7,724,442 B2 | 5/2010 | Amitai |
| 7,724,443 B2 | 5/2010 | Amitai |
| 7,733,571 B1 | 6/2010 | Li |
| 7,733,572 B1 | 6/2010 | Brown et al. |
| 7,740,387 B2 | 6/2010 | Schultz et al. |
| 7,747,113 B2 | 6/2010 | Mukawa et al. |
| 7,751,122 B2 | 7/2010 | Amitai |
| 7,751,662 B2 | 7/2010 | Kleemann et al. |
| 7,764,413 B2 | 7/2010 | Levola |
| 7,777,819 B2 | 8/2010 | Simmonds |
| 7,778,305 B2 | 8/2010 | Parriaux et al. |
| 7,778,508 B2 | 8/2010 | Hirayama |
| 7,843,642 B2 | 11/2010 | Shaoulov et al. |
| 7,847,235 B2 | 12/2010 | Krupkin et al. |
| 7,864,427 B2 | 1/2011 | Korenaga et al. |
| 7,865,080 B2 | 1/2011 | Hecker et al. |
| 7,866,869 B2 | 1/2011 | Karakawa |
| 7,872,707 B1 | 1/2011 | Sutherland et al. |
| 7,872,804 B2 | 1/2011 | Moon et al. |
| 7,884,593 B2 | 2/2011 | Simmonds et al. |
| 7,884,985 B2 | 2/2011 | Amitai et al. |
| 7,887,186 B2 | 2/2011 | Watanabe |
| 7,903,921 B2 | 3/2011 | Ostergard |
| 7,907,342 B2 | 3/2011 | Simmonds et al. |
| 7,920,787 B2 | 4/2011 | Gentner et al. |
| 7,928,862 B1 | 4/2011 | Matthews |
| 7,936,519 B2 | 5/2011 | Mukawa et al. |
| 7,944,428 B2 | 5/2011 | Travis |
| 7,944,616 B2 | 5/2011 | Mukawa |
| 7,949,214 B2 | 5/2011 | DeJong et al. |
| 7,961,117 B1 | 6/2011 | Zimmerman et al. |
| 7,969,644 B2 | 6/2011 | Tilleman et al. |
| 7,969,657 B2 | 6/2011 | Cakmakci et al. |
| 7,970,246 B2 | 6/2011 | Travis et al. |
| 7,976,208 B2 | 7/2011 | Travis |
| 7,984,884 B1 | 7/2011 | Iliev et al. |
| 7,999,982 B2 | 8/2011 | Endo et al. |
| 8,000,020 B2 | 8/2011 | Amitai et al. |
| 8,000,491 B2 | 8/2011 | Brodkin et al. |
| 8,004,765 B2 | 8/2011 | Amitai |
| 8,014,050 B2 | 9/2011 | McGrew |
| 8,016,475 B2 | 9/2011 | Travis |
| 8,018,579 B1 | 9/2011 | Krah |
| 8,022,942 B2 | 9/2011 | Bathiche et al. |
| 8,023,783 B2 | 9/2011 | Mukawa et al. |
| RE42,992 E | 12/2011 | David |
| 8,073,296 B2 | 12/2011 | Mukawa et al. |
| 8,077,274 B2 | 12/2011 | Sutherland et al. |
| 8,079,713 B2 | 12/2011 | Ashkenazi |
| 8,082,222 B2 | 12/2011 | Rangarajan et al. |
| 8,086,030 B2 | 12/2011 | Gordon et al. |
| 8,089,568 B1 | 1/2012 | Brown et al. |
| 8,093,451 B2 | 1/2012 | Spangenberg et al. |
| 8,098,439 B2 | 1/2012 | Amitai et al. |
| 8,107,023 B2 | 1/2012 | Simmonds et al. |
| 8,107,780 B2 | 1/2012 | Simmonds |
| 8,120,548 B1 | 2/2012 | Barber |
| 8,132,948 B2 | 3/2012 | Owen et al. |
| 8,132,976 B2 | 3/2012 | Odell et al. |
| 8,134,434 B2 | 3/2012 | Diederichs et al. |
| 8,136,690 B2 | 3/2012 | Fang et al. |
| 8,137,981 B2 | 3/2012 | Andrew et al. |
| 8,142,016 B2 | 3/2012 | Legerton et al. |
| 8,149,086 B2 | 4/2012 | Klein et al. |
| 8,152,315 B2 | 4/2012 | Travis et al. |
| 8,155,489 B2 | 4/2012 | Saarikko et al. |
| 8,159,752 B2 | 4/2012 | Wertheim et al. |
| 8,160,409 B2 | 4/2012 | Large |
| 8,160,411 B2 | 4/2012 | Levola et al. |
| 8,167,173 B1 | 5/2012 | Simmonds et al. |
| 8,186,874 B2 | 5/2012 | Sinbar et al. |
| 8,188,925 B2 | 5/2012 | DeJean |
| 8,189,263 B1 | 5/2012 | Wang et al. |
| 8,189,973 B2 | 5/2012 | Travis et al. |
| 8,194,325 B2 | 6/2012 | Levola et al. |
| 8,199,803 B2 | 6/2012 | Hauske et al. |
| 8,213,065 B2 | 7/2012 | Mukawa |

(56) References Cited

U.S. PATENT DOCUMENTS

| | | | |
|---|---|---|---|
| 8,213,755 B2 | 7/2012 | Mukawa et al. |
| 8,220,966 B2 | 7/2012 | Mukawa |
| 8,224,133 B2 | 7/2012 | Popovich et al. |
| 8,233,204 B1 | 7/2012 | Robbins et al. |
| 8,253,914 B2 | 8/2012 | Kajiya et al. |
| 8,254,031 B2 | 8/2012 | Levola |
| 8,264,498 B1 | 9/2012 | Vanderkamp et al. |
| 8,294,749 B2 | 10/2012 | Cable |
| 8,295,710 B2 | 10/2012 | Marcus |
| 8,301,031 B2 | 10/2012 | Gentner et al. |
| 8,305,577 B2 | 11/2012 | Kivioja et al. |
| 8,306,423 B2 | 11/2012 | Gottwald et al. |
| 8,310,327 B2 | 11/2012 | Willers et al. |
| 8,314,819 B2 | 11/2012 | Kimmel et al. |
| 8,314,993 B2 | 11/2012 | Levola et al. |
| 8,320,032 B2 | 11/2012 | Levola |
| 8,321,810 B2 | 11/2012 | Heintze |
| 8,325,166 B2 | 12/2012 | Akutsu et al. |
| 8,329,773 B2 | 12/2012 | Fäcke et al. |
| 8,335,040 B2 | 12/2012 | Mukawa et al. |
| 8,351,744 B2 | 1/2013 | Travis et al. |
| 8,354,640 B2 | 1/2013 | Hamre et al. |
| 8,354,806 B2 | 1/2013 | Travis et al. |
| 8,355,610 B2 | 1/2013 | Simmonds |
| 8,369,019 B2 | 2/2013 | Baker et al. |
| 8,376,548 B2 | 2/2013 | Schultz |
| 8,382,293 B2 | 2/2013 | Phillips, III et al. |
| 8,384,504 B2 | 2/2013 | Diederichs et al. |
| 8,384,694 B2 | 2/2013 | Powell et al. |
| 8,384,730 B1 | 2/2013 | Vanderkamp et al. |
| 8,396,339 B2 | 3/2013 | Mukawa et al. |
| 8,398,242 B2 | 3/2013 | Yamamoto et al. |
| 8,403,490 B2 | 3/2013 | Sugiyama et al. |
| 8,422,840 B2 | 4/2013 | Large |
| 8,427,439 B2 | 4/2013 | Larsen et al. |
| 8,432,363 B2 | 4/2013 | Saarikko et al. |
| 8,432,372 B2 | 4/2013 | Butler et al. |
| 8,432,614 B2 | 4/2013 | Amitai |
| 8,441,731 B2 | 5/2013 | Sprague |
| 8,447,365 B1 | 5/2013 | Imanuel |
| 8,466,953 B2 | 6/2013 | Levola |
| 8,472,119 B1 | 6/2013 | Kelly |
| 8,472,120 B2 | 6/2013 | Border et al. |
| 8,477,261 B2 | 7/2013 | Travis et al. |
| 8,481,130 B2 | 7/2013 | Harding et al. |
| 8,482,858 B2 | 7/2013 | Sprague |
| 8,488,246 B2 | 7/2013 | Border et al. |
| 8,491,121 B2 | 7/2013 | Tilleman et al. |
| 8,491,136 B2 | 7/2013 | Travis et al. |
| 8,493,366 B2 | 7/2013 | Bathiche et al. |
| 8,493,662 B2 | 7/2013 | Noui |
| 8,494,229 B2 | 7/2013 | Järvenpää et al. |
| 8,508,848 B2 | 8/2013 | Saarikko |
| 8,520,309 B2 | 8/2013 | Sprague |
| 8,547,638 B2 | 10/2013 | Levola |
| 8,548,290 B2 | 10/2013 | Travers et al. |
| 8,565,560 B2 | 10/2013 | Popovich et al. |
| 8,578,038 B2 | 11/2013 | Kaikuranta et al. |
| 8,581,831 B2 | 11/2013 | Travis |
| 8,582,206 B2 | 11/2013 | Travis |
| 8,593,734 B2 | 11/2013 | Laakkonen |
| 8,611,014 B2 | 12/2013 | Valera et al. |
| 8,619,062 B2 | 12/2013 | Powell et al. |
| 8,633,786 B2 | 1/2014 | Ermolov et al. |
| 8,634,120 B2 | 1/2014 | Popovich et al. |
| 8,634,139 B1 | 1/2014 | Brown et al. |
| 8,639,072 B2 | 1/2014 | Popovich et al. |
| 8,643,691 B2 | 2/2014 | Rosenfeld et al. |
| 8,643,948 B2 | 2/2014 | Amitai et al. |
| 8,649,099 B2 | 2/2014 | Schultz et al. |
| 8,654,420 B2 | 2/2014 | Simmonds |
| 8,659,826 B1 | 2/2014 | Brown et al. |
| D701,206 S | 3/2014 | Luckey et al. |
| 8,670,029 B2 | 3/2014 | McEldowney |
| 8,693,087 B2 | 4/2014 | Nowatzyk et al. |
| 8,698,705 B2 | 4/2014 | Burke |
| 8,731,350 B1 | 5/2014 | Lin et al. |
| 8,736,802 B2 | 5/2014 | Kajiya et al. |
| 8,736,963 B2 | 5/2014 | Robbins et al. |
| 8,742,952 B1 | 6/2014 | Bold |
| 8,746,008 B1 | 6/2014 | Mauritsen et al. |
| 8,749,886 B2 | 6/2014 | Gupta |
| 8,749,890 B1 | 6/2014 | Wood et al. |
| 8,767,294 B2 | 7/2014 | Chen et al. |
| 8,786,923 B2 | 7/2014 | Chuang et al. |
| 8,810,600 B2 | 8/2014 | Bohn et al. |
| 8,810,913 B2 | 8/2014 | Simmonds et al. |
| 8,810,914 B2 | 8/2014 | Amitai |
| 8,814,691 B2 | 8/2014 | Haddick et al. |
| 8,816,578 B1 | 8/2014 | Peng et al. |
| 8,817,350 B1 | 8/2014 | Robbins et al. |
| 8,824,836 B2 | 9/2014 | Sugiyama |
| 8,830,143 B1 | 9/2014 | Pitchford et al. |
| 8,830,584 B2 | 9/2014 | Saarikko et al. |
| 8,830,588 B1 | 9/2014 | Brown et al. |
| 8,842,368 B2 | 9/2014 | Simmonds et al. |
| 8,859,412 B2 | 10/2014 | Jain |
| 8,872,435 B2 | 10/2014 | Kreitzer et al. |
| 8,873,149 B2 | 10/2014 | Bohn et al. |
| 8,873,150 B2 | 10/2014 | Amitai |
| 8,885,112 B2 | 11/2014 | Popovich et al. |
| 8,885,997 B2 | 11/2014 | Nguyen et al. |
| 8,903,207 B1 | 12/2014 | Brown et al. |
| 8,906,088 B2 | 12/2014 | Pugh et al. |
| 8,913,324 B2 | 12/2014 | Schrader |
| 8,913,865 B1 | 12/2014 | Bennett |
| 8,917,453 B2 | 12/2014 | Bohn |
| 8,937,771 B2 | 1/2015 | Robbins et al. |
| 8,937,772 B1 | 1/2015 | Burns et al. |
| 8,938,141 B2 | 1/2015 | Magnusson |
| 8,950,867 B2 | 2/2015 | Macnamara |
| 8,964,298 B2 | 2/2015 | Haddick et al. |
| 8,965,152 B2 | 2/2015 | Simmonds |
| 8,985,803 B2 | 3/2015 | Bohn |
| 8,989,535 B2 | 3/2015 | Robbins |
| 9,019,595 B2 | 4/2015 | Jain |
| 9,025,253 B2 | 5/2015 | Hadad et al. |
| 9,035,344 B2 | 5/2015 | Jain |
| 9,075,184 B2 | 7/2015 | Popovich et al. |
| 9,081,178 B2 | 7/2015 | Simmonds et al. |
| 9,097,890 B2 | 8/2015 | Miller et al. |
| 9,128,226 B2 | 9/2015 | Fattal et al. |
| 9,129,295 B2 | 9/2015 | Border et al. |
| 9,164,290 B2 | 10/2015 | Robbins et al. |
| 9,176,324 B1 | 11/2015 | Scherer et al. |
| 9,201,270 B2 | 12/2015 | Fattal et al. |
| 9,215,293 B2 | 12/2015 | Miller |
| 9,244,275 B1 | 1/2016 | Li |
| 9,244,280 B1 | 1/2016 | Tiana et al. |
| 9,244,281 B1 | 1/2016 | Zimmerman et al. |
| 9,269,854 B2 | 2/2016 | Jain |
| 9,274,338 B2 | 3/2016 | Robbins et al. |
| 9,274,339 B1 | 3/2016 | Brown et al. |
| 9,310,566 B2 | 4/2016 | Valera et al. |
| 9,329,325 B2 | 5/2016 | Simmonds et al. |
| 9,335,604 B2 | 5/2016 | Popovich et al. |
| 9,341,846 B2 | 5/2016 | Popovich et al. |
| 9,354,366 B2 | 5/2016 | Jain |
| 9,366,862 B2 | 6/2016 | Haddick et al. |
| 9,366,864 B1 | 6/2016 | Brown et al. |
| 9,372,347 B1 | 6/2016 | Levola et al. |
| 9,377,623 B2 | 6/2016 | Robbins et al. |
| 9,377,852 B1 | 6/2016 | Shapiro et al. |
| 9,389,415 B2 | 7/2016 | Fattal et al. |
| 9,400,395 B2 | 7/2016 | Travers et al. |
| 9,423,360 B1 | 8/2016 | Kostamo et al. |
| 9,429,692 B1 | 8/2016 | Saarikko et al. |
| 9,431,794 B2 | 8/2016 | Jain |
| 9,456,744 B2 | 10/2016 | Popovich et al. |
| 9,459,451 B2 | 10/2016 | Saarikko et al. |
| 9,464,779 B2 | 10/2016 | Popovich et al. |
| 9,465,213 B2 | 10/2016 | Simmonds |
| 9,465,227 B2 | 10/2016 | Popovich et al. |
| 9,494,799 B2 | 11/2016 | Robbins et al. |

(56) References Cited

U.S. PATENT DOCUMENTS

| | | |
|---|---|---|
| 9,507,150 B1 | 11/2016 | Stratton et al. |
| 9,513,480 B2 | 12/2016 | Saarikko et al. |
| 9,519,089 B1 | 12/2016 | Brown et al. |
| 9,523,852 B1 | 12/2016 | Brown et al. |
| 9,535,253 B2 | 1/2017 | Levola et al. |
| 9,541,383 B2 | 1/2017 | Abovitz et al. |
| 9,541,763 B1 | 1/2017 | Heberlein et al. |
| 9,547,174 B2 | 1/2017 | Gao et al. |
| 9,551,874 B2 | 1/2017 | Amitai |
| 9,551,880 B2 | 1/2017 | Amitai |
| 9,599,813 B1 | 3/2017 | Stratton et al. |
| 9,612,403 B2 | 4/2017 | Abovitz et al. |
| 9,632,226 B2 | 4/2017 | Waldern et al. |
| 9,635,352 B1 | 4/2017 | Henry et al. |
| 9,648,313 B1 | 5/2017 | Henry et al. |
| 9,651,368 B2 | 5/2017 | Abovitz et al. |
| 9,664,824 B2 | 5/2017 | Simmonds et al. |
| 9,664,910 B2 | 5/2017 | Mansharof et al. |
| 9,674,413 B1 | 6/2017 | Tiana et al. |
| 9,678,345 B1 | 6/2017 | Melzer et al. |
| 9,679,367 B1 | 6/2017 | Wald |
| 9,715,067 B1 | 7/2017 | Brown et al. |
| 9,715,110 B1 | 7/2017 | Brown et al. |
| 9,726,540 B2 | 8/2017 | Popovich et al. |
| 9,727,772 B2 | 8/2017 | Popovich et al. |
| 9,733,475 B1 | 8/2017 | Brown et al. |
| 9,746,688 B2 | 8/2017 | Popovich et al. |
| 9,754,507 B1 | 9/2017 | Wenger et al. |
| 9,762,895 B1 | 9/2017 | Henry et al. |
| 9,766,465 B1 | 9/2017 | Tiana et al. |
| 9,785,231 B1 | 10/2017 | Zimmerman |
| 9,791,694 B1 | 10/2017 | Haverkamp et al. |
| 9,791,703 B1 * | 10/2017 | Vallius ................. G02B 30/35 |
| 9,804,389 B2 | 10/2017 | Popovich et al. |
| 9,823,423 B2 | 11/2017 | Waldern et al. |
| 9,874,931 B1 | 1/2018 | Koenck et al. |
| 9,933,684 B2 | 4/2018 | Brown et al. |
| 9,977,247 B1 | 5/2018 | Brown et al. |
| 10,089,516 B2 | 10/2018 | Popovich et al. |
| 10,156,681 B2 | 12/2018 | Waldern et al. |
| 10,185,154 B2 | 1/2019 | Popovich et al. |
| 2001/0024177 A1 | 9/2001 | Popovich |
| 2001/0043163 A1 | 11/2001 | Waldern et al. |
| 2001/0050756 A1 | 12/2001 | Lipton et al. |
| 2002/0003509 A1 | 1/2002 | Lipton et al. |
| 2002/0009299 A1 | 1/2002 | Lipton |
| 2002/0011969 A1 | 1/2002 | Lipton et al. |
| 2002/0012064 A1 | 1/2002 | Yamaguchi |
| 2002/0021461 A1 | 2/2002 | Ono et al. |
| 2002/0036825 A1 | 3/2002 | Lipton et al. |
| 2002/0047837 A1 | 4/2002 | Suyama et al. |
| 2002/0075240 A1 | 6/2002 | Lieberman et al. |
| 2002/0110077 A1 | 8/2002 | Drobot et al. |
| 2002/0126332 A1 | 9/2002 | Popovich |
| 2002/0127497 A1 | 9/2002 | Brown et al. |
| 2002/0131175 A1 | 9/2002 | Yagi et al. |
| 2002/0196332 A1 | 12/2002 | Lipton et al. |
| 2003/0007070 A1 | 1/2003 | Lipton et al. |
| 2003/0030912 A1 | 2/2003 | Gleckman et al. |
| 2003/0038912 A1 | 2/2003 | Broer et al. |
| 2003/0039442 A1 | 2/2003 | Bond et al. |
| 2003/0063042 A1 | 4/2003 | Friesem et al. |
| 2003/0063884 A1 | 4/2003 | Smith et al. |
| 2003/0067685 A1 | 4/2003 | Niv |
| 2003/0086670 A1 | 5/2003 | Moridaira et al. |
| 2003/0107809 A1 | 6/2003 | Chen et al. |
| 2003/0149346 A1 | 8/2003 | Arnone et al. |
| 2003/0197154 A1 | 10/2003 | Manabe et al. |
| 2003/0197157 A1 | 10/2003 | Sutherland et al. |
| 2003/0202247 A1 | 10/2003 | Niv et al. |
| 2003/0228019 A1 | 12/2003 | Eichler et al. |
| 2004/0004767 A1 | 1/2004 | Song |
| 2004/0089842 A1 | 5/2004 | Sutehrland et al. |
| 2004/0109234 A1 | 6/2004 | Levola |
| 2004/0112862 A1 | 6/2004 | Willson et al. |
| 2004/0130797 A1 | 7/2004 | Leigh |
| 2004/0141217 A1 | 7/2004 | Endo et al. |
| 2004/0174348 A1 | 9/2004 | David |
| 2004/0175627 A1 | 9/2004 | Sutherland et al. |
| 2004/0179764 A1 | 9/2004 | Melikechi et al. |
| 2004/0188617 A1 | 9/2004 | Devitt et al. |
| 2004/0208446 A1 | 10/2004 | Bond et al. |
| 2004/0208466 A1 | 10/2004 | Mossberg et al. |
| 2004/0263969 A1 | 12/2004 | Lipton et al. |
| 2004/0263971 A1 | 12/2004 | Lipton et al. |
| 2005/0018304 A1 | 1/2005 | Lipton et al. |
| 2005/0079663 A1 | 4/2005 | Masutani et al. |
| 2005/0105909 A1 | 5/2005 | Stone |
| 2005/0122395 A1 | 6/2005 | Lipton et al. |
| 2005/0134404 A1 | 6/2005 | Kajiya et al. |
| 2005/0135747 A1 | 6/2005 | Greiner et al. |
| 2005/0136260 A1 | 6/2005 | Garcia |
| 2005/0141066 A1 | 6/2005 | Ouchi |
| 2005/0180687 A1 | 8/2005 | Amitai |
| 2005/0195276 A1 | 9/2005 | Lipton et al. |
| 2005/0232530 A1 | 10/2005 | Kekas |
| 2005/0259217 A1 | 11/2005 | Lin et al. |
| 2005/0259302 A9 | 11/2005 | Metz et al. |
| 2005/0265585 A1 | 12/2005 | Rowe |
| 2005/0269481 A1 | 12/2005 | David et al. |
| 2005/0271258 A1 | 12/2005 | Rowe |
| 2005/0286133 A1 | 12/2005 | Lipton |
| 2006/0012878 A1 | 1/2006 | Lipton et al. |
| 2006/0013977 A1 | 1/2006 | Duke et al. |
| 2006/0043938 A1 | 3/2006 | O'Gorman et al. |
| 2006/0055993 A1 | 3/2006 | Kobayashi et al. |
| 2006/0093793 A1 | 5/2006 | Miyakawa et al. |
| 2006/0114564 A1 | 6/2006 | Sutherland et al. |
| 2006/0119837 A1 | 6/2006 | Raguin et al. |
| 2006/0119916 A1 | 6/2006 | Sutherland et al. |
| 2006/0126179 A1 | 6/2006 | Levola |
| 2006/0132914 A1 | 6/2006 | Weiss et al. |
| 2006/0146422 A1 | 7/2006 | Koike |
| 2006/0159864 A1 | 7/2006 | Natarajan et al. |
| 2006/0164593 A1 | 7/2006 | Peyghambarian et al. |
| 2006/0171647 A1 | 8/2006 | Ye et al. |
| 2006/0177180 A1 | 8/2006 | Tazawa et al. |
| 2006/0191293 A1 | 8/2006 | Kuczma |
| 2006/0215244 A1 | 9/2006 | Yosha et al. |
| 2006/0221063 A1 | 10/2006 | Ishihara |
| 2006/0221448 A1 | 10/2006 | Nivon et al. |
| 2006/0228073 A1 | 10/2006 | Mukawa et al. |
| 2006/0268104 A1 | 11/2006 | Cowan et al. |
| 2006/0268412 A1 | 11/2006 | Downing et al. |
| 2006/0279662 A1 | 12/2006 | Kapellner et al. |
| 2006/0284974 A1 | 12/2006 | Lipton et al. |
| 2006/0285205 A1 | 12/2006 | Lipton et al. |
| 2006/0291021 A1 | 12/2006 | Mukawa |
| 2006/0291052 A1 | 12/2006 | Lipton et al. |
| 2007/0012777 A1 | 1/2007 | Tsikos et al. |
| 2007/0019152 A1 | 1/2007 | Caputo et al. |
| 2007/0019297 A1 | 1/2007 | Stewart et al. |
| 2007/0041684 A1 | 2/2007 | Popovich et al. |
| 2007/0045596 A1 | 3/2007 | King et al. |
| 2007/0052929 A1 | 3/2007 | Allman et al. |
| 2007/0070476 A1 | 3/2007 | Yamada et al. |
| 2007/0070504 A1 | 3/2007 | Akutsu et al. |
| 2007/0089625 A1 | 4/2007 | Grinberg et al. |
| 2007/0097502 A1 | 5/2007 | Lipton et al. |
| 2007/0109401 A1 | 5/2007 | Lipton et al. |
| 2007/0116409 A1 | 5/2007 | Bryan et al. |
| 2007/0133089 A1 | 6/2007 | Lipton et al. |
| 2007/0133920 A1 | 6/2007 | Lee et al. |
| 2007/0133983 A1 | 6/2007 | Traff |
| 2007/0154153 A1 | 7/2007 | Fomitchov et al. |
| 2007/0160325 A1 | 7/2007 | Son et al. |
| 2007/0177007 A1 | 8/2007 | Lipton et al. |
| 2007/0182915 A1 | 8/2007 | Osawa et al. |
| 2007/0183650 A1 | 8/2007 | Lipton et al. |
| 2007/0188602 A1 | 8/2007 | Cowan et al. |
| 2007/0188837 A1 | 8/2007 | Shimizu et al. |
| 2007/0206155 A1 | 9/2007 | Lipton |
| 2007/0211164 A1 | 9/2007 | Olsen et al. |
| 2007/0236560 A1 | 10/2007 | Lipton et al. |

(56) References Cited

U.S. PATENT DOCUMENTS

| | | |
|---|---|---|
| 2007/0237456 A1 | 10/2007 | Blauvelt et al. |
| 2007/0247687 A1 | 10/2007 | Handschy et al. |
| 2007/0258138 A1 | 11/2007 | Cowan et al. |
| 2007/0263169 A1 | 11/2007 | Lipton |
| 2008/0001909 A1 | 1/2008 | Lim |
| 2008/0018851 A1 | 1/2008 | Lipton et al. |
| 2008/0024598 A1 | 1/2008 | Perlin et al. |
| 2008/0043334 A1 | 2/2008 | Itzkovitch et al. |
| 2008/0049100 A1 | 2/2008 | Lipton et al. |
| 2008/0062259 A1 | 3/2008 | Lipton et al. |
| 2008/0106775 A1 | 5/2008 | Amitai et al. |
| 2008/0106779 A1 | 5/2008 | Peterson et al. |
| 2008/0117289 A1 | 5/2008 | Schowengerdt et al. |
| 2008/0136916 A1 | 6/2008 | Wolff |
| 2008/0136923 A1 | 6/2008 | Inbar et al. |
| 2008/0138013 A1 | 6/2008 | Parriaux |
| 2008/0143964 A1 | 6/2008 | Cowan et al. |
| 2008/0143965 A1 | 6/2008 | Cowan et al. |
| 2008/0149517 A1 | 6/2008 | Lipton et al. |
| 2008/0151370 A1 | 6/2008 | Cook et al. |
| 2008/0151379 A1 | 6/2008 | Amitai |
| 2008/0186573 A1 | 8/2008 | Lipton |
| 2008/0186574 A1 | 8/2008 | Robinson et al. |
| 2008/0186604 A1 | 8/2008 | Amitai |
| 2008/0198471 A1 | 8/2008 | Amitai |
| 2008/0226281 A1 | 9/2008 | Lipton |
| 2008/0239067 A1 | 10/2008 | Lipton |
| 2008/0239068 A1 | 10/2008 | Lipton |
| 2008/0273081 A1 | 11/2008 | Lipton |
| 2008/0278812 A1 | 11/2008 | Amitai |
| 2008/0285137 A1 | 11/2008 | Simmonds et al. |
| 2008/0285140 A1 | 11/2008 | Amitai |
| 2008/0297731 A1 | 12/2008 | Powell et al. |
| 2008/0298649 A1 | 12/2008 | Ennis et al. |
| 2008/0303895 A1 | 12/2008 | Akka et al. |
| 2008/0303896 A1 | 12/2008 | Lipton et al. |
| 2008/0304111 A1 | 12/2008 | Queenan et al. |
| 2008/0309586 A1 | 12/2008 | Vitale |
| 2008/0316303 A1 | 12/2008 | Chiu et al. |
| 2008/0316375 A1 | 12/2008 | Lipton et al. |
| 2009/0017424 A1 | 1/2009 | Yoeli et al. |
| 2009/0019222 A1 | 1/2009 | Verma et al. |
| 2009/0052017 A1 | 2/2009 | Sasaki |
| 2009/0052046 A1 | 2/2009 | Amitai |
| 2009/0052047 A1 | 2/2009 | Amitai |
| 2009/0067774 A1 | 3/2009 | Magnusson |
| 2009/0074356 A1 | 3/2009 | Sanchez et al. |
| 2009/0097122 A1 | 4/2009 | Niv |
| 2009/0097127 A1 | 4/2009 | Amitai |
| 2009/0121301 A1 | 5/2009 | Chang |
| 2009/0122413 A1 | 5/2009 | Hoffman et al. |
| 2009/0122414 A1 | 5/2009 | Amitai |
| 2009/0128495 A1 | 5/2009 | Kong et al. |
| 2009/0128902 A1 | 5/2009 | Niv et al. |
| 2009/0128911 A1 | 5/2009 | Itzkovitch et al. |
| 2009/0136246 A1 | 5/2009 | Murakami |
| 2009/0141324 A1 | 6/2009 | Mukawa |
| 2009/0153437 A1 | 6/2009 | Aharoni |
| 2009/0190222 A1 | 7/2009 | Simmonds et al. |
| 2009/0213208 A1 | 8/2009 | Glatt |
| 2009/0237804 A1 | 9/2009 | Amitai et al. |
| 2009/0242021 A1 | 10/2009 | Petkie et al. |
| 2009/0296218 A1 | 12/2009 | Ryytty |
| 2009/0303599 A1 | 12/2009 | Levola |
| 2009/0316246 A1 | 12/2009 | Asai et al. |
| 2010/0014312 A1 | 1/2010 | Travis et al. |
| 2010/0039796 A1 | 2/2010 | Mukawa |
| 2010/0053565 A1 | 3/2010 | Mizushima et al. |
| 2010/0060551 A1 | 3/2010 | Sugiyama et al. |
| 2010/0060990 A1 | 3/2010 | Wertheim et al. |
| 2010/0079865 A1 | 4/2010 | Saarikko et al. |
| 2010/0086256 A1 | 4/2010 | Ben Bakir et al. |
| 2010/0092124 A1 | 4/2010 | Magnusson et al. |
| 2010/0096562 A1 | 4/2010 | Klunder et al. |
| 2010/0097674 A1 | 4/2010 | Kasazumi et al. |
| 2010/0097820 A1 | 4/2010 | Owen et al. |
| 2010/0103078 A1 | 4/2010 | Mukawa et al. |
| 2010/0134534 A1 | 6/2010 | Seesselberg et al. |
| 2010/0136319 A1 | 6/2010 | Imai et al. |
| 2010/0141555 A1 | 6/2010 | Rorberg et al. |
| 2010/0149073 A1 | 6/2010 | Chaum et al. |
| 2010/0165465 A1 | 7/2010 | Levola |
| 2010/0165660 A1 | 7/2010 | Weber et al. |
| 2010/0171680 A1 | 7/2010 | Lapidot et al. |
| 2010/0177388 A1 | 7/2010 | Cohen et al. |
| 2010/0202725 A1 | 8/2010 | Popovich et al. |
| 2010/0214659 A1 | 8/2010 | Levola |
| 2010/0220293 A1 | 9/2010 | Mizushima et al. |
| 2010/0231532 A1 | 9/2010 | Nho et al. |
| 2010/0231693 A1 | 9/2010 | Levola |
| 2010/0231705 A1 | 9/2010 | Yahav et al. |
| 2010/0232003 A1 | 9/2010 | Baldy et al. |
| 2010/0246003 A1 | 9/2010 | Simmonds et al. |
| 2010/0246004 A1 | 9/2010 | Simmonds |
| 2010/0246993 A1 | 9/2010 | Rieger et al. |
| 2010/0265117 A1 | 10/2010 | Weiss |
| 2010/0277803 A1 | 11/2010 | Pockett et al. |
| 2010/0284085 A1 | 11/2010 | Laakkonen |
| 2010/0284090 A1 | 11/2010 | Simmonds |
| 2010/0284180 A1 | 11/2010 | Popovich et al. |
| 2010/0296163 A1 | 11/2010 | Saarikko |
| 2010/0299814 A1 | 12/2010 | Celona et al. |
| 2010/0315719 A1 | 12/2010 | Saarikko et al. |
| 2010/0321781 A1 | 12/2010 | Levola et al. |
| 2011/0001895 A1 | 1/2011 | Dahl |
| 2011/0002143 A1 | 1/2011 | Saarikko et al. |
| 2011/0013423 A1 | 1/2011 | Selbrede et al. |
| 2011/0019250 A1 | 1/2011 | Aiki et al. |
| 2011/0019874 A1 | 1/2011 | Jarvenpaa et al. |
| 2011/0026128 A1 | 2/2011 | Baker et al. |
| 2011/0026774 A1 | 2/2011 | Flohr et al. |
| 2011/0032602 A1 | 2/2011 | Rothenberg et al. |
| 2011/0032618 A1 | 2/2011 | Handerek et al. |
| 2011/0032706 A1 | 2/2011 | Mukawa |
| 2011/0038024 A1 | 2/2011 | Wang et al. |
| 2011/0050548 A1 | 3/2011 | Blumenfeld et al. |
| 2011/0063604 A1 | 3/2011 | Hamre et al. |
| 2011/0096401 A1 | 4/2011 | Levola |
| 2011/0102711 A1 | 5/2011 | Sutherland et al. |
| 2011/0109880 A1 | 5/2011 | Nummela |
| 2011/0157707 A1 | 6/2011 | Tilleman et al. |
| 2011/0164221 A1 | 7/2011 | Tilleman et al. |
| 2011/0187293 A1 | 8/2011 | Travis et al. |
| 2011/0211239 A1 | 9/2011 | Mukawa et al. |
| 2011/0235179 A1 | 9/2011 | Simmonds |
| 2011/0235365 A1 | 9/2011 | McCollum et al. |
| 2011/0236803 A1 | 9/2011 | Weiser et al. |
| 2011/0238399 A1 | 9/2011 | Ophir et al. |
| 2011/0242349 A1 | 10/2011 | Izuha et al. |
| 2011/0242661 A1 | 10/2011 | Simmonds |
| 2011/0242670 A1 | 10/2011 | Simmonds |
| 2011/0249309 A1 | 10/2011 | McPheters et al. |
| 2011/0274435 A1 | 11/2011 | Fini et al. |
| 2011/0299075 A1 | 12/2011 | Meade et al. |
| 2011/0310356 A1 | 12/2011 | Vallius |
| 2012/0007979 A1 | 1/2012 | Schneider et al. |
| 2012/0027347 A1 | 2/2012 | Mathal et al. |
| 2012/0033306 A1 | 2/2012 | Valera et al. |
| 2012/0044572 A1 | 2/2012 | Simmonds et al. |
| 2012/0044573 A1 | 2/2012 | Simmonds et al. |
| 2012/0062850 A1 | 3/2012 | Travis |
| 2012/0062998 A1 | 3/2012 | Schultz et al. |
| 2012/0075168 A1 | 3/2012 | Osterhout et al. |
| 2012/0081789 A1 | 4/2012 | Mukawa et al. |
| 2012/0092632 A1 | 4/2012 | McLeod et al. |
| 2012/0099203 A1 | 4/2012 | Boubis et al. |
| 2012/0105634 A1 | 5/2012 | Meidan et al. |
| 2012/0120493 A1 | 5/2012 | Simmonds et al. |
| 2012/0127577 A1 | 5/2012 | Desserouer |
| 2012/0162549 A1 | 6/2012 | Gao et al. |
| 2012/0162764 A1 | 6/2012 | Shimizu |
| 2012/0176665 A1 | 7/2012 | Song et al. |
| 2012/0183888 A1 | 7/2012 | Oliveira et al. |
| 2012/0194420 A1 | 8/2012 | Osterhout et al. |

(56) References Cited

U.S. PATENT DOCUMENTS

| | | |
|---|---|---|
| 2012/0200532 A1 | 8/2012 | Powell et al. |
| 2012/0206811 A1 | 8/2012 | Mukawa et al. |
| 2012/0206937 A1 | 8/2012 | Travis et al. |
| 2012/0207432 A1 | 8/2012 | Travis et al. |
| 2012/0207434 A1 | 8/2012 | Large |
| 2012/0214089 A1 | 8/2012 | Hönel et al. |
| 2012/0214090 A1 | 8/2012 | Weiser et al. |
| 2012/0218481 A1 | 8/2012 | Popovich et al. |
| 2012/0224062 A1 | 9/2012 | Lacoste et al. |
| 2012/0235884 A1 | 9/2012 | Miller et al. |
| 2012/0235886 A1 | 9/2012 | Border et al. |
| 2012/0235900 A1 | 9/2012 | Border et al. |
| 2012/0242661 A1 | 9/2012 | Takagi et al. |
| 2012/0280956 A1 | 11/2012 | Yamamoto et al. |
| 2012/0281943 A1 | 11/2012 | Popovich et al. |
| 2012/0290973 A1 | 11/2012 | Robertson et al. |
| 2012/0294037 A1 | 11/2012 | Holman et al. |
| 2012/0300311 A1 | 11/2012 | Simmonds et al. |
| 2012/0320460 A1 | 12/2012 | Levola |
| 2013/0016324 A1 | 1/2013 | Travis |
| 2013/0016362 A1 | 1/2013 | Gong et al. |
| 2013/0021392 A1 | 1/2013 | Travis |
| 2013/0021586 A1 | 1/2013 | Lippey |
| 2013/0033485 A1 | 2/2013 | Kollin et al. |
| 2013/0039619 A1 | 2/2013 | Laughlin |
| 2013/0044376 A1 | 2/2013 | Valera et al. |
| 2013/0059233 A1 | 3/2013 | Askham |
| 2013/0069850 A1 | 3/2013 | Mukawa et al. |
| 2013/0077049 A1 | 3/2013 | Bohn |
| 2013/0093893 A1 | 4/2013 | Schofield et al. |
| 2013/0101253 A1 | 4/2013 | Popovich et al. |
| 2013/0117377 A1 | 5/2013 | Miller |
| 2013/0125027 A1 | 5/2013 | Abovitz et al. |
| 2013/0128230 A1 | 5/2013 | Macnamara |
| 2013/0138275 A1 | 5/2013 | Nauman et al. |
| 2013/0141937 A1 | 6/2013 | Katsuta et al. |
| 2013/0143336 A1 | 6/2013 | Jain |
| 2013/0163089 A1 | 6/2013 | Bohn |
| 2013/0170031 A1 | 7/2013 | Bohn et al. |
| 2013/0176704 A1 | 7/2013 | Lanman et al. |
| 2013/0184904 A1 | 7/2013 | Gadzinski |
| 2013/0200710 A1 | 8/2013 | Robbins |
| 2013/0207887 A1 | 8/2013 | Raffle et al. |
| 2013/0224634 A1 | 8/2013 | Berneth et al. |
| 2013/0229717 A1 | 9/2013 | Amitai |
| 2013/0235331 A1* | 9/2013 | Heinrich ............... G02C 11/10 351/158 |
| 2013/0249895 A1 | 9/2013 | Westerinen et al. |
| 2013/0250207 A1 | 9/2013 | Bohn |
| 2013/0250430 A1 | 9/2013 | Robbins et al. |
| 2013/0250431 A1 | 9/2013 | Robbins et al. |
| 2013/0257848 A1 | 10/2013 | Westerinen et al. |
| 2013/0258701 A1 | 10/2013 | Westerinen et al. |
| 2013/0267309 A1 | 10/2013 | Robbins et al. |
| 2013/0271731 A1 | 10/2013 | Popovich et al. |
| 2013/0277890 A1 | 10/2013 | Bowman et al. |
| 2013/0305437 A1 | 11/2013 | Weller et al. |
| 2013/0312811 A1 | 11/2013 | Aspnes et al. |
| 2013/0314789 A1 | 11/2013 | Saarikko et al. |
| 2013/0314793 A1 | 11/2013 | Robbins et al. |
| 2013/0322810 A1 | 12/2013 | Robbins |
| 2013/0328948 A1 | 12/2013 | Kunkel et al. |
| 2013/0342525 A1 | 12/2013 | Benko et al. |
| 2014/0003762 A1 | 1/2014 | Macnamara |
| 2014/0024159 A1 | 1/2014 | Jain |
| 2014/0027006 A1 | 1/2014 | Foley et al. |
| 2014/0037242 A1 | 2/2014 | Popovich et al. |
| 2014/0043689 A1 | 2/2014 | Mason |
| 2014/0055845 A1 | 2/2014 | Jain |
| 2014/0063055 A1 | 3/2014 | Osterhout et al. |
| 2014/0064655 A1 | 3/2014 | Nguyen et al. |
| 2014/0071538 A1 | 3/2014 | Muller |
| 2014/0098010 A1 | 4/2014 | Travis |
| 2014/0104665 A1 | 4/2014 | Popovich et al. |
| 2014/0104685 A1 | 4/2014 | Bohn et al. |
| 2014/0118647 A1 | 5/2014 | Momonoi et al. |
| 2014/0130132 A1 | 5/2014 | Cahill et al. |
| 2014/0140653 A1 | 5/2014 | Brown et al. |
| 2014/0140654 A1* | 5/2014 | Brown ............... G02B 27/0172 385/10 |
| 2014/0146394 A1 | 5/2014 | Tout et al. |
| 2014/0152778 A1 | 6/2014 | Ihlenburg et al. |
| 2014/0160576 A1 | 6/2014 | Robbins et al. |
| 2014/0168055 A1 | 6/2014 | Smith |
| 2014/0168260 A1 | 6/2014 | O'Brien et al. |
| 2014/0168735 A1 | 6/2014 | Yuan et al. |
| 2014/0168783 A1 | 6/2014 | Luebke et al. |
| 2014/0172296 A1 | 6/2014 | Shtukater |
| 2014/0176528 A1 | 6/2014 | Robbins |
| 2014/0177023 A1 | 6/2014 | Gao et al. |
| 2014/0185286 A1 | 7/2014 | Popovich et al. |
| 2014/0198128 A1 | 7/2014 | Hong et al. |
| 2014/0204455 A1 | 7/2014 | Popovich et al. |
| 2014/0211322 A1 | 7/2014 | Bohn et al. |
| 2014/0218468 A1 | 8/2014 | Gao et al. |
| 2014/0218801 A1 | 8/2014 | Simmonds et al. |
| 2014/0232759 A1 | 8/2014 | Simmonds et al. |
| 2014/0240834 A1 | 8/2014 | Mason |
| 2014/0240842 A1 | 8/2014 | Nguyen et al. |
| 2014/0267420 A1 | 9/2014 | Schowengerdt et al. |
| 2014/0300947 A1 | 10/2014 | Fattal et al. |
| 2014/0300960 A1 | 10/2014 | Santori et al. |
| 2014/0300966 A1 | 10/2014 | Travers et al. |
| 2014/0327970 A1* | 11/2014 | Bohn ....................... G02B 6/10 359/630 |
| 2014/0330159 A1 | 11/2014 | Costa et al. |
| 2014/0367719 A1 | 12/2014 | Jain |
| 2014/0375542 A1 | 12/2014 | Robbins et al. |
| 2014/0375789 A1 | 12/2014 | Lou et al. |
| 2014/0375790 A1 | 12/2014 | Robbins et al. |
| 2015/0001677 A1 | 1/2015 | Palumbo et al. |
| 2015/0003796 A1 | 1/2015 | Bennett |
| 2015/0015946 A1 | 1/2015 | Muller |
| 2015/0016777 A1 | 1/2015 | Abovitz et al. |
| 2015/0035744 A1 | 2/2015 | Robbins et al. |
| 2015/0036068 A1 | 2/2015 | Fattal et al. |
| 2015/0058791 A1 | 2/2015 | Robertson et al. |
| 2015/0062675 A1 | 3/2015 | Ayres et al. |
| 2015/0062707 A1 | 3/2015 | Simmonds et al. |
| 2015/0086163 A1 | 3/2015 | Valera et al. |
| 2015/0107671 A1 | 4/2015 | Bodan et al. |
| 2015/0109763 A1 | 4/2015 | Shinkai et al. |
| 2015/0125109 A1 | 5/2015 | Robbins et al. |
| 2015/0148728 A1 | 5/2015 | Sallum et al. |
| 2015/0160529 A1 | 6/2015 | Popovich et al. |
| 2015/0167868 A1 | 6/2015 | Boncha |
| 2015/0177688 A1 | 6/2015 | Popovich et al. |
| 2015/0185475 A1 | 7/2015 | Saarikko et al. |
| 2015/0219834 A1 | 8/2015 | Nichol et al. |
| 2015/0235447 A1 | 8/2015 | Abovitz et al. |
| 2015/0235448 A1 | 8/2015 | Schowengerdt et al. |
| 2015/0243068 A1 | 8/2015 | Solomon |
| 2015/0247975 A1 | 9/2015 | Abovitz et al. |
| 2015/0260994 A1 | 9/2015 | Akutsu et al. |
| 2015/0268415 A1 | 9/2015 | Schowengerdt et al. |
| 2015/0277375 A1 | 10/2015 | Large et al. |
| 2015/0285682 A1 | 10/2015 | Popovich et al. |
| 2015/0288129 A1 | 10/2015 | Jain |
| 2015/0289762 A1 | 10/2015 | Popovich et al. |
| 2015/0309264 A1 | 10/2015 | Abovitz et al. |
| 2015/0316768 A1 | 11/2015 | Simmonds |
| 2015/0346490 A1 | 12/2015 | Tekolste et al. |
| 2015/0346495 A1 | 12/2015 | Welch et al. |
| 2015/0355394 A1 | 12/2015 | Leighton et al. |
| 2016/0003847 A1 | 1/2016 | Ryan et al. |
| 2016/0004090 A1 | 1/2016 | Popovich et al. |
| 2016/0026253 A1 | 1/2016 | Bradski et al. |
| 2016/0033705 A1 | 2/2016 | Fattal |
| 2016/0033706 A1 | 2/2016 | Fattal et al. |
| 2016/0038992 A1 | 2/2016 | Arthur et al. |
| 2016/0041387 A1 | 2/2016 | Valera et al. |
| 2016/0077338 A1* | 3/2016 | Robbins ............... G09G 3/002 345/8 |
| 2016/0085300 A1 | 3/2016 | Robbins et al. |

(56) References Cited

U.S. PATENT DOCUMENTS

| | | | |
|---|---|---|---|
| 2016/0116739 A1 | 4/2016 | TeKolste et al. | |
| 2016/0124223 A1 | 5/2016 | Shinbo et al. | |
| 2016/0132025 A1 | 5/2016 | Taff et al. | |
| 2016/0195664 A1 | 7/2016 | Fattal et al. | |
| 2016/0209648 A1 | 7/2016 | Haddick et al. | |
| 2016/0209657 A1 | 7/2016 | Popovich et al. | |
| 2016/0231568 A1* | 8/2016 | Saarikko | G02B 27/0172 |
| 2016/0238772 A1 | 8/2016 | Waldern et al. | |
| 2016/0266398 A1 | 9/2016 | Poon et al. | |
| 2016/0274362 A1 | 9/2016 | Tinch et al. | |
| 2016/0283773 A1 | 9/2016 | Popovich et al. | |
| 2016/0291328 A1 | 10/2016 | Popovich et al. | |
| 2016/0299344 A1 | 10/2016 | Dobschal et al. | |
| 2016/0320536 A1 | 11/2016 | Simmonds et al. | |
| 2016/0327705 A1 | 11/2016 | Simmonds et al. | |
| 2016/0341964 A1 | 11/2016 | Amitai | |
| 2017/0003505 A1 | 1/2017 | Vallius et al. | |
| 2017/0010488 A1 | 1/2017 | Klug et al. | |
| 2017/0030550 A1 | 2/2017 | Popovich et al. | |
| 2017/0031160 A1 | 2/2017 | Popovich et al. | |
| 2017/0031171 A1 | 2/2017 | Vallius et al. | |
| 2017/0034435 A1 | 2/2017 | Vallius | |
| 2017/0038579 A1 | 2/2017 | Yeoh et al. | |
| 2017/0052374 A1 | 2/2017 | Waldern et al. | |
| 2017/0052376 A1 | 2/2017 | Amitai et al. | |
| 2017/0059759 A1 | 3/2017 | Ayres et al. | |
| 2017/0102543 A1 | 4/2017 | Vallius | |
| 2017/0115487 A1 | 4/2017 | Travis et al. | |
| 2017/0123208 A1 | 5/2017 | Vallius | |
| 2017/0131460 A1 | 5/2017 | Lin et al. | |
| 2017/0131546 A1 | 5/2017 | Woltman et al. | |
| 2017/0131551 A1 | 5/2017 | Robbins et al. | |
| 2017/0160546 A1 | 6/2017 | Bull et al. | |
| 2017/0180404 A1 | 6/2017 | Bersch et al. | |
| 2017/0180408 A1 | 6/2017 | Yu et al. | |
| 2017/0199333 A1 | 7/2017 | Waldern et al. | |
| 2017/0219841 A1 | 8/2017 | Popovich et al. | |
| 2017/0255257 A1 | 9/2017 | Tiana et al. | |
| 2017/0276940 A1 | 9/2017 | Popovich et al. | |
| 2017/0299860 A1 | 10/2017 | Wall et al. | |
| 2017/0356801 A1 | 12/2017 | Popovich et al. | |
| 2017/0357841 A1 | 12/2017 | Popovich et al. | |
| 2018/0011324 A1 | 1/2018 | Popovich et al. | |
| 2018/0074265 A1 | 3/2018 | Waldern et al. | |
| 2018/0074352 A1 | 3/2018 | Popovich et al. | |
| 2018/0113303 A1 | 4/2018 | Popovich et al. | |
| 2018/0120669 A1 | 5/2018 | Popovich et al. | |
| 2018/0143449 A1 | 5/2018 | Popovich et al. | |
| 2018/0188542 A1 | 7/2018 | Waldern et al. | |
| 2018/0210198 A1 | 7/2018 | Brown et al. | |
| 2018/0210396 A1 | 7/2018 | Popovich et al. | |
| 2018/0232048 A1 | 8/2018 | Popovich et al. | |
| 2018/0246354 A1 | 8/2018 | Popovich et al. | |
| 2018/0284440 A1 | 10/2018 | Popovich et al. | |
| 2018/0373115 A1 | 12/2018 | Brown et al. | |
| 2019/0212588 A1 | 7/2019 | Waldern et al. | |

FOREIGN PATENT DOCUMENTS

| | | |
|---|---|---|
| CN | 200944140 Y | 9/2007 |
| CN | 101103297 A | 1/2008 |
| CN | 101151562 A | 3/2008 |
| CN | 101263412 A | 9/2008 |
| CN | 100492099 C | 5/2009 |
| CN | 101589326 A | 11/2009 |
| CN | 101688977 A | 3/2010 |
| CN | 101881936 A | 11/2010 |
| CN | 103823267 A | 5/2014 |
| CN | 104204901 A | 12/2014 |
| CN | 104956252 A | 9/2015 |
| CN | 105074537 A | 11/2015 |
| CN | 105074539 A | 11/2015 |
| CN | 105190407 A | 12/2015 |
| CN | 105229514 A | 1/2016 |
| CN | 105393159 A | 3/2016 |
| CN | 105408801 A | 3/2016 |
| CN | 105408802 A | 3/2016 |
| CN | 105408803 A | 3/2016 |
| CN | 105531716 A | 4/2016 |
| CN | 105705981 A | 6/2016 |
| CN | 107466372 A | 12/2017 |
| CN | 108780224 A | 11/2018 |
| DE | 19751190 A1 | 5/1999 |
| DE | 102006003785 A1 | 7/2007 |
| DE | 102012108424 A1 | 3/2014 |
| DE | 102013209436 A1 | 11/2014 |
| EP | 0795775 A2 | 9/1997 |
| EP | 0822441 A2 | 2/1998 |
| EP | 1347641 A1 | 9/2003 |
| EP | 1413972 A1 | 4/2004 |
| EP | 1526709 A2 | 4/2005 |
| EP | 1748305 A1 | 1/2007 |
| EP | 1938152 A1 | 7/2008 |
| EP | 1413972 B1 | 10/2008 |
| EP | 2110701 A1 | 10/2009 |
| EP | 2225592 A1 | 9/2010 |
| EP | 2244114 A1 | 10/2010 |
| EP | 2326983 A1 | 6/2011 |
| EP | 2381290 A1 | 10/2011 |
| EP | 1828832 B1 | 5/2013 |
| EP | 2733517 A1 | 5/2014 |
| EP | 1573369 B1 | 7/2014 |
| EP | 2748670 A1 | 7/2014 |
| EP | 2929378 A1 | 10/2015 |
| EP | 2748670 B1 | 11/2015 |
| EP | 2995986 A1 | 3/2016 |
| EP | 2995986 B1 | 4/2017 |
| EP | 3256888 A1 | 12/2017 |
| EP | 3359999 A1 | 8/2018 |
| EP | 2494388 B1 | 11/2018 |
| FR | 2677463 A1 | 12/1992 |
| GB | 2115178 A | 9/1983 |
| GB | 2140935 A | 12/1984 |
| GB | 2508661 A | 6/2014 |
| GB | 2509536 A | 7/2014 |
| GB | 2512077 A | 9/2014 |
| GB | 2514658 A | 12/2014 |
| HK | 1204684 A1 | 11/2015 |
| HK | 1205563 A1 | 12/2015 |
| HK | 1205793 A1 | 12/2015 |
| HK | 1206101 A1 | 12/2015 |
| JP | 02186319 A | 7/1990 |
| JP | 03239384 A | 10/1991 |
| JP | 06294952 A | 10/1994 |
| JP | 07098439 A | 4/1995 |
| JP | 0990312 A | 4/1997 |
| JP | 11109320 A | 4/1999 |
| JP | 11142806 A | 5/1999 |
| JP | 2953444 B2 | 9/1999 |
| JP | 2000056259 A | 2/2000 |
| JP | 2000267042 A | 9/2000 |
| JP | 2001027739 A | 1/2001 |
| JP | 2001296503 A | 10/2001 |
| JP | 2002090858 A | 3/2002 |
| JP | 2002122906 A | 4/2002 |
| JP | 2002162598 A | 6/2002 |
| JP | 2002523802 A | 7/2002 |
| JP | 2002529790 A | 9/2002 |
| JP | 2003066428 A | 3/2003 |
| JP | 2003270419 A | 9/2003 |
| JP | 2004157245 A | 6/2004 |
| JP | 2006350129 A | 12/2006 |
| JP | 2007011057 A | 1/2007 |
| JP | 2007219106 A | 8/2007 |
| JP | 2008112187 A | 5/2008 |
| JP | 2009036955 A | 2/2009 |
| JP | 2009133999 A | 6/2009 |
| JP | 2009211091 A | 9/2009 |
| JP | 4367775 B2 | 11/2009 |
| JP | 2012137616 A | 7/2012 |
| JP | 5303928 B2 | 10/2013 |
| JP | 2018508037 A | 3/2018 |
| JP | 2018533069 A | 11/2018 |
| KR | 20100092059 A | 8/2010 |

(56) References Cited

FOREIGN PATENT DOCUMENTS

| | | |
|---|---|---|
| KR | 20140140063 A | 12/2014 |
| KR | 20140142337 A | 12/2014 |
| TW | 200535633 A | 11/2005 |
| TW | 200801583 A | 1/2008 |
| TW | 201314263 A | 4/2013 |
| TW | 201600943 A | 1/2016 |
| TW | 201604601 A | 2/2016 |
| WO | 1997001133 A1 | 1/1997 |
| WO | 1997027519 A1 | 7/1997 |
| WO | 1998004650 A1 | 2/1998 |
| WO | 1999009440 A1 | 2/1999 |
| WO | 1999052002 A1 | 10/1999 |
| WO | 2000016136 A1 | 3/2000 |
| WO | 2000023830 | 4/2000 |
| WO | 2000023832 A1 | 4/2000 |
| WO | 2000023847 | 4/2000 |
| WO | 2000028369 A2 | 5/2000 |
| WO | 2000028369 A3 | 10/2000 |
| WO | 2001050200 A2 | 7/2001 |
| WO | 2001090822 A1 | 11/2001 |
| WO | 2002082168 A1 | 10/2002 |
| WO | 2003081320 A1 | 10/2003 |
| WO | 2004102226 A2 | 11/2004 |
| WO | 2005001753 A1 | 1/2005 |
| WO | 2005006065 A8 | 1/2005 |
| WO | 2005006065 A3 | 2/2005 |
| WO | 2005073798 A1 | 8/2005 |
| WO | 2006002870 A1 | 1/2006 |
| WO | 2006064301 A1 | 6/2006 |
| WO | 2006064325 A1 | 6/2006 |
| WO | 2006064334 A1 | 6/2006 |
| WO | 2006102073 A2 | 9/2006 |
| WO | 2006132614 A1 | 12/2006 |
| WO | 2006102073 A3 | 1/2007 |
| WO | 2007015141 A2 | 2/2007 |
| WO | 2007029032 A1 | 3/2007 |
| WO | 2007085682 A1 | 8/2007 |
| WO | 2007130130 A2 | 11/2007 |
| WO | 2007141587 A1 | 12/2007 |
| WO | 2007141589 A1 | 12/2007 |
| WO | 2008011066 A2 | 1/2008 |
| WO | 2008011066 A9 | 5/2008 |
| WO | 2008081070 A1 | 7/2008 |
| WO | 2008100545 A2 | 8/2008 |
| WO | 2008011066 A3 | 12/2008 |
| WO | 2009013597 A2 | 1/2009 |
| WO | 2009013597 A3 | 1/2009 |
| WO | 2009077802 A1 | 6/2009 |
| WO | 2009077803 A1 | 6/2009 |
| WO | 2009101238 A1 | 8/2009 |
| WO | 2007130130 A3 | 9/2009 |
| WO | 2009155437 A1 | 12/2009 |
| WO | 2009155437 A8 | 3/2010 |
| WO | 2010023444 A1 | 3/2010 |
| WO | 2010057219 A1 | 5/2010 |
| WO | 2010067114 A1 | 6/2010 |
| WO | 2010067117 A1 | 6/2010 |
| WO | 2010078856 A1 | 7/2010 |
| WO | 2010104692 A2 | 9/2010 |
| WO | 2010122330 A1 | 10/2010 |
| WO | 2010125337 A2 | 11/2010 |
| WO | 2010125337 A3 | 11/2010 |
| WO | 2011012825 A1 | 2/2011 |
| WO | 2011032005 A2 | 3/2011 |
| WO | 2011042711 A2 | 4/2011 |
| WO | 2011042711 A3 | 4/2011 |
| WO | 2011051660 A1 | 5/2011 |
| WO | 2011055029 A2 | 5/2011 |
| WO | 2011073673 A1 | 6/2011 |
| WO | 2011107831 A1 | 9/2011 |
| WO | 2011110821 A1 | 9/2011 |
| WO | 2011131978 A1 | 10/2011 |
| WO | 2012052352 A1 | 4/2012 |
| WO | 2012062658 A1 | 5/2012 |
| WO | 2012158950 A1 | 11/2012 |
| WO | 2012172295 A1 | 12/2012 |
| WO | 2013027004 A1 | 2/2013 |
| WO | 2013027006 A1 | 2/2013 |
| WO | 2013033274 A1 | 3/2013 |
| WO | 2013034879 A1 | 3/2013 |
| WO | 2013049012 A1 | 4/2013 |
| WO | 2013102759 A2 | 7/2013 |
| WO | 2013163347 A1 | 10/2013 |
| WO | 2013167864 A1 | 11/2013 |
| WO | 2013190257 A1 | 12/2013 |
| WO | 2014064427 A1 | 5/2014 |
| WO | 2014080155 A1 | 5/2014 |
| WO | 2014085734 A1 | 6/2014 |
| WO | 2014090379 A1 | 6/2014 |
| WO | 2014091200 A1 | 6/2014 |
| WO | 2014093601 A1 | 6/2014 |
| WO | 2014100182 A1 | 6/2014 |
| WO | 2014113506 A1 | 7/2014 |
| WO | 2014116615 A1 | 7/2014 |
| WO | 2014130383 A1 | 8/2014 |
| WO | 2014144526 A2 | 9/2014 |
| WO | 2014159621 A1 | 10/2014 |
| WO | 2014164901 A1 | 10/2014 |
| WO | 2014176695 A1 | 11/2014 |
| WO | 2014179632 A1 | 11/2014 |
| WO | 2014188149 A1 | 11/2014 |
| WO | 2014209733 A1 | 12/2014 |
| WO | 2014209819 A1 | 12/2014 |
| WO | 2014209820 A1 | 12/2014 |
| WO | 2014209821 A1 | 12/2014 |
| WO | 2014210349 A1 | 12/2014 |
| WO | 2015006784 A2 | 1/2015 |
| WO | 2015015138 A1 | 2/2015 |
| WO | 2015017291 A1 | 2/2015 |
| WO | 2015069553 A1 | 5/2015 |
| WO | 2015081313 A2 | 6/2015 |
| WO | 2015117039 A1 | 8/2015 |
| WO | 2015145119 A1 | 10/2015 |
| WO | 2016010289 A1 | 1/2016 |
| WO | 2016020643 A1 | 2/2016 |
| WO | 2016025350 A1 | 2/2016 |
| WO | 2016042283 A1 | 3/2016 |
| WO | 2016046514 A1 | 3/2016 |
| WO | 2016103263 A1 | 6/2016 |
| WO | 2016111706 A1 | 7/2016 |
| WO | 2016111707 A1 | 7/2016 |
| WO | 2016111708 A1 | 7/2016 |
| WO | 2016111709 A1 | 7/2016 |
| WO | 2016113534 A1 | 7/2016 |
| WO | 2016116733 A1 | 7/2016 |
| WO | 2016118107 A1 | 7/2016 |
| WO | 2016122679 A1 | 8/2016 |
| WO | 2016130509 A1 | 8/2016 |
| WO | 2016135434 A1 | 9/2016 |
| WO | 2016156776 A1 | 10/2016 |
| WO | 2017060665 A1 | 4/2017 |
| WO | WO-2017060665 A1 * | 4/2017 ......... G02B 27/0081 |
| WO | 2017162999 A1 | 9/2017 |
| WO | 2017162999 A8 | 9/2017 |
| WO | WO-2017162999 A1 * | 9/2017 ............... G02B 6/34 |
| WO | 2017178781 A1 | 10/2017 |
| WO | 2017180403 A1 | 10/2017 |
| WO | 2018102834 A2 | 6/2018 |
| WO | 2018102834 A3 | 6/2018 |
| WO | 2018129398 A1 | 7/2018 |
| WO | 2019136476 A1 | 7/2019 |

OTHER PUBLICATIONS

International Search Report and Written Opinion for International Application PCT/GB2016/000181, completed Dec. 21, 2016, dated Feb. 27, 2017, 21 pgs.
International Search Report and Written Opinion for International Application PCT/US2016/017091, completed by the European Patent Office dated Apr. 20, 2016, 7 pgs.
International Search Report for International Application No. PCT/GB2014/000295, completed Nov. 18, 2014, dated Jan. 5, 2015, 4 pgs.

(56) References Cited

OTHER PUBLICATIONS

International Search Report for International Application PCT/GB2017/000040, dated Jul. 18, 2017, completed Jul. 10, 2017, 3 pgs.
International Search Report for PCT/GB2010/001982, completed by the European Patent Office dated Feb. 24, 2011, 4 pgs.
International Search Report for PCT/GB2011/000349, completed by the European Patent Office dated Aug. 17, 2011, 4 pgs.
International Search Report for PCT/GB2012/000331, completed by the European Patent Office dated Aug. 29, 2012, 4 pgs.
International Search Report for PCT/GB2012/000677, completed by the European Patent Office dated Dec. 10, 2012, 4 pgs.
International Search Report for PCT/GB2013/000005, completed by the European Patent Office dated Jul. 16, 2013, 3 pgs.
International Search Report for PCT/GB2013/000273, completed by the European Patent Office dated Aug. 30, 2013, 4 pgs.
International Search Report for PCT/GB2015/000203, completed by the European Patent Office dated Oct. 9, 2015, 4 pgs.
International Search Report for PCT/GB2015/000225, completed by the European Patent Office on Nov 10, 2015, dated Dec. 2, 2016, 5 pgs.
International Search Report for PCT/GB2015/000274, completed by the European Patent Office dated Jan. 7, 2016, 4 pgs.
International Search Report for PCT/GB2016/000014, completed by the European Patent Office dated Jun. 27, 2016, 4 pgs.
Written Opinion for International Application No. PCT/GB2010/001982, search completed Feb. 24, 2011, dated Mar. 8, 2011, 6 pgs.
Written Opinion for International Application No. PCT/GB2011/000349, completed Aug. 17, 2011, dated Aug. 25, 2011, 9 pgs.
Written Opinion for International Application No. PCT/GB2012/000331, completed Aug. 29, 2012, dated Sep. 6, 2012, 7 pgs.
Written Opinion for International Application No. PCT/GB2012/000677, completed Dec. 10, 2012, dated Dec. 17, 2012, 4 pgs.
Written Opinion for International Application No. PCT/GB2013/000005, search completed Jul. 16, 2013, dated Jul. 24, 2013, 11 pgs.
Written Opinion for International Application No. PCT/GB2013/000273, completed Aug. 30, 2013, dated Sep. 9, 2013, 7 pgs.
Written Opinion for International Application No. PCT/GB2014/000295, search completed Nov. 18, 2014, dated Jan. 5, 2015, 3 pgs.
Written Opinion for International Application No. PCT/GB2015/000203, completed Oct. 29, 2015, dated Nov. 16, 2015, 7 pgs.
Written Opinion for International Application No. PCT/GB2015/000225, search completed Nov. 10, 2015, dated Feb. 4, 2016, 7 pgs.
Written Opinion for International Application No. PCT/GB2015/000274, search completed Jan. 7, 2016, dated Jan. 19, 2016, 7 pgs.
Written Opinion for International Application No. PCT/GB2016/000014, search completed Jun. 27, 2016, dated Jul. 7, 2016, 6 pgs.
Written Opinion for International Application No. PCT/GB2016/000051, Search completed Aug. 11, 2016 , dated Aug. 22, 2016, 6 Pgs.
Written Opinion for International Application No. PCT/GB2017/000040, search completed Jul. 10, 2017, dated Jul. 18, 2017, 6 pgs.
"Agilent ADNS-2051 Optical Mouse Sensor: Data Sheet", Agilent Technologies, Jan. 9, 2002, 40 pgs.
"Application Note—MOXTEK ProFlux Polarizer use with LCOS displays", CRL Opto Limited, http://www.crlopto.com, 2003, 6 pgs.
"Application Note AN16: Optical Considerations for Bridgelux LED Arrays", BridgeLux, Jul. 31, 2010, 23 pgs.
"Application Note: Variable Attenuator for Lasers", Technology and Applications Center, Newport Corporation, www.newport.com, 2006, DS-08067, 6 pgs.
"Bae Systems to Unveil Q-Sight Family of Helmet-Mounted Display at AUSA Symposium", Released on Tuesday, Oct. 9, 2007, 1 pg.
"Beam Steering Using Liquid Crystals", Boulder Nonlinear Systems, Inc., info@bnonlinear.com, May 8, 2001, 4 pgs.
"BragGrate—Deflector: Transmitting Volume Bragg Grating for angular selection and magnification", 2015, www.OptiGrate.com.
"Cree XLamp XP-E LEDs", Cree, Inc., Retrieved from www.cree.com/Xlamp, CLD-DS18 Rev 17, 2013, 17 pgs.

"Desmodur N 3900", Bayer MaterialScience AG, Mar. 18, 2013, www.bayercoatings.com, 4 pgs.
"Digilens—Innovative Augmented Reality Display and Sensor Solutions for OEMs", Jun. 6, 2017, 31 pgs.
"Exotic Optical Components", Building Electro-Optical Systems, Making It All Work, Chapter 7, John Wiley & Sons, Inc., pp. 233-261.
"FHS Lenses Series", Fraen Corporation, www.fraen.com, Jun. 16, 2003, 10 pgs.
"FLP Lens Series for LUXEONTM Rebel and Rebel ES LEDs", Fraen Corporation, www.fraensrl.com, Aug. 7, 2015, 8 pgs.
"Head-up Displays, See-through display for military aviation", BAE Systems, 2016, 3 pgs.
"Holder for LUXEON Rebel—Part No. 180", Polymer Optics Ltd., 2008, 12 pgs.
"LED 7—Segment Displays", Lumex, uk.digikey.com, 2003, UK031, 36 pgs.
"LED325W UVTOP UV LED with Window", Thorlabs, Specifications and Documentation, 21978-S01 Rev. A, Apr. 8, 2011, 5 pgs.
"Liquid Crystal Phases", Phases of Liquid Crystals, http://plc.cwru.edu/tutorial/enhanced/files/lc/phase, Retrieved on Sep. 21, 2004, 6 pgs.
"LiteHUD Head-up display", BAE Systems, 2016, 2 pgs.
"LiteHUD Head-up display infographic", BAE Systems, 2017, 2 pgs.
"Luxeon C: Power Light Source", Philips Lumileds, www.philipslumileds.com, 2012, 18 pgs.
"Luxeon Rebel ES: Leading efficacy and light output, maximum design flexibility", LUXEON Rebel ES Datasheet DS61 20130221, www.philipslumileds.com, 2013, 33 pgs.
"Mobile Display Report", Insight Media, LLC, Apr. 2012, vol. 7, No. 4, 72 pgs.
"Molecular Imprints Imprio 55", Engineering at Illinois, Micro + Nanotechnology Lab, Retrieved from https://mntl.illinois.edu/facilities/cleanrooms/equipment/Nano-Imprint.asp, Dec. 28, 2015, 2 pgs.
"Navy awards SGB Labs a contract for HMDs for simulation and training", Press releases, DigiLens, Oct. 2012, pp. 1-2.
"Optical measurements of retinal flow", Industrial Research Limited, Feb. 2012, 18 pgs.
"Osterhout Design Group Develops Next-Generation, Fully-integrated Smart Glasses Using Qualcomm Technologies", ODG, www.osterhoutgroup.com, Sep. 18, 2014, 2 pgs.
Stumpe et al., "Active and Passive LC Based Polarization Elements", Mol. Cryst. Liq. Cryst., 2014, vol. 594: pp. 140-149.
Stumpe et al., "New type of polymer-LC electrically switchable diffractive devices—POLIPHEM", May 19, 2015, p. 97.
Subbarayappa et al., "Bistable Nematic Liquid Crystal Device", Jul. 30, 2009, 14 pgs.
Sun et al., "Effects of multiwalled carbon nanotube on holographic polymer dispersed liquid crystal", Polymers Advanced Technologies, Feb. 19, 2010, DOI: 10.1002/pat.1708, 8 pgs.
Sun et al., "Low-birefringence lens design for polarization sensitive optical systems", Proceedings of SPIE, 2006, vol. 6289, doi: 10.1117/12.679416, pp. 6289DH-1-6289DH-10.
Sun et al., "Transflective multiplexing of holographic polymer dispersed liquid crystal using Si additives", eXPRESS Polymer Letters, 2011, vol. 5, No. 1, pp. 73-81.
Sutherland et al., "Bragg Gratings in an Acrylate Polymer Consisting of Periodic Polymer—Dispersed Liquid-Crystal Planes", Chem. Mater., 1993, vol. 5, pp. 1533-1538.
Sutherland et al., "Electrically switchable volume gratings in polymer-dispersed liquid crystals", Applied Physics Letters, Feb. 28, 1994, vol. 64, No. 9, pp. 1074-1076.
Sutherland et al., "Enhancing the electro-optical properties of liquid crystal nanodroplets for switchable Bragg gratings", Proc. of SPIE, 2008, vol. 7050, pp. 705003-1-705003-9, doi: 10.1117/12.792629.
Sutherland et al., "Liquid crystal bragg gratings: dynamic optical elements for spatial light modulators", Hardened Materials Branch, Hardened Materials Branch, AFRL-ML-WP-TP-2007-514, Jan. 2007, Wright-Patterson Air Force Base, OH, 18 pgs.

(56) References Cited

OTHER PUBLICATIONS

Sutherland et al., "The physics of photopolymer liquid crystal composite holographic gratings", presented at SPIE: Diffractive and Holographic Optics Technology San Jose, CA, 1996, SPIE, vol. 2689, pp. 158-169.
Sweatt, "Achromatic triplet using holographic optical elements", Applied Optics, May 1977, vol. 16, No. 5, pp. 1390-1391.
Talukdar, "Technology Forecast: Augmented reality", Changing the economics of Smartglasses, Issue 2, 2016, 5 pgs.
Tao et al., "TiO2 nanocomposites with high refractive index and transparency", J. Mater. Chem., Oct. 4, 2011, vol. 21, pp. 18623-18629.
Titus et al., "Efficient, Accurate Liquid Crystal Digital Light Deflector", Proc. SPIE 3633, Diffractive and Holographic Technologies, Systems, and Spatial Light Modulators VI, 1 Jun. 1, 1999, doi: 10.1117/12.349334, 10 pgs.
Tiziani, "Physical Properties of Speckles", Speckle Metrology, Chapter 2, Academic Press, Inc., 1978, pp. 5-9.
Tominaga et al., "Fabrication of holographic polymer dispersed liquid crystals doped with gold nanoparticles", 2010 Japanese Liquid Crystal Society Annual Meeting, 2 pgs.
Tomita, "Holographic assembly of nanoparticles in photopolymers for photonic applications", The International Society for Optical Engineering, SPIE Newsroom, 2006, 10.1117/2.1200612.0475, 3 pgs.
Trisnadi, "Hadamard Speckle Contrast Reduction", Optics Letters, Jan. 1, 2004, vol. 29, No. 1, pp. 11-13.
Trisnadi, "Speckle contrast reduction in laser projection displays", Proc. SPIE 4657, 2002, 7 pgs.
Tzeng et al., "Axially symmetric polarization converters based on photo-aligned liquid crystal films", Optics Express, Mar. 17, 2008, vol. 16, No. 6, pp. 3768-3775.
Upatnieks et al., "Color Holograms for white light reconstruction", Applied Physics Letters, Jun. 1, 1996, vol. 8, No. 11, pp. 286-287.
Urey, "Diffractive exit pupil expander for display applications", Applied Optics, vol. 40, Issue 32, pp. 5840-5851 (2001).
Ushenko, "The Vector Structure of Laser Biospeckle Fields and Polarization Diagnostics of Collagen Skin Structures", Laser Physics, 2000, vol. 10, No. 5, pp. 1143-1149.
Valoriani, "Mixed Reality: Dalle demo a un prodotto", Disruptive Technologies Conference, Sep. 23, 2016, 67 pgs.
Van Gerwen et al., "Nanoscaled interdigitated electrode arrays for biochemical sensors", Sensors and Actuators, Mar. 3, 1998, vol. B 49, pp. 73-80.
Vecchi, "Studi ESR Di Sistemi Complessi Basati Su Cristalli Liquidi", Thesis, University of Bologna, Department of Physical and Inorganic Chemistry, 2004-2006, 110 pgs.
Veltri et al., "Model for the photoinduced formation of diffraction gratings in liquid-crystalline composite materials", Applied Physics Letters, May 3, 2004, vol. 84, No. 18, pp. 3492-3494.
Vita, "Switchable Bragg Gratings", Thesis, Universita degli Studi di Napoli Federico II, Nov. 2005, 103 pgs.
Vuzix, "M3000 Smart Glasses, Advanced Waveguide Optics", brochure, Jan. 1, 2017, 2 pgs.
Wang et al., "Liquid-crystal blazed-grating beam deflector", Applied Optics, Dec. 10, 2000, vol. 39, No. 35, pp. 6545-6555.
Wang et al., "Optical Design of Waveguide Holographic Binocular Display for Machine Vision", Applied Mechanics and Materials, Sep. 27, 2013, vols. 427-429, pp. 763-769.
Wang et al., "Speckle reduction in laser projection systems by diffractive optical elements", Applied Optics, Apr. 1, 1998, vol. 37, No. 10, pp. 1770-1775.
Weber et al., "Giant Birefringent Optics in Multilayer Polymer Mirrors", Science, Mar. 31, 2000, vol. 287, pp. 2451-2456.
Wei AN, "Industrial Applications of Speckle Techniques", Doctoral Thesis, Royal Institute of Technology, Department of Production Engineering, Chair of Industrial Metrology & Optics, Stockholm, Sweden 2002, 76 pgs.
Welde et al., "Investigation of methods for speckle contrast reduction", Master of Science in Electronics, Jul. 2010, Norwegian University of Science and Technology, Department of Electronics and Telecommunications, 127 pgs.
White, "Influence of thiol-ene polymer evolution on the formation and performance of holographic polymer dispersed liquid crystals", The 232nd ACS National Meeting, San Francisco, CA, Sep. 10-14, 2006, 1 pg.
Wicht et al., "Nanoporous Films with Low Refractive Index for Large-Surface Broad-Band Anti-Reflection Coatings", Macromol. Mater. Eng., 2010, 295, DOI: 10.1002/mame.201000045, 9 pgs.
Wilderbeek et al., "Photoinitiated Bulk Polymerization of Liquid Crystalline Thiolene Monomers", Macromolecules, 2002, vol. 35, pp. 8962-8969.
Wilderbeek et al., "Photo-Initiated Polymerization of Liquid Crystalline Thiol-Ene Monomers in Isotropic and Anisotropic Solvents", J. Phys. Chem. B, 2002, vol. 106, No. 50, pp. 12874-12883.
Wisely, "Head up and head mounted display performance improvements through advanced techniques in the manipulation of light", Proc. of SPIE, 2009, 10 pages, vol. 7327.
Wofford et al., "Liquid crystal bragg gratings: dynamic optical elements for spatial light modulators", Hardened Materials Branch, Survivability and Sensor Materials Division, AFRL-ML-WP-TP-2007-551, Air Force Research Laboratory, Jan. 2007, Wright-Patterson Air Force Base, OH, 17 pgs.
Yaqoob et al., "High-speed two-dimensional laser scanner based on Bragg grating stored in photothermorefractive glass", Applied Optics, Sep. 10, 2003, vol. 42, No. 26, pp. 5251-5262.
Yaroshchuk et al., "Stabilization of liquid crystal photoaligning layers by reactive mesogens", Applied Physics Letters, Jul. 14, 2009, vol. 95, pp. 021902-1-021902-3.
Ye, "Three-dimensional Gradient Index Optics Fabricated in Diffusive Photopolymers", Thesis, Department of Electrical, Computer and Energy Engineering, University of Colorado, 2012, 224 pgs.
Yemtsova et al., "Determination of liquid crystal orientation in holographic polymer dispersed liquid crystals by linear and non-linear optics", Journal of Applied Physics, Oct. 13, 2008, vol. 104, pp. 073115-1-073115-4.
Yeralan et al., "Switchable Bragg grating devices for telecommunications applications", Opt. Eng., Aug. 2012, vol. 41, No. 8, pp. 1774-1779.
Yoshida et al., "Nanoparticle-Dispersed Liquid Crystals Fabricated by Sputter Doping", Adv. Mater., 2010, vol. 22, pp. 622-626.
Zhang et al., "Dynamic Holographic Gratings Recorded by Photopolymerization of Liquid Crystalline Monomers", J. Am. Chem. Soc., 1994, vol. 116, pp. 7055-7063.
Zhang et al., "Switchable Liquid Crystalline Photopolymer Media for Holography", J. Am. Chem. Soc., 1992, vol. 114, pp. 1506-1507.
Zhao et al., "Designing Nanostructures by Glancing Angle Deposition", Proc. of SPIE, Oct. 27, 2003, vol. 5219, pp. 59-73.
Zlębacz, "Dynamics of nano and micro objects in complex liquids", Ph.D. dissertation, Institute of Physical Chemistry of the Polish Academy of Sciences, Warsaw 2011, 133 pgs.
Zou et al., "Functionalized nano interdigitated electrodes arrays on polymer with integrated microfluidics for direct bio-affinity sensing using impedimetric measurement", Sensors and Actuators A, Jan. 16, 2007, vol. 136, pp. 518-526.
Zyga, "Liquid crystals controlled by magnetic fields may lead to new optical applications", Nanotechnology, Nanophysics, Retrieved from http://phys.org/news/2014-07-liquid-crystals-magnetic-fields-optical.html, Jul. 9, 2014, 3 pgs.
Hata et al., "Holographic nanoparticle-polymer composites based on step-growth thiol-ene photopolymerization", Optical Materials Express, Jun. 1, 2011, vol. 1, No. 2, pp. 207-222.
He et al., "Dynamics of peristrophic multiplexing in holographic polymer-dispersed liquid crystal", Liquid Crystals, Mar. 26, 2014, vol. 41, No. 5, pp. 673-684.
He et al., "Holographic 3D display based on polymer-dispersed liquid-crystal thin films", Proceedings of China Display/Asia Display 2011, pp. 158-160.
He et al., "Properties of Volume Holograms Recording in Photopolymer Films with Various Pulse Exposures Repetition Frequencies", Proceedings of SPIE vol. 5636, Bellingham, WA, 2005, doi: 10.1117/12.580978, pp. 842-848.

(56) References Cited

OTHER PUBLICATIONS

Herman et al., "Production and Uses of Diffractionless Beams", J. Opt. Soc. Am. A., Jun. 1991, vol. 8, No. 6, pp. 932-942.

Hisano, "Alignment layer-free molecular ordering induced by masked photopolymerization with nonpolarized light", Appl. Phys. Express 9, Jun. 6, 2016, pp. 072601-1-072601-4.

Hoepfner et al., "LED Front Projection Goes Mainstream", Luminus Devices, Inc., Projection Summit, 2008, 18 pgs.

Holmes et al., "Controlling the anisotropy of holographic polymer-dispersed liquid-crystal gratings", Physical Review E, Jun. 11, 2002, vol. 65, 066603-1-066603-4.

Hoyle et al., "Advances in the Polymerization of Thiol-Ene Formulations", Heraeus Noblelight Fusion UV Inc., 2003 Conference, 6 pgs.

Hua, "Sunglass-like displays become a reality with free-form optical technology", Illumination & Displays 3D Visualization and Imaging Systems Laboratory (3DVIS) College of Optical Sciences University of Arizona Tucson, AZ. 2014, 3 pgs.

Huang et al., "Diffraction properties of substrate guided-wave holograms", Optical Engineering, Oct. 1995, vol. 34, No. 10, pp. 2891-2899.

Huang et al., "Theory and characteristics of holographic polymer dispersed liquid crystal transmission grating with scaffolding morphology", Applied Optics, Jun. 20, 2012, vol. 51, No. 18, pp. 4013-4020.

Iannacchione et al., "Deuterium NMR and morphology study of copolymer-dispersed liquid-crystal Bragg gratings", Europhysics Letters, 1996, vol. 36, No. 6, pp. 425-430.

Irie, "Photochromic diarylethenes for photonic devices", Pure and Applied Chemistry, 1996, pp. 1367-1371, vol. 68, No. 7, IUPAC.

Jeng et al., "Aligning liquid crystal molecules", SPIE, 2012, 10.1117/2.1201203.004148, 2 pgs.

Jo et al., "Control of Liquid Crystal Pretilt Angle using Polymerization of Reactive Mesogen", IMID 2009 Digest, P1-25, 2009, pp. 604-606.

Juhl, "Interference Lithography for Optical Devices and Coatings", Dissertation, University of Illinois at Urbana-Champaign, 2010.

Juhl et al., "Holographically Directed Assembly of Polymer Nanocomposites", ACS Nano, Oct. 7, 2010, vol. 4, No. 10, pp. 5953-5961.

Jurbergs et al., "New recording materials for the holographic industry", Proc. of SPIE, 2009 vol. 7233, pp. 72330K-1-72330L-10, doi: 10.1117/12.809579.

Kahn et al., "Private Line Report on Large Area Display", Kahn International, Jan. 7, 2003, vol. 8, No. 10, 9 pgs.

Karasawa et al., "Effects of Material Systems on the Polarization Behavior of Holographic Polymer Dispersed Liquid Crystal Gratings", Japanese Journal of Applied Physics, Oct. 1997, vol. 36, No. 10, pp. 6388-6392.

Karp et al., "Planar micro-optic solar concentration using multiple imaging lenses into a common slab waveguide", Proc. of SPIE vol. 7407, 2009 SPIE, CCC code: 0277-786X/09, doi: 10.1117/12.826531, pp. 74070D-1-74070D-11.

Karp et al., "Planar micro-optic solar concentrator", Optics Express, Jan. 18, 2010, vol. 18, No. 2, pp. 1122-1133.

Kato et al., "Alignment-Controlled Holographic Polymer Dispersed Liquid Crystal (HPDLC) for Reflective Display Devices", SPIE, 1998, vol. 3297, pp. 52-57.

Kessler, "Optics of Near to Eye Displays (NEDs)", Oasis 2013, Tel Aviv, Feb. 19, 2013, 37 pgs.

Keuper et al., "26.1: RGB LED Illuminator for Pocket-Sized Projectors", SID 04 Digest, 2004, ISSN/0004-0966X/04/3502, pp. 943-945.

Keuper et al., "P-126: Ultra-Compact LED based Image Projector for Portable Applications", SID 03 Digest, 2003, ISSN/0003-0966X/03/3401-0713, pp. 713-715.

Kim et al., "Effect of Polymer Structure on the Morphology and Electro optic Properties of UV Curable PNLCs", Polymer, Feb. 2000, vol. 41, pp. 1325-1335.

Kim et al., "Enhancement of electro-optical properties in holographic polymer-dispersed liquid crystal films by incorporation of multiwalled carbon nanotubes into a polyurethane acrylate matrix", Polym. Int., Jun. 16, 2010, vol. 59, pp. 1289-1295.

Kim et al., "Fabrication of Reflective Holographic PDLC for Blue", Molecular Crystals and Liquid Crystals Science, 2001, vol. 368, pp. 3845-3853.

Kim et al., "Optimization of Holographic PDLC for Green", Mol. Cryst. Liq. Cryst., vol. 368, pp. 3855-3864, 2001.

Klein, "Optical Efficiency for Different Liquid Crystal Colour Displays", Digital Media Department, HPL-2000-83, Jun. 29, 2000, 18 pgs.

Kogelnik, "Coupled Wave Theory for Thick Hologram Gratings", The Bell System Technical Journal, vol. 48, No. 9, pp. 2909-2945, Nov. 1969.

Kotakonda et al., "Electro-optical Switching of the Holographic Polymer-dispersed Liquid Crystal Diffraction Gratings", Journal of Optics A: Pure and Applied Optics, Jan. 1, 2009, vol. 11, No. 2, 11 pgs.

Kress et al., "Diffractive and Holographic Optics as Optical Combiners in Head Mounted Displays", UbiComp '13, Sep. 9-12, 2013, Session: Wearable Systems for Industrial Augmented Reality Applications, pp. 1479-1482.

Lauret et al., "Solving the Optics Equation for Effective LED Applications", Gaggione North America, LLFY System Design Workshop 2010, Oct. 28, 2010, 26 pgs.

Lee, "Patents Shows Widespread Augmented Reality Innovation", PatentVue, May 26, 2015, 5 pgs.

Levola, "Diffractive optics for virtual reality displays", Journal of the SID, 2006, 14/5, pp. 467-475.

Levola et al., "Near-to-eye display with diffractive exit pupil expander having chevron design", Journal of the SID, 2008, 16/8, pp. 857-862.

Levola et al., "Replicated slanted gratings with a high refractive index material for in and outcoupling of light", Optics Express, vol. 15, Issue 5, pp. 2067-2074 (2007).

Li et al., "Design and Optimization of Tapered Light Pipes", Proceedings vol. 5529, Nonimaging Optics and Efficient Illumination Systems, Sep. 29, 2004, doi: 10.1117/12.559844, 10 pgs.

Li et al., "Dual Paraboloid Reflector and Polarization Recycling Systems for Projection Display", Proceedings vol. 5002, Projection Displays IX, Mar. 28, 2003, doi: 10.1117/12.479585, 12 pgs.

Li et al., "Light Pipe Based Optical Train and its Applications", Proceedings vol. 5524, Novel Optical Systems Design and Optimization VII, Oct. 24, 2004, doi: 10.1117/12.559833, 10 pgs.

Li et al., "Novel Projection Engine with Dual Paraboloid Reflector and Polarization Recovery Systems", Wavien Inc., SPIE EI 5289-38, Jan. 21, 2004, 49 pgs.

Li et al., "Polymer crystallization/melting induced thermal switching in a series of holographically patterned Bragg reflectors", Soft Matter, Jul. 11, 2005, vol. 1, pp. 238-242.

Lin et al., "Ionic Liquids in Photopolymerizable Holographic Materials", in book: Holograms—Recording Materials and Applications, Nov. 9, 2011, 21 pgs.

Liu et al., "Holographic Polymer-Dispersed Liquid Crystals: Materials, Formation, and Applications", Advances in OptoElectronics, Nov. 30, 2008, vol. 2008, Article ID 684349, 52 pgs.

Lorek, "Experts Say Mass Adoption of augmented and Virtual Reality is Many Years Away", Siliconhills, Sep. 9, 2017, 4 pgs.

Lowenthal et al., "Speckle Removal by a Slowly Moving Diffuser Associated with a Motionless Diffuser", Journal of the Optical Society of America, Jul. 1971, vol. 61, No. 7, pp. 847-851.

Lu et al., "Polarization switch using thick holographic polymer-dispersed liquid crystal grating", Journal of Applied Physics, Feb. 1, 2004, vol. 95, No. 3, pp. 810-815.

Lu et al., "The Mechanism of electric-field-induced segregation of additives in a liquid-crystal host", Phys Rev E Stat Nonlin Soft Matter Phys., Nov. 27, 2012, 14 pgs.

Ma et al., "Holographic Reversed-Mode Polymer-Stabilized Liquid Crystal Grating", Chinese Phys. Lett., 2005, vol. 22, No. 1, pp. 103-106.

(56) References Cited

OTHER PUBLICATIONS

Mach et al., "Switchable Bragg diffraction from liquid crystal in colloid-templated structures", Europhysics Letters, Jun. 1, 2002, vol. 58, No. 5, pp. 679-685.
Magarinos et al., "Wide Angle Color Holographic infinity optics display", Air Force Systems Command, Brooks Air Force Base, Texas, AFHRL-TR-80-53, Mar. 1981, 100 pgs.
Marino et al., "Dynamical Behaviour of Policryps Gratings", Electronic-Liquid Crystal Communications, Feb. 5, 2004, 10 pgs.
Massenot et al., "Multiplexed holographic transmission gratings recorded in holographic polymer-dispersed liquid crystals: static and dynamic studies", Applied Optics, 2005, vol. 44, Issue 25, pp. 5273-5280.
Matay et al., "Planarization of Microelectronic Structures by Using Polyimides", Journal of Electrical Engineering, 2002, vol. 53, No. 3-4, pp. 86-90.
Mathews, "The LED FAQ Pages", Jan. 31, 2002, 23 pgs.
Matic, "Blazed phase liquid crystal beam steering", Proc. of the SPIE, 1994, vol. 2120, pp. 194-205.
McLeod, "Axicons and Their Uses", Journal of the Optical Society of America, Feb. 1960, vol. 50, No. 2, pp. 166-169.
McManamon et al., "A Review of Phased Array Steering for Narrow-Band Electrooptical Systems", Proceedings of the IEEE, Jun. 2009, vol. 97, No. 6, pp. 1078-1096.
McManamon et al., "Optical Phased Array Technology", Proceedings of the IEEE, Feb. 1996, vol. 84, Issue 2, pp. 268-298.
Miller, "Coupled Wave Theory and Waveguide Applications", The Bell System Technical Journal, Short Hills, NJ, Feb. 2, 1954, 166 pgs.
Moffitt, "Head-Mounted Display Image Configurations", retrieved from the internet on Dec. 19, 2014, dated May 2008, 25 pgs.
Nair et al., "Enhanced Two-Stage Reactive Polymer Network Forming Systems", Polymer (Guildf). May 25, 2012, vol. 53, No. 12, pp. 2429-2434, doi:10.1016/j.polymer.2012.04.007.
Nair et al., "Two-Stage Reactive Polymer Network Forming Systems", Advanced Functional Materials, 2012, pp. 1-9, DOI: 10.1002/adfm.201102742.
Naqvi et al., "Concentration-dependent toxicity of iron oxide nanoparticles mediated by increased oxidative stress", International Journal of Nanomedicine, Dovepress, Nov. 13, 2010, vol. 5, pp. 983-989.
Natarajan et al., "Electro Optical Switching Characteristics of Volume Holograms in Polymer Dispersed Liquid Crystals", Journal of Nonlinear Optical Physics and Materials, 1997, vol. 5, No. 1, pp. 666-668.
Natarajan et al., "Electro-Optical Switching Characteristics of Volume Holograms in Polymer Dispersed Liquid Crystals", J. of Nonlinear Optical Physics Materials, Jan. 1996, vol. 5, No. 1, pp. 89-98.
Natarajan et al., "Holographic polymer dispersed liquid crystal reflection gratings formed by visible light initiated thiol-ene photopolymerization", Polymer, vol. 47, May 8, 2006, pp. 4411-4420.
Naydenova et al., "Low-scattering Volume Holographic Material", DIT PhD Project, http://www.dit.ie/ieo/, Oct. 2017, 2 pgs.
Neipp et al., "Non-local polymerization driven diffusion based model: general dependence of the polymerization rate to the exposure intensity", Optics Express, Aug. 11, 2003, vol. 11, No. 16, pp. 1876-1886.
Nishikawa et al., "Mechanically and Light Induced Anchoring of Liquid Crystal on Polyimide Film", Mol. Cryst. Liq. Cryst., Aug. 1999, vol. 329, 8 pgs.
Nishikawa et al., "Mechanism of Unidirectional Liquid-Crystal Alignment on Polyimides with Linearly Polarized Ultraviolet Light Exposure", Applied Physics Letters, May 11, 1998, vol. 72, No. 19, 4 pgs.
Nordin G et al., "Diffraction Properties of Stratified Volume Holographic Optical Elements", Journal of the Optical Society of America A., vol. 9, No. 12, Dec. 1992, pp. 2206-2217.
Oh et al., "Achromatic diffraction from polarization gratings with high efficiency", Optic Letters, Oct. 15, 2008, vol. 33, No. 20, pp. 2287-2289.
Olson et al., "Templating Nanoporous Polymers with Ordered Block Copolymers", Chemistry of Materials, Web publication Nov. 27, 2007, vol. 20, pp. 869-890.
Ondax, Inc., "Volume Holographic Gratings (VHG)", 2005, 7 pgs.
Orcutt, "Coming Soon: Smart Glasses That Look Like Regular Spectacles", Intelligent Machines, Jan. 9, 2014, 4 pgs.
Osredkar, "A study of the limits of spin-on-glass planarization process", Informacije MIDEM, 2001, vol. 31, 2, ISSN0352-9045, pp. 102-105.
Osredkar et al., "Planarization methods in IC fabrication technologies", Informacije MIDEM, 2002, vol. 32, 3, ISSN0352-9045, 5 pgs.
Ou et al., "A Simple LCOS Optical System (Late News)", Industrial Technology Research Institute/OES Lab. Q100/Q200, SID 2002, Boston, USA, 2 pgs.
Paolini et al., "High-Power LED Illuminators in Projection Displays", Lumileds, Aug. 7, 2001, 19 pgs.
Park et al., "Aligned Single-Wall Carbon Nanotube Polymer Composites Using an Electric Field", Journal of Polymer Science: Part B: Polymer Physics, Mar. 24, 2006, DOI 10.1002/polb.20823, pp. 1751-1762.
Park et al., "Fabrication of Reflective Holographic Gratings with Polyurethane Acrylates (PUA)", Current Applied Physics, Jun. 2002, vol. 2, pp. 249-252.
Plawsky et al., "Engineered nanoporous and nanostructured films", MaterialsToday, Jun. 2009, vol. 12, No. 6, pp. 36-45.
Potenza, "These smart glasses automatically focus on what you're looking at", The Verge, Voc Media, Inc., Jan. 29, 2017, https://www.theverge.com/2017/1/29/14403924/smart-glasses-automatic-focus-presbyopia-ces-2017, 6 pgs.
Presnyakov et al., "Electrically tunable polymer stabilized liquid-crystal lens", Journal of Applied Physics, Apr. 29, 2005, vol. 97, pp. 103101-1-103101-6.
Qi et al., "P-111: Reflective Display Based on Total Internal Reflection and Grating-Grating Coupling", Society for Information Display Digest, May 2003, pp. 648-651, DOI: 10.1889/1.1832359.
Ramón, "Formation of 3D micro- and nanostructures using liquid crystals as a template", Technische Universiteit Eindhoven, Apr. 17, 2008, Thesis, DOI:http://dx.doi.org/10.6100/IR634422, 117 pgs.
Ramsey, "Holographic Patterning of Polymer Dispersed Liquid Crystal Materials for Diffractive Optical Elements", Thesis, The University of Texas at Arlington, Dec. 2006, 166 pgs.
Ramsey et al., "Holographically recorded reverse-mode transmission gratings in polymer-dispersed liquid crystal cells", Applied Physics B: Laser and Optics, Sep. 10, 2008, vol. 93, Nos. 2-3, pp. 481-489.
Reid, "Thin film silica nanocomposites for anti-reflection coatings", Oxford Advance Surfaces, www.oxfordsurfaces.com, Oct. 18, 2012, 23 pgs.
Riechert, "Speckle Reduction in Projection Systems", Dissertation, University Karlsruhe, 2009, 178 pgs.
Rossi et al., "Diffractive Optical Elements for Passive Infrared Detectors", Submitted to OSA Topical Meeting "Diffractive Optics and Micro-Optics", Quebec, Jun. 18-22, 2000, 3 pgs.
Sagan et al., "Electrically Switchable Bragg Grating Technology for Projection Displays", Proc. SPIE. vol. 4294, Jan. 24, 2001, pp. 75-83.
Saleh et al., "Fourier Optics : 4.1 Propagation of light in free space, 4.2 Optical Fourier Transform, 4.3 Diffraction of Light, 4.4 Image Formation, 4.5 Holography", Fundamentals of Photonics 1991, Chapter 4, pp. 108-143.
Saraswat, "Deposition & Planarization", EE 311 Notes, Aug. 29, 2017, 28 pgs.
Schechter et al., "Compact beam expander with linear gratings", Applied Optics, vol. 41, No. 7, Mar. 1, 2002, pp. 1236-1240.
Schreiber et al., "Laser display with single-mirror MEMS scanner", Journal of the SID 17/7, 2009, pp. 591-595.
Seiberle et al., "Photo-aligned anisotropic optical thin films", Journal of the SID 12/1, 2004, 6 pgs.

(56) References Cited

OTHER PUBLICATIONS

Serebriakov et al., "Correction of the phase retardation caused by intrinsic birefringence in deep UV lithography", Proc. of SPIE, May 21, 2010, vol. 5754, pp. 1780-1791.
Shi et al., "Design considerations for high efficiency liquid crystal decentered microlens arrays for steering light", Applied Optics, vol. 49, No. 3, Jan. 20, 2010, pp. 409-421.
Shriyan et al., "Analysis of effects of oxidized multiwalled carbon nanotubes on electro-optic polymer/liquid crystal thin film gratings", Optics Express, Nov. 12, 2010, vol. 18, No. 24, pp. 24842-24852.
Simonite, "How Magic Leap's Augmented Reality Works", Intelligent Machines, Oct. 23, 2014, 7 pgs.
Smith et al., "RM-PLUS—Overview", Licrivue, Nov. 5, 2013, 16 pgs.
Sony Global, "Sony Releases the Transparent Lens Eyewear 'SmartEyeglass Developer Edition'", printed Oct. 19, 2017, Sony Global—News Releases, 5 pgs.
Steranka et al., "High-Power LEDs—Technology Status and Market Applications", Lumileds, Jul. 2002, 23 pgs.
Extended European Search Report for EP Application No. 13192383, dated Apr. 2, 2014, 7 pgs.
Extended European Search Report for European Application No. 15187491.4, search completed Jan. 15, 2016, dated Jan. 28, 2016, 5 pgs.
International Preliminary Report on Patentability for International Application No. PCT/GB2010/000835, issued Nov. 1, 2011, dated Nov. 10, 2011, 9 pgs.
International Preliminary Report on Patentability for International Application No. PCT/GB2010/001920, dated Apr. 11, 2012, dated Apr. 19, 2012, 10 pgs.
International Preliminary Report on Patentability for International Application No. PCT/GB2010/001982, report dated May 1, 2012, dated May 10, 2012, 7 pgs.
International Preliminary Report on Patentability for International Application No. PCT/GB2013/000273, dated Dec. 23, 2014, dated Dec. 31, 2014, 8 pgs.
International Preliminary Report on Patentability for International Application No. PCT/GB2015/000203, dated Mar. 21, 2017, dated Mar. 30, 2017, 8 pgs.
International Preliminary Report on Patentability for International Application No. PCT/GB2016/000036, dated Aug. 29, 2017, dated Sep. 8, 2017, 8 pgs.
International Preliminary Report on Patentability for International Application No. PCT/GB2016/000065, dated Oct. 3, 2017, dated Oct. 12, 2017, 8 pgs.
International Preliminary Report on Patentability for International Application PCT/GB2009/051676, dated Jun. 14, 2011, dated Jun. 23, 2011, 6 pgs.
International Preliminary Report on Patentability for International Application PCT/GB2011/000349, dated Sep. 18, 2012, dated Sep. 27, 2012, 10 pgs.
International Preliminary Report on Patentability for International Application PCT/GB2012/000331, dated Oct. 8, 2013, dated Oct. 17, 2013, 8 pgs.
International Preliminary Report on Patentability for International Application PCT/GB2012/000677, dated Feb. 25, 2014, dated Mar. 6, 2014, 5 pgs.
International Preliminary Report on Patentability for International Application PCT/GB2013/000005, dated Jul. 8, 2014, dated Jul. 17, 2014, 12 pgs.
International Preliminary Report on Patentability for International Application PCT/GB2014/000295, dated Feb. 2, 2016, dated Feb. 11, 2016, 4 pgs.
International Preliminary Report on Patentability for International Application PCT/GB2015/000225, dated Feb. 14, 2017, dated Feb. 23, 2017, 8 pgs.
International Preliminary Report on Patentability for International Application PCT/GB2015/000228, dated Feb. 14, 2017, dated Feb. 23, 2017, 11 pgs.
International Preliminary Report on Patentability for International application PCT/GB2015/000274, dated Mar. 28, 2017, dated Apr. 6, 2017, 8 pgs.
International Preliminary Report on Patentability for International Application PCT/GB2016/000014, dated Jul. 25, 2017, dated Aug. 3, 2017, 7 pgs.
International Preliminary Report on Patentability for International Application PCT/GB2017/000055, dated Oct. 16, 2018, dated Oct. 25 2018, 9 pgs.
International Preliminary Report on Patentability for International Application PCT/US2014/011736, dated Jul. 21, 2015, dated Jul. 30, 2015, 9 pgs.
International Preliminary Report on Patentability for International Application PCT/US2016/017091, dated Aug 15, 2017, dated Aug 24, 2017, 5 pgs.
International Preliminary Report on Patentability for International Application PCT/GB2017/000040, Report dated Sep. 25, 2018, dated Oct. 4, 2018, 7 pgs.
International Preliminary Report on Patentability for PCT Application No. PCT/US2013/038070, dated Oct. 28, 2014, 6 pgs.
International Search Report and Written Opinion for International Application No. PCT/US2019/012768, Search completed Feb. 26, 2019, dated Mar. 8, 2019, 11 Pgs.
International Search Report and Written Opinion for International Application No. PCT/GB2010/000835, completed Oct. 26, 2010, dated Nov. 8, 2010, 12 pgs.
International Search Report and Written Opinion for International Application No. PCT/GB2010/001920, completed Mar. 29, 2011, dated Apr. 6, 2011, 15 pgs.
International Search Report and Written Opinion for International Application No. PCT/GB2015/000228, Search completed May 4, 2011, dated Jul. 15, 2011, 15 Pgs.
International Search Report and Written Opinion for International Application No. PCT/GB2016/000036, completed Jul. 4, 2016, dated Jul. 13, 2016, 10 pgs.
International Search Report and Written Opinion for International Application No. PCT/GB2016/000065, completed Jul. 14, 2016, dated Jul. 27, 2016, 10 pgs.
International Search Report and Written Opinion for International Application No. PCT/GB2017/000055, completed Jul. 19, 2017, dated Jul. 26, 2017, 12 pgs.
International Search Report and Written Opinion for International Application No. PCT/US2013/038070, completed Aug. 12, 2013, dated Aug. 14, 2013, 12 pgs.
International Search Report and Written Opinion for International Application No. PCT/US2014/011736, completed Apr. 18, 2014, dated May 8, 2014, 10 pgs.
International Search Report and Written Opinion for International Application No. PCT/US2018/012691, completed Mar. 10, 2018, dated Mar. 28, 2018, 16 pgs.
International Search Report and Written Opinion for International Application No. PCT/US2018/015553, completed Aug. 6, 2018, dated Sep. 19, 2018, 12 pgs.
International Search Report and Written Opinion for International Application No. PCT/US2018/037410, completed Aug. 16, 2018, dated Aug. 30, 2018, 11 Pgs.
"Plastic has replaced glass in photochromic lens", 2003, 1 page.
"Range Finding Using Pulse Lasers", OSRAM, Opto Semiconductors, Sep. 10, 2004, 7 pgs.
"Response time in Liquid-Crystal Variable Retarders", Meadowlark Optics, Inc., 2005, 4 pgs.
"Secondary Optics Design Considerations for SuperFlux LEDs", Lumileds, application brief AB20-5, Sep. 2002, 23 pgs.
"Solid-State Optical Mouse Sensor with Quadrature Outputs", IC Datasheet, UniqueICs, Jul. 15, 2004, 11 pgs.
"SVGA TransparentVLSITM Microdisplay Evaluation Kit", Radiant Images, Inc., Product Data Sheet, 2003, 3 pgs.
"Technical Data Sheet LPR1", Luminus Devices, Inc., Luminus Projection Chipset, Release 1, Preliminary, Revision B, Sep. 21, 2004, 9 pgs.
"The Next Generation of TV", SID Information Display, Nov./Dec. 2014, vol. 30, No. 6, 56 pgs.

(56) References Cited

OTHER PUBLICATIONS

"Thermal Management Considerations for SuperFlux LEDs", Lumileds, application brief AB20-4, Sep. 2002, 14 pgs.
"USAF Awards SBG Labs an SBIR Contract for Wide Field of View HUD", Press Release ,SBG Labs DigiLens, Apr. 2014, 2 pgs.
"UVTOP240", Roithner LaserTechnik GmbH, v 2.0, Jun. 24, 2013, 6 pgs.
"UVTOP310", Roithner LaserTechnik GmbH, v 2.0, Jun. 24, 2013, 6 pgs.
"Velodyne's HDL-64E: A High Definition Lidar Sensor for 3-D Applications", High Definition Lidar, white paper, Oct. 2007, 7 pgs.
"VerLASE Gets Patent for Breakthrough Color Conversion Technology That Enables Full Color MicroLED Arrays for Near Eye Displays", Cision PRweb, Apr. 28, 2015, Retrieved from the Internet http://www.prweb.com/releases/2015/04/prweb12681038.htm, 3 pgs.
"Webster's Third New International Dictionary 433", (1986), 3 pages.
"X-Cubes—Revisited for LCOS", BASID, RAF Electronics Corp. Rawson Optics, Inc., Oct. 24, 2002, 16 pgs.
Aachen, "Design of plastic optics for LED applications", Optics Colloquium 2009, Mar. 19, 2009, 30 pgs.
Abbate et al., "Characterization of LC-polymer composites for opto-electronic application", Proceedings of OPTOEL'03, Leganes-Madrid, Spain, Jul. 14-16, 2003, 4 pgs.
Al-Kalbani et al., "Ocular Microtremor laser speckle metrology", Proc. of SPIE, 2009, vol. 7176 717606-1, 12 pgs.
Almanza-Workman et al., "Planarization coating for polyimide substrates used in roll-to-roll fabrication of active matrix backplanes for flexible displays", HP Laboratories, HPL-2012-23, Feb. 6, 2012, 12 pgs.
Amitai et al., "Visor-display design based on planar holographic optics", Applied Optics, vol. 34, No. 8, Mar. 10, 1995, pp. 1352-1356.
Amundson et al., "Morphology and electro-optic properties of polymer-dispersed liquid-crystal films", Physical Review E, Feb. 1997, vol. 55. No. 2, pp. 1646-1654.
An et al., "Speckle suppression in laser display using several partially coherent beams", Optics Express, Jan. 5, 2009, vol. 17, No. 1, pp. 92-103.
Apter et al., "Electrooptical Wide-Angle Beam Deflector Based on Fringing-Field-Induced Refractive Inhomogeneity in a Liquid Crystal Layer", 23rd IEEE Convention of Electrical and Electronics Engineers in Israel, Sep. 6-7, 2004, pp. 240-243.
Arnold et al., "52.3: An Improved Polarizing Beamsplitter LCOS Projection Display Based on Wire-Grid Polarizers", Society for Information Display, Jun. 2001, pp. 1282-1285.
Ayras et al., "Exit pupil expander with a large field of view based on diffractive optics", Journal of the SID, May 18, 2009, 17/8, pp. 659-664.
Baets et al., "Resonant-Cavity Light-Emitting Diodes: a review", Proceedings of SPIE, 2003, vol. 4996, pp. 74-86.
Bayer et al., "Introduction to Helmet-Mounted Displays", 2016, pp. 47-108.
Beckel et al., "Electro-optic properties of thiol-ene polymer stabilized ferroelectric liquid crystals", Liquid Crystals, vol. 30, No. 11, Nov. 2003, pp. 1343-1350.
Bergkvist, "Biospeckle-based Study of the Line Profile of Light Scattered in Strawberries", Master Thesis, Lund Reports on Atomic Physics, LRAP-220, Lund 1997, pp. 1-62.
Bernards et al., "Nanoscale porosity in polymer films: fabrication and therapeutic applications", Soft Matter, Jan. 1, 2010, vol. 6, No. 8, pp. 1621-1631.
Bleha et al., "Binocular Holographic Waveguide Visor Display", SID Symposium Digest of Technical Papers, Holoeye Systems Inc., Jun. 2014, San Diego, CA, 4 pgs.
Bleha et al., "D-ILA Technology for High Resolution Projection Displays", Sep. 10, 2003, Proceedings, vol. 5080, doi:10.1117/12.497532, 11 pgs.

Bone, "Design Obstacles for LCOS Displays in Projection Applications "Optics architectures for LCOS are still evolving"", Aurora Systems Inc., Bay Area SID Seminar, Mar. 27, 2001, 22 pgs.
Born et al., "Optics of Crystals", Principles of Optics 5th Edition 1975, pp. 705-707.
Bourzac, "Magic Leap Needs to Engineer a Miracle", Intelligent Machines, Jun. 11, 2015, 7 pgs.
Bowen et al., "Optimisation of interdigitated electrodes for piezoelectric actuators and active fibre composites", J Electroceram, Jul. 2006, vol. 16, pp. 263-269, DOI 10.1007/s10832-006-9862-8.
Bowley et al., "Variable-wavelength switchable Bragg gratings formed in polymer-dispersed liquid crystals", Applied Physics Letters, Jul. 2, 2001, vol. 79, No. 1, pp. 9-11.
Bronnikov et al., "Polymer-Dispersed Liquid Crystals: Progress in Preparation, Investigation and Application", Journal of Macromolecular Science Part B, published online Sep. 30, 2013, vol. 52, pp. 1718-1738.
Brown, "Waveguide Displays", Rockwell Collins, 2015, 11 pgs.
Bruzzone et al., "Compact, high-brightness LED illumination for projection systems", Journal of the SID 17/12, Dec. 2009, pp. 1043-1049.
Buckley, "Colour holographic laser projection technology for heads-up and instrument cluster displays", Conference: Proc. SID Conference 14th Annual Symposium on Vehicle Displays, Jan. 2007, 5 pgs.
Buckley, "Pixtronix DMS technology for head-up displays", Pixtronix, Inc., Jan. 2011, 4 pgs.
Buckley et al., "Full colour holographic laser projector HUD", Light Blue Optics Ltd., Aug. 10, 2015, 5 pgs.
Buckley et al., "Rear-view virtual image displays", in Proc. SID Conference 16th Annual Symposium on Vehicle Displays, Jan. 2009, 5 pgs.
Bunning et al., "Effect of gel-point versus conversion on the real-time dynamics of holographic polymer-dispersed liquid crystal (HPDLC) formation", Proceedings of SPIE—vol. 5213, Liquid Crystals VII, Iam-Choon Khoo, Editor, Dec. 2003, pp. 123-129.
Bunning et al., "Electro-optical photonic crystals formed in H-PDLCs by thiol-ene photopolymerization", American Physical Society, Annual APS, Mar. 3-7, 2003, abstract #R1.135.
Bunning et al., "Holographic Polymer-Dispersed Liquid Crystals (H-PDLCs)1", Annu. Rev. Mater. Sci., 2000, vol. 30, pp. 83-115.
Bunning et al., "Morphology of Anisotropic Polymer Dispersed Liquid Crystals and the Effect of Monomer Functionality", Polymer Science: Part B: Polymer Physics, Jul. 30, 1997, vol. 35, pp. 2825-2833.
Busbee et al., "SiO2 Nanoparticle Sequestration via Reactive Functionalization in Holographic Polymer-Dispersed Liquid Crystals", Advanced Materials, Sep. 2009, vol. 21, pp. 3659-3662.
Butler et al., "Diffractive Properties of Highly Birefringent Volume Gratings: Investigation", Journal of Optical Society of America, Feb. 2002, vol. 19, No. 2, pp. 183-189.
Cai et al., "Recent advances in antireflective surfaces based on nanostructure arrays", Mater. Horiz., 2015, vol. 2, pp. 37-53.
Cameron, "Optical Waveguide Technology & Its Application in Head Mounted Displays", Proc. of SPIE, May 22, 2012, vol. 8383, pp. 83830E-1-83830E-11.
Cameron, "The Application of Holographic Optical Waveguide Technology to Q-Sight™ Family of Helmet Mounted Displays", Proc. of SPIE, 2009, 11 pages, vol. 7326.
Caputo et al., "POLICRYPS Composite Materials: Features and Applications", Advances in Composite Materials—Analysis of Natural and Man-Made Materials, www.intechopen.com, Sep. 2011, pp. 93-118.
Caputo et al., "Policryps Switchable Holographic Grating: A Promising Grating Electro-Optical Pixel for High Resolution Display Application", Journal of Display Technology, Mar. 2006, vol. 2, No. 1, pp. 38-51.
Carclo Optics, "Guide to choosing secondary optics", Carclo Optics, Dec. 15, 2014, www.carclo-optics.com, 48 pgs.
Chen et al, "Polarization rotators fabricated by thermally-switched liquid crystal alignments based on rubbed poly(N-vinyl carbazole) films", Optics Express, Apr. 11, 2011, vol. 19, No. 8, pp. 7553-7558.

(56) References Cited

OTHER PUBLICATIONS

Cheng et al., "Design of an ultra-thin near-eye display with geometrical waveguide and freeform optics", Optics Express, Aug. 2014, 16 pgs.
Chi et al., "Ultralow-refractive-index optical thin films through nanoscale etching of ordered mesoporous silica films", Optic Letters, May 1, 2012, vol. 37, No. 9, pp. 1406-1408.
Chigrinov et al., "Photo-aligning by azo-dyes: Physics and applications", Liquid Crystals Today, Sep. 6, 2006, http://www.tandfonline.com/action/journalInformation?journalCode=tlcy20, 15 pgs.
Cho et al., "Electro-optic Properties of CO2 Fixed Polymer/Nematic LC Composite Films", Journal of Applied Polymer Science, Nov. 5, 2000, vol. 81, Issue 11, pp. 2744-2753.
Cho et al., "Optimization of Holographic Polymer Dispersed Liquid Crystals for Ternary Monomers", Polymer International, Nov. 1999, vol. 48, pp. 1085-1090.
Colegrove et al., "P-59: Technology of Stacking HPDLC for Higher Reflectance", SID 00 Digest, May 2000, pp. 770-773.
Crawford, "Electrically Switchable Bragg Gratings", Optics & Photonics News, pp. 54-59, Apr. 2003.
Cruz-Arreola et al., "Diffraction of beams by infinite or finite amplitude-phase gratings", Investigacio' N Revista Mexicana De Fi'Sica, Feb. 2011, vol. 57, No. 1, pp. 6-16.
Dabrowski, "High Birefringence Liquid Crystals", Crystals, Sep. 3, 2013, vol. 3, No. 3, pp. 443-482.
Dainty, "Some statistical properties of random speckle patterns in coherent and partially coherent illumination", Optica Acta, Mar. 12, 1970, vol. 17, No. 10, pp. 761-772.
Date, "Alignment Control in Holographic Polymer Dispersed Liquid Crystal", Journal of Photopolymer Science and Technology, Nov. 2, 2000, vol. 13, pp. 289-284.
Date et al., "52.3: Direct-viewing Display Using Alignment-controlled PDLC and Holographic PDLC", Society for Information Display Digest, May 2000, pp. 1184-1187, DOI: 10.1889/1.1832877.
Date et al., "Full-color reflective display device using holographically fabricated polymer-dispersed liquid crystal (HPDLC)", Journal of the SID, 1999, vol. 7, No. 1, pp. 17-22.
De Bitetto, "White light viewing of surface holograms by simple dispersion compensation", Applied Physics Letters, Dec. 15, 1966, vol. 9, No. 12, pp. 417-418.
Developer World, "Create customized augmented reality solutions", printed Oct. 19, 2017, LMX-001 holographic waveguide display, Sony Developer World, 3 pgs.
Dhar et al., "Recording media that exhibit high dynamic range for digital holographic data storage", Optics Letters, Apr. 1, 1999, vol. 24, No. 7, pp. 487-489.
Domash et al., "Applications of switchable Polaroid holograms", SPIE Proceedings, vol. 2152, Diffractive and Holographic Optics Technology, Jan. 23-29, 1994, Los Angeles, CA, pp. 127-138, ISBN: 0-8194-1447-6.
Drake et al., "Waveguide Hologram Fingerprint Entry Device", Optical Engineering, Sep. 1996, vol. 35, No. 9, pp. 2499-2505.
Drevensek-Olenik et al., "In-Plane Switching of Holographic Polymer-Dispersed Liquid Crystal Transmission Gratings", Mol. Cryst. Liq. Cryst., 2008, vol. 495, pp. 177/[529]-185/[537].
Drevensek-Olenik et al., "Optical diffraction gratings from polymer-dispersed liquid crystals switched by interdigitated electrodes", Journal of Applied Physics, Dec. 1, 2004, vol. 96, No. 11, pp. 6207-6212.
Ducharme, "Microlens diffusers for efficient laser speckle generation", Optics Express, Oct. 29, 2007, vol. 15, No. 22, pp. 14573-14579.
Duong et al., "Centrifugal Deposition of Iron Oxide Magnetic Nanorods for Hyperthermia Application", Journal of Thermal Engineering, Yildiz Technical University Press, Istanbul, Turkey, Apr. 2015, vol. 1, No. 2, pp. 99-103.
Fattal et al., "A multi directional backlight for a wide-angle glasses-free three-dimensional display", Nature, Mar. 21, 2012, vol. 495, pp. 348-351.

Fontecchio et al., "Spatially Pixelated Reflective Arrays from Holographic Polymer Dispersed Liquid Crystals", SID 00 Digest, May 2000, pp. 774-776.
Forman et al., "Materials development for PhotoINhibited Super-Resolution (PINSR) lithography", Proc. of SPIE, 2012, vol. 8249, 824904, doi: 10.1117/12.908512, pp. 824904-1-824904-9.
Forman et al., "Radical diffusion limits to photoinhibited super-resolution lithography", Phys.Chem. Chem. Phys., May 31, 2013, vol. 15, pp. 14862-14867.
Friedrich-Schiller, "Spatial Noise and Speckle", Version Jan. 12, 2011, Dec. 2011, Abbe School of Photonics, Jena, Germany, 27 pgs.
Fujii et al., "Nanoparticle-polymer-composite volume gratings incorporating chain-transfer agents for holography and slow-neutron optics", Optics Letters, Apr. 25, 2014, vol. 39, Issue 12, 5 pgs.
Funayama et al., "Proposal of a new type thin film light-waveguide display device using", The International Conference on Electrical Engineering, 2008, No. P-044, 5 pgs.
Gabor, "Laser Speckle and its Elimination", BM Research and Development, Eliminating Speckle Noise, Sep. 1970, vol. 14, No. 5, pp. 509-514.
Gardiner et al., "Bistable liquid-crystals reduce power consumption for high-efficiency smart glazing", SPIE, 2009, 10.1117/2.1200904.1596, 2 pgs.
Giancola, "Holographic Diffuser, Makes Light Work of Screen Tests", Photonics Spectra, 1996, vol. 30, No. 8, pp. 121-122.
Goodman, "Some fundamental properties of speckle", J. Opt. Soc. Am., Nov. 1976, vol. 66, No. 11, pp. 1145-1150.
Goodman, "Statistical Properties of Laser Speckle Patterns", Applied Physics, 1975, vol. 9, Chapter 2, Laser Speckle and Related Phenomena, pp. 9-75.
Goodman et al., "Speckle Reduction by a Moving Diffuser in Laser Projection Displays", The Optical Society of America, 2000, 15 pgs.
Guldin et al., "Self-Cleaning Antireflective Optical Coatings", Nano Letters, Oct. 14, 2013, vol. 13, pp. 5329-5335.
Guo et al., "Review Article: A Review of the Optimisation of Photopolymer Materials for Holographic Data Storage", Physics Research International, vol. 2012, Article ID 803439, Academic Editor: Sergi Gallego, 16 pages, http://dx.doi.org/10.1155/2012/803439, May 4, 2012.
Han et al., "Study of Holographic Waveguide Display System", Advanced Photonics for Communications, 2014, 4 pgs.
Harbers et al., "I-15.3: LED Backlighting for LCD-HDTV", Journal of the Society for Information Display, 2002, vol. 10, No. 4, pp. 347-350.
Harbers et al., "Performance of High Power LED Illuminators in Color Sequential Projection Displays", Lumileds Lighting, 2007, 4 pgs.
Harbers et al., "Performance of High Power LED Illuminators in Color Sequential Projection Displays", Lumileds, Aug. 7, 2001, 11 pgs.
Harbers et al., "Performance of High-Power LED illuminators in Projection Displays", Proc. Int. Disp. Workshops, Japan. vol. 10, pp. 1585-1588, 2003.
Harding et al., "Reactive Liquid Crystal Materials for Optically Anisotropic Patterned Retarders", Merck, licrivue, 2008, ME-GR-RH-08-010, 20 pgs.
Harding et al., "Reactive Liquid Crystal Materials for Optically Anisotropic Patterned Retarders", SPIE Lithography Asia—Taiwan, 2008, Proceedings vol. 7140, Lithography Asia 2008; 71402J, doi: 10.1117/12.805378.
Hariharan, "Optical Holography: Principles, techniques and applications", Cambridge University Press, 1996, pp. 231-233.
Harris, "Photonic Devices", EE 216 Principals and Models of Semiconductor Devices, Autumn 2002, 20 pgs.
Harrold et al., "3D Display Systems Hardware Research at Sharp Laboratories of Europe: an update", Sharp Laboratories of Europe, Ltd., received May 21, 1999, 7 pgs.
Harthong et al., "Speckle phase averaging in high-resolution color holography", J. Opt. Soc. Am. A, Feb. 1997, vol. 14, No. 2, pp. 405-409.
Hasan et al., "Tunable-focus lens for adaptive eyeglasses", Optics Express, Jan. 23, 2017, vol. 25, No. 2, 1221, 13 pgs.

(56) References Cited

OTHER PUBLICATIONS

Hasman et al., "Diffractive Optics: Design, Realization, and Applications", Fiber and Integrated Optics, vol. 16, pp. 1-25, 1997.
International Preliminary Report on Patentability for International Application No. PCT/US2019/012768, Report dated Jul. 14, 2020, dated Jul. 23, 2020, 7 Pgs.

* cited by examiner

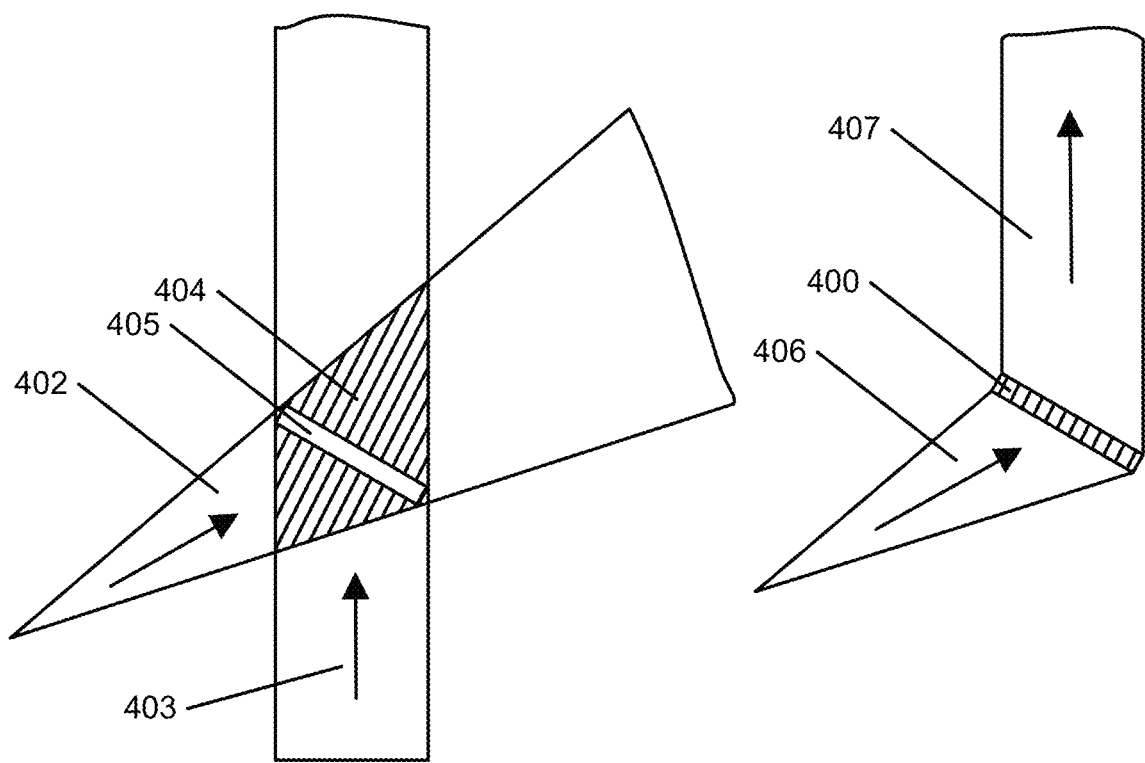
*FIG. 4A*        *FIG. 4B*

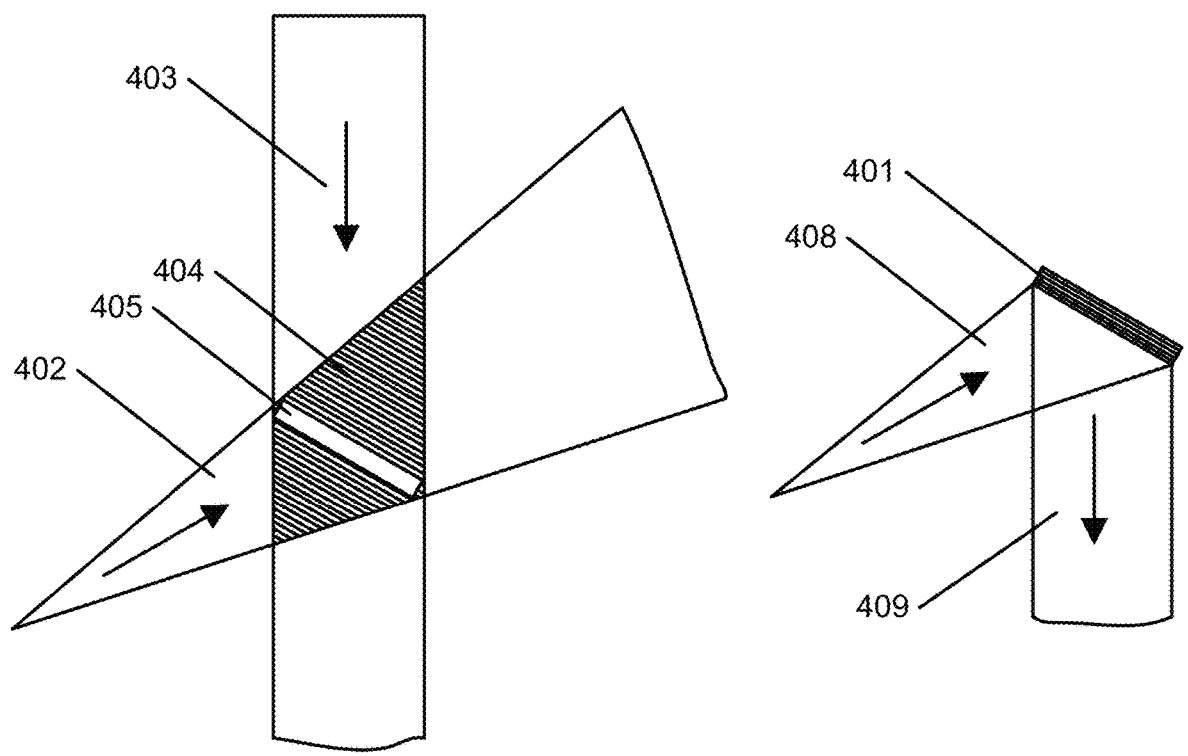
FIG. 4C                    FIG. 4D

R, G, B Waveguides

Grating slanted angle change across the O/P box to balance output power for different field angle Horizontally Bifurcated Field Vertically Bifurcated Field

FIG. 55B
A : 30/180/30
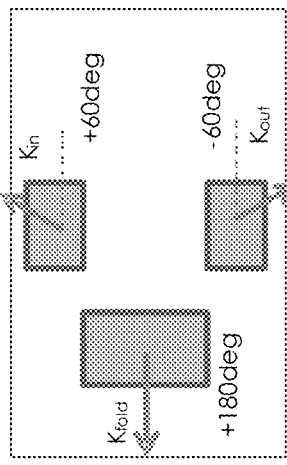
FIG. 55C
B : 45/180/45
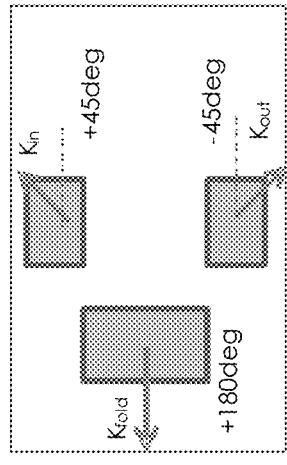
FIG. 55D
C : 60/180/60
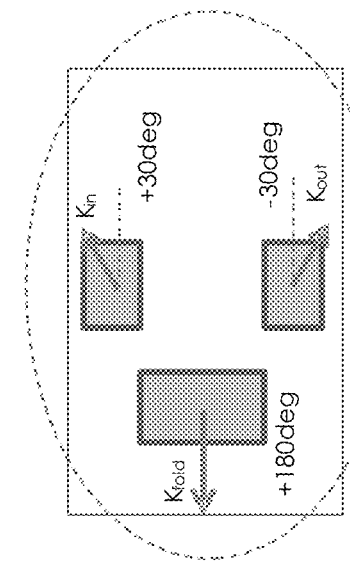
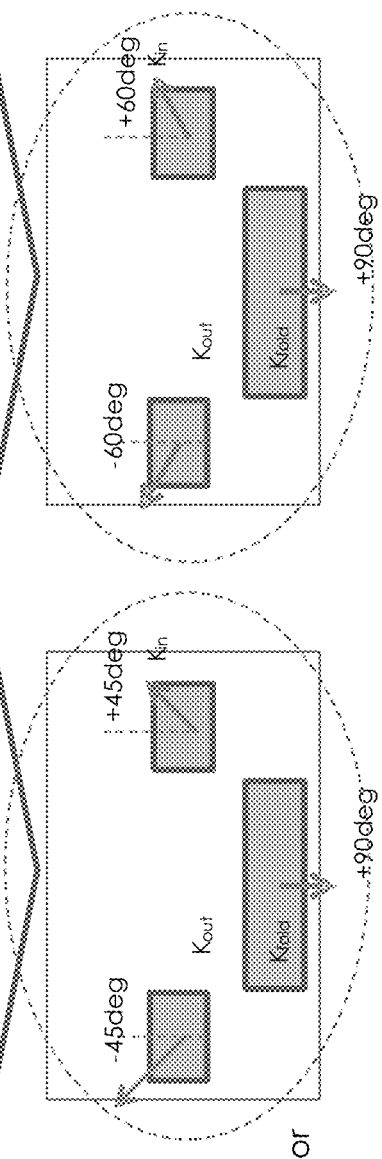
Grating arrangements under consideration shown in red circles.
The diffraction angles on the fold grating are considered. Material is P sensitive. P polarization coupling reduces modulation as $dn*\cos(2\theta_{Bragg})$. The effective modulation available is considered for each case.

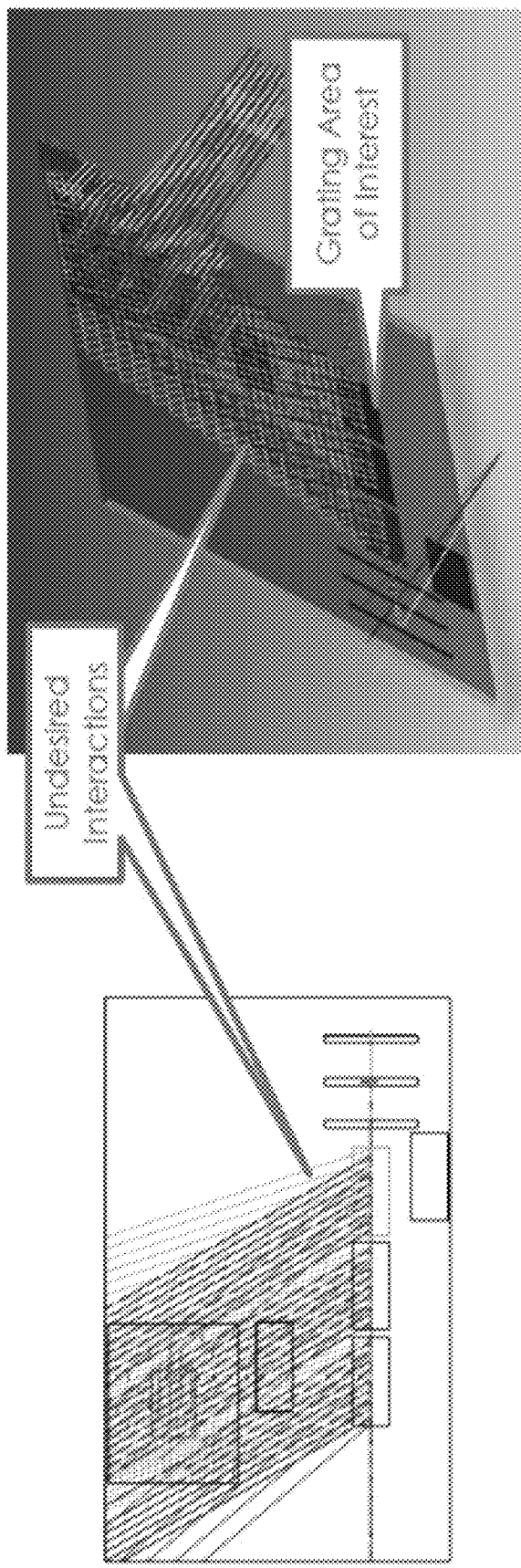

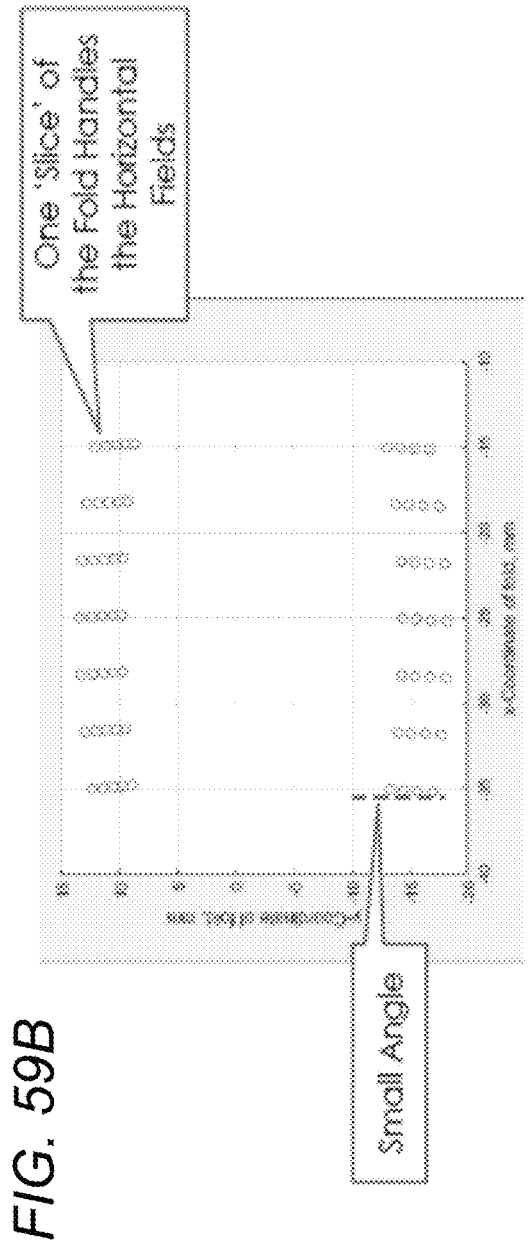
FIG. 59B
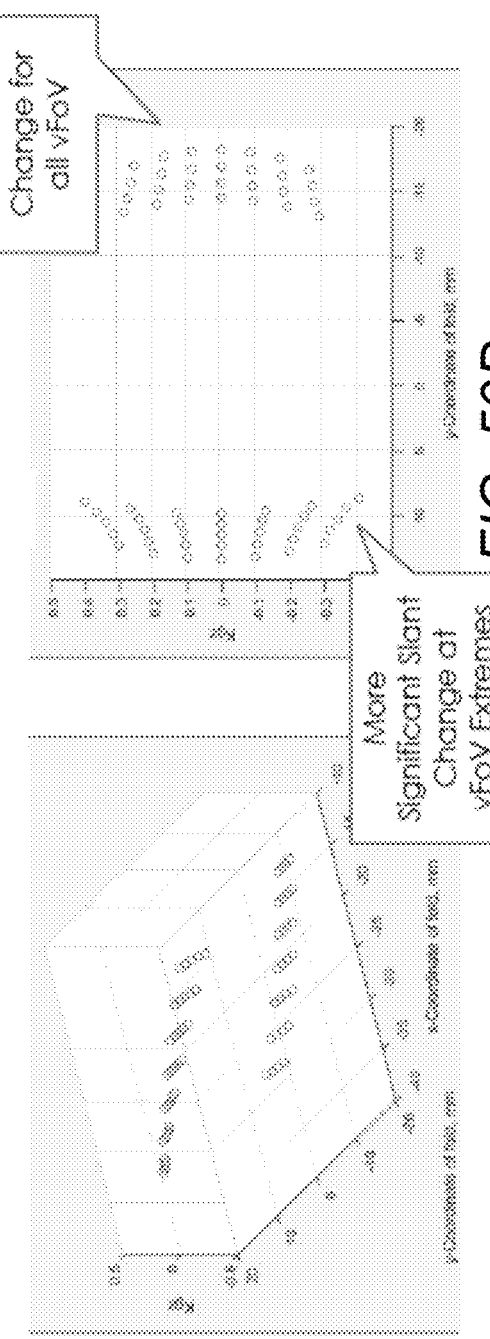
FIG. 59D
FIG. 59C

Narrow angular bandwidth and very high efficiency fold grating is required to reduce ineffective diffraction and increase effective diffraction

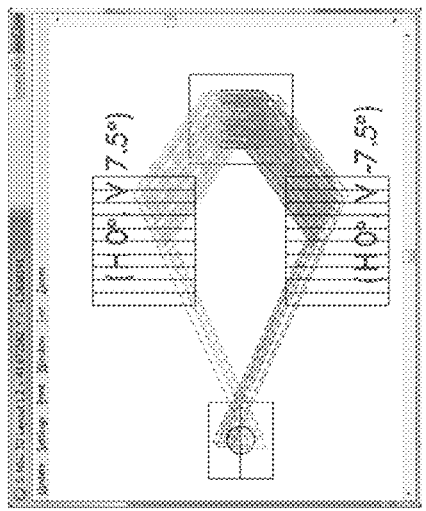

*FIG. 61A*

Break vertical field into half, positive field goes to top RKV fold, negative field goes to bottom RKV fold gratings Advantage: FOLD grating becomes narrower horizontally, prevent interaction to reduce ineffective diffraction

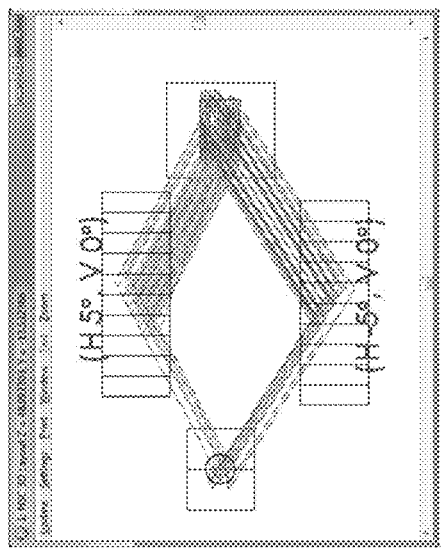

*FIG. 61B*

Break horizontal field into half, positive field goes to top RKV fold, negative field goes to bottom RKV fold gratings.

Advantage: FOLD grating becomes shorter vertically, reduce ineffective diffraction Note that relative fold efficiencies of vertical and horizontal bifurcation are very similar at 45%. Compare this to unbifurcated field fold efficiencies at 23%. Therefore, bifurcation of fields provides a doubling of efficiency.

FIG. 62

P-Pol Diffraction for High Effective Modulation:
P coupling is dependent on $\cos(2\theta_B)$
Here $2\theta_B$ is <90deg, therefore coupling is high.
P-pol coupling is applied as factor to $\delta n$.

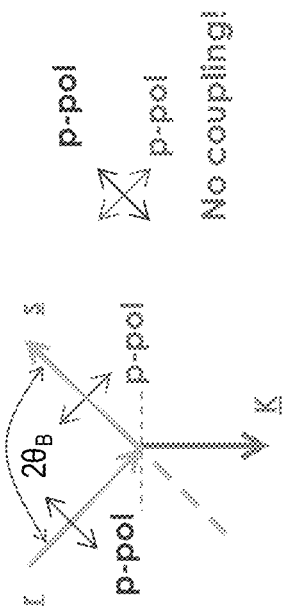

Good coupling!

P-Pol Diffraction for Zero Effective Modulation:
P coupling is dependent on $\cos(2\theta_B)$
Here $2\theta_B$ =90deg, so no coupling of $\underline{\iota}$ to $\underline{s}$.
Effective modulation $\delta n$ is zero.

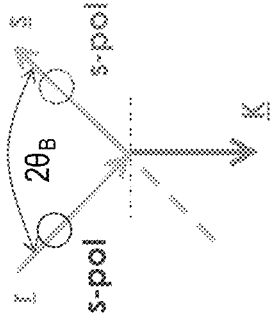

No coupling!

S-Pol Diffraction:
S coupling is independent of Bragg angle in both cases
S-pol E field vectors remain aligned pre and post diffraction.

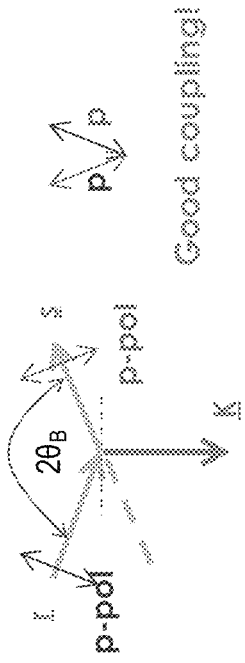

Always full coupling, not applicable to DigiLens RMLCM.

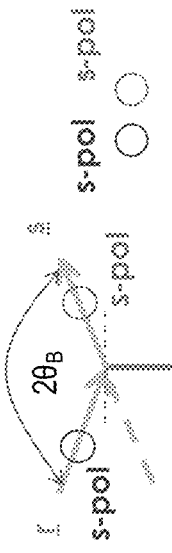

Always full coupling, not applicable to DigiLens RMLCM.

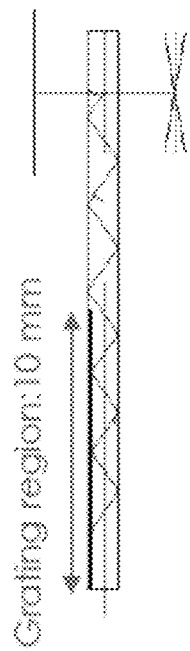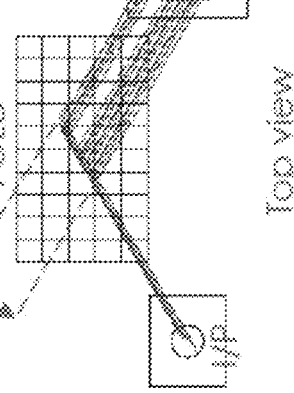
FIG. 63A

Case 1) No polarization mismatch:

Case 2) Random polarization:

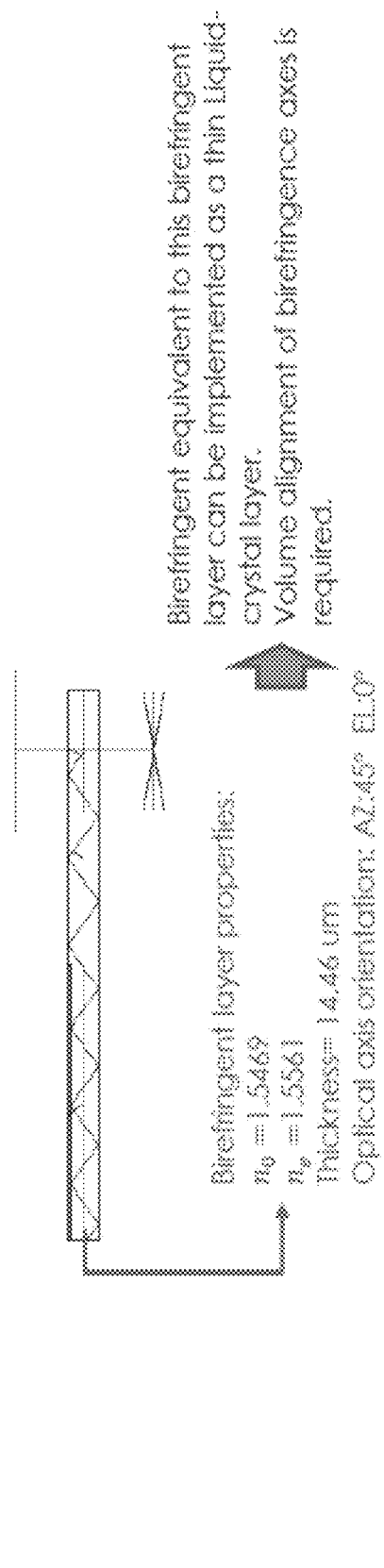

| FoV | Non-Polarization efficiency (Total) | Polarization preserving efficiency (Ex. out-coupling polarization preserving efficiency) | Polarization efficiency (Ex. out-coupling) |
|---|---|---|---|
| -10° | 47.41% | 38.72% | 81.67% |
| -5° | 61.25% | 45.22% | 73.83% |
| 0° | 73.90% | 54.50% | 73.75% |
| 5° | 67.58% | 45.87% | 67.88% |
| 10° | 62.00% | 30.41% | 49.05% |

FIG. 65K

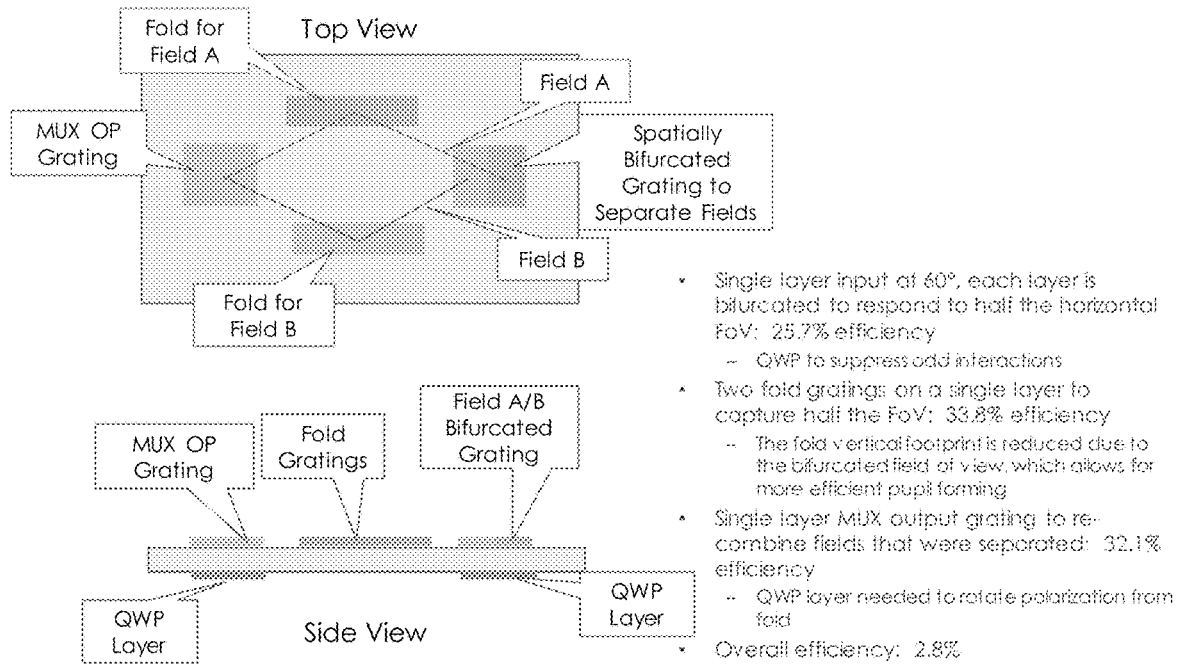

- Single layer input at 60°, each layer is bifurcated to respond to half the horizontal FoV: 25.7% efficiency
  - QWP to suppress odd interactions
- Two fold gratings on a single layer to capture half the FoV: 33.8% efficiency
  - The fold vertical footprint is reduced due to the bifurcated field of view, which allows for more efficient pupil forming
- Single layer MUX output grating to recombine fields that were separated: 32.1% efficiency
  - QWP layer needed to rotate polarization from fold
- Overall efficiency: 2.8%

FIG. 65L

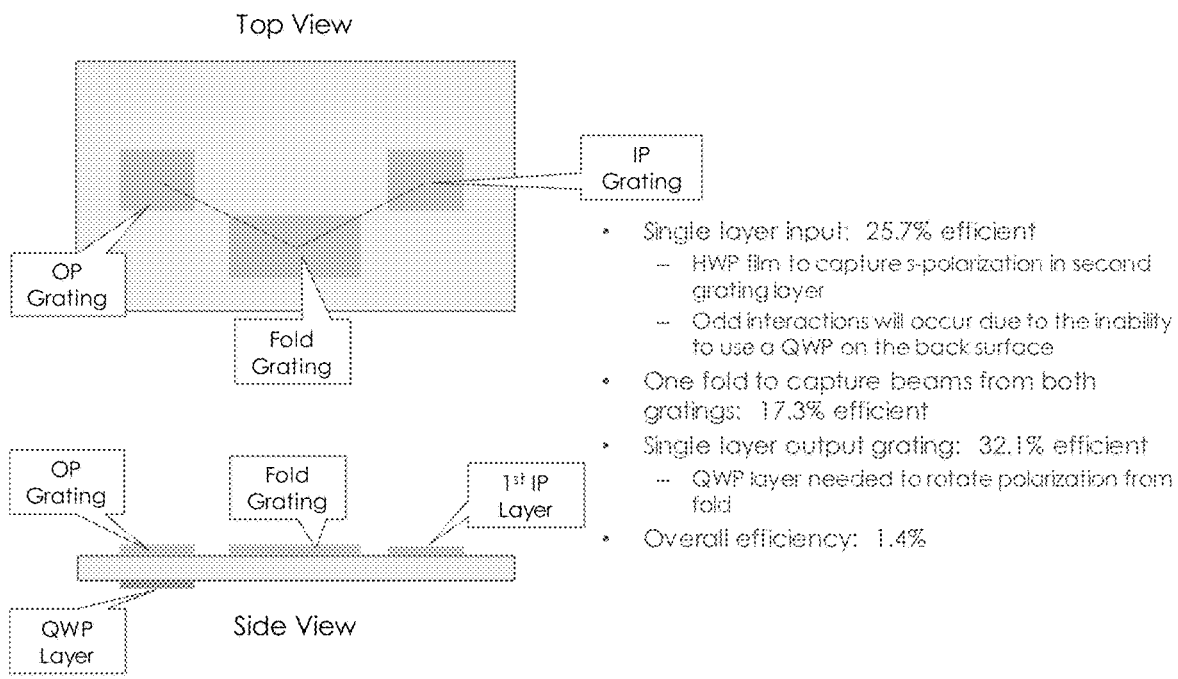

- Single layer input: 25.7% efficient
  - HWP film to capture s-polarization in second grating layer
  - Odd interactions will occur due to the inability to use a QWP on the back surface
- One fold to capture beams from both gratings: 17.3% efficient
- Single layer output grating: 32.1% efficient
  - QWP layer needed to rotate polarization from fold
- Overall efficiency: 1.4%

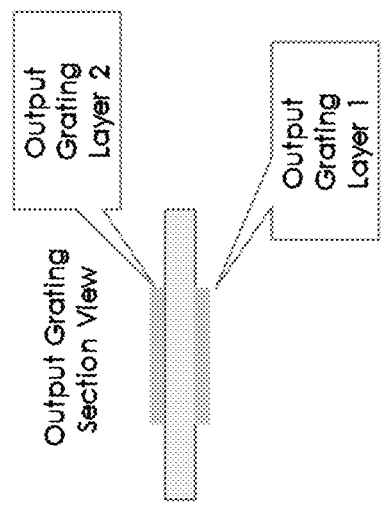
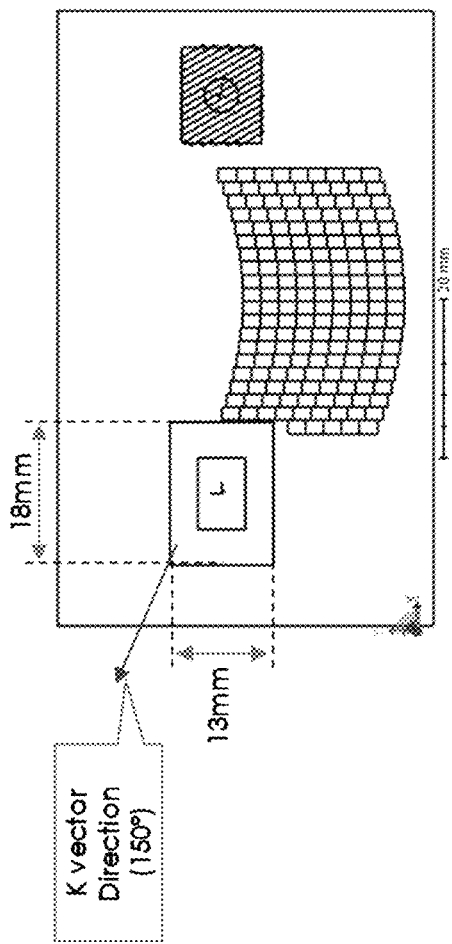
FIG. 66C

Mastering Rig Setup
— Illustration for single exposure

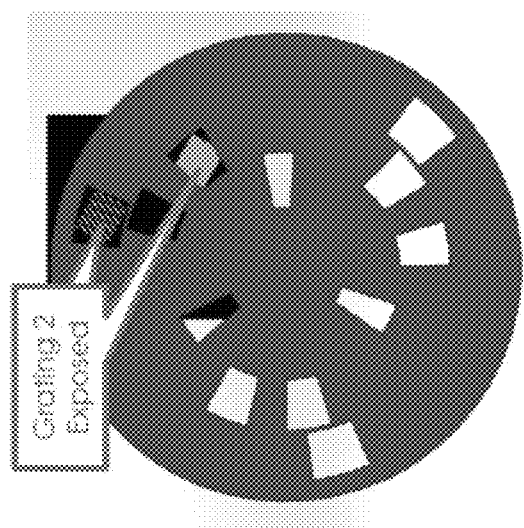
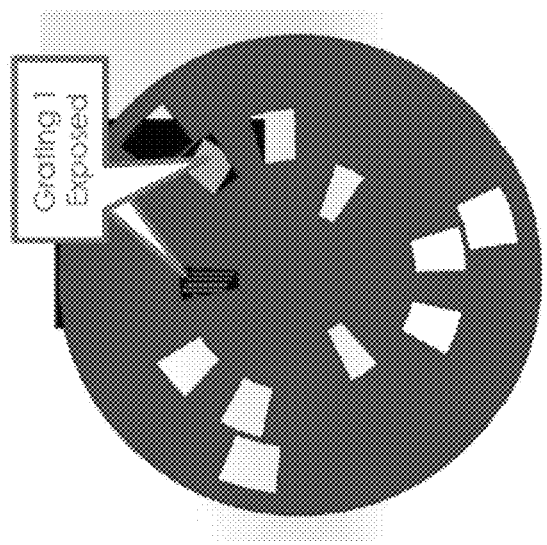
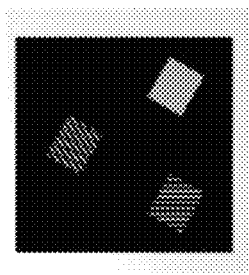
FIG. 67D

WAVEGUIDE ARCHITECTURES AND RELATED METHODS OF MANUFACTURING

CROSS-REFERENCE TO RELATED APPLICATIONS

The current application claims the benefit of and priority under 35 U.S.C. § 119(e) to U.S. Provisional Patent Application No. 62/614,947 entitled "Monocular Waveguide Displays," filed Jan. 8, 2018, U.S. Provisional Patent Application No. 62/614,949 entitled, "Vehicular Waveguide Displays," filed Jan. 8, 2018, and U.S. Provisional Patent Application No. 62/615,000 entitled "Near-Eye Waveguide Displays," filed Jan. 8, 2018. The disclosures of U.S. Provisional Patent Application Nos. 62/614,947, 62/614,949, and 62/615,000 are hereby incorporated by reference in their entireties for all purposes.

FIELD OF THE INVENTION

The present invention generally relates to apparatuses and methods for displays and more specifically to apparatuses and methods for waveguide displays.

BACKGROUND

Waveguides can be referred to as structures with the capability of confining and guiding waves (i.e., restricting the spatial region in which waves can propagate). One subclass includes optical waveguides, which are structures that can guide electromagnetic waves, typically those in the visible spectrum. Waveguide structures can be designed to control the propagation path of waves using a number of different mechanisms. For example, planar waveguides can be designed to utilize diffraction gratings to diffract and couple incident light into the waveguide structure such that the in-coupled light can proceed to travel within the planar structure via total internal reflection ("TIR").

Fabrication of waveguides can include the use of material systems that allow for the recording of holographic optical elements within the waveguides. One class of such material includes polymer dispersed liquid crystal ("PDLC") mixtures, which are mixtures containing photopolymerizable monomers and liquid crystals. A further subclass of such mixtures includes holographic polymer dispersed liquid crystal ("HPDLC") mixtures. Holographic optical elements, such as volume phase gratings, can be recorded in such a liquid mixture by illuminating the material with two mutually coherent laser beams. During the recording process, the monomers polymerize and the mixture undergoes a photopolymerization-induced phase separation, creating regions densely populated by liquid crystal micro-droplets, interspersed with regions of clear polymer. The alternating liquid crystal-rich and liquid crystal-depleted regions form the fringe planes of the grating.

Waveguide optics, such as those described above, can be considered for a range of display and sensor applications. In many applications, waveguides containing one or more grating layers encoding multiple optical functions can be realized using various waveguide architectures and material systems, enabling new innovations in near-eye displays for augmented reality ("AR") and virtual reality ("VR"), compact heads-up displays ("HUDs") for aviation and road transport, and sensors for biometric and laser radar ("LIDAR") applications.

SUMMARY OF THE INVENTION

One embodiment includes a waveguide display including a waveguide including a holographic polymer dispersed liquid crystal mixture (HPDLC) layer sandwiched between first and second transparent substrates, wherein the HPDLC layer includes an input grating, a fold grating, and an output grating, and an input image node optically coupled to the waveguide, wherein the input grating is configured to receive light from the input image node and to cause the light to travel within the waveguide via total internal reflection to the fold grating, the fold grating is configured to direct the light towards the output grating, and the output grating is configured to cause the light to exit the waveguide.

In another embodiment, the input image node is coupled to the waveguide by an opto-mechanical interface that allows the waveguide to be mechanically disconnected from the input image node.

In a further embodiment, the waveguide is configured to direct light received from the input image node towards a vehicular windshield.

In still another embodiment, the waveguide is configured to distort the light exiting the waveguide such that the distorted light compensates for the curvature of the vehicular windshield.

In a still further embodiment, the input grating and the output grating are configured to be reverse reciprocal of each other.

In yet another embodiment, the input image node includes a transparent prism for coupling light into the waveguide.

In a yet further embodiment, the transparent prism includes a first surface for coupling light from the input image node into the prism, a second surface for coupling light out of the prism towards the waveguide, a third surface for providing an internal reflection, and a fourth surface opposing the third surface.

In another additional embodiment, the third surface is configured to totally internally reflect the light, wherein the third and fourth surfaces provide a window for viewing an external scene.

In a further additional embodiment, the waveguide display further includes a second waveguide, wherein the two waveguides are configured to form a binocular waveguide display.

In another embodiment again, at least one of the input grating and the output grating is a multiplexed grating.

In a further embodiment again, the waveguide further includes a second fold grating, wherein the multiplexed grating is configured to direct a portion of incident light towards the first fold grating and to direct another portion of incident light towards the second fold grating.

In still yet another embodiment, the multiplexed gratings provided by at least one of the input grating and the output grating is configured to increase the field of view of the waveguide display by providing a first waveguide path for light forming a first portion of the field of view and a second waveguide path for light forming a second portion of the field of view.

In a still yet further embodiment, the input and output gratings each multiplex first and second gratings, wherein a second fold grating is provided, wherein the first grating multiplexed into the input grating, the fold grating and the first grating multiplexed into the output grating together provide a first waveguide path for in-coupling, beam expanding and extracting a first field of view portion, wherein the second grating multiplexed into the input grating, the second fold grating and the second grating multiplexed into the output grating together provide a second waveguide path for in-coupling, beam expanding, and extracting a second field of view portion.

In still another additional embodiment, the waveguide further includes a quarter wave coating for rotating polarization of incoming light.

In a still further additional embodiment, the fold grating is configured to provide pupil expansion in a first direction and the output grating is configured to provide pupil expansion in a second direction different than the first direction.

In still another embodiment again, at least one of the input grating, fold grating, and output grating includes a rolled K-vector grating.

In a still further embodiment again, the input image node includes a light source.

In yet another additional embodiment, the input image node further includes a microdisplay panel.

In a yet further additional embodiment, the waveguide display further includes an eye tracker.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention. It will apparent to those skilled in the art that the present invention may be practiced with some or all of the present invention as disclosed in the following description.

FIGS. 4A-4D conceptually illustrate two-beam recording processes in accordance with various embodiments of the invention.

FIGS. 55A-55D conceptually illustrate gratings incorporating specific K-vectors in accordance with various embodiments of the invention.

FIGS. 57A-57C conceptually illustrate projected light reflected off a surface into an eyebox region in accordance with various embodiments of the invention.

FIGS. 59A-59E conceptually illustrate variation of the slant angle of the fold grating in accordance with various embodiments of the invention.

FIGS. 61A and 61B conceptually illustrate bifurcation of the vertical and horizontal fields in accordance with various embodiments of the invention.

FIG. 62 conceptually illustrates polarization of light in accordance with various embodiments of the invention.

FIGS. 63A-63F conceptually illustrate the effect of polarization on the efficiency of the gratings in accordance with embodiments of the invention.

FIGS. 66A-66C conceptually illustrate an implementation of a waveguide architecture in accordance with embodiments of the invention.

FIGS. 67A-67D conceptually illustrate methods of manufacturing multiplex (MUX) gratings in accordance with embodiments of the invention.

DETAILED DESCRIPTION

Figure 1A:
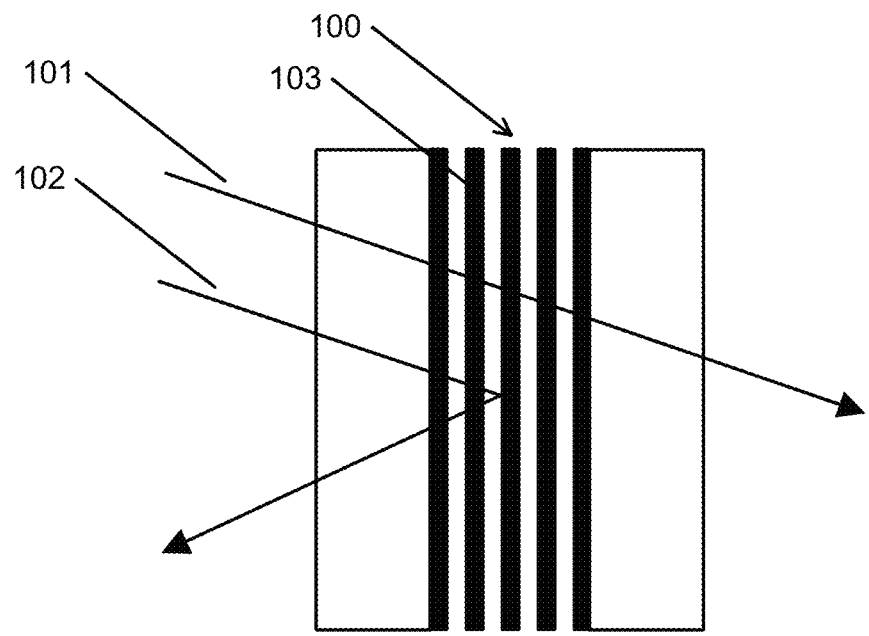
FIGS. 1A and 1B conceptually illustrate two volume Bragg grating configurations in accordance with various embodiments of the invention.

For the purposes of describing embodiments, some well-known features of optical technology known to those skilled in the art of optical design and visual displays have been omitted or simplified in order to not obscure the basic principles of the invention. Unless otherwise stated the term "on-axis" in relation to a ray or a beam direction refers to propagation parallel to an axis normal to the surfaces of the optical components described in relation to the invention. In the following description the terms light, ray, beam, and direction may be used interchangeably and in association with each other to indicate the direction of propagation of electromagnetic radiation along rectilinear trajectories. The term light and illumination may be used in relation to the visible and infrared bands of the electromagnetic spectrum. Parts of the following description will be presented using terminology commonly employed by those skilled in the art of optical design. As used herein, the term grating may encompass a grating comprised of a set of gratings in some embodiments. For illustrative purposes, it is to be understood that the drawings are not drawn to scale unless stated otherwise.

Turning now to the drawings, systems and methods for generating displays using waveguides incorporating Bragg gratings in accordance with various embodiments of the invention are illustrated. In many embodiments, the waveguide structures are designed to be optical waveguides, which are structures that can confine and guide electromagnetic waves in the visible spectrum, or light. These optical waveguides can be implemented for use in a number of different applications, such as but not limited to helmet mounted displays, head mounted displays ("HMDs"), and HUDs. The term HUD is typically utilized to describe a class of devices that incorporates a transparent display that presents data without requiring users to change their usual visual field. Optical waveguides can integrate various optical functions into a desired form factor depending on the given application.

Optical waveguides in accordance with various embodiments can be designed to manipulate light waves in a controlled manner using various methods and waveguide optics. For example, optical waveguides can be implemented using materials with higher refractive indices than the surrounding environment to restrict the area in which light can propagate. Light coupled into optical waveguides made of such materials at certain angles can be confined within the waveguide via total internal reflection. In a planar waveguide, the angles at which total internal reflection occurs can be given by Snell's law, which can determine whether the light is refracted or entirely reflected at the surface boundary.

In many embodiments, waveguides incorporating Bragg gratings are implemented for HUD applications. HUDs can be incorporated in any of a variety of applications including (but not limited to) near-eye applications. HUDs that utilize planar waveguides incorporating Bragg gratings in accordance with various embodiments of the invention can achieve significantly larger fields of view and have lower volumetric requirements than HUDs implemented using conventional optical components. In some embodiments, the HUDs include at least one waveguide incorporating a number of gratings. In further embodiments, the waveguide incorporates at least three Bragg gratings that can be implemented to provide various optical functions, such as but not limited to dual-axis beam expansion. For example, in a number of embodiments, the waveguide incorporates an input grating, a fold grating, and an output grating. HUDs utilizing waveguides can be implemented using varying numbers of waveguide. In many embodiments, a HUD is implemented using a single waveguide. In other embodiments, the HUD is implemented using a stack of waveguides. Multiple waveguides can be stacked and implemented to provide different optical functions, such as but not limited to implementing color displays. In several embodiments, the HUDs incorporate three separate waveguides, one waveguide for each of a Red, Green, and Blue color channel.

Waveguides utilizing Bragg gratings in accordance with various embodiments of the invention can be designed to have different types of fringes. Use of multiple waveguides having the same surface pitch sizes but different grating slanted angles can increase the overall couple-in angular bandwidth of the waveguide. In a number of embodiments, one or more of the gratings within the waveguide incorporate a rolling K-vector and/or a slant angle that varies across the grating to modify the diffraction efficiency of the grating. The K-vector can be defined as a vector orthogonal to the plane of the associated grating fringe, which can determine the optical efficiency for a given range of input and diffracted angles. By incorporating a grating with rolled K-vectors ("RKVs"), the gratings can be designed to vary diffraction efficiency in a manner that achieves desirable characteristics across the eyebox of the HUD display. Configurations of grating fringes (such as RKVs) and other aspects relating to the structures and implementations of waveguides for use in HUDs are discussed below in further detail.

Diffraction Gratings

Optical waveguides can incorporate different optical elements to manipulate the propagation of light waves. As can readily be appreciated, the type of grating selected can depend on the specific requirements of a given application. Optical structures recorded in waveguides can include many different types of optical elements, such as but not limited to diffraction gratings. In many embodiments, the grating implemented is a Bragg grating (also referred to as a volume grating). Bragg gratings can have high efficiency with little light being diffracted into higher orders. The relative amount of light in the diffracted and zero order can be varied by controlling the refractive index modulation of the grating, a property that is can be used to make lossy waveguide gratings for extracting light over a large pupil. By strategically placing volume Bragg gratings within a waveguide, the propagation of light within the waveguide can be affected in a controlled manner to achieve various effects. The diffraction of light incident on the grating can be determined by the characteristic of the light and the grating. As can readily be appreciated, volume Bragg gratings can be constructed to have different characteristics depending on the specific requirements of the given application. In a number of embodiments, the volume Bragg grating is designed to be a transmission grating. In other embodiments, the volume Bragg grating is designed to be a reflection grating. In transmission gratings, incident light meeting the Bragg condition is diffracted such that the diffracted light exits the grating on the side which the incident light did not enter. For reflection gratings, the diffracted light exits on the same side of the grating as where the incident light entered.

Figure 1B:
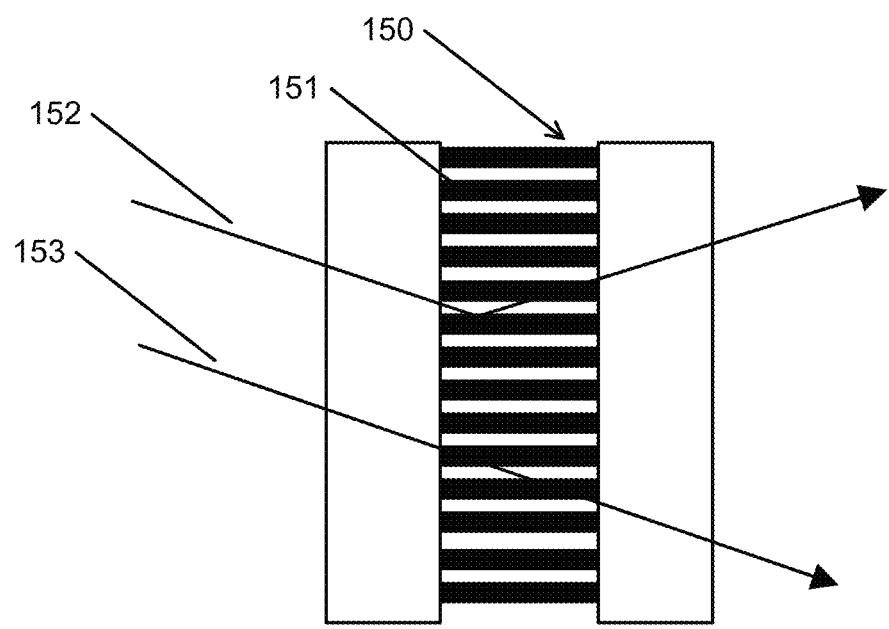

FIGS. 1A and 1B conceptually illustrate two volume Bragg grating configurations in accordance with various embodiments of the invention. Depending on the side out of which a light ray exits after diffraction, the grating can be classified as either a reflection grating 100 or a transmission grating 150. The conditions for refraction/reflection, or Bragg condition, can depend several factors, such as but not limited to the refractive indices of the medium, the grating period, the wavelength of the incident light, and the angle of incidence. FIG. 1A shows a reflection grating 100 recorded in a transparent material. As shown, light rays 101, 102 are of different wavelengths and are incident at the same angle on the reflection grating 100, which has fringes 103 that are parallel to the grating surface. Light ray 101 does not meet the Bragg condition and is transmitted through the grating. On the other hand, light ray 102 does meet the Bragg condition and is reflected back through the same surface on which it entered. Another type of grating is a transmission grating, which is conceptually illustrated in FIG. 1B. In the illustrative embodiment, the transmission grating 150 has fringes 151 that are perpendicular to the grating surface. As shown, light rays 152, 153 with different wavelengths are incident on the transmission grating 150 at the same angle. Light ray 152 meets the Bragg condition and is refracted, exiting on the opposite side of the grating on which the light ray 152 entered. Light ray 153 does not meet the Bragg condition and is transmitted through with its original path of propagation. Depending on the efficiency of the grating, light can be partially reflected or refracted. Although FIGS. 1A and 1B illustrate specific volume grating structures, any type of grating structure can be recorded in a waveguide cell in accordance with various embodiments of the invention. For example, volume gratings can be implemented with fringes that are tilted and/slanted relative to the grating surface, which can affect the angles of diffraction/reflection. Although the discussions above denote the grating structures as either transmission or reflection, both types of gratings behave in the same manner according to the standard grating equation.

Waveguide structures in accordance with various embodiments of the invention can implement gratings in a number of different ways. In addition to volume gratings, gratings can be implemented as surface relief gratings. As the name suggests, surface relief gratings can be implemented by physically forming grooves or periodic patterns on the surface of the substrate. The periodicity and angles formed by the grooves can determine the efficiency and other characteristics of the grating. Any of a number of methods can be used to form these grooves, such as but not limited to etching and photolithography.

Figure 2:
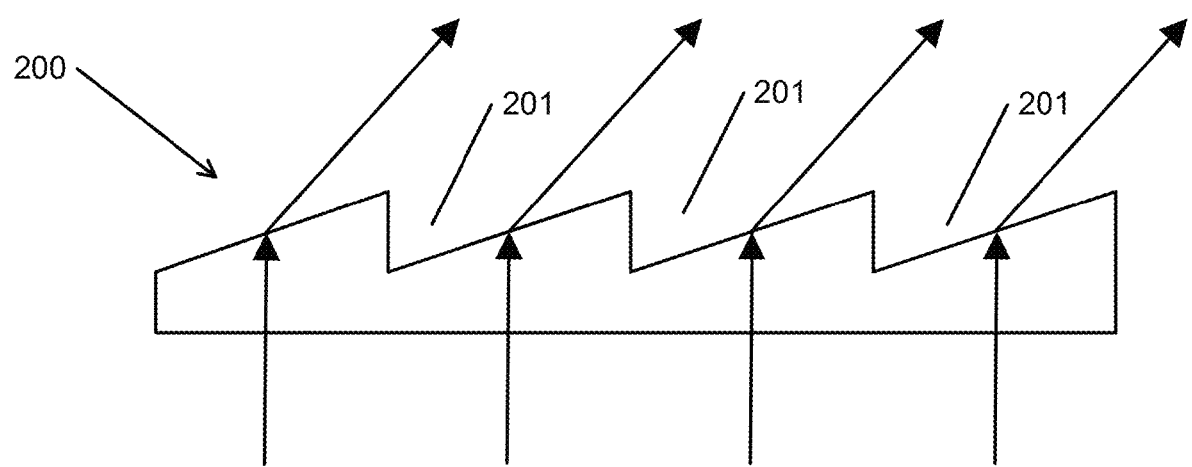
FIG. 2 conceptually illustrates a surface relief grating in accordance with an embodiment of the invention.

FIG. 2 conceptually illustrates a surface relief grating in accordance with an embodiment of the invention. As shown, the surface relief grating 200 contains periodic slanted grooves 201. When light is incident on the grooves 201, diffraction can occur under certain conditions. The slant and periodicity of the grooves 201 can be designed to achieve targeted diffraction behavior of incident light.

Although FIGS. 1A-1B and 2 show specific grating structures, it is readily appreciable that grating structures can be configured in a number of different ways depending on the specific requirements of a given application. Examples of such configurations are discussed in the sections below in further detail.

Switchable Bragg Gratings

One class of gratings used in holographic waveguide devices is the Switchable Bragg Grating ("SBG"). SBGs can be fabricated by first placing a thin film of a mixture of photopolymerizable monomers and liquid crystal material between glass plates or substrates. In many cases, the glass plates are in a parallel configuration. One or both glass plates can support electrodes, typically transparent tin oxide films, for applying an electric field across the film. The grating structure in an SBG can be recorded in the liquid material (often referred to as the syrup) through photopolymerization-induced phase separation using interferential exposure with a spatially periodic intensity modulation. Factors such as but not limited to control of the irradiation intensity, component volume fractions of the materials in the mixture, and exposure temperature can determine the resulting grating morphology and performance. As can readily be appreciated, a wide variety of materials and mixtures can be used depending on the specific requirements of a given application. In many embodiments, HPDLC material is used. During the recording process, the monomers polymerize and the mixture undergoes a phase separation. The LC molecules aggregate to form discrete or coalesced droplets that are periodically distributed in polymer networks on the scale of optical wavelengths. The alternating liquid crystal-rich and liquid crystal-depleted regions form the fringe planes of the grating, which can produce Bragg diffraction with a strong optical polarization resulting from the orientation ordering of the LC molecules in the droplets.

The resulting volume phase grating can exhibit very high diffraction efficiency, which can be controlled by the magnitude of the electric field applied across the film. When an electric field is applied to the grating via transparent electrodes, the natural orientation of the LC droplets can change, causing the refractive index modulation of the fringes to lower and the hologram diffraction efficiency to drop to very low levels. Typically, the electrodes are configured such that the applied electric field will be perpendicular to the substrates. In a number of embodiments, the electrodes are fabricated from indium tin oxide ("ITO"). In the OFF state with no electric field applied, the extraordinary axis of the liquid crystals generally aligns normal to the fringes. The grating thus exhibits high refractive index modulation and high diffraction efficiency for P-polarized light. When an electric field is applied to the HPDLC, the grating switches to the ON state wherein the extraordinary axes of the liquid crystal molecules align parallel to the applied field and hence perpendicular to the substrate. In the ON state, the grating exhibits lower refractive index modulation and lower diffraction efficiency for both S- and P-polarized light. Thus, the grating region no longer diffracts light. Each grating region can be divided into a multiplicity of grating elements such as for example a pixel matrix according to the function of the HPDLC device. Typically, the electrode on one substrate surface is uniform and continuous, while electrodes on the opposing substrate surface are patterned in accordance to the multiplicity of selectively switchable grating elements.

Typically, the SBG elements are switched clear in 30 µs with a longer relaxation time to switch ON. Note that the diffraction efficiency of the device can be adjusted, by means of the applied voltage, over a continuous range. In many cases, the device exhibits near 100% efficiency with no voltage applied and essentially zero efficiency with a sufficiently high voltage applied. In certain types of HPDLC devices, magnetic fields can be used to control the LC orientation. In some HPDLC applications, phase separation of the LC material from the polymer can be accomplished to such a degree that no discernible droplet structure results. An SBG can also be used as a passive grating. In this mode, its chief benefit is a uniquely high refractive index modulation. SBGs can be used to provide transmission or reflection gratings for free space applications. SBGs can be implemented as waveguide devices in which the HPDLC forms either the waveguide core or an evanescently coupled layer in proximity to the waveguide. The glass plates used to form the HPDLC cell provide a total internal reflection ("TIR") light guiding structure. Light can be coupled out of the SBG when the switchable grating diffracts the light at an angle beyond the TIR condition.

Figure 3A:
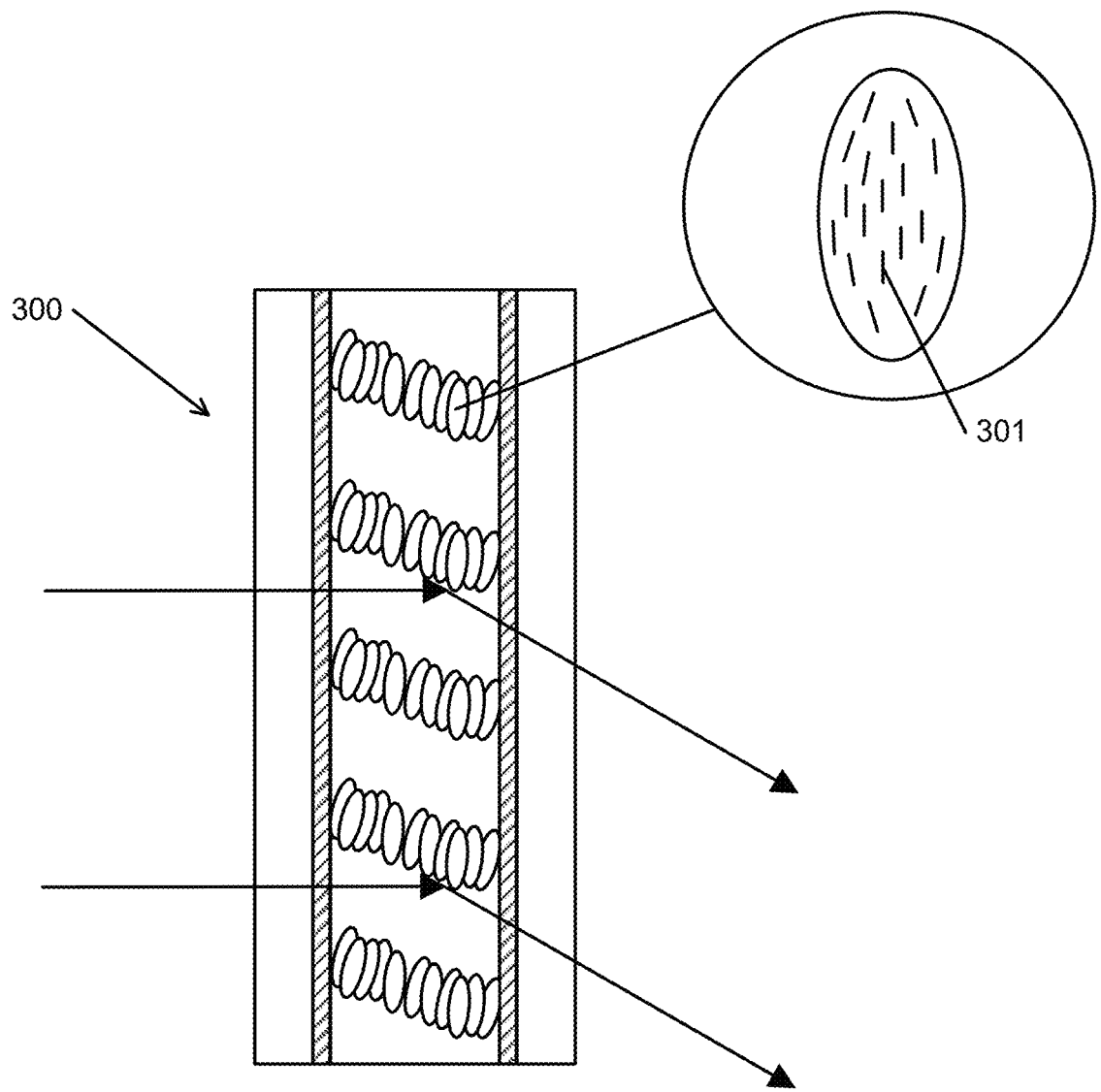
FIGS. 3A and 3B conceptually illustrate HPDLC SBG devices and the switching property of SBGs in accordance with various embodiments of the invention.
Figure 3B:
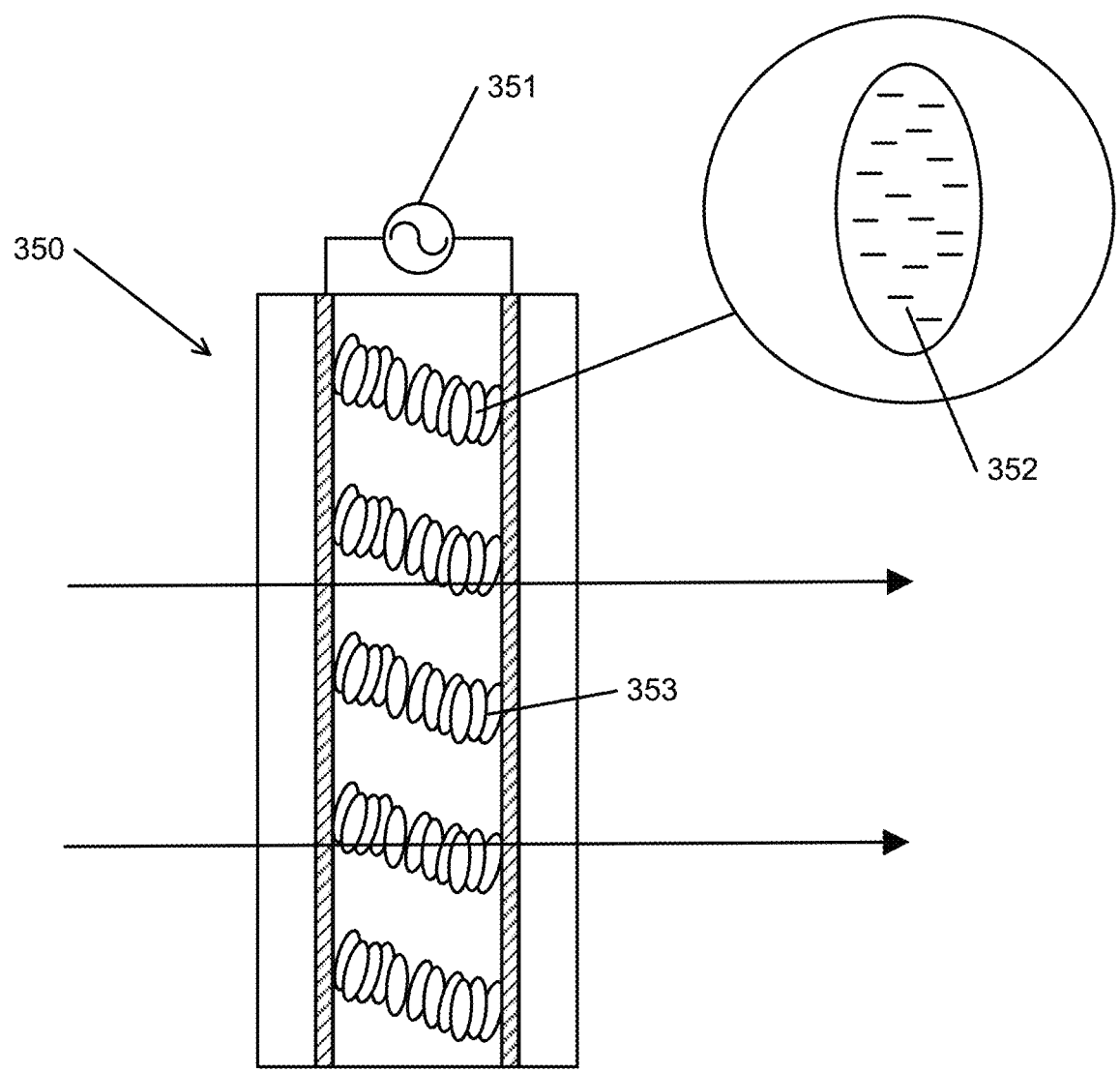

FIGS. 3A and 3B conceptually illustrate HPDLC SBG devices 300, 350 and the switching property of SBGs in accordance with various embodiments of the invention. In FIG. 3A, the SBG 300 is in an OFF state. As shown, the LC molecules 301 are aligned substantially normal to the fringe planes. As such, the SBG 300 exhibits high diffraction efficiency, and incident light can easily be diffracted. FIG. 3B illustrates the SBG 350 in an ON position. An applied voltage 351 can orient the optical axis of the LC molecules 352 within the droplets 353 to produce an effective refractive index that matches the polymer's refractive index, essentially creating a transparent cell where incident light is not diffracted. In the illustrative embodiment, an AC voltage source is shown. As can readily be appreciated, various voltage sources can be utilized depending on the specific requirements of a given application.

In waveguide cell designs, in addition to the components described above, adhesives and spacers can be disposed between the substrates to affix the layers of the elements together and to maintain the cell gap, or thickness dimension. In these devices, spacers can take many forms, such as but not limited to materials, sizes, and geometries. Materials can include, for example, plastics (e.g., divinylbenzene), silica, and conductive spacers. They can take any suitable geometry, such as but not limited to rods and spheres. The spacers can take any suitable size. In many cases, the sizes of the spacers range from 1 to 30 μm. While the use of these adhesive materials and spacers can be necessary in LC cells using conventional materials and methods of manufacture, they can contribute to the haziness of the cells degrading the optical properties and performance of the waveguide and device.

HPDLC Material Systems

HPDLC mixtures in accordance with various embodiments of the invention generally include LC, monomers, photoinitiator dyes, and coinitiators. The mixture (often referred to as syrup) frequently also includes a surfactant. For the purposes of describing the invention, a surfactant is defined as any chemical agent that lowers the surface tension of the total liquid mixture. The use of surfactants in PDLC mixtures is known and dates back to the earliest investigations of PDLCs. For example, a paper by R. L Sutherland et al., SPIE Vol. 2689, 158-169, 1996, the disclosure of which is incorporated herein by reference, describes a PDLC mixture including a monomer, photoinitiator, coinitiator, chain extender, and LCs to which a surfactant can be added. Surfactants are also mentioned in a paper by Natarajan et al, Journal of Nonlinear Optical Physics and Materials, Vol. 5 No. 1 89-98, 1996, the disclosure of which is incorporated herein by reference. Furthermore, U.S. Pat. No. 7,018,563 by Sutherland; et al., discusses polymer-dispersed liquid crystal material for forming a polymer-dispersed liquid crystal optical element comprising: at least one acrylic acid monomer; at least one type of liquid crystal material; a photoinitiator dye; a coinitiator; and a surfactant. The disclosure of U.S. Pat. No. 7,018,563 is hereby incorporated by reference in its entirety.

The patent and scientific literature contains many examples of material systems and processes that can be used to fabricate SBGs, including investigations into formulating such material systems for achieving high diffraction efficiency, fast response time, low drive voltage, and so forth. U.S. Pat. No. 5,942,157 by Sutherland, and U.S. Pat. No. 5,751,452 by Tanaka et al. both describe monomer and liquid crystal material combinations suitable for fabricating SBG devices. Examples of recipes can also be found in papers dating back to the early 1990s. Many of these materials use acrylate monomers, including:

R. L. Sutherland et al., Chem. Mater. 5, 1533 (1993), the disclosure of which is incorporated herein by reference, describes the use of acrylate polymers and surfactants. Specifically, the recipe comprises a crosslinking multi-functional acrylate monomer; a chain extender N-vinyl pyrrolidinone, LC E7, photoinitiator rose Bengal, and coinitiator N-phenyl glycine. Surfactant octanoic acid was added in certain variants.

Fontecchio et al., SID 00 Digest 774-776, 2000, the disclosure of which is incorporated herein by reference, describes a UV curable HPDLC for reflective display applications including a multi-functional acrylate monomer, LC, a photoinitiator, a coinitiators, and a chain terminator.

Y. H. Cho, et al., Polymer International, 48, 1085-1090, 1999, the disclosure of which is incorporated herein by reference, discloses HPDLC recipes including acrylates.

Karasawa et al., Japanese Journal of Applied Physics, Vol. 36, 6388-6392, 1997, the disclosure of which is incorporated herein by reference, describes acrylates of various functional orders.

T. J. Bunning et al., Polymer Science: Part B: Polymer Physics, Vol. 35, 2825-2833, 1997, the disclosure of which is incorporated herein by reference, also describes multifunctional acrylate monomers.

G. S. Iannacchione et al., Europhysics Letters Vol. 36 (6). 425-430, 1996, the disclosure of which is incorporated herein by reference, describes a PDLC mixture including a penta-acrylate monomer, LC, chain extender, coinitiators, and photoinitiator.

Acrylates offer the benefits of fast kinetics, good mixing with other materials, and compatibility with film forming processes. Since acrylates are cross-linked, they tend to be mechanically robust and flexible. For example, urethane acrylates of functionality 2 (di) and 3 (tri) have been used extensively for HPDLC technology. Higher functionality materials such as penta and hex functional stems have also been used.

One of the known attributes of transmission SBGs is that the LC molecules tend to align with an average direction normal to the grating fringe planes (i.e., parallel to the grating or K-vector). The effect of the LC molecule alignment is that transmission SBGs efficiently diffract P polarized light (i.e., light with a polarization vector in the plane of incidence), but have nearly zero diffraction efficiency for S polarized light (i.e., light with the polarization vector normal to the plane of incidence).

Recording Mechanisms for Volume Gratings

Volume gratings can be recorded in a waveguide cell using many different methods in accordance with various embodiments of the invention. The recording of optical elements in optical recording materials can be achieved using any number and type of electromagnetic radiation sources. Depending on the application, the exposure source (s) and/or recording system can be configured to record optical elements using varying levels of exposure power and duration. As discussed above with regards to SBGs, techniques for recording volume gratings can include the exposure of an optical recording material using two mutually coherent laser beams, where the superimposition of the two beams create a periodic intensity distribution along the interference pattern. The optical recording material can form grating structures exhibiting a refractive index modulation pattern matching the periodic intensity distribution. In HPDLC mixtures, the light intensity distribution results in diffusion and polymerization of monomers into the high intensity regions and simultaneous diffusion of liquid crystal into the dark regions. This phase separation creates alternating liquid crystal-rich and liquid crystal-depleted regions that form the fringe planes of the grating. The grating structures can be formed with slanted or non-slanted fringes depending on how the recording beams are configured. FIGS. 4A-4D conceptually illustrate two-beam recording processes in accordance with various embodiments of the invention. As shown, two methods can be used to create two different types of Bragg gratings—i.e., a transmission grating 400 and a reflection grating 401. Depending on how the two recording beams 402, 403 are positioned, the interference pattern 404 can record either a transmission or a reflection grating in an optical recording material 405. Differences between the two types of gratings can be seen in the orientation of the fringes (i.e., the fringes of a reflection volume grating are typically substantially parallel to the surface of the substrate, and the fringes of a transmission grating are typically substantially perpendicular to the surface of the substrate). During playback, a beam 406 incident on the transmission grating 400 can result in a diffracted beam 407 that is transmitted. On the other hand, a beam 408 that is incident on the reflection grating 401 can result in a beam 409 that is reflected.

Figure 5:
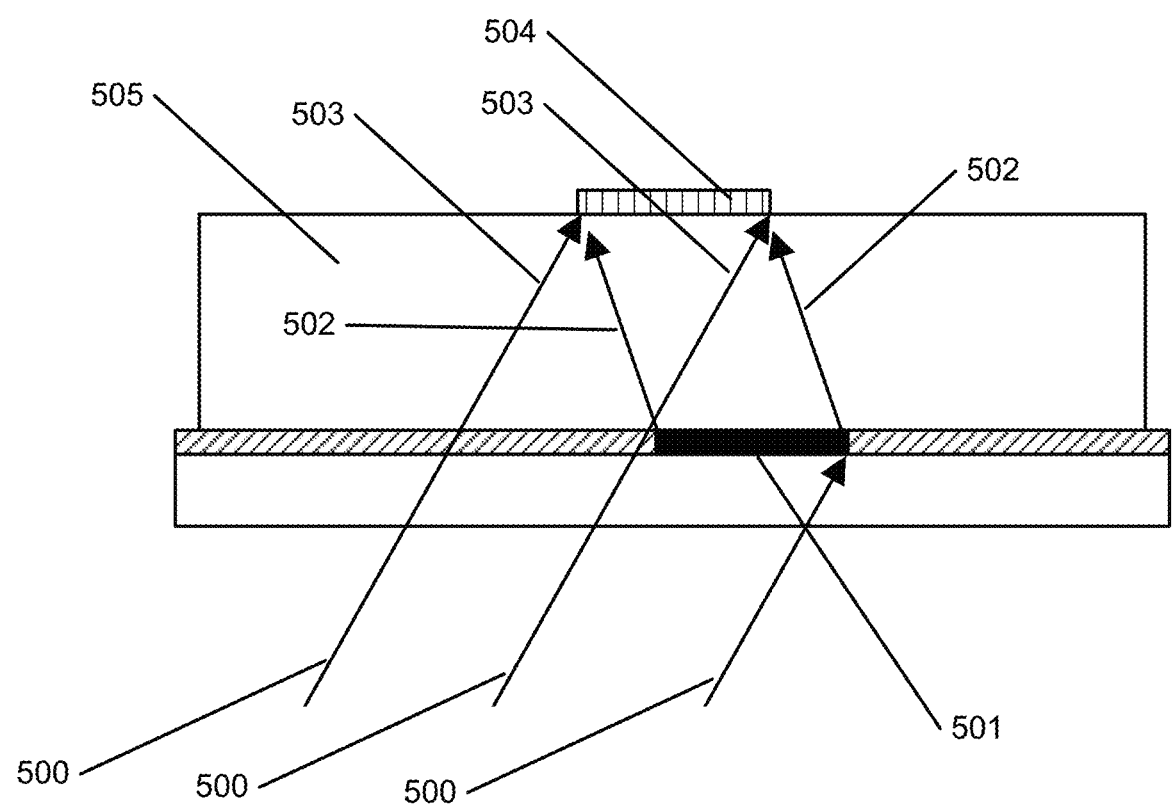
FIG. 5 conceptually illustrates a single-beam recording process utilizing an amplitude grating in accordance with an embodiment of the invention.

Another method for recording volume gratings in an optical recording material includes the use of a single beam to form an interference pattern onto the optical recording material. This can be achieved through the use of a master grating. In many embodiments, the master grating is a volume grating. In some embodiments, the master grating is an amplitude grating. Upon interaction with the master grating, the single beam can diffract. The first order diffraction and the zero order beam can overlap to create an interference pattern, which can then expose the optical recording material to form the desired volume grating. A single-beam recording process utilizing an amplitude grating in accordance with an embodiment of the invention is conceptually illustrated in FIG. 5. As shown, a beam 500 from a single laser source (not shown) is directed through an amplitude grating 501. Upon interaction with the grating 501, the beam 500 can diffract as, for example, in the case of the rays interacting with the black shaded region of the amplitude grating, or the beam 500 can propagated through the amplitude grating without substantial deviation as a zero-order beam as, for example, in the case of the rays interacting with the cross-hatched region of the amplitude grating. The first order diffraction beams 502 and the zero order beams 503 can overlap to create an interference pattern that exposes the optical recording layer 504 of a waveguide cell. In the illustrative embodiment, a spacer block 505 is positioned between the grating 501 and the optical recording layer 504 in order to alter the distance between the two components.

Although specific methods of recording volume gratings are discussed and shown in FIGS. 4A-4D and 5, recording systems in accordance with various embodiments of the invention can be configured to implement any of a number of methods for recording volume gratings.

Rolled K-Vector Gratings and Multiplexed K-Vector Gratings

In addressing the limited range of wavelengths and angles over which diffraction occurs in volume Bragg gratings, several methods can be utilized to increase the diffraction bandwidth of the gratings. In many embodiments, gratings can employ fringes that vary with respect to their K-vectors. In a number of embodiments, the change across the rolled K-vectors is typically such that the direction of the change in K-vectors is out of plane with the waveguide or grating element. Varying fringes, or rolled K-vectors, can be implemented in a number of different ways. In some embodiments, fringes of gratings are designed to vary in a progressive manner across the grating. In other embodiments, different discrete sets of gratings with different fringes are place serially. Gratings with rolled K-vectors can be designed and configured in a variety of ways. In many embodiments, the rolled K-vectors are designed such that the peak diffraction efficiency of each grating segment is optimized for its corresponding output angle at that position. In some embodiments, the peak diffraction efficiency of each grating at different positions is at an offset with its corresponding output angle at that position. It has been shown that by introducing this offset, eyebox homogeneity can be improved. In several embodiments, offsets can improve total image brightness by a factor of two compared to just matching the peak diffraction efficiencies at different positions.

Rolled K-vector gratings can be used to maximize the peak diffraction efficiency of in-couple light in accordance with an embodiment of the invention. The use of rolled k-vectors enables high efficiency input coupling into a grating, and also allows the beam spread angle to be optimized to minimize the thickness of the waveguide; this may need balancing the waveguide thickness, the angular bandwidth of the grating, and the spread of field angles at any given point on the grating. The low angular response of gratings as the K-vector is rolled (and surface pitch maintained) can prevent output coupling, allowing the waveguide thickness to be minimized. In a number of embodiments, the design aim is to ensure maximum input coupling at a point and to minimize the angular diversity such that the grating thickness can be minimized without reciprocally out-coupling at different point.

Figure 6A:
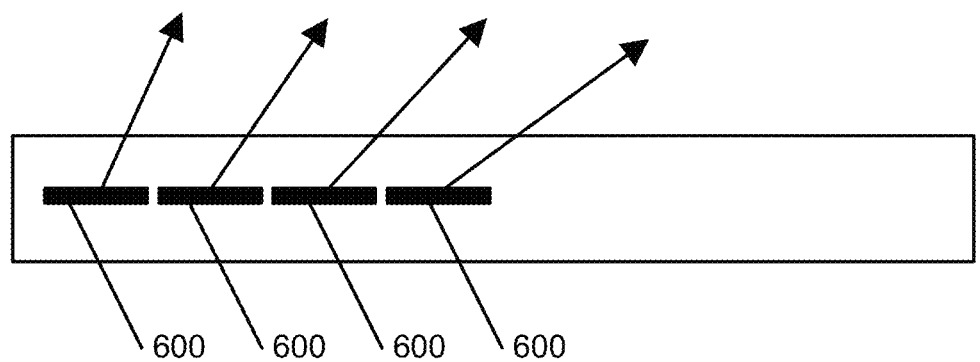
FIGS. 6A and 6B conceptually illustrate two implementations of rolled K-vector gratings in accordance with various embodiments of the invention.
Figure 6B:
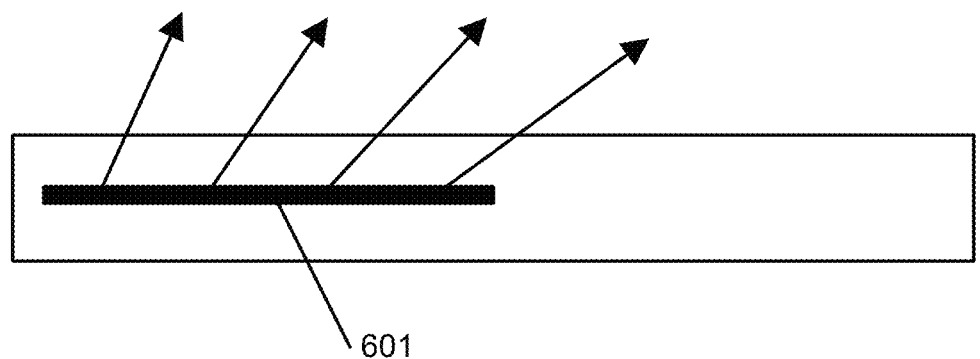

FIGS. 6A and 6B conceptually illustrate two implementations of rolled K-vector gratings in accordance with various embodiments of the invention. Referring first to FIG. 6A, in some embodiments a rolled K-vector grating can be implemented as a waveguide portion containing discrete grating elements 600 having different K-vectors. Referring next to FIG. 6B, in several embodiments a rolled K-vector grating can be implemented as a waveguide portion containing grating elements 601 within which the K-vectors undergoes a smooth monotonic variation in direction. As illustrated, the change in the direction of the K-vectors is out of plane with the waveguide.

In many embodiments, different sets of discrete fringes are superimposed into the same grating, creating a multiplexed grating with essentially multiple gratings inside the same volume that work independently and without interfering with each other. For example, if two volume gratings are recorded in the same device for two different Bragg wavelengths at the same incidence angle, the device can diffract the two selected wavelengths into different output directions with limited crosstalk. Multiplexing can be used to produce improved angular profiles by combining two gratings of similar prescription to extend the diffraction efficiency angular bandwidth and give better luminance uniformity and color balance across the exit pupil and field of view. Multiplexing can also be used to encode two distinct diffraction prescriptions which can be design to project light into distinct field of regions or diffract light of two different wavelengths into a given field of view region. Steps can be taken to ensure that there is no competition between gratings during recording leading to unequal diffraction efficiencies and crosstalk between gratings in playback. Multiplexing can also offer the significant benefit of reducing the number of layers in the waveguide structure. In some embodiments, at least one of the input, fold, or output gratings can combine two or more angular diffraction prescriptions to expand the angular bandwidth. Similarly, in several embodiments, at least one of the input, fold, or output gratings can combine two or more spectral diffraction prescriptions to expand the spectral bandwidth. For example, a color multiplexed grating may be used to diffract two or more of the primary colors.

Figure 7:
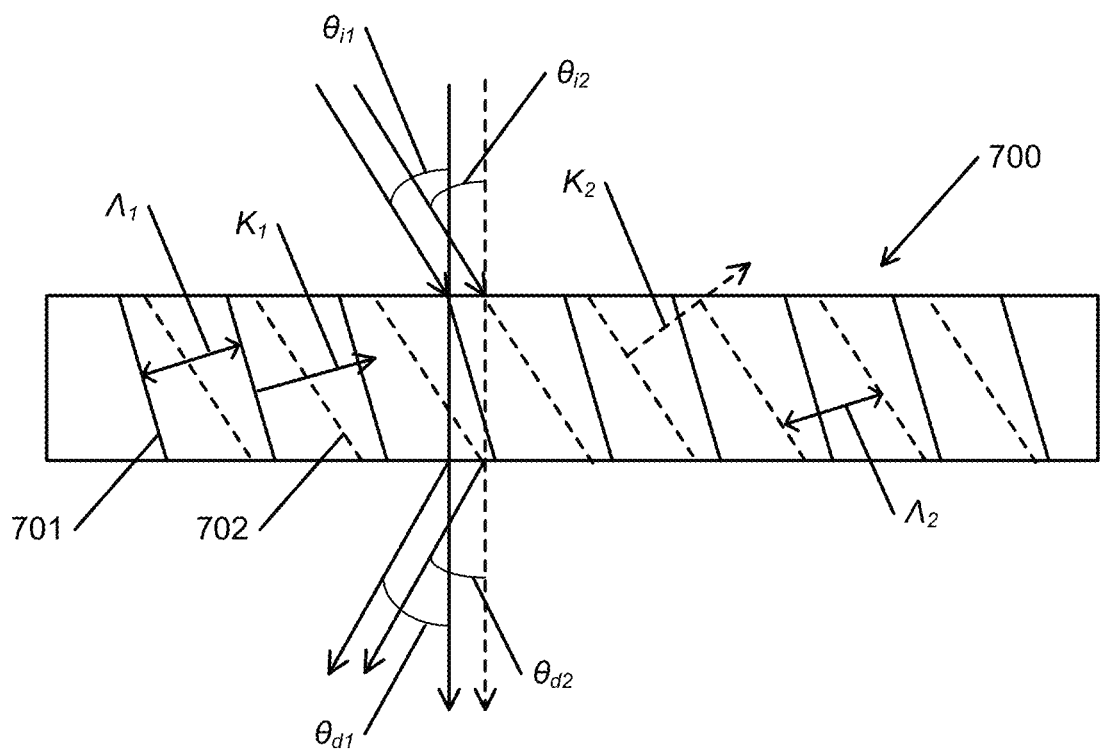
FIG. 7 conceptually illustrates a multiplexed K-vector grating in accordance with an embodiment of the invention.

FIG. 7 conceptually illustrates a multiplexed K-vector grating in accordance with an embodiment of the invention. As illustrated, the multiplexed grating 700 contains two sets of fringes 701, 702. The first set 701 is depicted by solid diagonal lines and has K-vector $K_1$ and period $\Lambda_1$. The second multiplexed grating 702 is illustrated by dot-dash lines and has K-vector $K_2$ and period $\Lambda_2$. In the illustrated embodiment, the two grating periods are the same, but the K-vectors differ in direction. In operation, both of the multiplexed gratings 701, 702 are active and can provide broader incidence and diffraction bandwidths. The angular bandwidth of incidence $\theta_i$ for the multiplexed gratings covers the angular range including the overlapping $\theta_{i1}$ and $\theta_{i2}$. The angular bandwidth of diffraction $\theta_d$ for the multiplexed gratings 701, 702 covers the angular range including the overlapping $\theta_{d1}$ and $\theta_{d2}$. In some embodiments, more than two gratings are multiplexed.

Although specific grating structures with varying fringes are discussed above, any of a number of fringe configurations can be utilized in accordance with specific requirements of a given application. For example, any number of gratings can be multiplexed as allowed by manufacturing constraints. Rolled K-vector gratings can be designed to have K-vectors rolled in any discrete unit.

Waveguides Implementing Pupil Expansion

Figure 8:
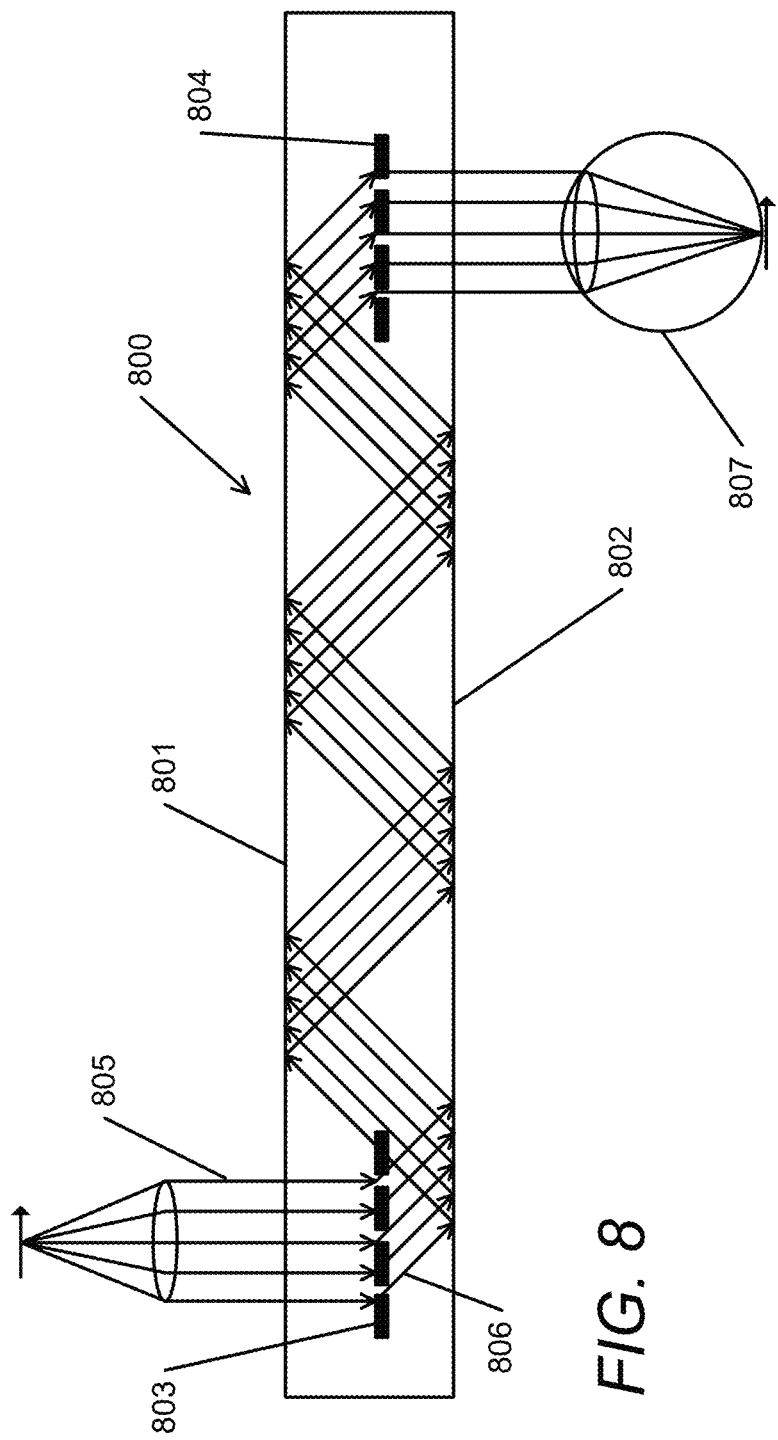
FIG. 8 conceptually illustrates a waveguide utilizing coupling gratings to diffract light into and out of the waveguide in accordance with an embodiment of the invention.

Gratings can be implemented in waveguides in a variety of different ways. In some embodiments, the gratings reside on the outer surface of the waveguide. In other embodiments, volume gratings are implemented inside the waveguide. Gratings can also be implemented to perform different optical functions, such as but not limited to coupling light, directing light, and preventing the transmission of light. FIG. 8 conceptually illustrates a waveguide utilizing coupling gratings to diffract light into and out of the waveguide in accordance with an embodiment of the invention. As shown, the waveguide 800 includes a first surface 801, a second surface 802, an input grating element 803, and an output grating element 804. Collimated light 805 from a projection lens enters the waveguide through the first surface 801 at an orthogonal angle. The light travels through the waveguide 800 at its original angle and, before reaching the second surface 802 at the other side of the waveguide 800, interacts with an input grating element 803. The input grating element 803 can be designed to diffract the light 805 at an oblique angle such that the refracted light 806 is incident on the second surface 802 at an angle at which total internal reflection can occur. As such, the light 805 is coupled into the waveguide and is confined within the first and second surfaces 801, 802 of the waveguide 800. In the illustrative embodiment, the light travels within the waveguide 800 until it interacts with an output grating 804, which refracts and couples the light out of the waveguide 800 and into a user's eye 807.

Figure 9:
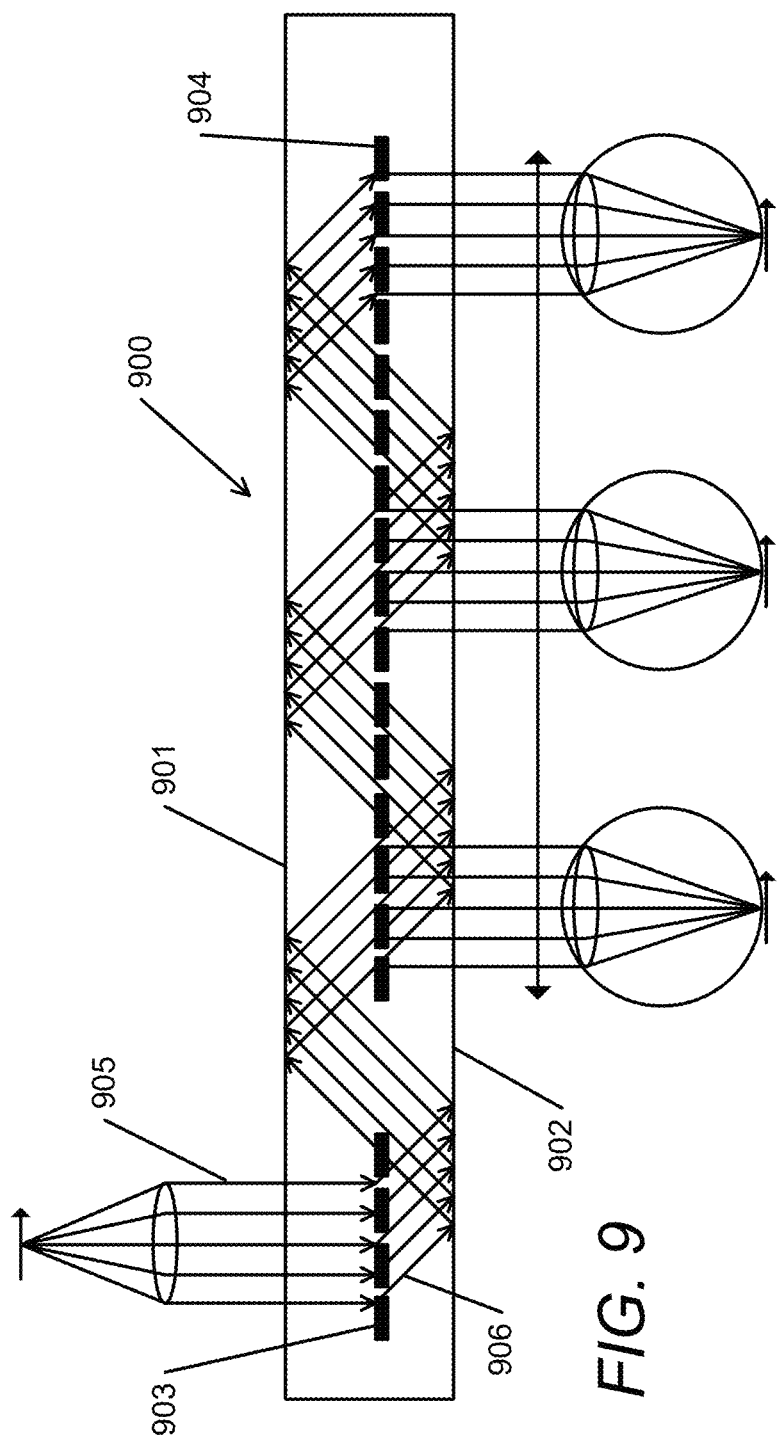
FIGS. 9 and 10 conceptually illustrate waveguides utilizing an output grating for exit pupil expansion in one dimension in accordance with an embodiment of the invention.
Figure 10:
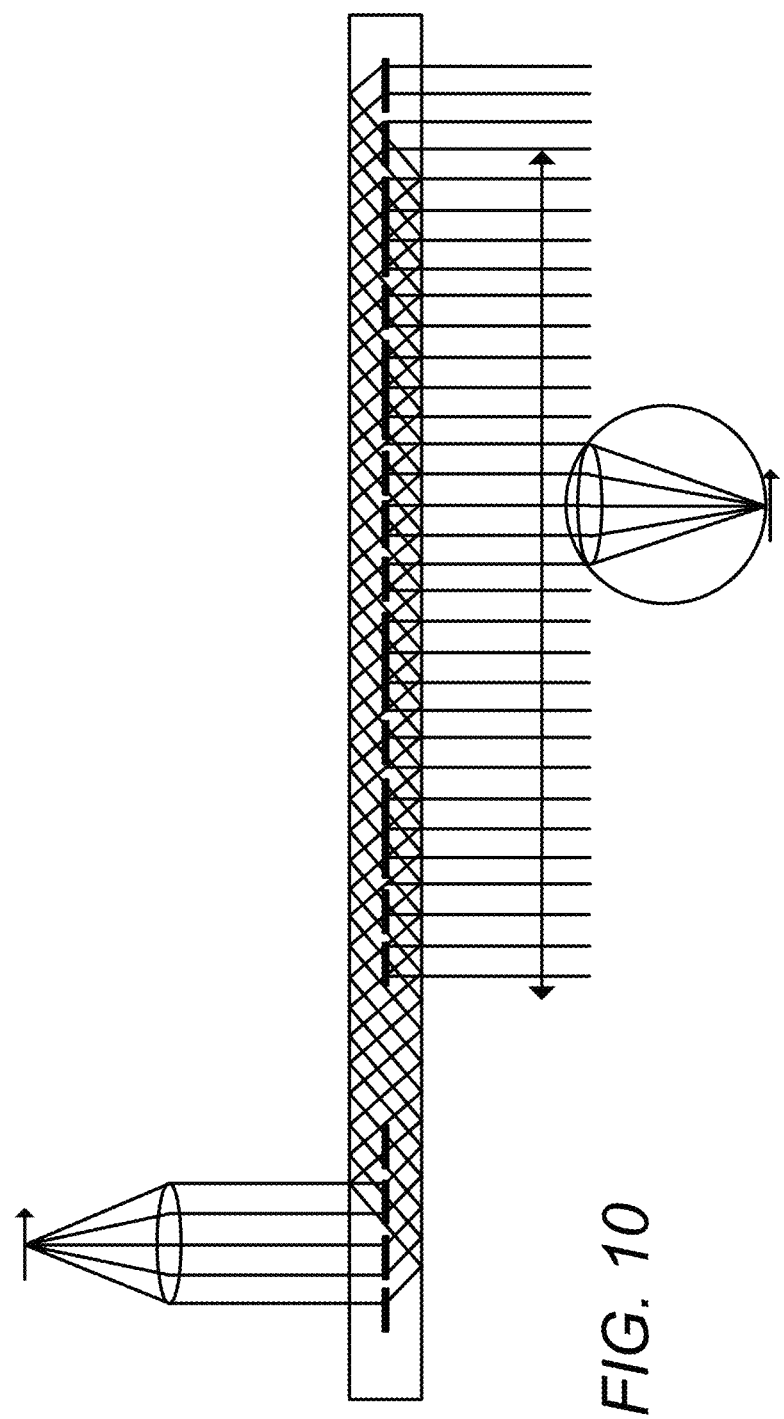

In many embodiments, diffraction gratings can be used to preserve eye box size while reducing lens size by effectively expanding the exit pupil of a collimating optical system. The exit pupil can be defined as a virtual aperture where only the light rays which pass though this virtual aperture can enter a user's eyes. FIGS. 9 and 10 conceptually illustrate waveguides utilizing an output grating for exit pupil expansion in one dimension in accordance with an embodiment of the invention. The waveguide 900 in FIG. 9 includes a first surface 901, a second surface 902, an input grating element 903, and an output grating element 904. As shown, light 905 is coupled into the waveguide 900 by the input grating 902 and can travel through the waveguide 900 via total internal reflection. In the illustrative embodiment, the output grating 904 is extended and designed to refract a portion of the waveguided light. The light can be refracted such that the refracted light 906 is incident on the second surface 902 at an angle at which total internal reflection does not occur, allowing the light 906 to couple out of the waveguide 900. This lossy extraction permits exit pupil expansion as the remaining light can continue to travel within the waveguide 900 and, once the light is again incident on the output grating 904, the scenario described above can occur again. Utilizing this technique, a continuous expanded exit pupil can also be achieved with the correct design, as shown in FIG. 10.

Figure 11:
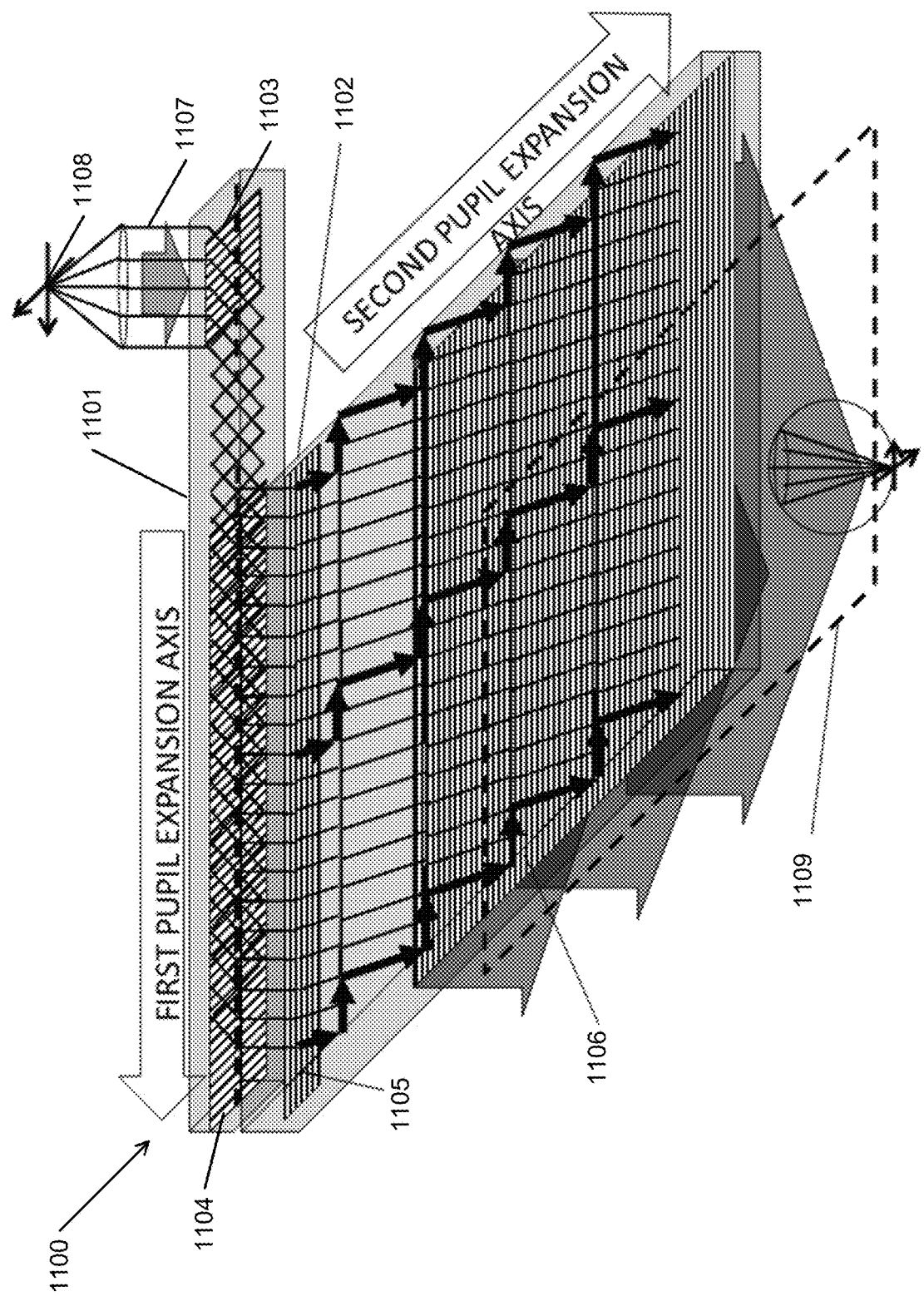
FIG. 11 conceptually illustrates a waveguide system utilizing two planar waveguides to provide exit pupil expansion in two dimensions in accordance with an embodiment of the invention.

Expanding upon the ideas in FIGS. 9 and 10, an optical waveguide can be designed to expand the exit pupil in two dimensions. In many embodiments, two waveguides can be stacked together to create a system where light coupled into the waveguide stack can achieve exit pupil expansion in two dimensions. FIG. 11 conceptually illustrates a waveguide system utilizing two planar waveguides to provide exit pupil expansion in two dimensions in accordance with an embodiment of the invention. As shown, the system 1100 includes a first waveguide 1101 and a second waveguide 1102. The first waveguide 1101 can include a first input coupling grating 1103 and a first output coupling grating 1104, and the second waveguide 1102 can include a second input coupling grating 1105 and a second output coupling grating 1106. The first input coupling grating 1103 can be designed to couple collimated light 1107 from an image source 1108 into the first waveguide 1101. Similar to the systems as described in FIGS. 9 and 10, the confined light can travel through the first waveguide 1101 via total internal reflection until the light reaches the first output coupling grating 1104. In the illustrative embodiment, the first output coupling grating 1104 is designed to provide lossy exit pupil expansion in a first dimension and to couple the light out of the first waveguide 1101. The second input coupling grating 1105 can be designed to receive light outputted from the first waveguide 1101, which is expanded in the first dimension, and refract the received light such that the received light travels through the second waveguide 1102 via total internal reflection. In many embodiments, the first output coupling grating 1104 and the second input coupling grating 1106 are extended in a similar manner. The light traveling through the second waveguide 1102 can then interact with the second output coupling grating 1106. In the illustrative embodiment, the second output coupling grating 1106 is designed to provide lossy exit pupil expansion in a second dimension that is different from the first dimension and to couple the light out of the second waveguide 1102. As a result, the exit pupil is expanded in two dimensions, allowing for a smaller lens size with respect to the eye box size 1109.

Figure 12:
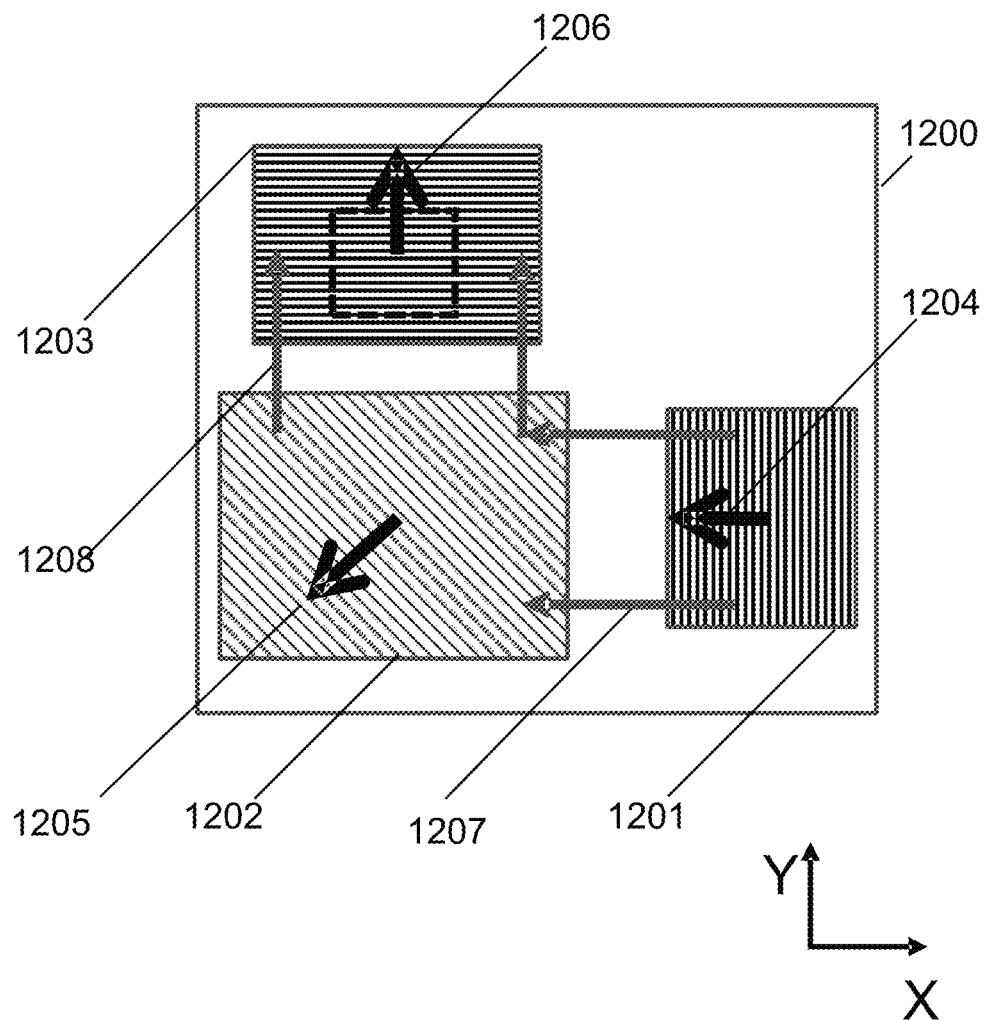
FIG. 12 conceptually illustrates a waveguide utilizing a three-grating structure to provide two dimensional exit pupil expansion in accordance with an embodiment of the invention.

In many embodiments, the optical waveguide utilizes a fold grating, which can provide exit pupil expansion in one dimension while directing the light within the waveguide. In further embodiments, the fold grating directs the light towards an output grating, which can provide exit pupil expansion in a second dimension that is different from the first direction and also couples the light out of the waveguide. By using the fold grating, the waveguide display can require fewer layers than other systems and methods of displaying information. In addition, by using fold grating, light can travel by total internal refection within the waveguide in a single rectangular prism defined by the waveguide outer surfaces while achieving dual pupil expansion. As a result, a two-dimension exit pupil expansion can be achieved using a single waveguide. FIG. 12 conceptually illustrates a waveguide utilizing a three-grating structure to provide two dimensional exit pupil expansion in accordance with an embodiment of the invention. As shown, the waveguide 1200 includes an input grating 1201, a fold grating 1202, and an output grating 1203. Arrows 1204-1206 on the gratings 1201-1203 show the k-vector associated with each grating. In many embodiments, the fold grating 1202 can be designed to provide exit pupil expansion in one dimension and to redirect the direction of light propagating via total internal reflection from the input grating 1201. In the illustrative embodiment, the fringes of the fold gratings 1202 are at a 45 degree offset from either of the other two gratings 1201, 1203. Light incident on the fold grating is redirected 1207, 1208 to propagate towards the output grating 1203, which provides exit pupil expansion in a second dimension and couples the light out of the waveguide 1200.

Although the discussions above relating to FIGS. 8-12 describe specific waveguide structures, it is readily appreciated that any number of waveguide structure configurations can be utilized in accordance with specific requirements of a given application. For example, gratings providing exit pupil expansion can be designed with a gradient efficiency such that the portion of light refracted changes depending on the area of incident.

Waveguide Layer Stacks

Figure 13:
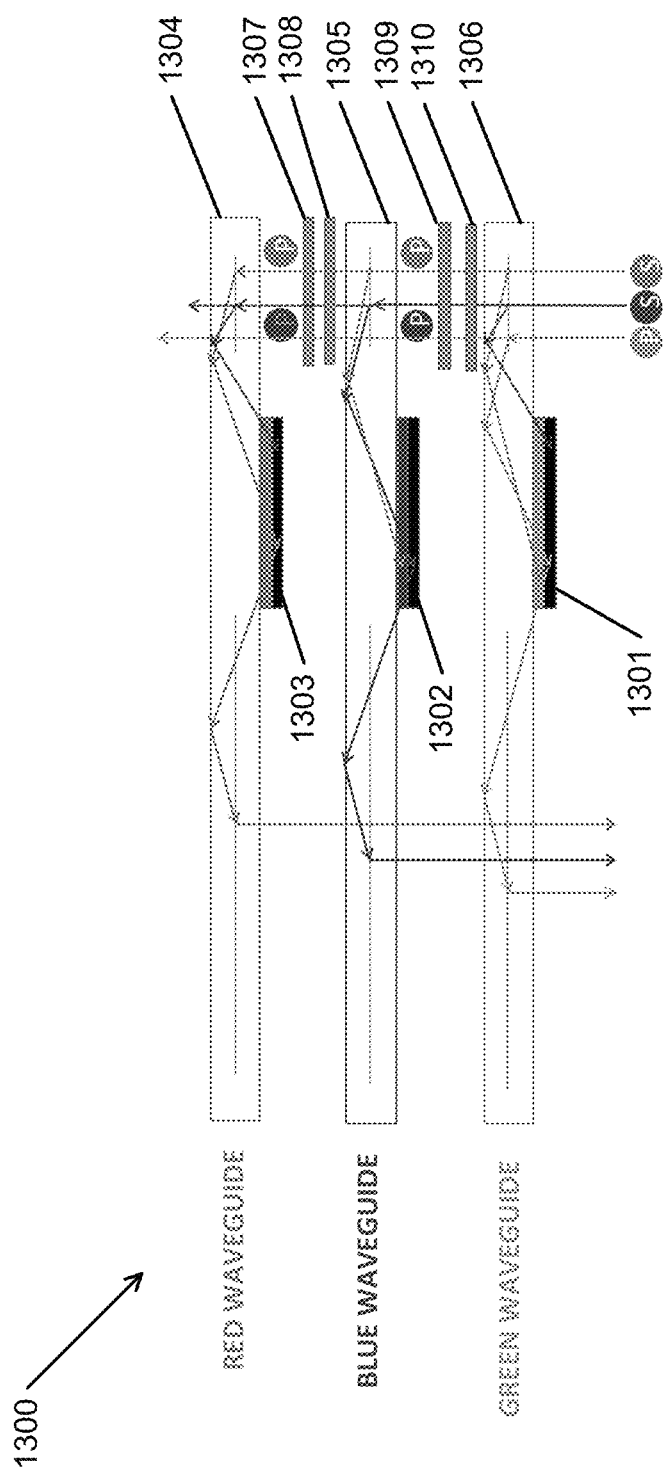
FIG. 13 conceptually illustrates a profile view of an RGB stack of waveguides in accordance with an embodiment of the invention.

Waveguides in accordance with various embodiments of the invention can be stacked together to implement certain optical functions. For example, in many embodiments, the device can include a stack of RGB diffracting layers, each layer comprising input and output gratings. In each layer the SBGs are recorded to provide peak diffraction efficiency vs. wavelength characteristics (along the waveguide) shifted by small increments from the peak wavelength. In some embodiments, RGB SBG layers are used and can be switched sequentially and synchronously with RGB LEDs image sources. FIG. 13 conceptually illustrates a profile view of an RGB stack of waveguides 1300 in accordance with an embodiment of the invention. In the illustrative embodiment, wavelength selective absorptive layers 1301-1303 are used to selectively absorb unwanted light in each waveguide layer 1304-1306. Dashed lines represent weak coupling due to either off-polarization or off Bragg. The stack of waveguides further includes various filters and waveplates 1307-1311. Polarization orientations are depicted with respect to the input grating.

Although FIG. 13 illustrates a specific structure of a waveguide stack, any of a number of stacking configuration can be used in accordance with specific requirements of a given application. For example, in many embodiments, only two layers, red and blue/green, are used to implement an RGB stack. Such a system can be achieved using several methods. In some embodiments, multiplexed gratings containing different sets of gratings, each correlating with an RGB color, are used to implement multiple color waveguides in one waveguide layer.

Waveguide Displays

Figure 14:
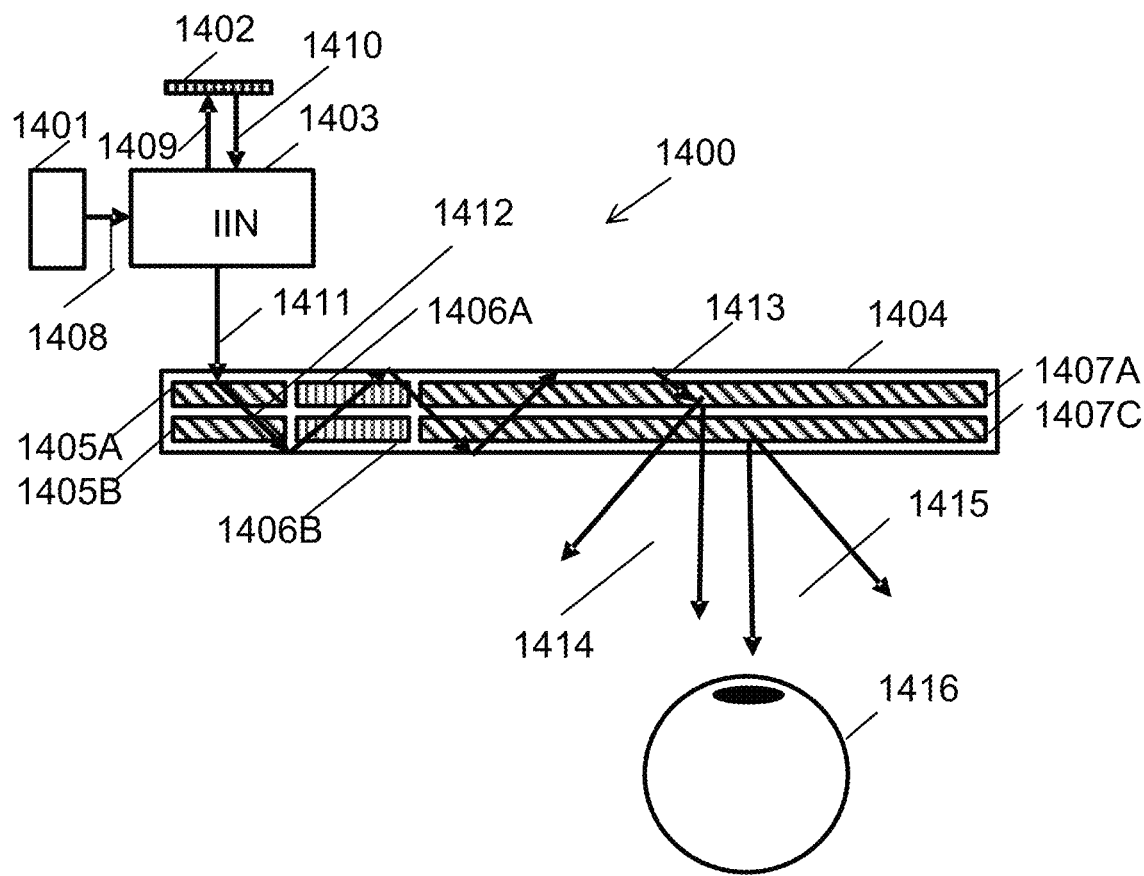
FIG. 14 conceptually illustrates a dual axis expansion waveguide display with two grating layers in accordance with an embodiment of the invention.

Waveguide displays in accordance with various embodiments of the invention can be implemented and constricted in many different ways. For example, waveguide displays can contain a varying number of waveguide layers and different exit pupil expansion scheme. FIG. 14 conceptually illustrates a dual axis expansion waveguide display with two grating layers in accordance with an embodiment of the invention. As shown, the waveguide display 1400 includes a light source 1401, a microdisplay panel 1402, and an input image node ("IIN") 1403 optically coupled to a waveguide 1404 having two grating layers. In some embodiments, the waveguide is formed by sandwiched the grating layers between glass or plastic substrates to form a stack within which total internal reflection occurs at the outer substrate and air interfaces. In several embodiments, the stack can further comprise additional layers such as beam splitting coatings and environmental protection layers. In the illustrative embodiment, each grating layer contains an input grating 1405A,1405B, a fold grating exit pupil expander 1406A, 1406B, and an output grating 1407A, 1407B where characters A and B refer to the first and second waveguide layers. The input grating, fold grating, and the output grating can be holographic gratings, such as a switchable or non-switchable SBG. As used herein, the term grating may encompass a grating can include a set of gratings, such as multiplexed gratings or sets of discrete rolled K-vector gratings. In the illustrative embodiment, the IIN 1403 integrates the microdisplay panel 1402, the light source 1401, and optical components needed to illuminate the display panel, separate the reflected light, and collimate it into the required FOV. In the embodiment of FIG. 14 and in the embodiments to be described below, at least one of the input, fold, and output gratings can be electrically switchable. In many embodiments, all three grating types are passive (i.e., non-switching). In a number of embodiments, the IIN can project the image displayed on the microdisplay panel such that each display pixel is converted into a unique angular direction within the substrate waveguide. The collimation optics contained in the IIN can include lens and mirrors. In further embodiments, the lens and mirrors are diffractive lenses and mirrors.

In the illustrative embodiment, the light path from the source to the waveguide via the IIN is indicated by rays 1408-1411. The input grating 1405A, 1405B of each grating layer can couple a portion of the light into a TIR path in the waveguide 1404, such path being represented by the rays 1412, 1413. The output gratings 1407A, 1407B can diffract light out of the waveguide into angular ranges of collimated light 1414, 1415 respectively for viewing by the eye 1416. The angular ranges, which correspond to the field of view of the display, can be defined by the IIN optics. In some embodiments, the waveguide gratings can encode optical power for adjusting the collimation of the output. In several embodiments, the output image is at infinity. In other embodiments, the output image may be formed at distances of several meters from the eye box. Typically, the eye is positioned within the exit pupil or eye box of the display.

Different IIN implementations and embodiments can be utilized as discussed and taught in U.S. patent application Ser. No. 13/869,866, entitled Holographic Wide Angle Display, and U.S. patent application Ser. No. 13/844,456, entitled Transparent Waveguide Display, the disclosures of which are hereby incorporated by reference in their entireties. In some embodiments, the IIN contains a beamsplitter for directing light onto a microdisplay and transmitting the reflected light towards the waveguide. In many embodiments, the beamsplitter is a grating recorded in HPDLC and uses the intrinsic polarization selectivity of such gratings to separate the light illuminating the display and the image modulated light reflected off the display. In several embodiments, the beam splitter is a polarizing beam splitter cube. In a number of embodiments, the IIN incorporates a despeckler. Despecklers are discussed in U.S. Pat. No. 8,565,560, entitled Laser Illumination Device, the disclosure of which is hereby incorporated by reference in its entirety.

The light source can be a laser or LED and can include one or more lenses for modifying the illumination beam angular characteristics. The image source can be a microdisplay or laser based display. LED can provide better uniformity than laser. If laser illumination is used, there is a risk of illumination banding occurring at the waveguide output. In many embodiments, laser illumination banding in waveguides can be overcome using the techniques and teachings disclosed in U.S. patent application Ser. No. 15/512,500, entitled Method and Apparatus for Generating Input Images for Holographic Waveguide Displays, the disclosure of which is hereby incorporated by reference in its entirety. In some embodiments, the light from the light source is polarized. In several embodiments, the image source is a liquid crystal display (LCD) micro display or liquid crystal on silicon (LCoS) micro display.

In some embodiments, similar to the one shown in FIG. 14, each grating layer addresses half the total field of view. Typically, the fold gratings are clocked (i.e., tilted in the waveguide plane) at 45 degrees to ensure adequate angular bandwidth for the folded light. In other embodiments, other clock angles can be used to satisfy spatial constraints on the positioning of the gratings that can arise in the ergonomic design of the display. In some embodiments, at least one of the input and output gratings have rolled k-vectors. Rolling the K-vectors can allow the angular bandwidth of the grating to be expanded without the need to increase the waveguide thickness.

In many embodiments, the fold grating's angular bandwidth can be enhanced by designing the grating prescription to provide dual interaction of the guided light with the grating. Exemplary embodiments of dual interaction fold gratings are disclosed in U.S. patent application Ser. No. 14/620,969, entitled Waveguide Grating Device, the disclosure of which is hereby incorporated in its entirety.

Figure 15:
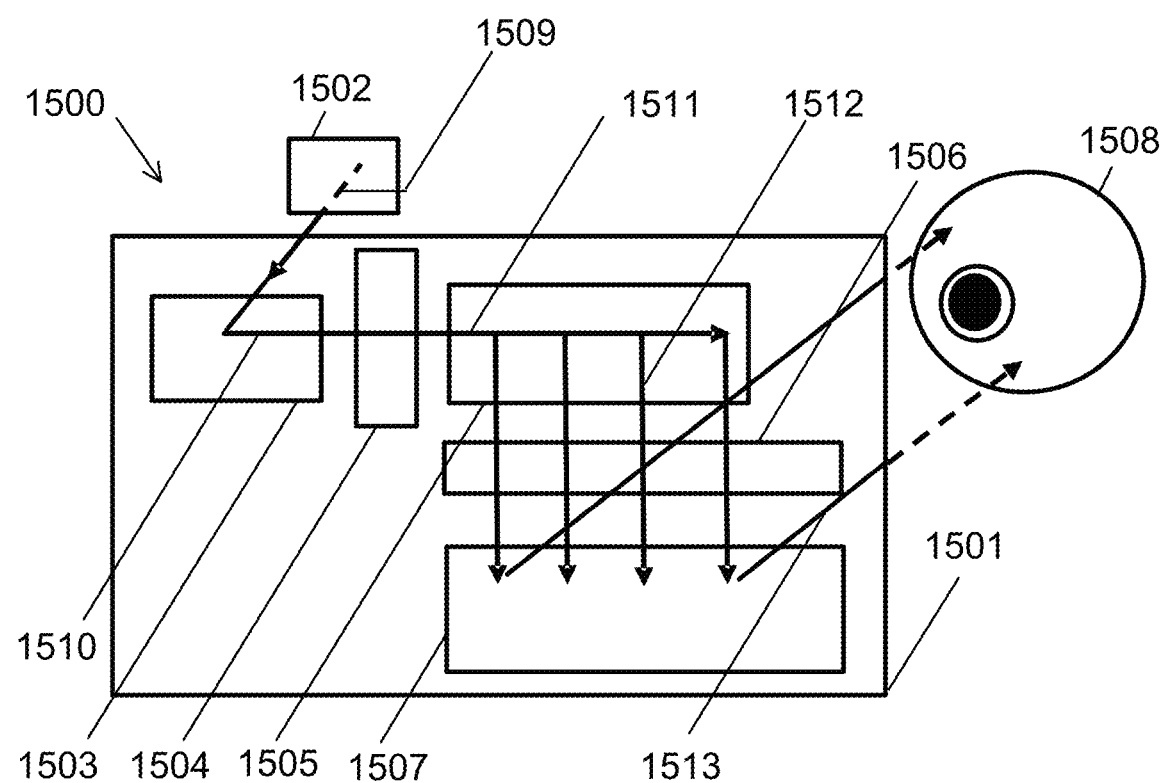
FIG. 15 conceptually illustrates a plan view of a single grating layer in accordance with an embodiment of the invention.

FIG. 15 conceptually illustrates a plan view 1500 of a single grating layer similar to the ones used in FIG. 14 in accordance with an embodiment of the invention. The grating layer 1501, which is optically coupled to the IIN 1502, includes input grating 1503, a first beamsplitter 1504, a fold grating 1505, a second beamsplitter 1506, and an output grating 1507. The beamsplitters can be partially transmitting coatings which homogenize the waveguide light by providing multiple reflection paths within the waveguide. Each beamsplitter can include more than one coating layer with each coating layer being applied to a transparent substrate. Typical beam paths from the IIN up to the eye 1508 are indicated by the rays 1509-1513.

Figure 16:
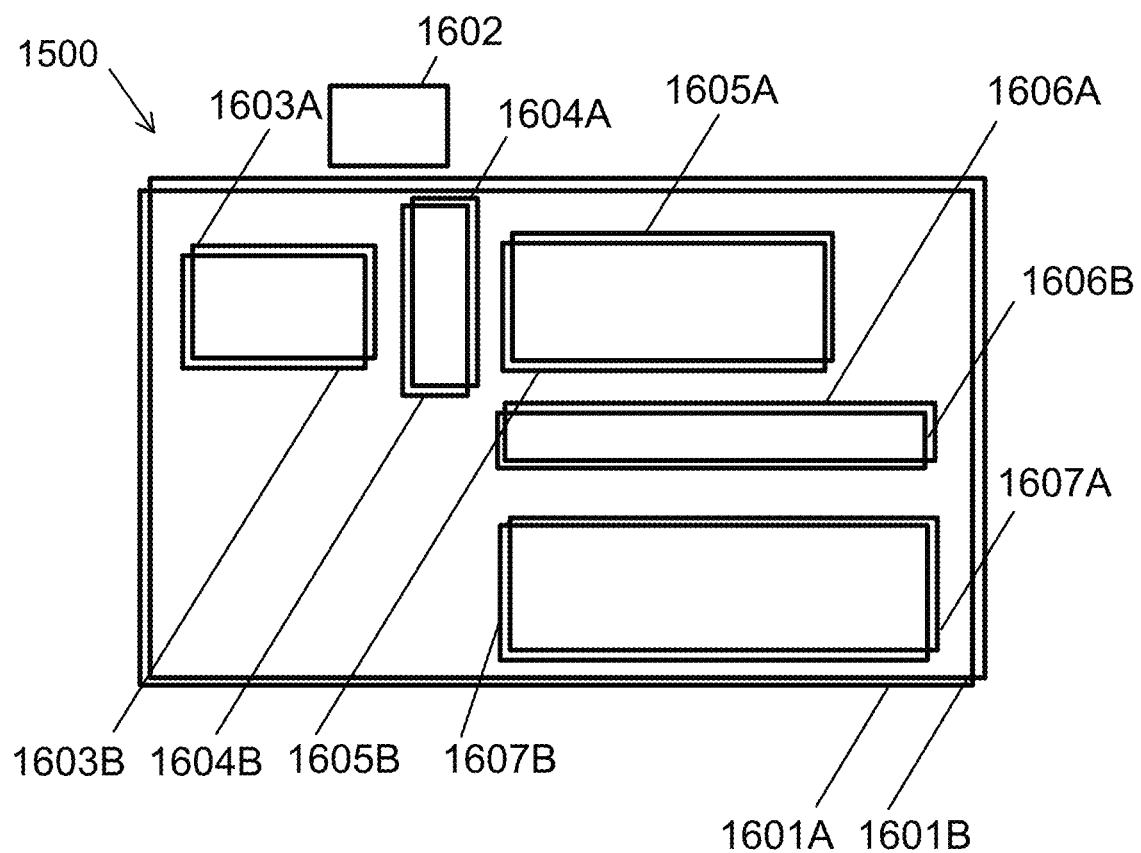
FIG. 16 conceptually illustrates a plan view of a two grating layer configuration in accordance with an embodiment of the invention.

FIG. 16 conceptually illustrates a plan view 1600 of a two grating layer configuration in accordance with an embodiment of the invention. As shown, the grating layers 1601A, 1601B, which are optically coupled to the IIN 1602, includes input gratings 1603A, 1603B, first beamsplitters 1604A, 1604B, fold gratings 1605A, 1605B, second beamsplitters 1606A, 1606B and output gratings 1607A, 1607B, where the characters A, B refer to the first and second grating layers, respectively. In the illustrated embodiment, the gratings and beams splitters of the two layers substantially overlap.

In many embodiments, the grating layer can be broken up into separate layers. For example, in some embodiments, a first layer includes the fold grating while a second layer includes the output grating. In further embodiments, a third layer can include the input grating. In such embodiments, the number of layers can then be laminated together into a single waveguide substrate. In several embodiments, the grating layer includes a number of pieces, including the input coupler, the fold grating, and the output grating (or portions thereof) that are laminated together to form a single substrate waveguide. The pieces can be separated by optical glue or other transparent material of refractive index matching or substantially similar that of the pieces.

In many embodiments, the grating layer can be formed via a cell making process by creating cells of the desired grating thickness and vacuum filling each cell with SBG material for each of the input coupler, the fold grating, and the output grating. In some embodiments, the cell can be formed by positioning multiple plates of glass with gaps between the plates of glass that define the desired grating thickness for the input coupler, the fold grating, and the output grating. In several embodiments, one cell can be made with multiple apertures such that the separate apertures are filled with different pockets of SBG material. Any intervening spaces can then be separated by a separating material (e.g., glue, oil, etc.) to define separate areas. In a number of embodiments, the SBG material can be spin-coated onto a substrate and then covered by a second substrate after curing of the material.

In many embodiments, the input coupler, the fold grating, and the output grating can be created by interfering two waves of light at an angle within the substrate to create a holographic wave front, thereby creating light and dark fringes that are set in the waveguide substrate at a desired angle. Additional, such optical elements can also be fabricated using any of the various methods described in the above sections.

In one embodiment, the input coupler, the fold grating, and the output grating embodied as SBGs can be Bragg gratings recorded in a holographic polymer dispersed liquid crystal (HPDLC) (e.g., a matrix of liquid crystal droplets), although SBGs may also be recorded in other materials. In one embodiment, SBGs are recorded in a uniform modulation material, such as POLICRYPS or POLIPHEM having a matrix of solid liquid crystals dispersed in a liquid polymer. The SBGs can be switching or non-switching in nature. In its non-switching form a SBG has the advantage over conventional holographic photopolymer materials of being capable of providing high refractive index modulation due to its liquid crystal component. Exemplary uniform modulation liquid crystal-polymer material systems are disclosed in United State Patent Application Publication No.: US2007/0019152 by Caputo et al and PCT Application No.: PCT/EP2005/006950 by Stumpe et al. both of which are incorporated herein by reference in their entireties. Uniform modulation gratings are characterized by high refractive index modulation (and hence high diffraction efficiency) and low scatter.

In many embodiments, the input coupler, the fold grating, and the output grating is made of a reverse mode HPDLC material. Reverse mode HPDLC differs from conventional HPDLC in that the grating is passive when no electric field is applied and becomes diffractive in the presence of an electric field. The reverse mode HPDLC may be based on any of the recipes and processes disclosed in PCT Application No. PCT/GB2012/000680, entitled Improvements to Holographic Polymer Dispersed Liquid Crystal Materials and Devices, the disclosure of which is hereby incorporated in its entirety. The grating can be recorded in any of the above material systems but used in a passive (non-switching) mode. The fabrication process is identical to that used for switched but with the electrode coating stage being omitted. LC polymer material systems are highly desirable in view of their high index modulation. In some embodiments, the gratings are recorded in HPDLC but are not switched.

In many embodiments, the input grating can be replaced by another type of input coupler, such as but not limited to a prism and a reflective surface. In some embodiments, the input coupler can be a holographic grating, such as an SBG grating or a passive grating, which can be a passive SBG grating. The input coupler can be configured to receive collimated light from a display source and to cause the light to travel within the waveguide via total internal reflection between the first surface and the second surface to the fold grating. The input coupler can be orientated directly towards or at an angle relative to the fold grating. For example, in several embodiments, the input coupler can be set at a slight incline in relation to the fold grating. In a number of embodiments, the fold grating can be oriented in a diagonal direction. The fold grating can be configured to provide pupil expansion in a first direction and to direct the light to the output grating via total internal reflection inside the waveguide.

In many embodiments, a longitudinal edge of each fold grating is oblique to the axis of alignment of the input coupler such that each fold grating is set on a diagonal with respect to the direction of propagation of the display light. The fold grating can be angled such that light from the input coupler is redirected to the output grating. In some embodiments, the fold grating is set at a forty-five-degree angle relative to the direction that the display image is released from the input coupler. This feature can cause the display image propagating down the fold grating to be turned into the output grating. For example, in several embodiments, the fold grating can cause the image to be turned 90 degrees into the output grating. In this manner, a single waveguide can provide dual axis pupil expansion in both the horizontal and vertical directions. In a number of embodiments, each of the fold grating can have a partially diffractive structure. In some embodiments, each of the fold gratings can have a fully diffractive structure.

The output grating can be configured to provide pupil expansion in a second direction different than the first direction and to cause the light to exit the waveguide from the first surface or the second surface. The output grating can receive the display image from the fold grating via total internal reflection and can provide pupil expansion in a second direction. In many embodiments, the output grating includes multiple layers of substrate, thereby comprising multiple layers of output gratings. Accordingly, there is no requirement for gratings to be in one plane within the waveguide, and gratings may be stacked on top of each other (e.g., cells of gratings stacked on top of each other).

In many embodiments, a quarter wave plate on the substrate waveguide rotates polarization of a light ray to maintain efficient coupling with the SBGs. The quarter wave plate can be coupled to or adhered to the surface of substrate waveguide. For example, in some embodiments, the quarter wave plate is a coating that is applied to substrate waveguide. The quarter wave plate can provide light wave polarization management. Such polarization management can help light rays retain alignment with the intended viewing axis by compensating for skew waves in the waveguide. The quarter wave plate is optional and can increase the efficiency of the optical design in implementations. In several embodiments, the waveguide does not include the quarter wave plate. The quarter wave plate may be provided as multi-layer coating.

Figure 17:
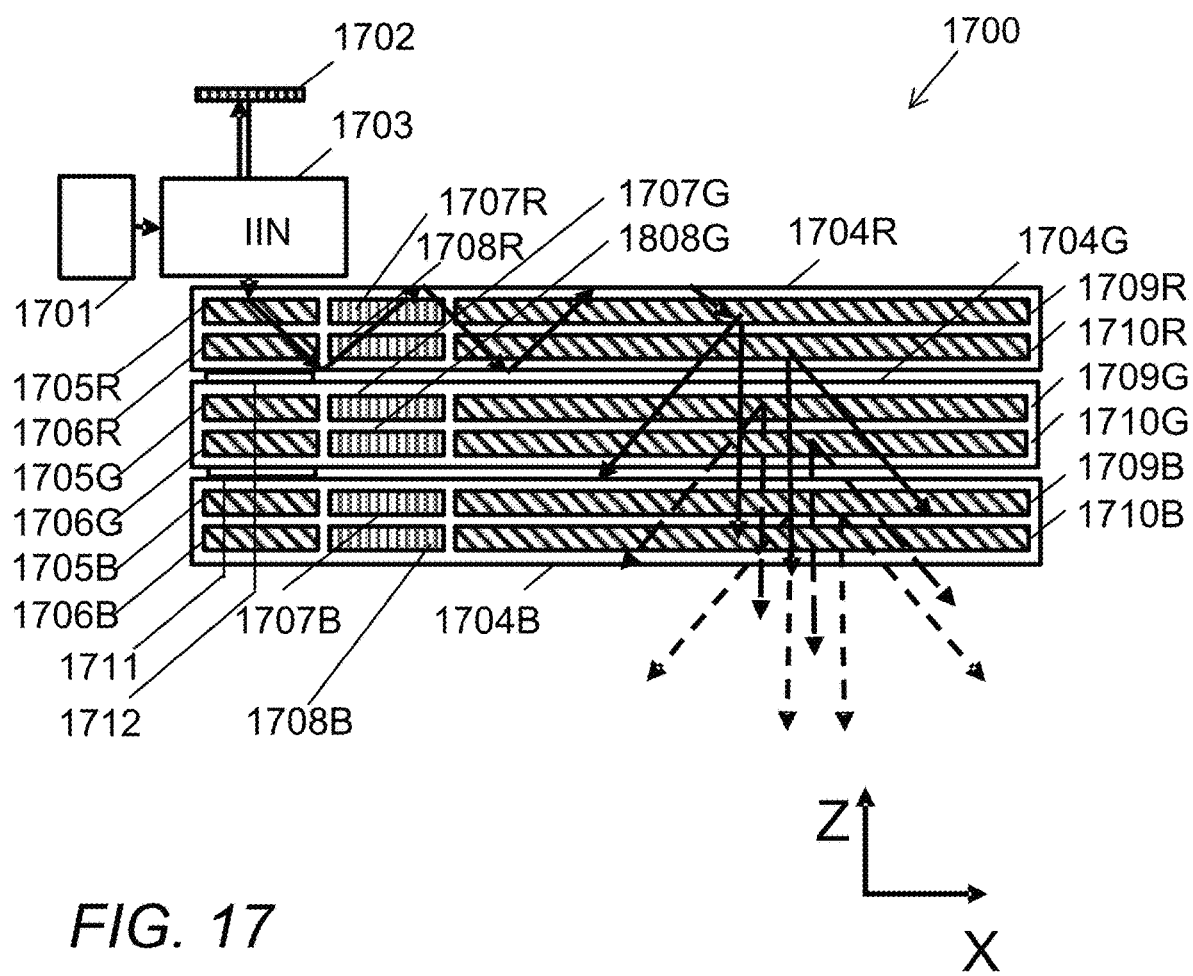
FIG. 17 conceptually illustrates a dual axis expansion waveguide display in accordance with an embodiment of the invention.
Figure 18:
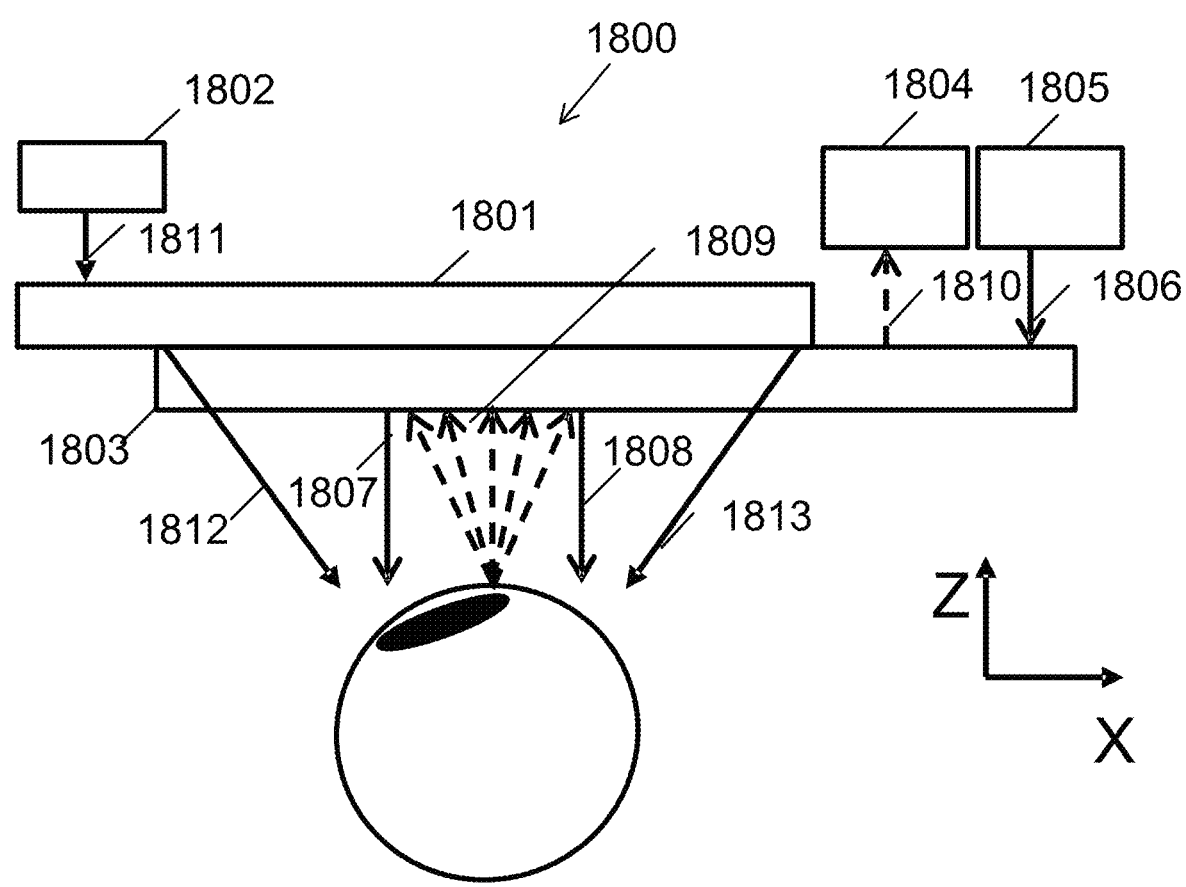
FIG. 18 conceptually illustrates an eye tracker display in accordance with an embodiment of the invention.

In many embodiments, the waveguide display can be operated in monochrome. In some embodiments, the waveguide display can be operated in color. Operating in color can be achieved using a stack of monochrome waveguides of similar design to the one in FIG. 14. The design can use red, green, and blue waveguide layers as shown or, alternatively, red and blue/green layers. FIG. 17 conceptually illustrates a dual axis expansion waveguide display 1700 that includes a light source 1701, a microdisplay panel 1702, and an IIN 1703 optically coupled to red, green, and blue waveguides 1704R, 1704G, 1704B, with each waveguide including two grating layers in accordance with an embodiment of the invention. In the illustrative embodiment, the three waveguides are separated by air gaps. In some embodiments, the waveguides are separated by a low index material such as a nanoporous film. As shown, the red grating layer labelled by R includes an input grating 1705R, 1706R, a fold grating exit pupil expander 1707R, 1708R, and an output grating 1709R, 1710R. The grating elements of the blue and green waveguides are labeled using the same numerals with B, G designating blue and green. In some embodiments, the input, fold, and output gratings are all passive, that is non-switching. In several embodiments, at least one of the gratings is switching. In a number of embodiments, the input gratings in each layer are switchable to avoid color crosstalk between the waveguide layers. In many embodiments, color crosstalk can be avoided by disposing dichroic filters 1711, 1712 between the input grating regions of the red and blue and the blue and green waveguides. In a variety of embodiments, a color waveguide can be implemented using just one grating layer in each monochromatic waveguide FIG. 18 conceptually illustrates an eye tracker display in accordance with an embodiment of the invention. Waveguide device based eye trackers are discussed in PCT Application No. PCT/GB2014/000197, entitled Holographic Waveguide Eye Tracker, PCT Application No. PCT/GB2015/000274, entitled Holographic Waveguide Optical Tracker, and PCT Application No. PCT/GB2013/000210, entitled Apparatus for Eye Tracking, the disclosures of which are hereby incorporated in their entireties. Turning again to FIG. 18, the eye tracked display 1800 includes a dual axis expansion waveguide display based on any of the embodiments described above. The waveguide display can include a waveguide 1801 containing at least one grating layer incorporating an input fold and output grating, the IIN 1802, an eye tracker including waveguide 1803, infrared detector 1804, and infrared source 1805. The eye tracker and display waveguides can be separated by an air gap or by a low refractive material. As explained in the above references, the eye tracker can comprise separate illumination and detector waveguides. In the illustrative embodiment, the optical path from the infrared source to the eye is indicated by the rays 1806-1808, and the backscattered signal from the eye is indicated by the rays 1809, 1810. The optical path from the input image node through the display waveguide to the eye box is indicated by the rays 1811-1813.

Figure 19:
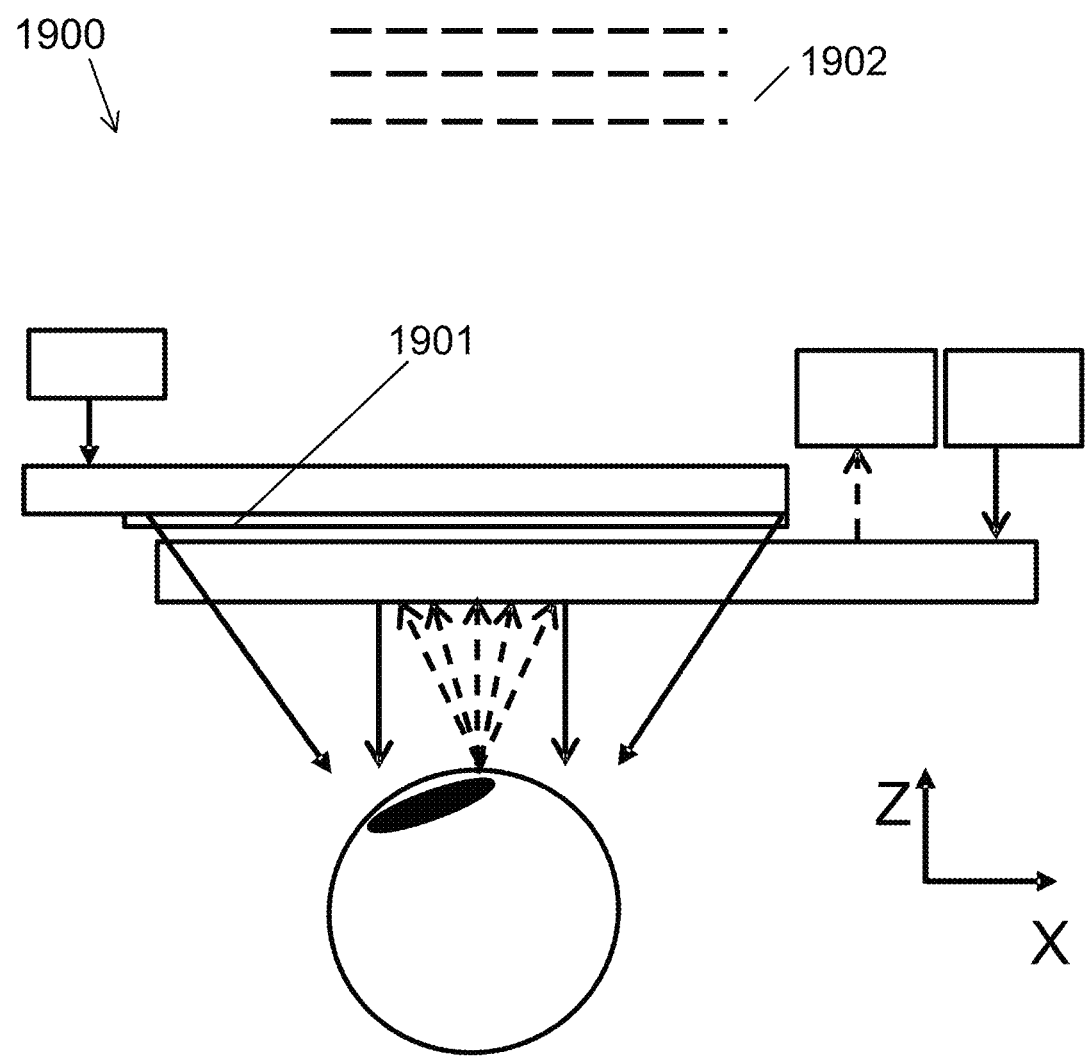
FIG. 19 conceptually illustrates a dual expansion waveguide display with a dynamic focusing element and an eye tracker in accordance with an embodiment of the invention.

In many embodiments, a dual expansion waveguide display can further include a dynamic focusing element. FIG. 19 conceptually illustrates a dual expansion waveguide display 1900 with a dynamic focusing element 1901 disposed in proximity to a principal surface of the waveguide display and an eye tracker in accordance with an embodiment of the invention. In some embodiments, the dynamic focusing element is an LC device. In several embodiments, the LC device combines an LC layer and a diffractive optical element. In a number of embodiments, the diffractive optical element is an electrically controllable LC-based device. In various embodiments, the dynamic focusing element is disposed between the waveguide display and the eye tracker. In a variety of embodiments, the dynamic focusing element can be disposed in proximity to the surface of the display waveguide furthest from the eye.

The dynamic focus device can provide a multiplicity of image surfaces 1902. In light field display applications, at least four image surfaces can be used. The dynamic focusing element can be based on dynamic focusing elements described in U.S. patent application Ser. No. 15/553,120 entitled, Electrically Focus Tunable Lens, the disclosure of which is hereby incorporated in its entirety. In some embodiments, a dual expansion waveguide display having a dynamic focusing element and an eye tracker can provide a light field display, such as those based on the teachings disclosed in U.S. patent application Ser. No. 15/543,013, entitled Holographic Waveguide Light Field Displays, the disclosure of which is hereby incorporated by reference in its entirety.

Although specific waveguide structures are discussed above, any of a number of waveguide structures can be implemented depending on the specific requirements of a given application. For example, in many waveguide configurations, the input, fold, and output gratings are formed in a single layer sandwiched by transparent substrates. Such a configuration is shown in FIG. 14, where two layers are stacked as such. In some embodiments, the waveguide includes just one grating layer. In several embodiments, switching transparent electrodes are applied to opposing surfaces of the substrate layers sandwiching the switching grating. In a number of embodiments, the cell substrates can be fabricated from glass. One glass substrate that can be used is standard Corning Willow glass substrate (index 1.51) which is available in thicknesses down to 50 micrometers. In other embodiments, the cell substrates can be optical plastics.

Figure 20A:
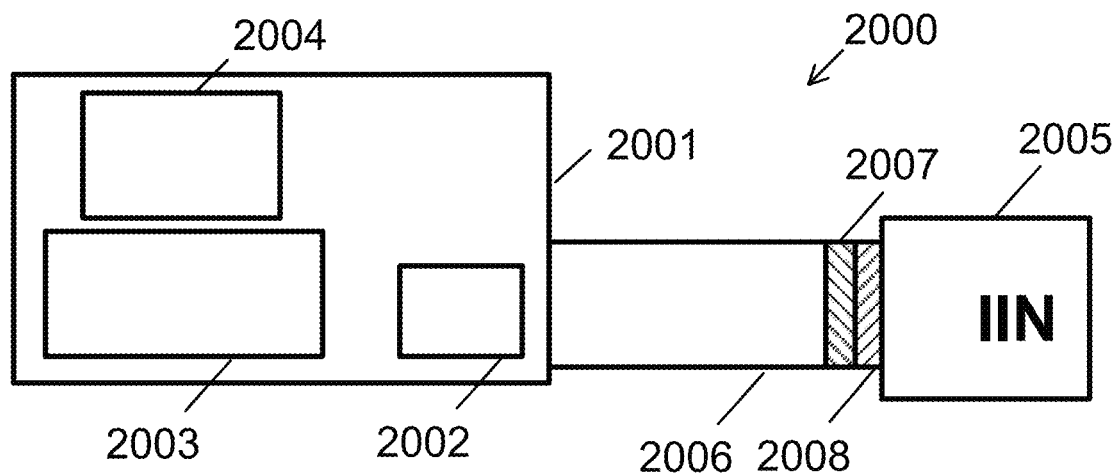
FIGS. 20A and 20B conceptually illustrate a waveguide display coupled to an input image node by an opto-mechanical interface in accordance with an embodiment of the invention.
Figure 20B:
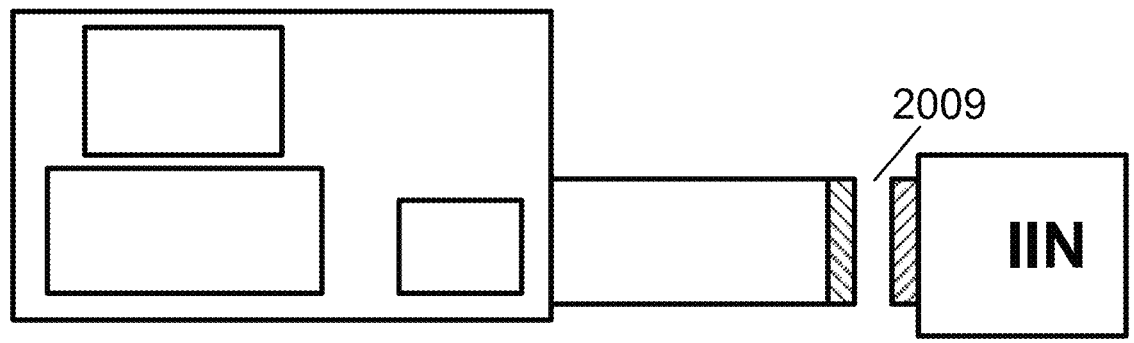

In many embodiments, the waveguide display is coupled to the IIN by an opto-mechanical interface that allows the waveguide to be easily retracted from the IIN assembly. The basic principle is conceptually illustrated in FIG. 20A. FIG. 20A shows a dual axis expansion waveguide display 2000 including a waveguide 2001 containing an input grating 2002, a fold grating 2003, an output grating 2004, and an IIN 2005. The apparatus further includes an optical link 2006 connected to the waveguide, a first optical interface 2007 terminating the optical link, and a second optical interface 2008 forming the exit optical port of the IIN. The first and second optical interfaces can be decoupled as indicated by gap 2009 shown in FIG. 20B. In some embodiments, the optical link is a waveguide. In several embodiments, the optical link is curved. In a number of embodiments, the optical link is a GRIN image relay device. In a variety of embodiments, the optical connection is established using a mechanical mechanism. In some embodiments, the optical connection is established using a magnetic mechanism. The advantage of decoupling the waveguide from the IIN in helmet mounted display applications is that the near eye portion of the display can be removed when not in used. In some embodiments where the waveguide includes passive gratings, the near eye optics can be disposable.

Figure 21:
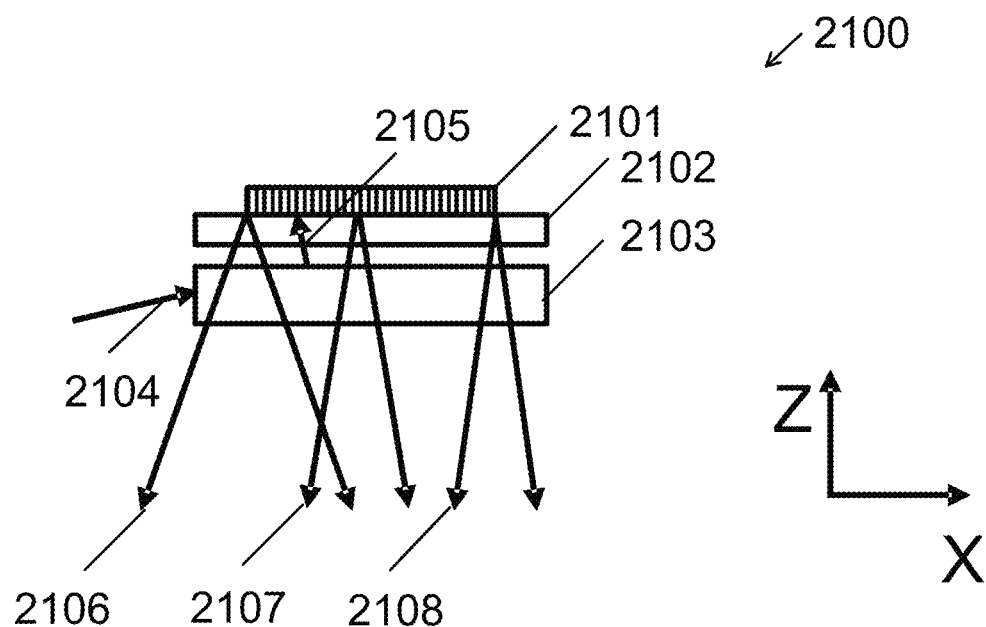
FIGS. 21-24 conceptually illustrate various input image node configurations in accordance with various embodiments of the invention.
Figure 22:
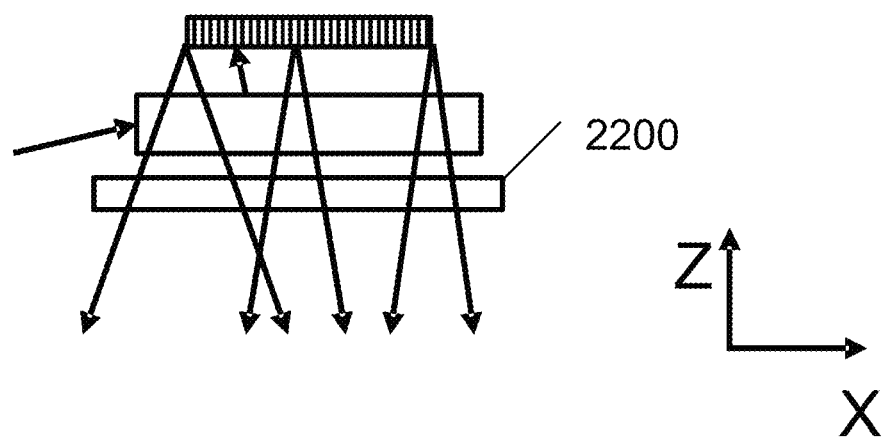

FIG. 21 conceptually illustrates an IIN 2100 having a microdisplay panel 2101, a spatially-varying NA component 2102, and microdisplay optics 2103 in accordance with an embodiment of the invention. As shown, the microdisplay optics 2103 accepts light 2104 from an illumination source (not illustrated) and deflects the light onto the microdisplay in the direction indicated by ray 2105. The light reflected from the microdisplay is indicated by the divergent ray pairs 2106-2108 with numerical aperture ("NA") angles varying along the X axis. In the illustrative embodiment, the spatially-varying NA component is disposed between the microdisplay optics and the microdisplay. In other embodiments, the spatially-varying NA component is disposed adjacent the output surface of the microdisplay optics. FIG. 22 conceptually illustrates such an embodiment, shown by spatially-varying NA component 2200.

Figure 23:
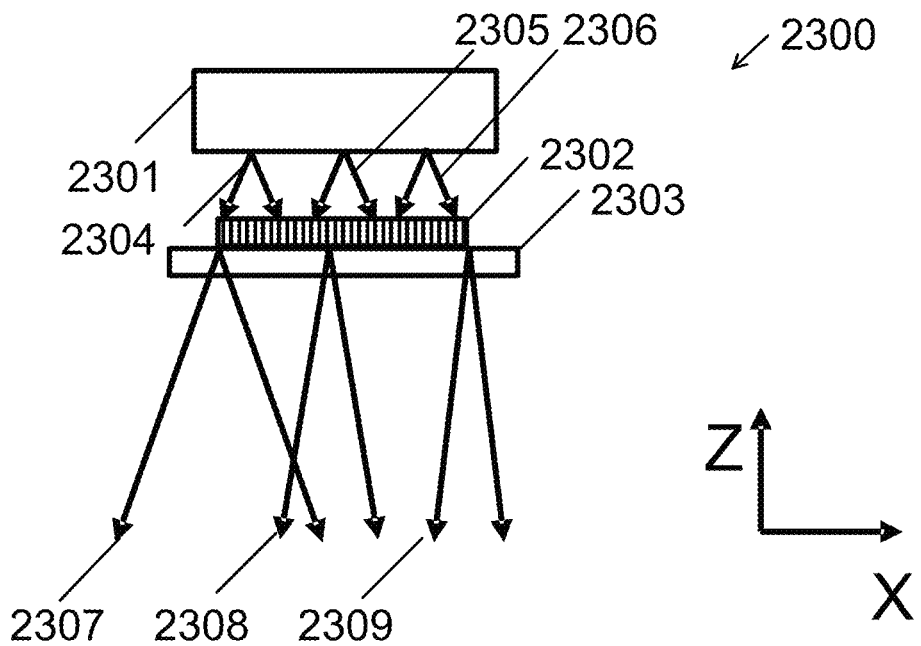

In many embodiments, the microdisplay is a reflective device. In some embodiments, the microdisplay is a transmission device, typically a transmission LCoS device. FIG. 23 conceptually illustrates an IIN 2300 including a backlight 2301, a microdisplay 2302, and a variable NA component 2303 in accordance with an embodiment of the invention. Light from the backlight indicated by the rays 2304-2306, which typically has a uniform NA across the backlight, illuminates the back surface of the microdisplay and, after propagation through the variable NA component, is converted into output image modulated light indicated by the divergent ray pairs 2307-2309 with NA angles varying along the X axis.

Figure 24:
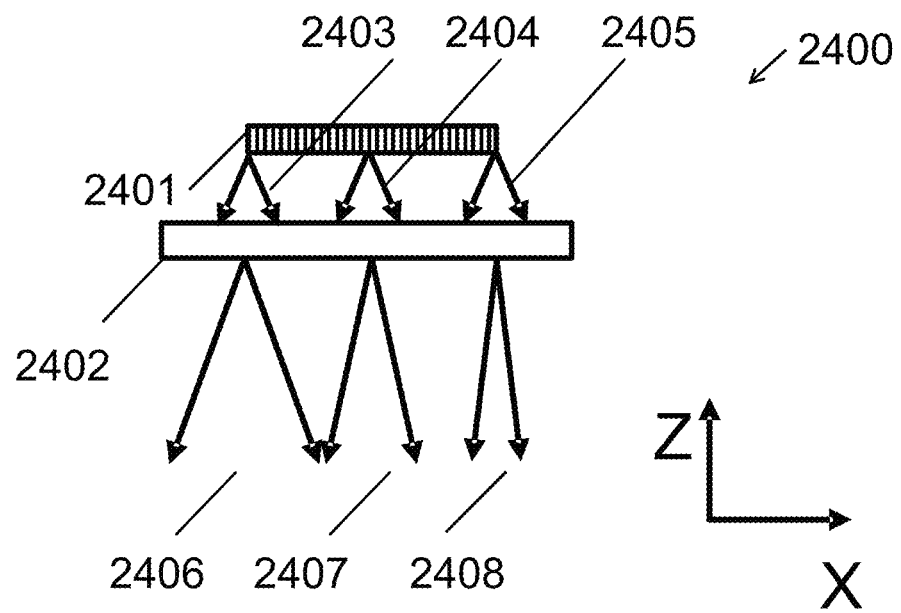

In many embodiments, the principles of the invention may be applied to an emissive display. Examples of emissive displays for use with the invention include ones based on LED arrays and light emitting polymers arrays. FIG. 24 conceptually illustrates an IIN 2400 having an emissive microdisplay 2401 and a spatially-varying NA component 2402 in accordance with an embodiment of the invention. Light from the microdisplay indicated by rays 2403-2405, which typically has a uniform NA across the emitting surface of the display, illuminates the spatially-varying NA component and is converted into output image modulated light indicated by divergent ray pairs 2406-2408 with NA angles varying along the X axis.

In many embodiments, the microdisplay optics includes a polarizing beam splitter cube. In some embodiments, the microdisplay optics includes an inclined plate to which a beam splitter coating has been applied. In a number of embodiments, the microdisplay optics includes a waveguide device comprising a SBG, which acts as a polarization selective beam splitter. Details relating to such embodiments are discussed U.S. patent application Ser. No. 13/869,866, entitled Holographic Wide Angle Display, and U.S. patent application Ser. No. 13/844,456, entitled Transparent Waveguide Display, the disclosures of which are hereby incorporated in their entireties. In several embodiments, the microdisplay optics contains at least one of a refractive component and curved reflecting surfaces or a diffractive optical element for controlling the numerical aperture of the illumination light. In some embodiments, the microdisplay optics contains spectral filters for controlling the wavelength characteristics of the illumination light. In a number of embodiments, the microdisplay optics contains apertures, masks, filter, and coatings for controlling stray light. In many embodiments, the microdisplay optics incorporate birdbath optics.

Figure 25:
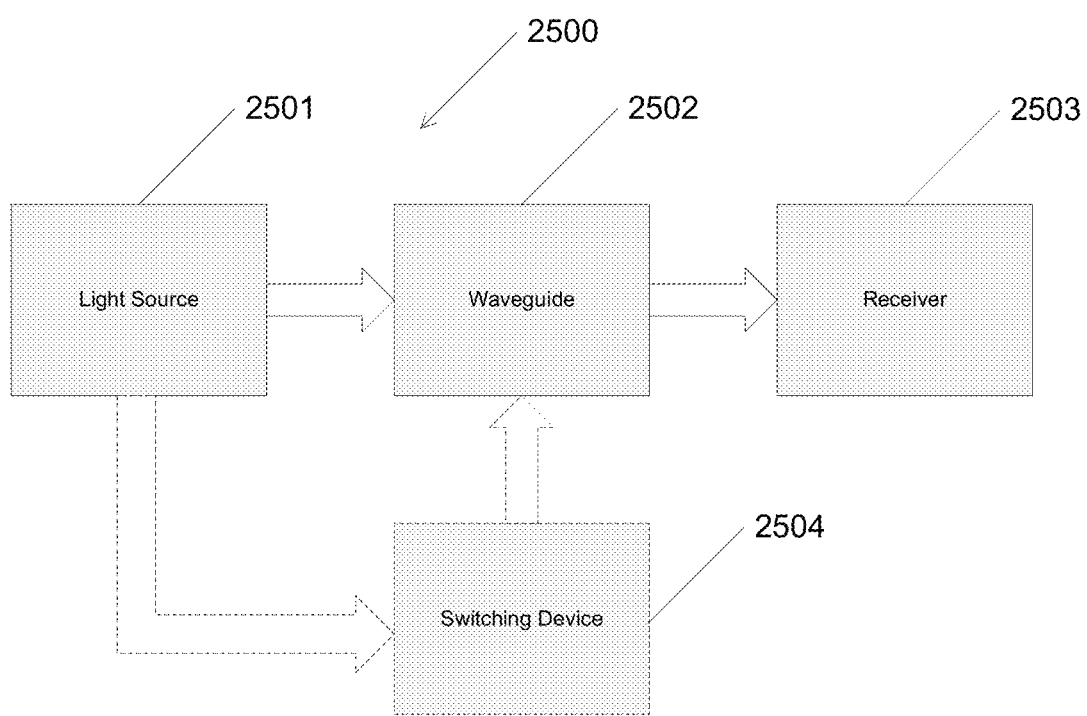
FIG. 25 conceptually illustrates a system diagram showing components for waveguide displays in accordance with an embodiment of the invention.

Although FIGS. 14-24 describe specific waveguide displays and structures, any waveguide display system and configuration can be used as appropriate to the specific requirements of a given application. At its core, waveguides are simply used to manipulate the direction of light. This property can be used generally in a variety of different systems. An example of a general system that can utilize waveguides is shown in FIG. 25. FIG. 25 conceptually illustrates a system diagram showing components for waveguide displays in accordance with various embodiments of the invention. As shown, the system 2500 utilizes a light source 2501 that can output light into a waveguide 2502. Light sources used can be a variety of different systems. In some embodiments, the light source 2501 is from a projector. In many embodiments, the light source 2501 further includes a microdisplay panel and optical components needed to illuminate the display panel. In further embodiments, the light source 2501 includes collimators and other optical components for manipulating the light into a desired form before entry into the waveguide. In other embodiments, the light source 2501 is natural light. Once the light source 2501 outputs light into the waveguide 2502, the waveguide 2502 can then manipulate and redirect light in a desired manner out and into a receiver 2503. Waveguides can be any general waveguides known within the art and/or one of the waveguides as described above. A receiver can be any of a number of components capable of receiving light from the waveguide. In many embodiments, the receiver 2503 is a user's eye(s). In some embodiments, the receiver 2503 is another waveguide. In several embodiments, the receiver 2503 is a display capable of displaying the light from the waveguide 2502. In further embodiments, the display is simply glass that can reflect the light onto another receiver. The system 2500 can optionally include a switching device 2504 and electrical components for use in conjunction with SBGs. In many embodiments, the switching device 2504 can optionally receive data from the light source in order to introduce a voltage to turn the SBGs in an ON position at the appropriate times.

Head-Up Displays

Waveguides incorporating Bragg gratings similar to those described above can be utilized in a variety of applications including (but not limited to) HUDs in vehicular applications such as automotive and aerospace applications. In many embodiments, a waveguide is utilized to direct light incident on the waveguide from one or more projection sources toward a windshield, where the light is reflected toward the operator of the vehicle. Windshields are often curved. In several embodiments, the waveguides transmit incident light to compensate for distortions introduced by the curvature of a windshield (or other surface onto which light from the waveguide is projected). As is discussed further below, distortions introduced by curvature of a surface onto which light is projected can be compensated for by selection of the K-vector across the output grating of the waveguide and/or computationally by modifying the manner in which an input image is projected into the waveguide.

Figure 26:
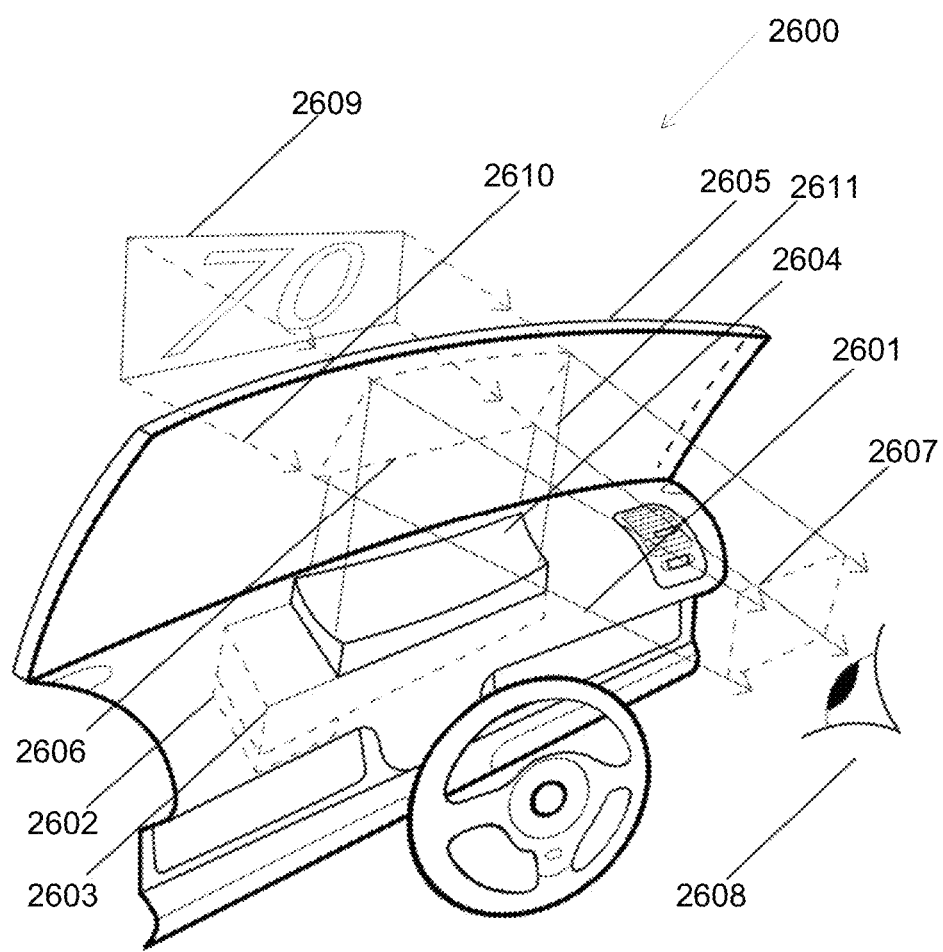
FIG. 26 is a conceptual illustration of a head-up display within an automobile in accordance with an embodiment of the invention.

An HUD for vehicular applications in accordance with an embodiment of the invention is conceptually illustrated in FIG. 26. The HUD 2600 is located within the dashboard 2601 of a vehicle. A projection system 2602 and a waveguide 2603 are contained within the dashboard and light is projected from the waveguide through a transparent aperture 2604 in the dashboard onto the windshield 2605. The light is reflected off the curved surface 2606 of the windshield 2605 into a region that is commonly referred to as the eyebox 2607 of the HUD. The term eyebox is generally utilized to refer to a region in which the display is visible to the eye 2608 of a viewer. The display appears to the viewer as a virtual display 2609 on the opposite side of the windshield to the viewer. The location of the display can be determined based upon projective geometry 2610, 2611. Placement of the display within the field of view of the vehicle enables the driver to view the road ahead and projected information simultaneously.

Figure 27B:
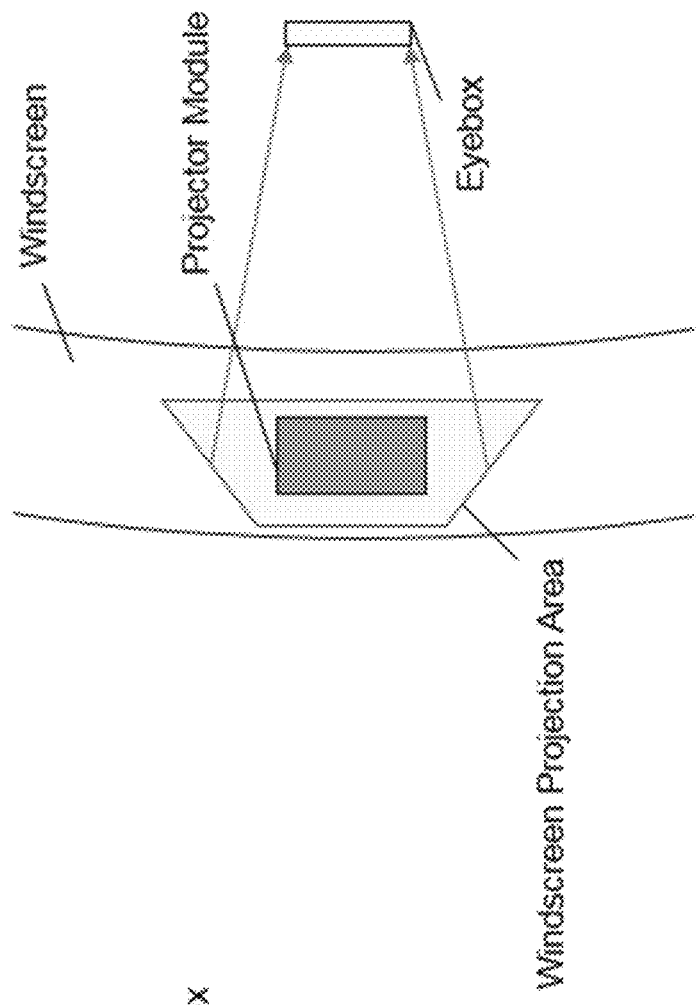
FIGS. 27A and 27B conceptually illustrate the projection of light into an eyebox.
Figure 27A:
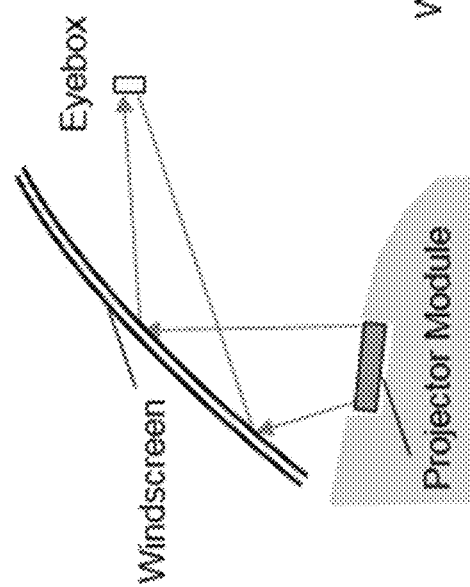

Projection of light into an eyebox by reflection off a curved windshield using a HUD system in accordance with an embodiment of the invention is conceptually illustrated in FIGS. 27A and 27B.

Figure 28:
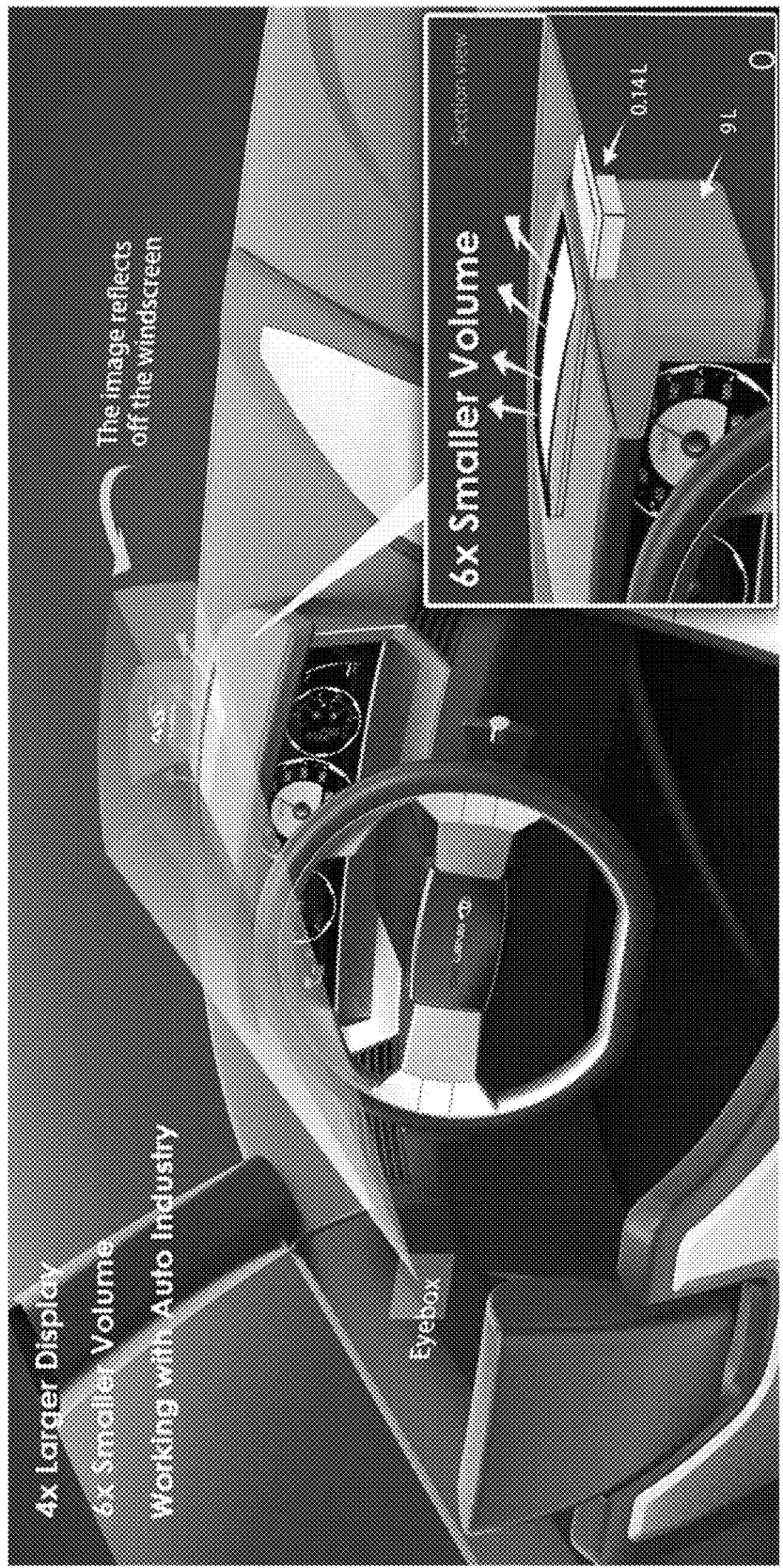
FIG. 28 is a conceptual illustration of the field of view and volumetric requirements of a HUD implemented in accordance with an embodiment of the invention.

Use of flat waveguides that incorporate Bragg gratings can significantly reduce the volumetric requirements of a HUD compared to conventional HUDs implemented using conventional refractive and/or reflective optical components. Furthermore, the field of view of a HUD that can be achieved using a waveguide can be significantly greater despite the reduction in volumetric requirements compared to a conventional HUD. A comparison of the field of view and volumetric requirements of a HUD implemented using a waveguide incorporating Bragg gratings and a conventional HUD is shown in FIG. 28.

While various embodiments of HUDs incorporating waveguides including Bragg gratings are described above with reference to FIGS. 26-28, any of a variety of planar waveguides and/or HUD system configurations can be utilized to implement a HUD for use in a vehicle and/or any other display that projects on a planar and/or curved surface as appropriate to the requirements of a given application. Various waveguides that can be utilized in HUDs in accordance with a number of embodiments of the invention are discussed further below.

Waveguides incorporating Bragg gratings can provide significant advantages when used in HUDs including (but not limited to) wide field of view displays and reduced volumetric requirements compared to HUDs implemented using conventional reflective and refractive optical components. In many embodiments, vehicular HUDS are implemented using one or more planar waveguides fabricated to incorporate at least volumetric Bragg gratings that couple incident light into the waveguide, fold the light within the waveguide and direct light from the waveguide. As noted above, the gratings can provide two dimensional exit pupil expansion.

Figure 29:
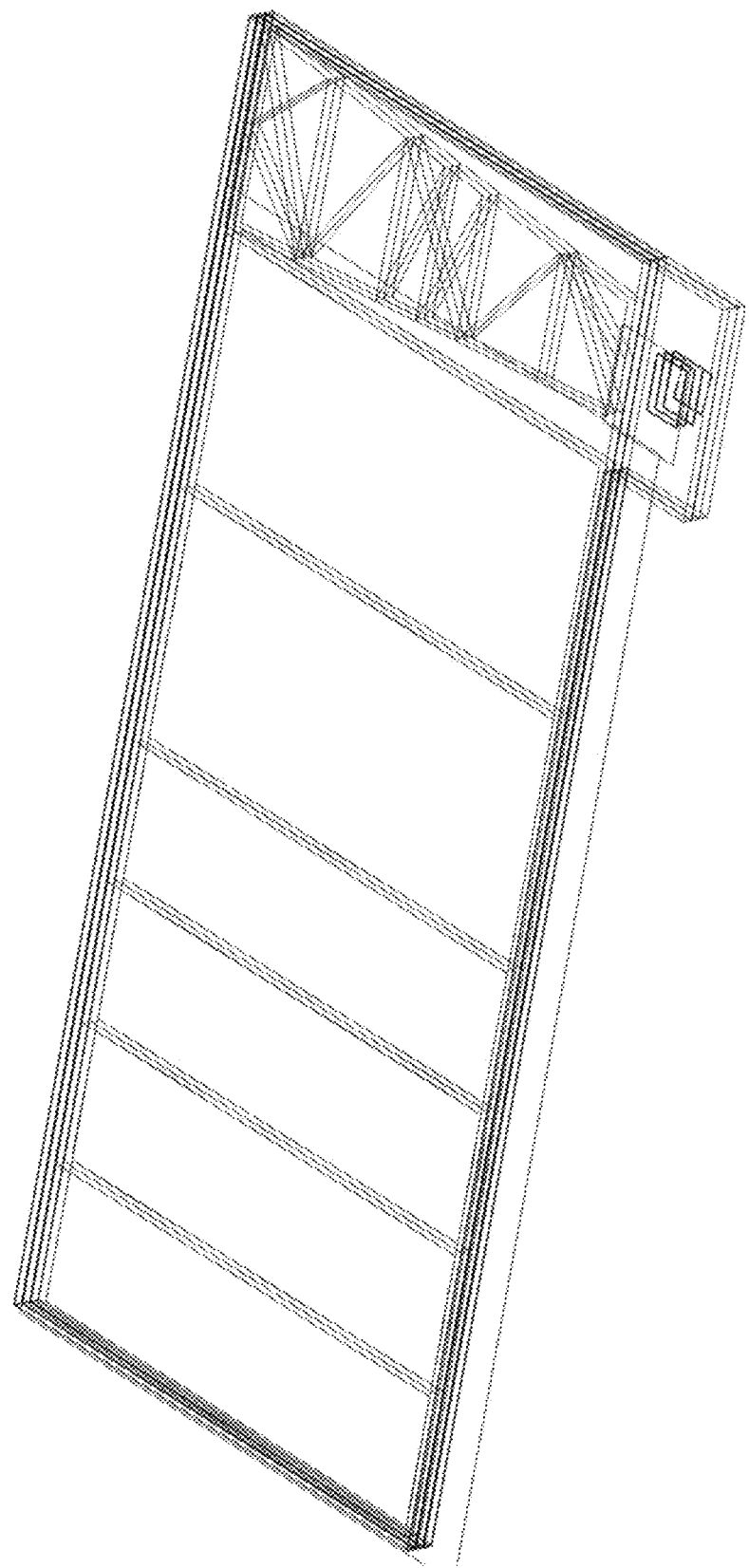
FIG. 29 is a conceptual illustration of a waveguide assembly in accordance with an embodiment of an invention.

A waveguide assembly including three separate waveguides for each of a Red, Green, and Blue color channel implemented in accordance with an embodiment of the invention is illustrated in FIG. 29. The waveguide assembly includes a stack of three (3) waveguides that receive light incident on the bottom surface of the waveguide assembly. Each of a Red, Green, and Blue spectral band is coupled into the Red, Green, and Blue waveguides respectively. Input coupling can be achieved by a pair of input gratings that are provided for each waveguide. The two input coupling gratings have the same surface pitch sizes but different grating slanted angles, which can increase the overall couple-in angular bandwidth of the waveguide. Light coupled into a waveguide is diffracted within the waveguide by a fold grating. In the illustrated embodiment, the width of the fold gratings expand with increased distance from the input grating. As is discussed further below, increasing the width of the fold grating can address Vignetting. The fold grating also includes a tapered diffraction efficiency (DE) profile to increase uniformity of the display across the light box. As noted above, the fold grating performs one dimensional pupil expansion. The expansion of the second dimension of the pupil is achieved in the output grating. In the illustrated embodiment, the output grating also includes a rolled K-vector to taper the DE profile of the grating. As is discussed further below, the K-vector across the output grating can also correct for distortions introduced due to the curvature of a surface (e.g. a windshield) onto which light is projected by the waveguide. Each of the input, fold, and output gratings are discussed in additional detail below.

Input Coupling Gratings for Vehicular Waveguide Displays

Input coupling gratings couple light from one or more illumination sources into a waveguide. Referring again to FIG. 29, each waveguide receives light from two input coupling gratings that are separate from the planar material that incorporates the fold and output gratings. The two input coupling gratings have the same surface pitch sizes but different grating slanted angles, which can increase the overall couple-in angular bandwidth of the waveguide. Each of the input gratings that couple light into the waveguides are plane gratings. In many embodiments, one or more of the input gratings can include a rolled K-vector and/or a multiplexed K-vector as appropriate to the requirements of a specific application.

Figure 30:
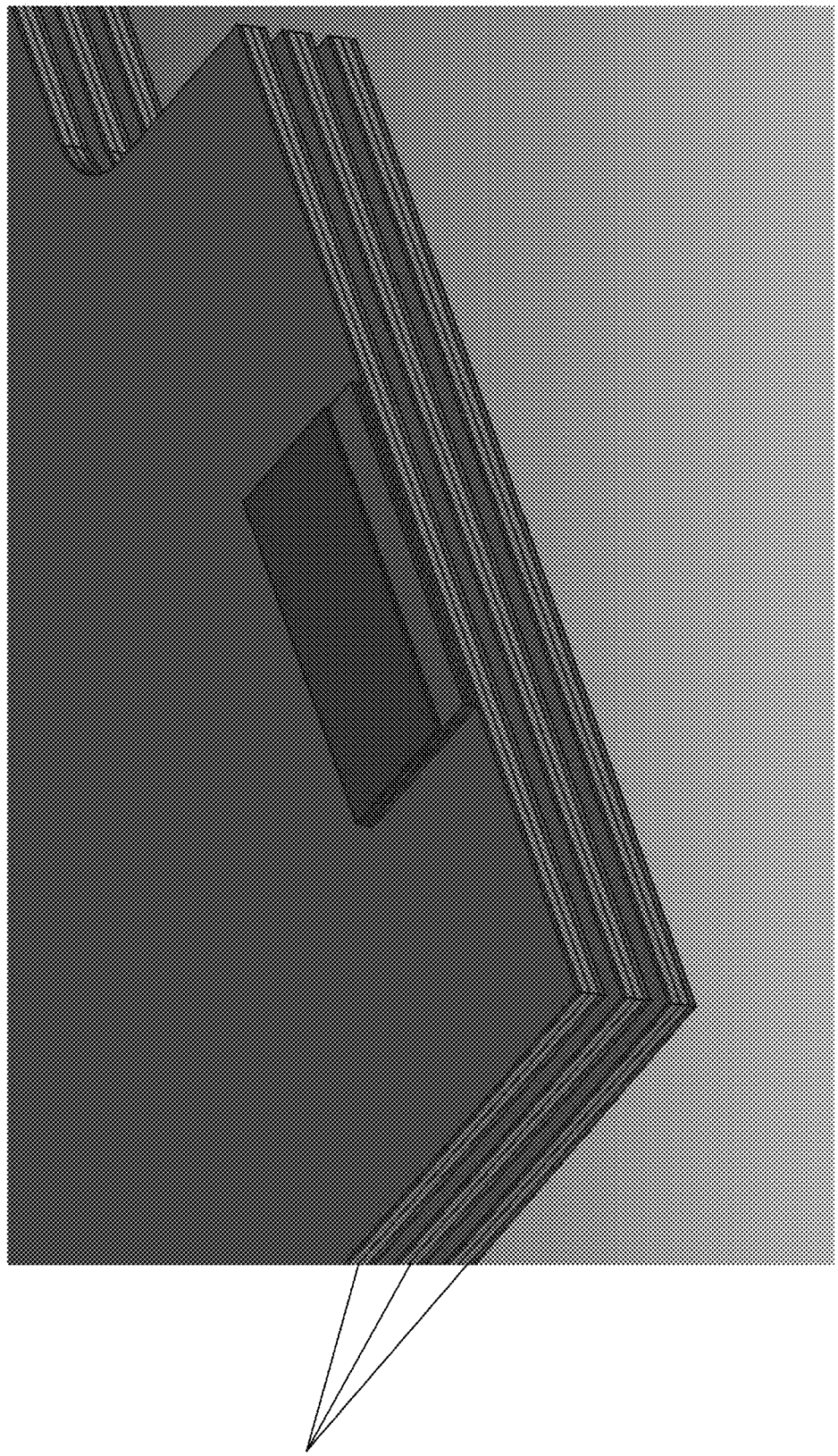
FIG. 30 is a conceptual illustration of a perspective view of a waveguide assembly in accordance with an embodiment of the invention.
Figure 31C:
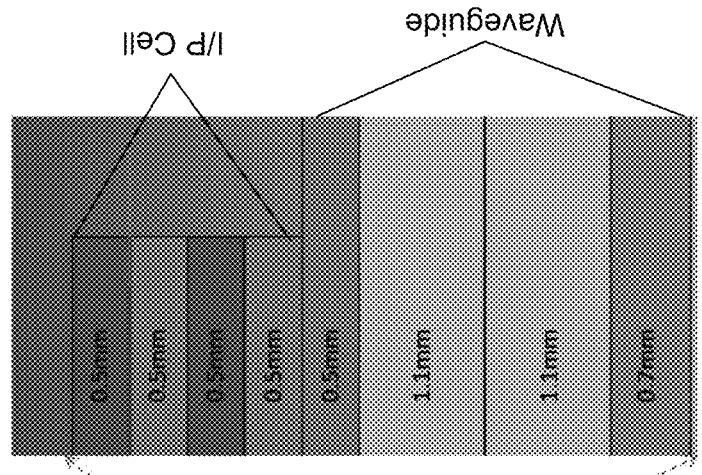
FIGS. 31A-31C conceptually illustrate a stack up including input coupling gratings and waveguides within a waveguide assembly in accordance with an embodiment of the invention.
Figure 31A:
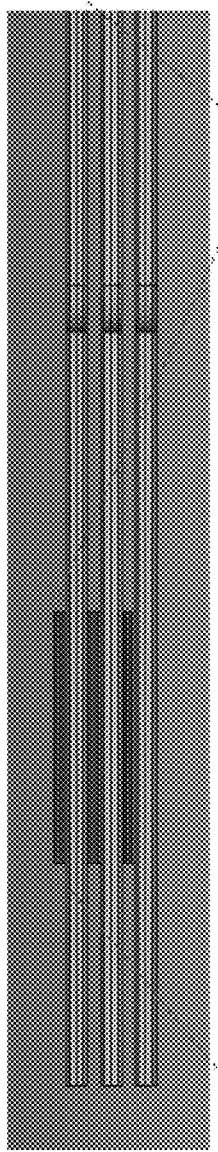
Figure 31B:
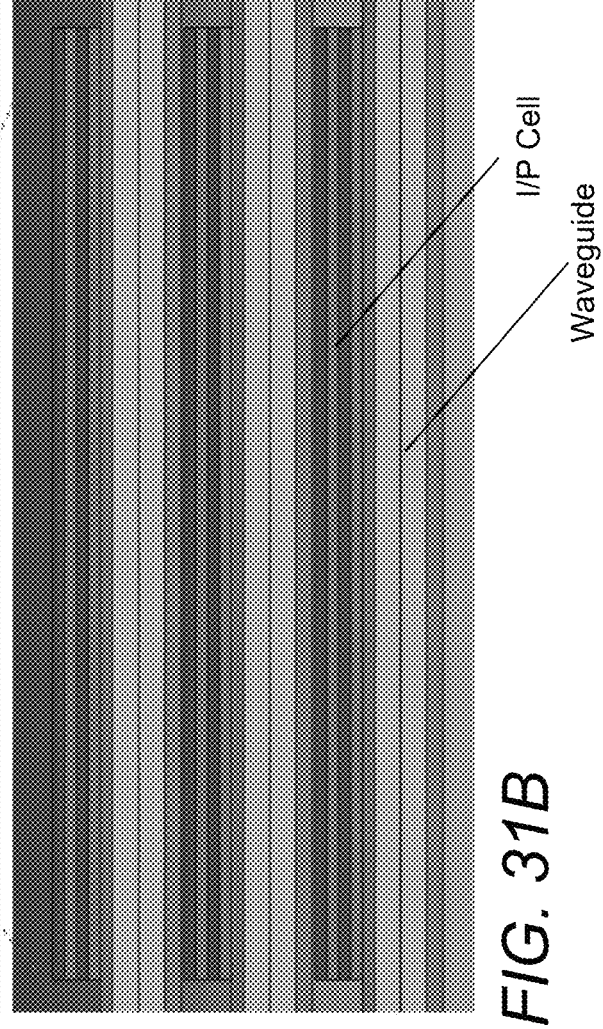

A perspective view of a waveguide assembly incorporating separate input gratings for each waveguide is shown in FIG. 30. A side view of a similar waveguide assembly is shown in FIGS. 31A-31C showing the various layers utilized within the waveguide assembly and their relative thicknesses. The gratings are formed in layers of polymer using techniques similar to those described in U.S. PCT Application Serial No. PCT/GB2012/000680, the relevant disclosure from which is incorporated by reference herein in its entirety. In many embodiments, the polymer layers that contain the waveguides are separated by layers of glass or other appropriate optically transparent material.

Figure 32:
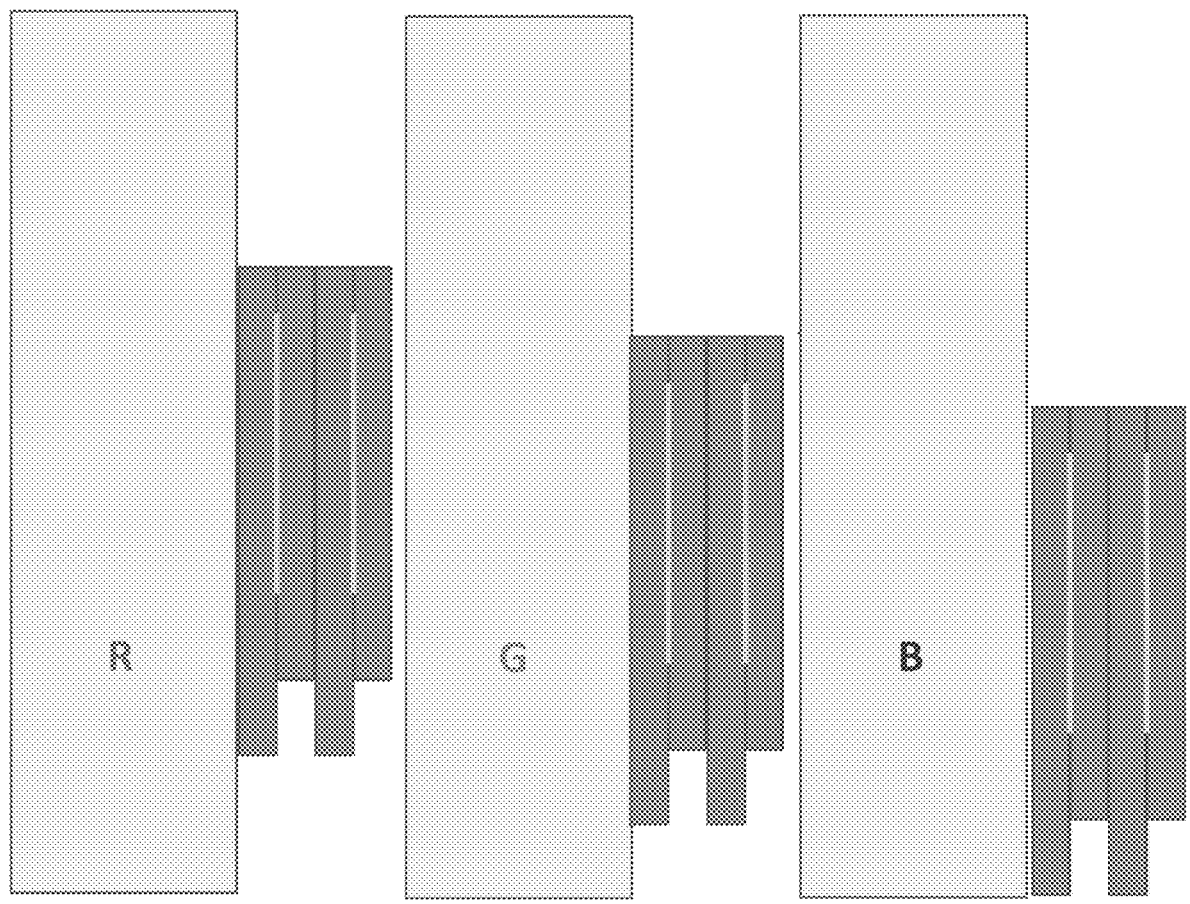
FIG. 32 conceptually illustrates pairs of input coupling gratings positioned adjacent to each of a Red, Green, and Blue waveguide in a waveguide assembly in accordance with an embodiment of the invention.

The input gratings for each of the waveguides can be slightly offset within the waveguide assembly as can be appreciated from the conceptual illustration of the placement of the input gratings relative to the waveguides shown in FIG. 32. The inclusion of the staggered offsets allows for better capture of the transmitted light, which will be diffracted at different angles by the gratings as a result of the different wavelengths of the light being coupled into the waveguide.

Figure 33B:
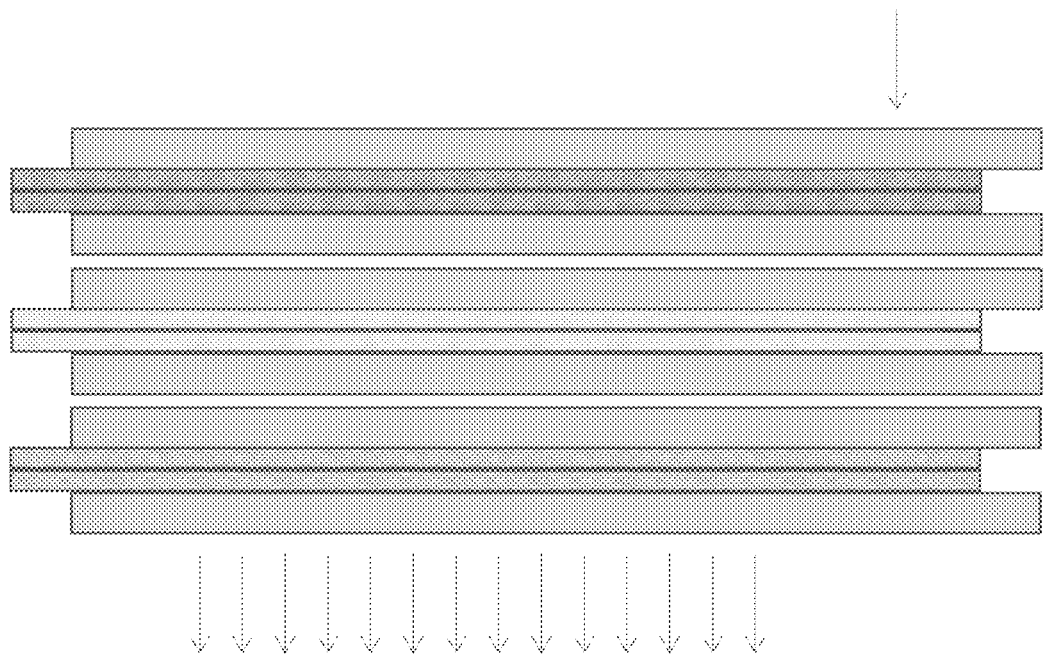
FIG. 33B conceptually illustrates use of waveguides incorporating input, fold, and coupling gratings into a single planar material to construct a waveguide assembly in accordance with an embodiment of the invention.
Figure 33A:
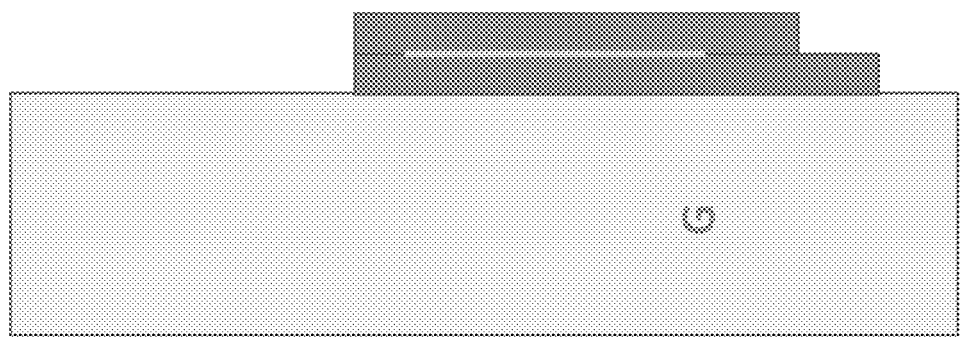
FIG. 33A conceptually illustrates use of a single coupling grating to couple light into a waveguide in accordance with an embodiment of the invention.

While the waveguide assemblies illustrated above in FIGS. 29-32 include multiple input gratings per waveguide, waveguide assemblies in accordance with several embodiments of the invention utilize a single input coupling grating in a manner similar to the configuration shown in FIG. 33A. In several embodiments, the waveguide assembly does not include separate input gratings. Instead, the waveguide can incorporate at least the input, fold, and output gratings in a planar material in a manner similar to that illustrated in FIG. 33B.

Figure 34A:
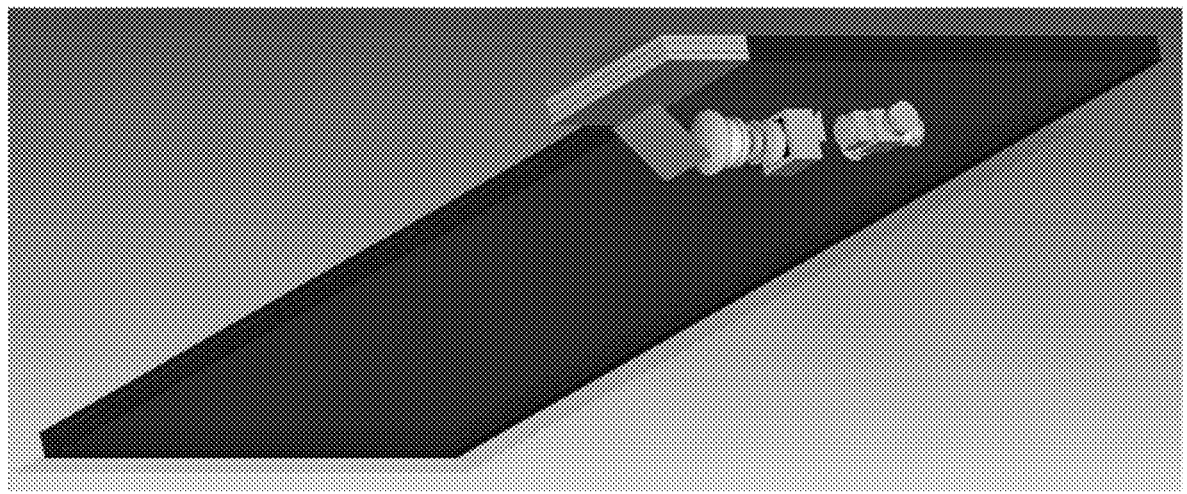
FIGS. 34A and 34B are conceptual illustrations of coupling of light reflected by a reflection surface from a projection system into input gratings of a waveguide assembly in accordance with an embodiment of the invention.
Figure 34B:
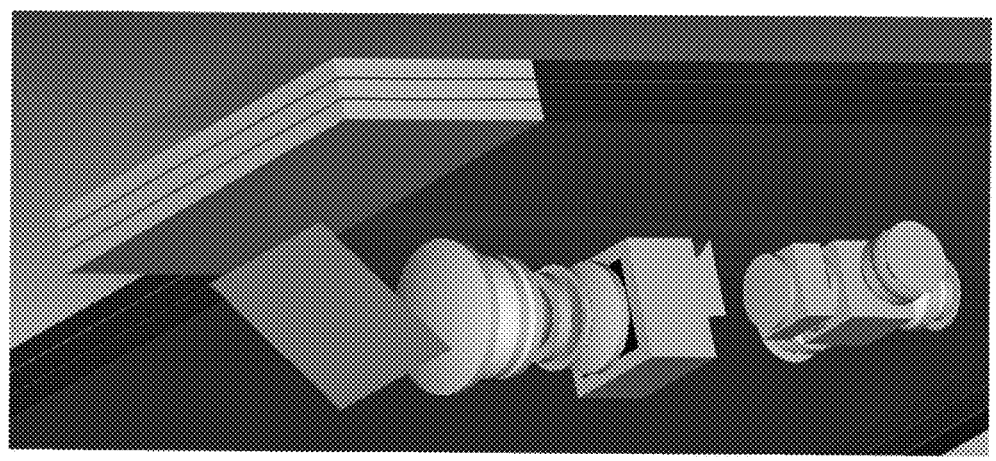

Coupling of light from a projection system into input gratings of a waveguide assembly in accordance with an embodiment of the invention is conceptually illustrated in FIGS. 34A and 34B. The projector directs light toward a mirror that reflects the light into the input gratings. In other embodiments, the projector can directly project light into the input gratings, and/or a waveguide can be utilized to direct light from the projection system into the input gratings.

Fold and Output Gratings

Referring again to FIG. 29, each waveguide in the waveguide assembly includes a fold grating designed for the specific bandwidth of light coupled into the waveguide by the input coupling gratings. The fold and output gratings together provide two dimensional pupil expansion of the light coupled into the waveguide.

Figure 35:
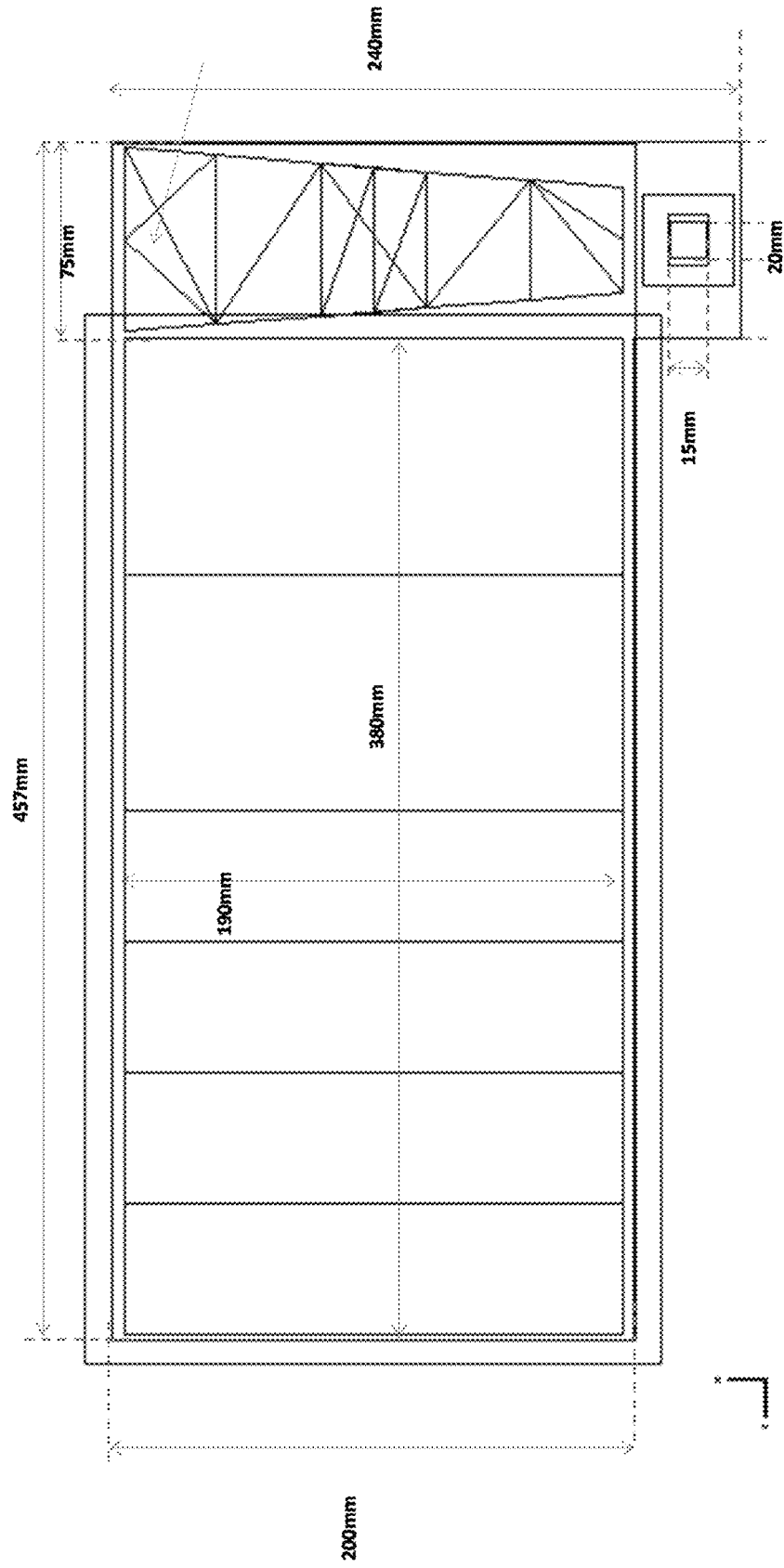
FIG. 35 is a schematic diagram of a waveguide in accordance with an embodiment of the invention.
Figure 36:
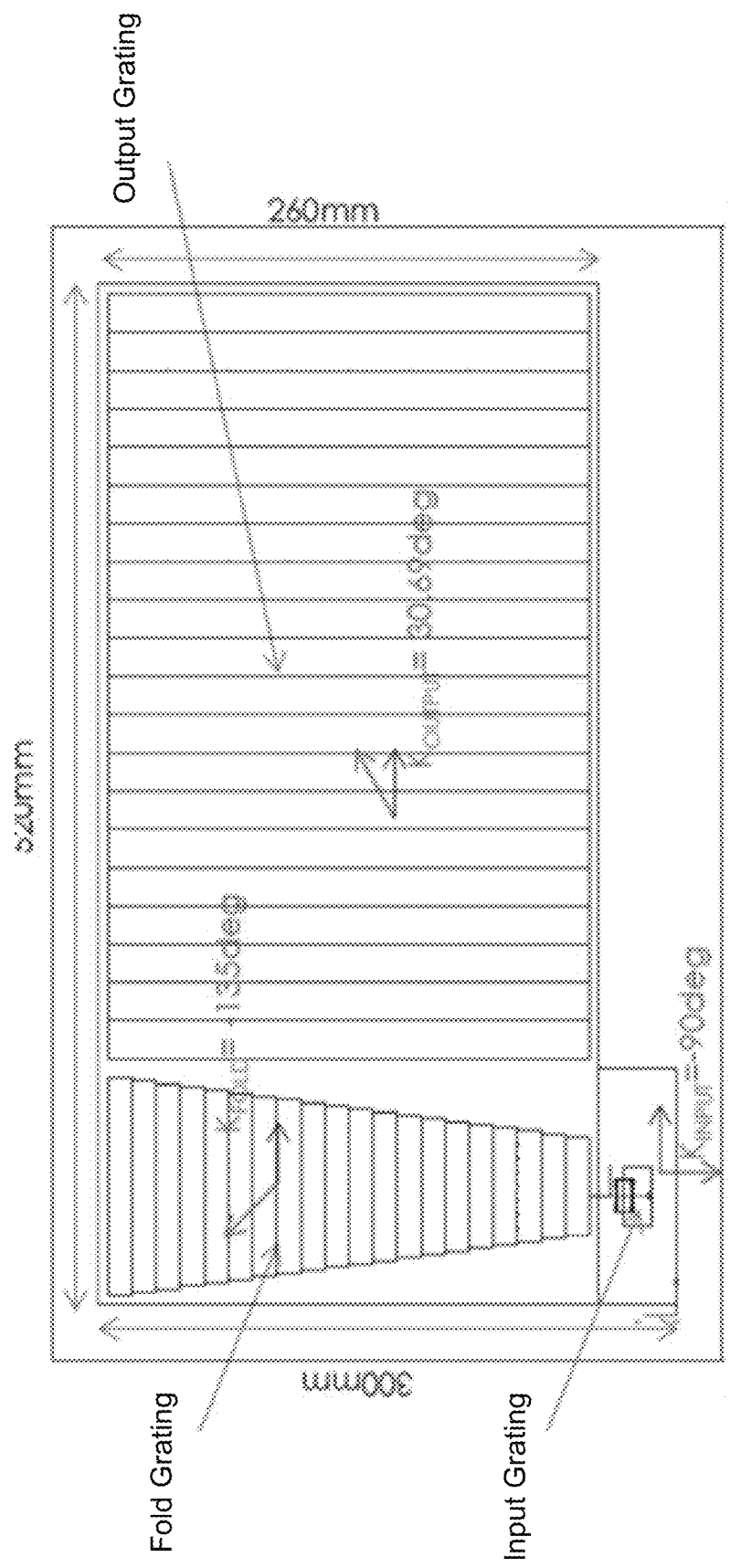
FIG. 36 conceptually illustrates K-vector prescriptions for gratings in a waveguide implemented in accordance with an embodiment of the invention.

The dimensions of the fold and output gratings of a waveguide that can be utilized in a vehicular HUD in accordance with an embodiment of the invention is illustrated in FIG. 35. In the illustrated embodiment, the gratings support a 15×5 degree field of view using an output grating having an aperture size of 380 mm×190 mm at a 1 meter relief from the eyebox (reflected via a curved windshield). As is discussed further below modification of the K-vector and/or slant angle across one or more of the fold and/or output gratings can increase the homogeneity of the display generated by the HUD within an eyebox region. Specific K-vectors that can be utilized within a waveguide in accordance with an embodiment of the invention are illustrated in FIG. 36. The K-vector shown for the fold grating can be varied to modify diffraction efficiency across the grating with the goal of attaining homogeneity of the projected display across the light box. The K-vector and/or the slant angle of the grating can be similarly modified across the output grating to achieve desired characteristics of the HUD system including (but not limited to) increased homogeneity. Furthermore, the K-vector can be modified using a correction function that accounts for distortion introduced by reflection off a curved surface such as (but not limited to) a windshield.

Figure 37A:
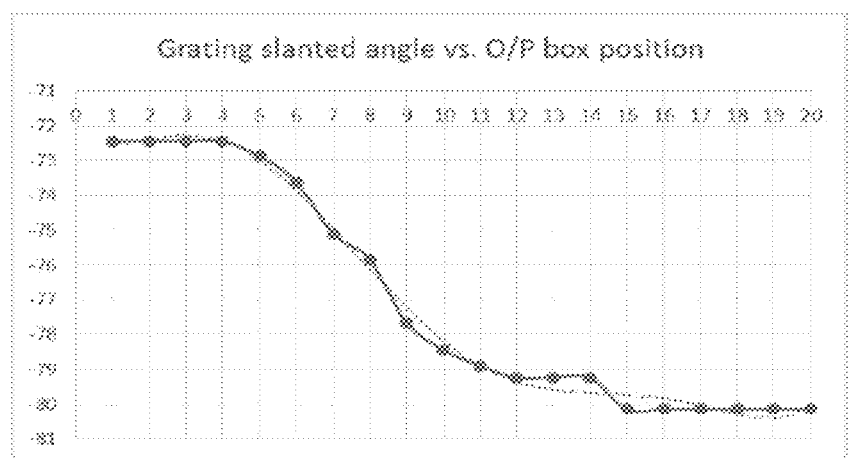
FIGS. 37A and 37B conceptually illustrate the manner in which modifying slant angle to increase diffraction efficiency can compensate for decrease in coupling efficiency across an output grating in accordance with an embodiment of the invention.
Figure 37B:
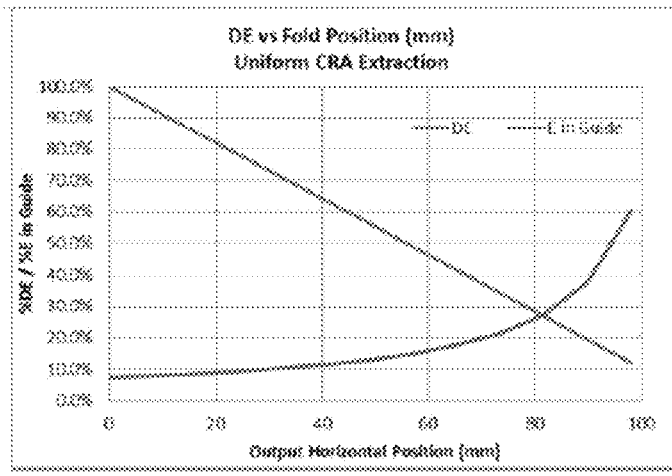

Impact of varying output grating slant angle in the manner shown in FIG. 37A upon output power for different field angles can be appreciated from FIG. 37B. FIG. 37B illustrates the extent to which the energy coupled into the waveguide decreases across the output grating. FIG. 37B also illustrates that modification of the slant angle of the output grating can increase diffraction efficiency across the waveguide to compensate for the decrease in energy. As can readily be appreciated, the manner in which slant angle can be modified across the output grating (and/or any other gratings within a waveguide) can largely be determined based upon the desired output characteristics of a given HUD system.

Figure 38A:
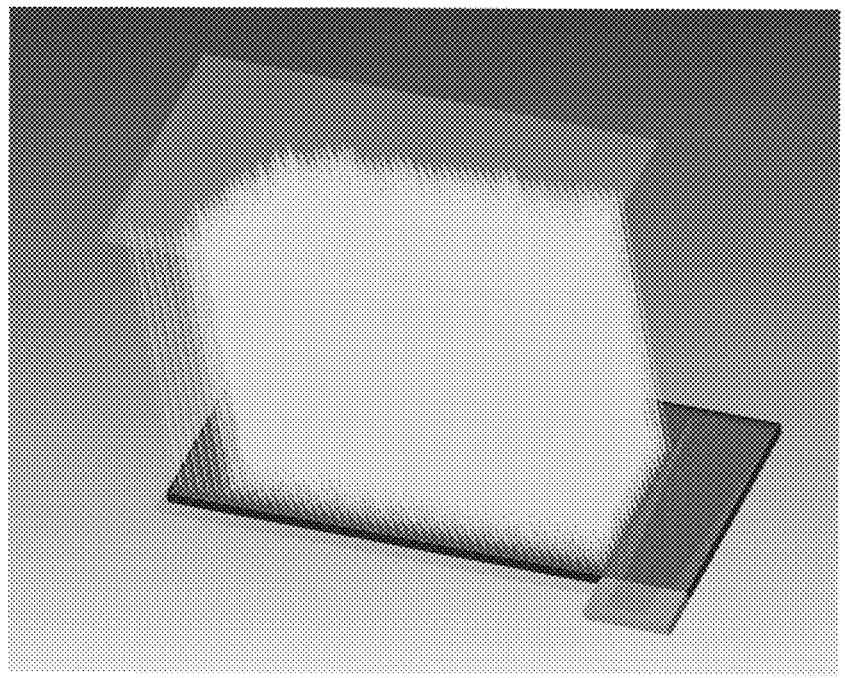
FIGS. 38A and 38B are conceptual illustrations of projection of light by a waveguide in accordance with an embodiment of the invention.
Figure 38B:
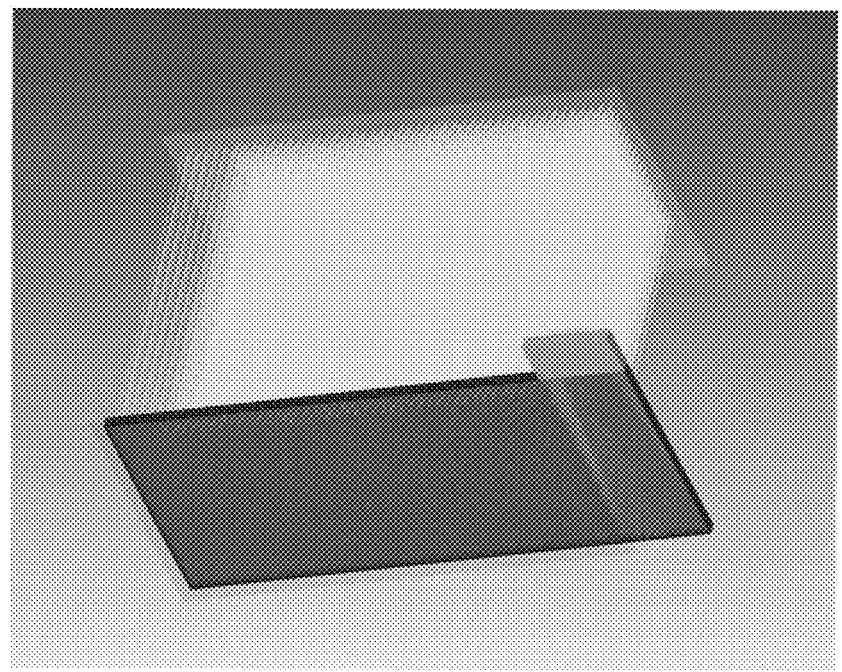
Figure 39:
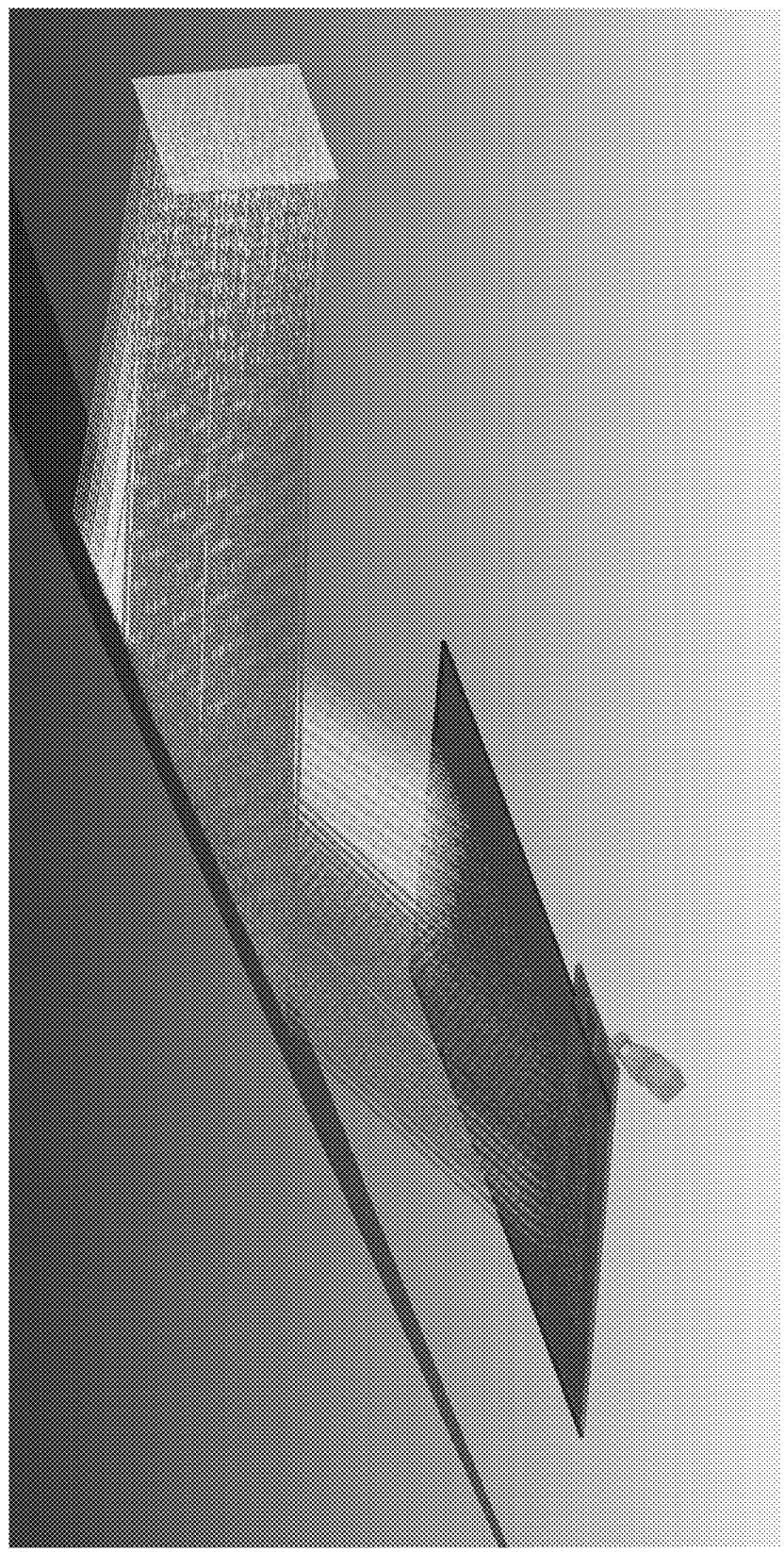
FIG. 39 is a conceptual illustration of reflection of light projected by a waveguide assembly off a windshield in accordance with an embodiment of the invention.

HUD systems in accordance with several embodiments of the invention reflect light off a curved surface such as (but not limited to a windshield). Projection of light by a waveguide similar to the waveguide shown in FIG. 29 is conceptually illustrated in FIGS. 38A and 38B. The manner in which projected light can be reflected off a surface into an eyebox region in which a viewer can see the display across a field of view is conceptually illustrated in FIG. 39. The ability of the output grating to diffract light across the grating into the eyebox increases the field of view of the display. As noted above, the field of view of the display can be increased by adding additional waveguides that project light into eyebox region across a wider field of view. The field of view into which light can be projected is typically limited by the HUD form factor requirements of a given application.

Figures 40A, 40B, 40C:
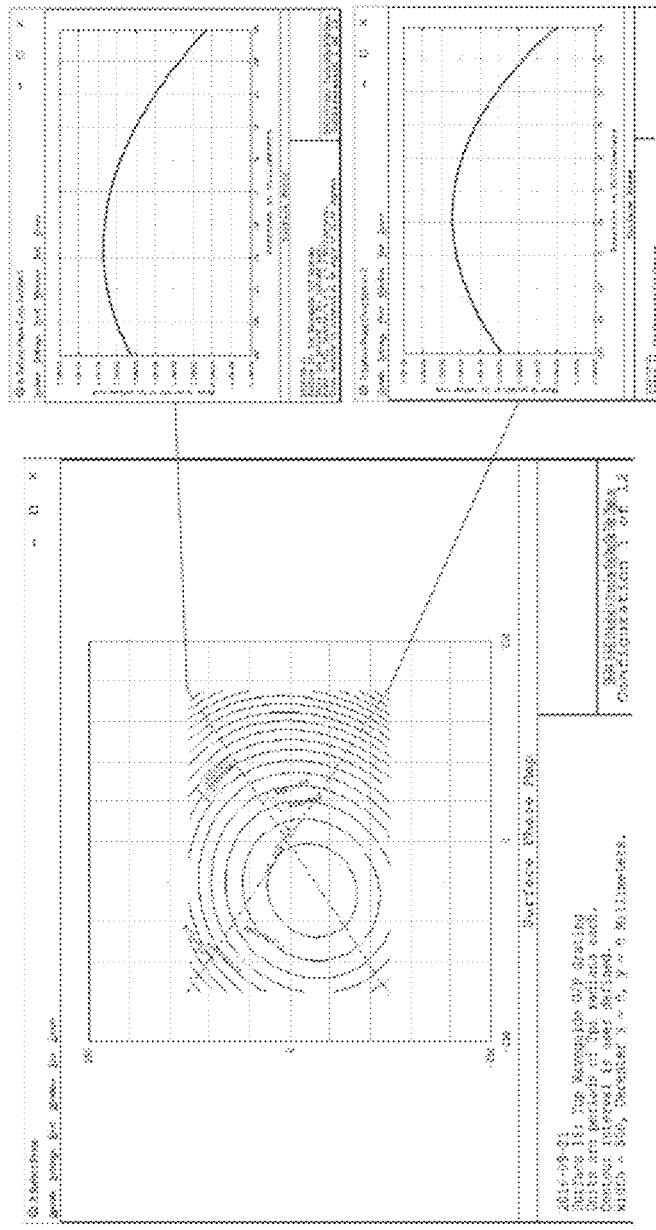
FIGS. 40A-40C conceptually illustrate corrections that can be applied to a rolled K-vector prescription for an output grating to correct for distortions introduced by a curved windshield in accordance with an embodiment of the invention.
Figure 41A:
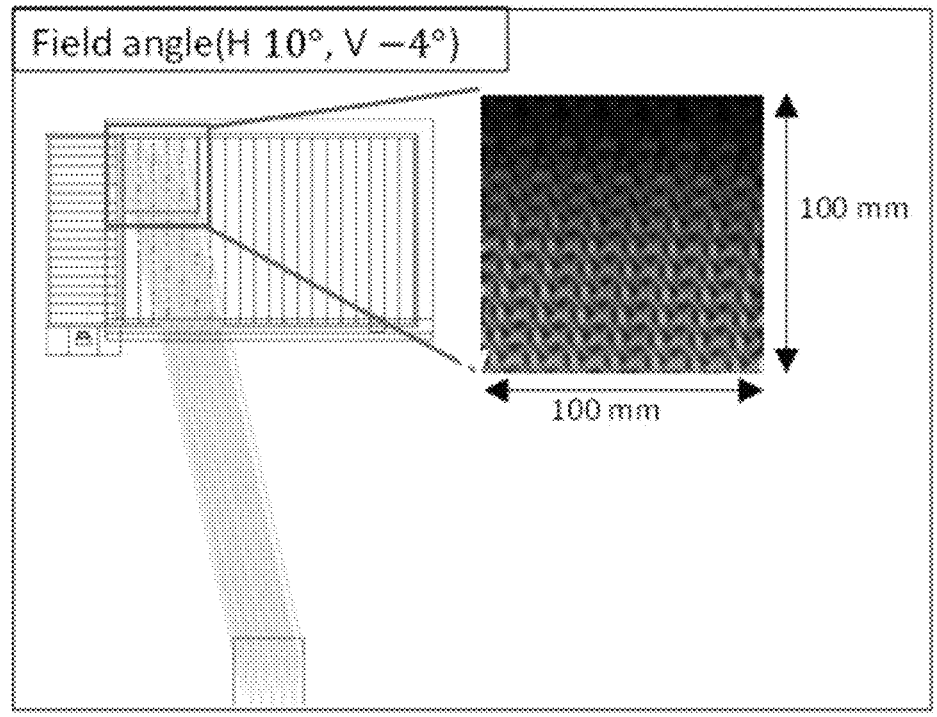
FIG. 41A-41E conceptually illustrates simulations showing the impact of a fold grating of a waveguide upon vignetting in accordance with an embodiment of the invention.
Figure 41B:
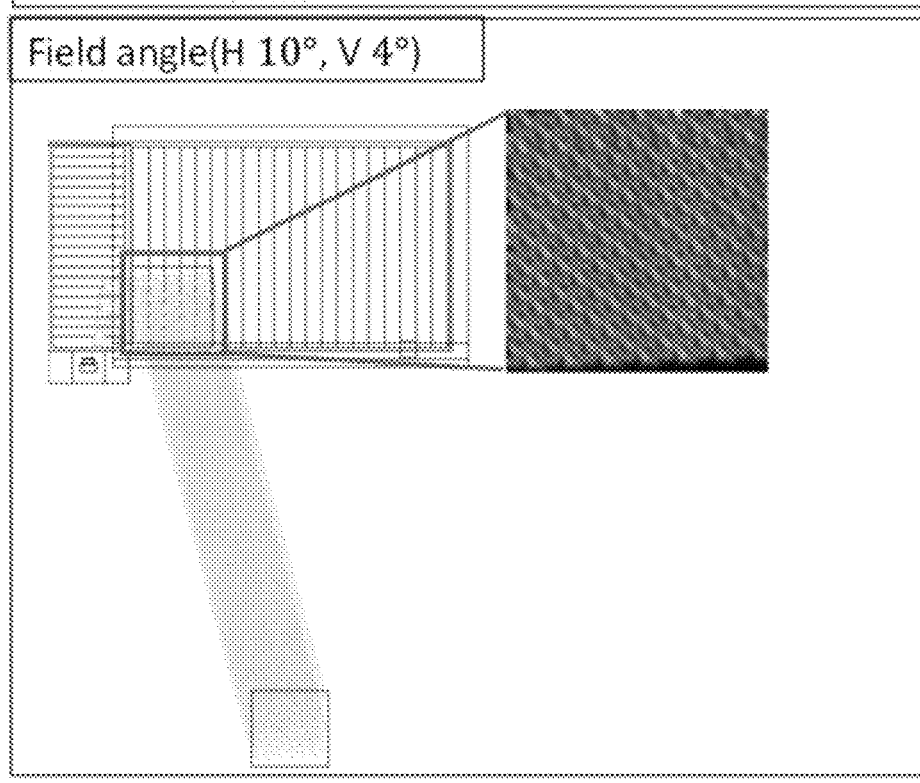
Figure 41C:
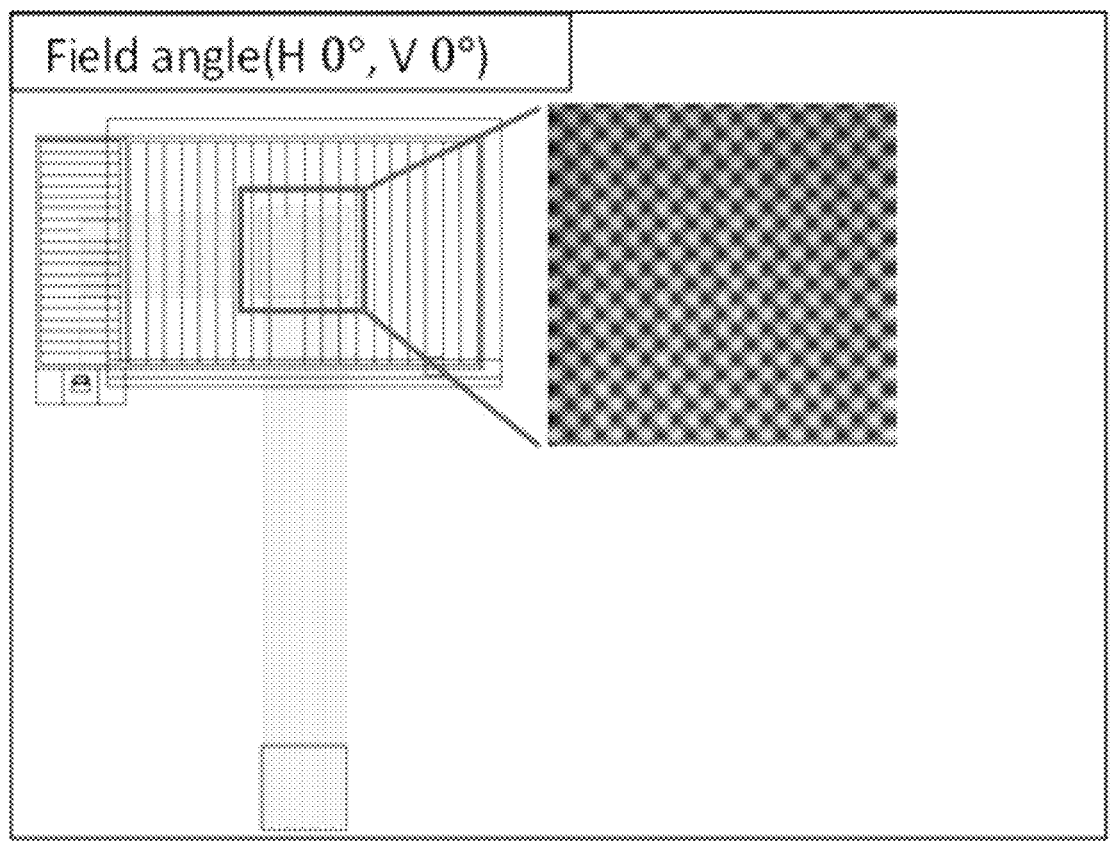
Figure 41D:
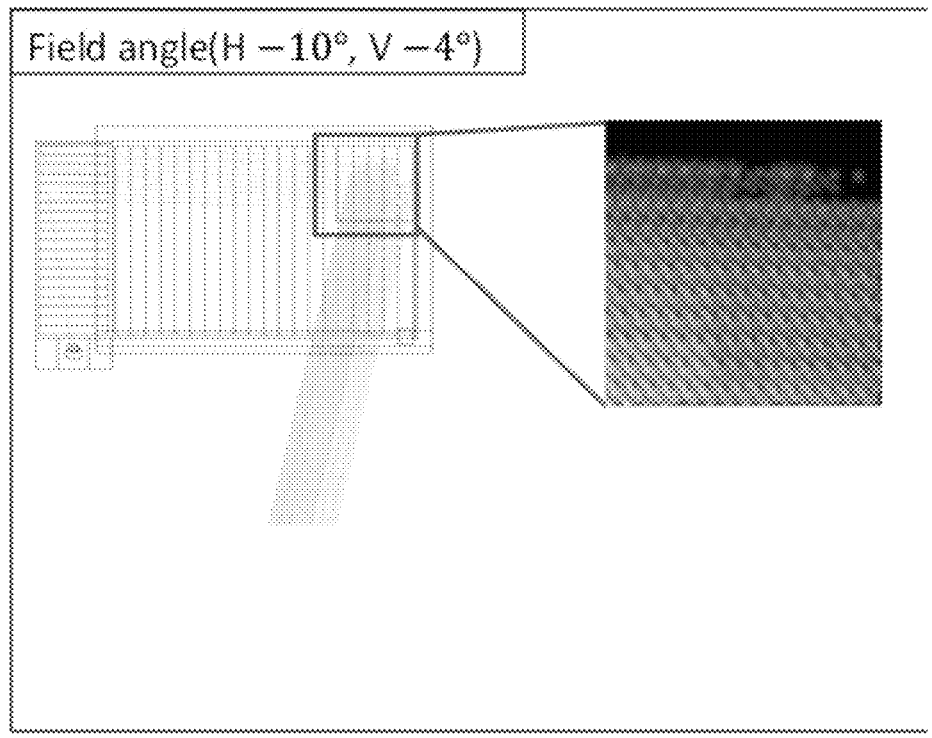
Figure 41E:
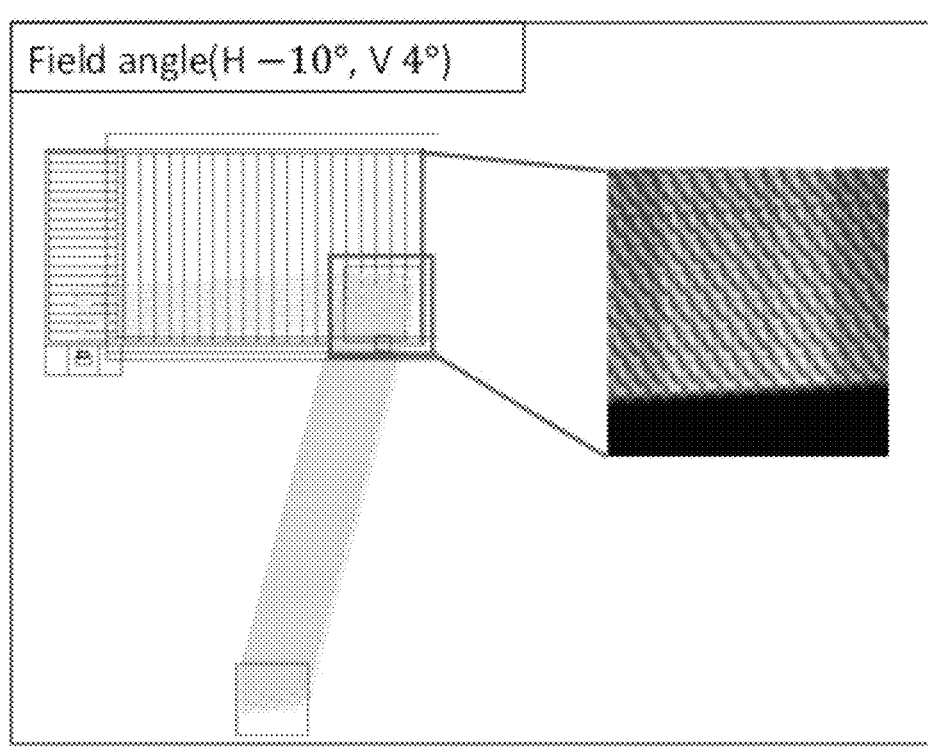
Figure 42A:
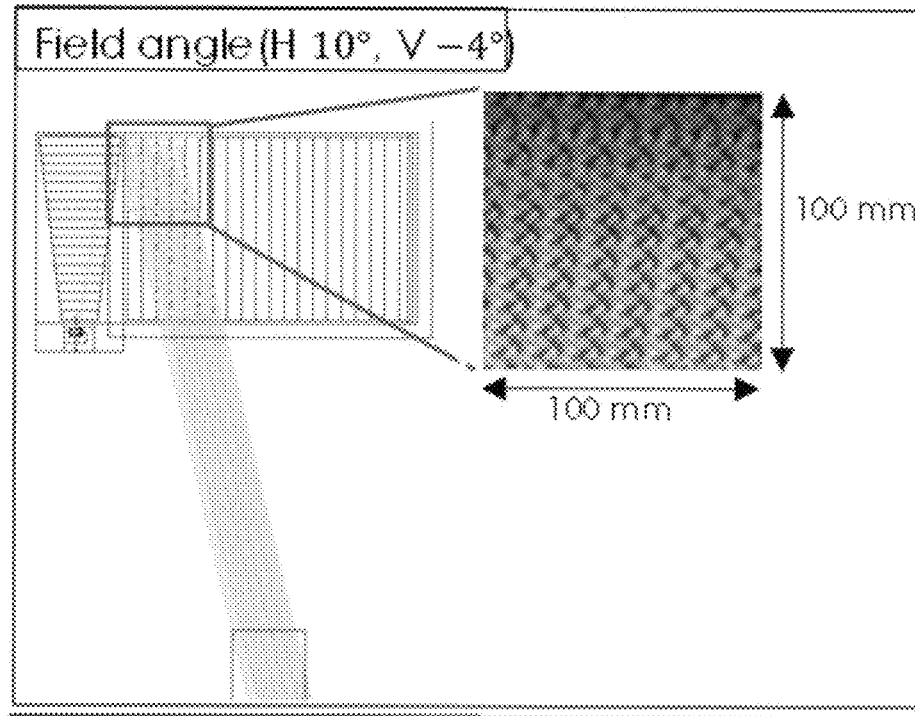
FIG. 42A-42E conceptually illustrates simulations showing reduction of vignetting in accordance with an embodiment of the invention.
Figure 42B:
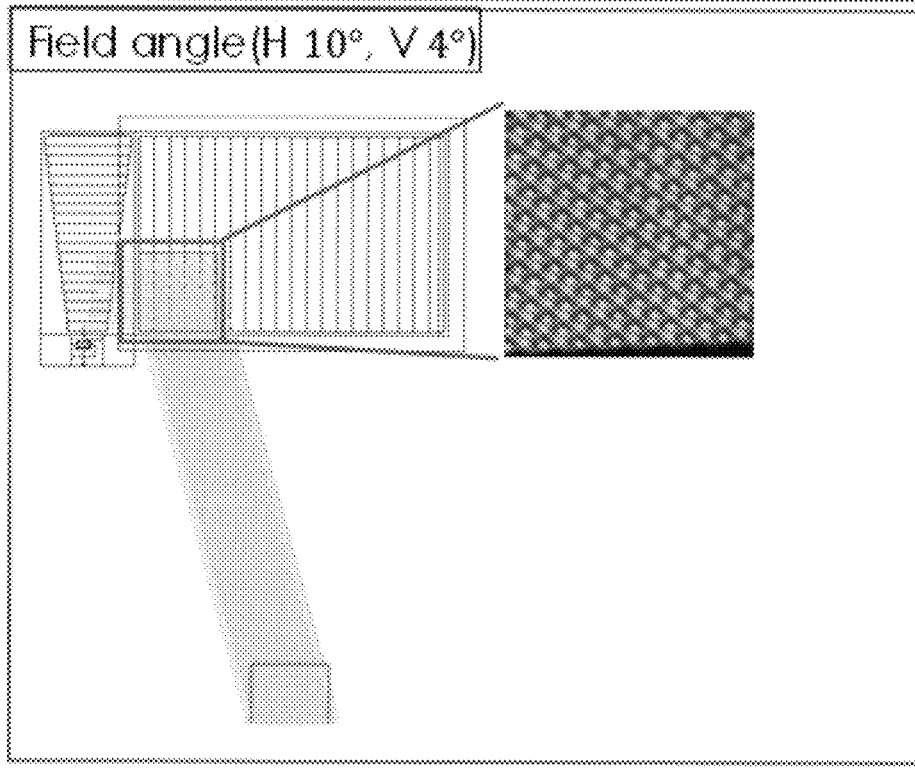
Figure 42C:
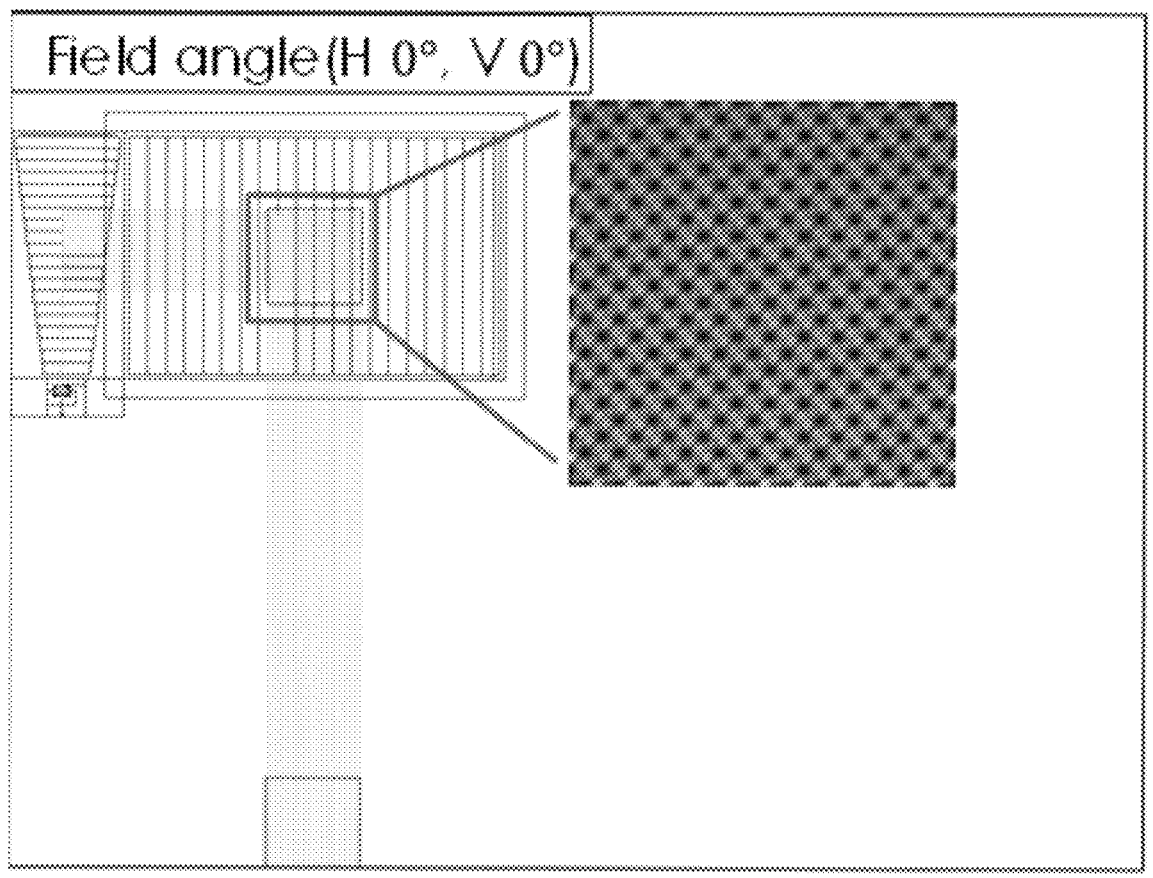
Figure 42D:
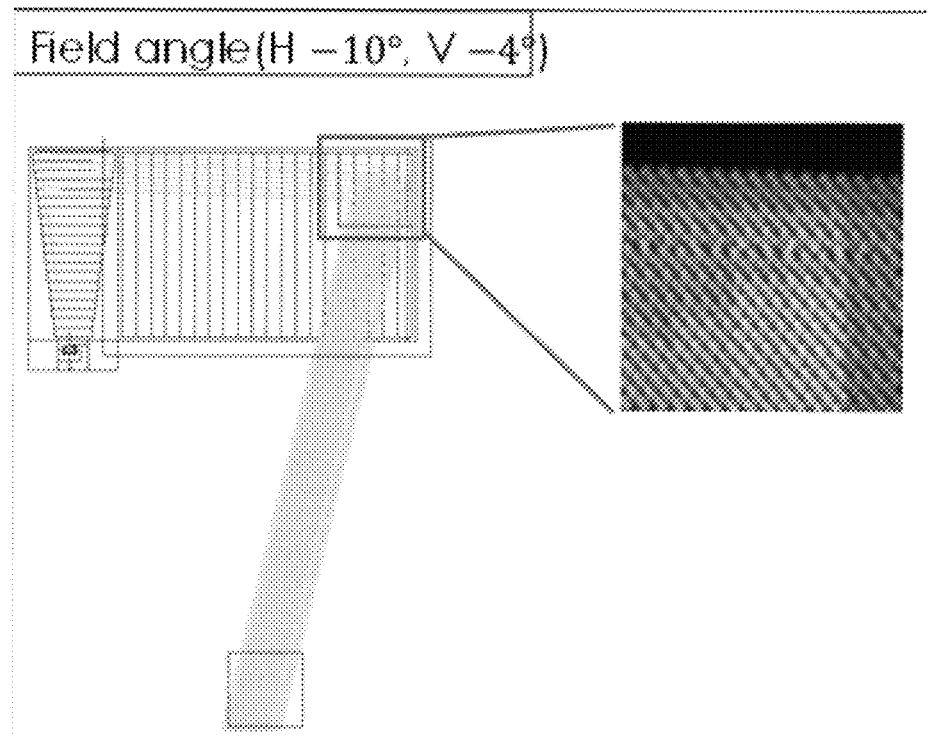
Figure 42E:
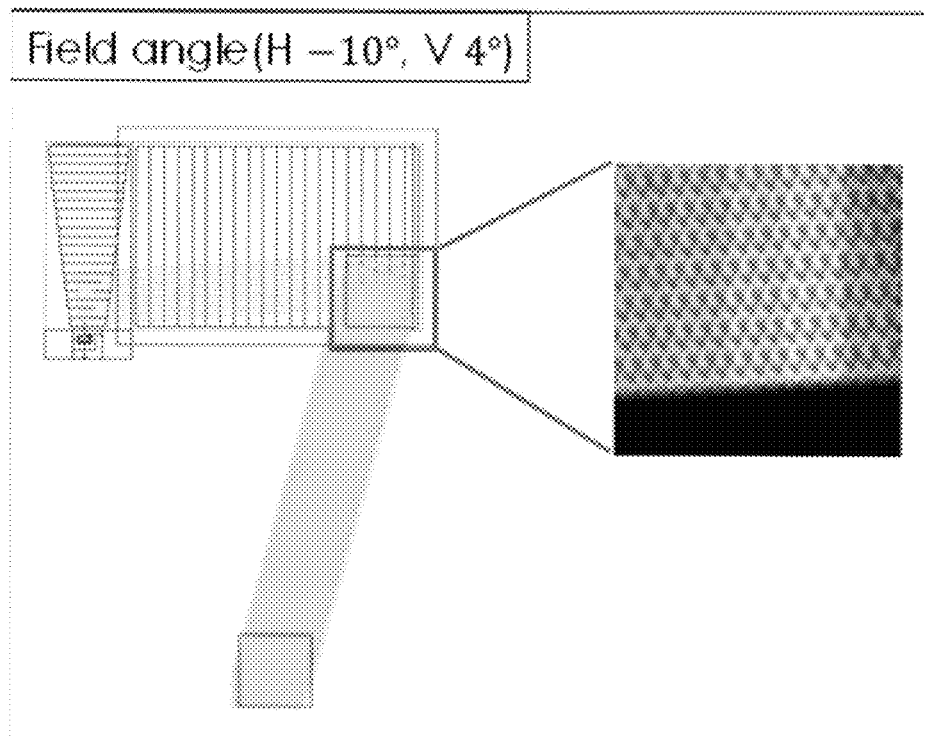

As noted above, the K-vectors and slant angles of the fringes within an output Bragg grating can be chosen to correct for curvature of the surface onto which the display is projected by the output grating. A windshield correction function that is utilized to modify the rolled K-vector prescription of an output grating in accordance with an embodiment of the invention is illustrated in FIGS. 40A-40C. The effect of the correction function is to cause the output grating to modify the projected light so that light reflected from the specific curved surface used to derive the correction function will appear undistorted within the eyebox region of the HUD system. As can readily be appreciated, the specific manner in which the K-vector and/or slant angle of a grating is modified across a waveguide to accommodate curvature of a windshield and/or other surface upon which light is projected is largely dependent upon the requirements of a given application.

Referring again to FIG. 29, the path length for light projected into the eyebox from each of the three waveguides have different path lengths and wavelengths. Accordingly, the gratings in each of the waveguides in a waveguide assembly are separately configured for each color channel. While specific waveguide configurations incorporating specific grating implementations are described above, any of a variety of Bragg grating combinations can be utilized within waveguides including (but not limited to) multiplexed K-vector gratings, gratings that include varying slant angles and/or gratings that are electronically switchable as appropriate to the requirements of a given application in accordance with various embodiments of the invention.

Addressing Vignetting Through Fold Grating Design

Figure 43:
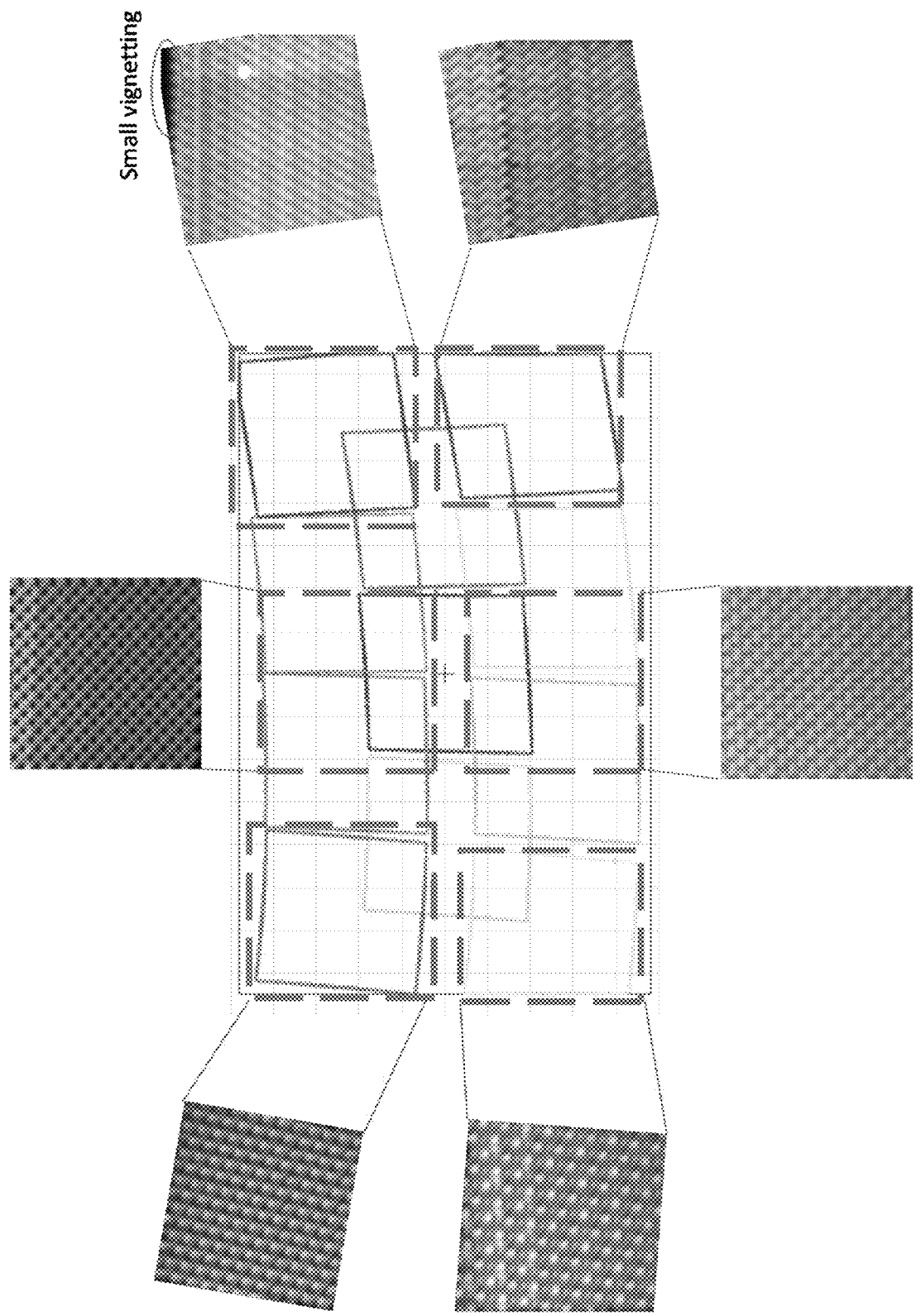
FIG. 43 conceptually illustrates simulations showing vignetting across an eyebox of a HUD that reflects light projected from a waveguide assembly off a surface in accordance with an embodiment of the invention.

Referring again to FIG. 35, the width of the fold grating increases with distance from the input coupling grating. Increasing the width of the fold grating can address vignetting. The term vignetting is commonly used to refer to a reduction of an image's brightness or saturation toward the periphery compared to the image center. The roll that the fold grating can play with respect to the unwanted introduction of vignetting within a display produced by a HUD system can be readily appreciated with respect to the simulations illustrated in FIG. 41A-41E. The region of the fold grating closest to the input grating can introduce cropping and the region of the fold grating furthest from the input grating can introduce vignetting. The artifacts introduced by the fold grating are significantly reduced in the simulation illustrated in FIG. 42A-42E. In the simulation illustrated in FIG. 46, the fold grating is designed to increase in width with increased distance from the input grating. The result is a significant reduction in vignetting. The impact of utilizing a fold grating similar to the grating shown in FIG. 42A-42E on vignetting across the eyebox of a HUD in accordance with an embodiment of the invention can be appreciated from the simulation shown in FIG. 43. In many embodiments, the input grating is slightly offset from the center line of the fold grating in a direction away from the output grating to further improve the output performance of the HUD system.

Figure 44:
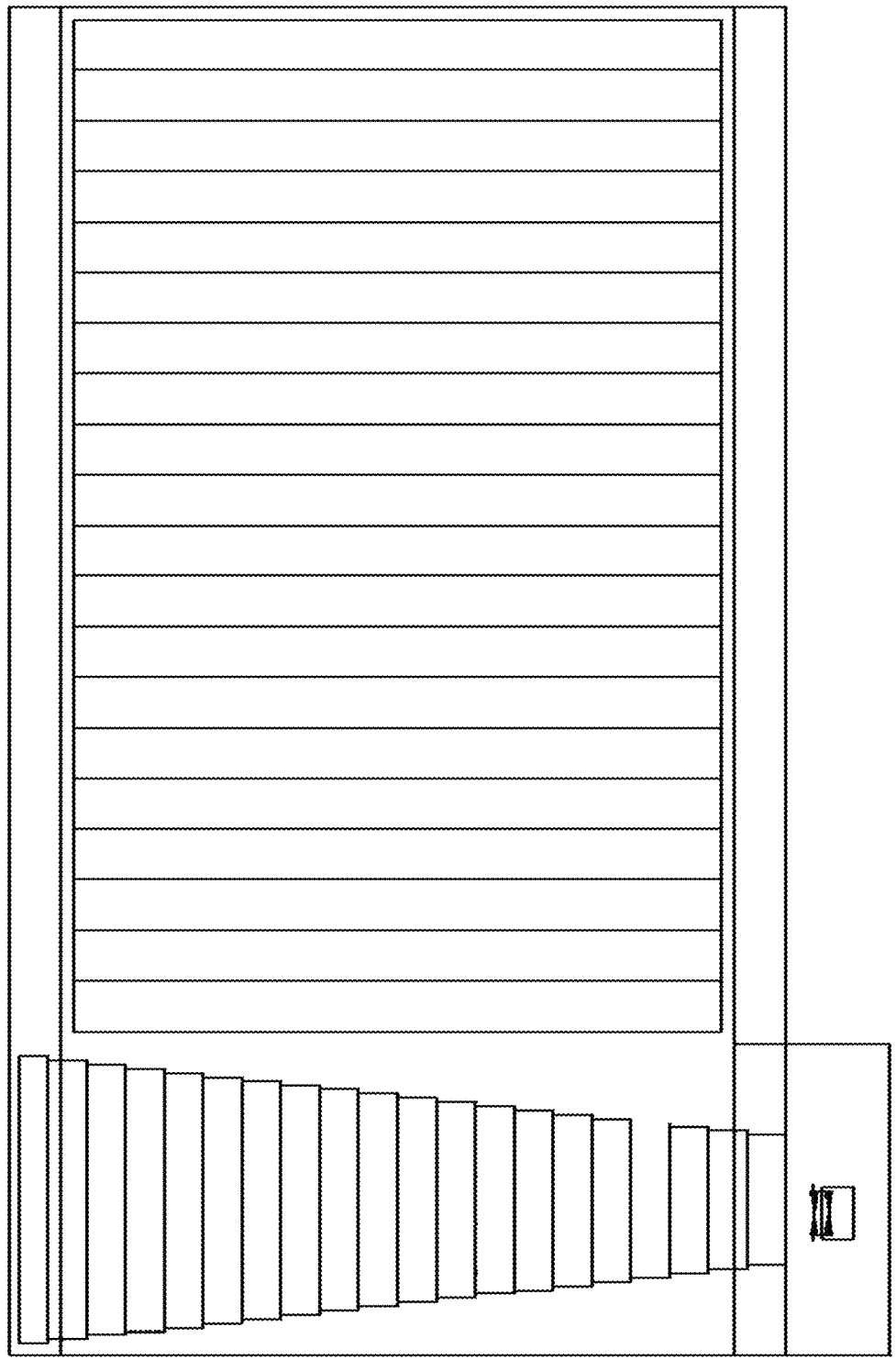
FIG. 44 conceptually illustrates a waveguide that can be cut with a tapered outline in accordance with an embodiment of the invention.

In many embodiments, incorporation of a fold grating that increases in width with distance from the input grating can enable the construction of a variety of waveguide shapes. Many of the waveguides illustrated above are largely rectangular. In many embodiments, the form factor of the waveguide can be reduced. A waveguide in which the output grating is contained within a region that can be cut with a taper (indicated with dashed lines) in accordance with an embodiment of the invention is illustrated in FIG. 44. As can readily be appreciated, any of a variety of shapes for waveguides can be utilized as appropriate to the requirements of specific applications in accordance with various embodiments of the invention.

HUD Projection Systems

Figure 45:
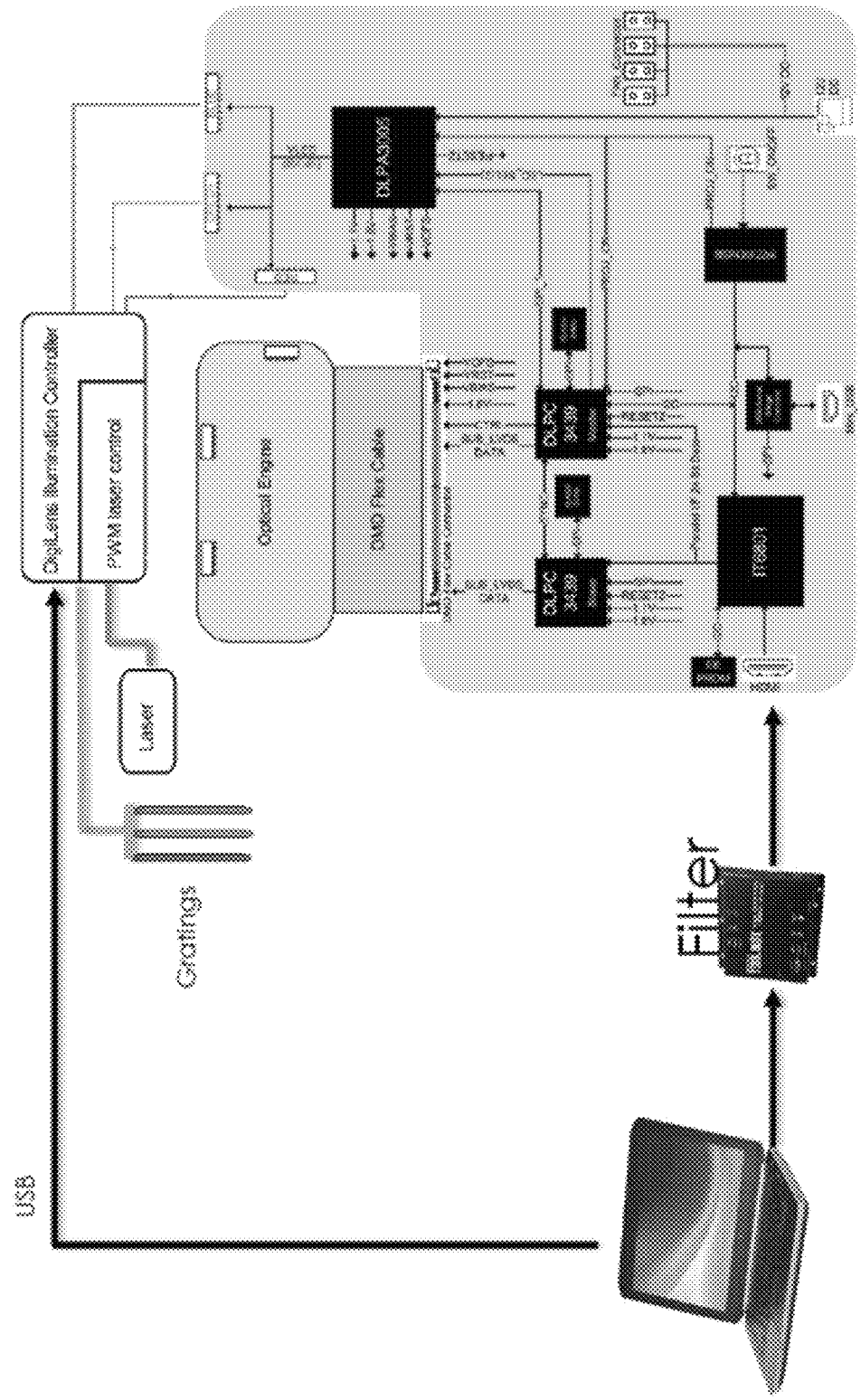
FIG. 45 is a conceptual illustration of a HUD system in accordance with an embodiment of the invention.

A variety of illumination sources can be utilized to implement HUDs in accordance with various embodiments of the invention including (but not limited to) LED based and laser based projection systems. A HUD projection system that couples Red, Green, and Blue laser pulses into the respective Red, Green, and Blue waveguides of a waveguide assembly in accordance with an embodiment of the invention is conceptually illustrated in FIG. 45.

Although specific projection systems are described above with reference to FIG. 45, any of a variety of projection systems can be utilized to generate light that can be coupled into one or more waveguides within a waveguide assembly of a HUD in accordance with the requirements of specific applications in accordance with various embodiments of the invention.

Monocular Displays

Figure 46A:
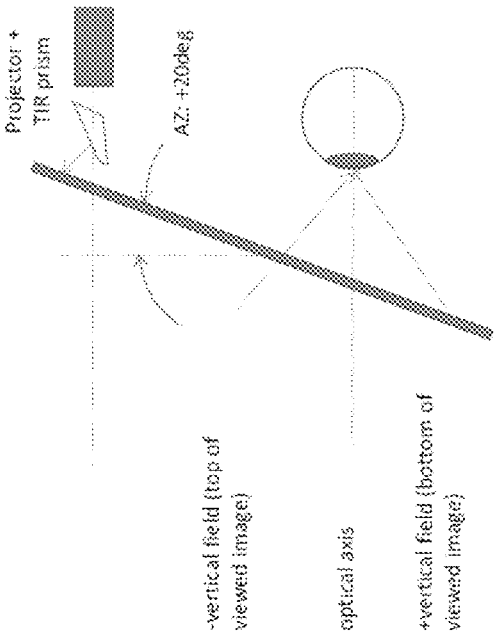
FIGS. 46A and 46B conceptually illustrate the positioning of various components in a monocular display in accordance with an embodiment of the invention.
Figure 46B:
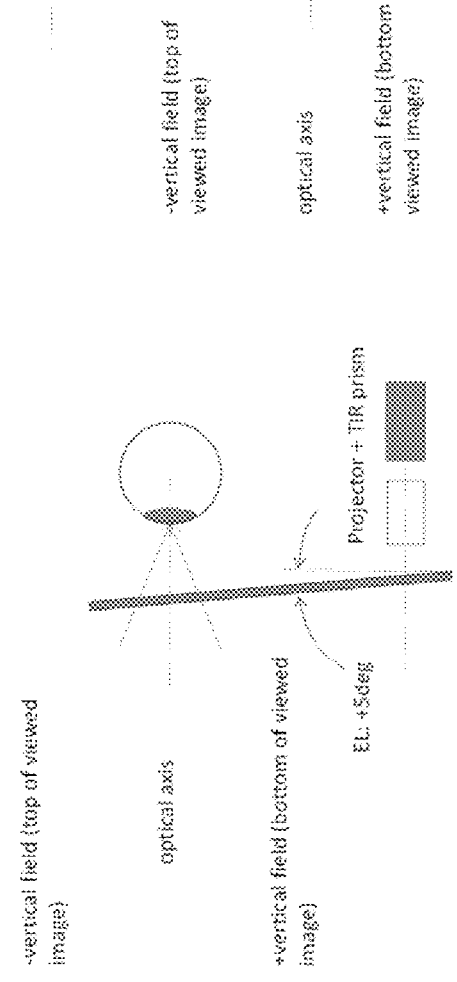

Waveguides incorporating Bragg gratings similar to those described above can be utilized in a variety of applications, such as but not limited to monocular displays. Monocular displays can be implemented in a variety of different ways, including through the use of methods, components, and structures as described above. Additionally, it should be readily apparent that various aspects can be modified as appropriate to the specific requirements of a given application. For example, in many embodiments, it can be desirable for the monocular display to have an optical element that can facilitate the redirection of light from the light source onto the waveguide. This can be due to the spatial and angle positioning of the various components. In a number of embodiments, the monocular display is designed to be compact, resulting in forced positioning for the various components. An optical element used for redirecting light in such embodiments can include, but are not limited to, a prism. In several embodiments, a prism is used for PGU coupling and TIR redirection. FIGS. 46A and 46B conceptually illustrate the positioning of various components in a monocular display in accordance with an embodiment of the invention. FIG. 46A shows a side view of the monocular display along with the position of a user's right eye, and FIG. 46B shows a top view of the same system. As shown, the system includes a projector and a TIR prism for manipulating the light before it enters the waveguide. FIGS. 46A and 46B also depict angle conventions with regards to elevation and azimuth angles, shown by arrows calling out the angular position of the waveguide with respect to a certain axis. Although FIGS. 46A and 46B illustrates a specific monocular display system with specific elevation and azimuth angles, it is readily apparent that these angles can vary across various embodiments of the invention and can depend on the specific requirements of a given application.

Figure 47:
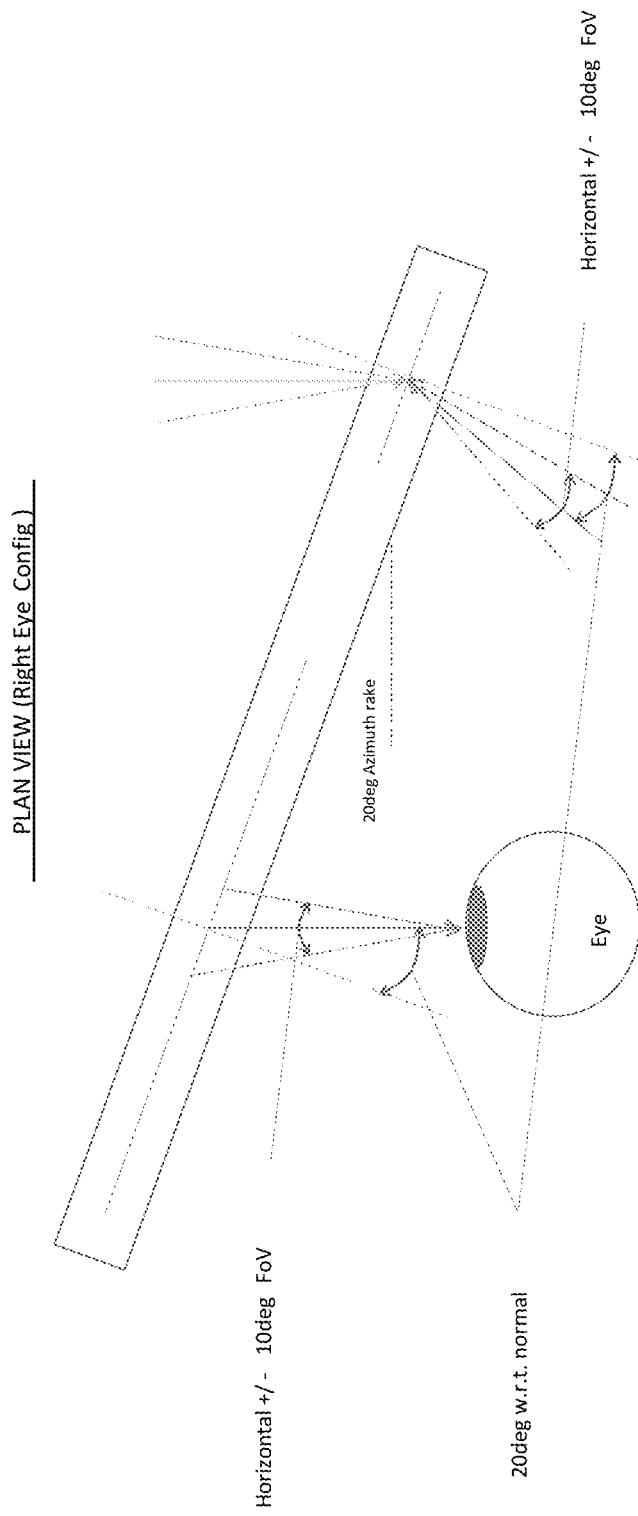
FIG. 47 conceptually illustrates a monocular display with a reverse reciprocal arrangement in accordance with an embodiment of the invention.

In many embodiments, the monocular display includes a waveguide implementing at least an input grating, a fold grating, and an output grating. In some embodiments, the waveguide includes reciprocal grating prescriptions designed for zero-dispersion. Monocular displays can be designed to implement a variety of different types of gratings, including those described in the previous sections of this application. Positioning and orientation of the gratings can depend on the specific requirements of a given application. For example, in several embodiments, the gratings are designed such that the monocular display can implement a reverse reciprocal dual axis pupil expansion architecture where the waveguide receives and outputs light from the same side. FIG. 47 conceptually illustrates a monocular display with a reverse reciprocal arrangement in accordance with an embodiment with the invention. As shown, the input and output of light occurs on the same side of the waveguide. In some embodiments, the slant angles of the input and output gratings are reversed in order to implement reverse reciprocity. In further embodiments, the slant angles are equivalent, but reversed. This reverse reciprocity property can be implemented in both 1-axis and 2-axis expansion waveguides. Although FIG. 47 illustrates a specific monocular display implementation, reverse reciprocity can be implemented in a number of different monocular displays. For example, monocular displays with different azimuth rake angles can also implement reverse reciprocity. As can readily be appreciated, the specific design of a particular monocular display can depend on the specific requirements of a given application.

Figure 48:
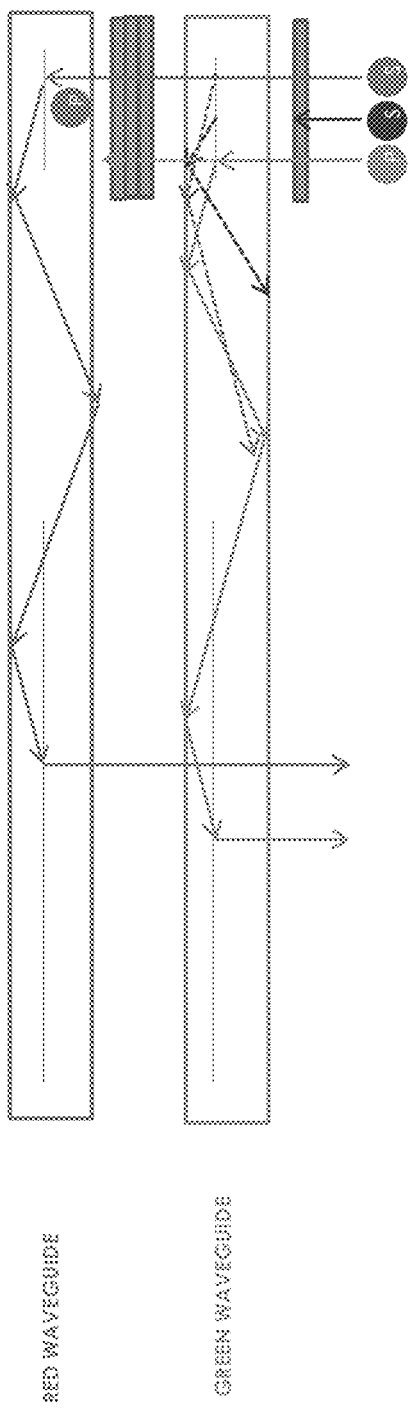
FIG. 48 conceptually illustrates a profile view of an exploded two—waveguide stack in accordance with an embodiment of the invention.
Figure 49:
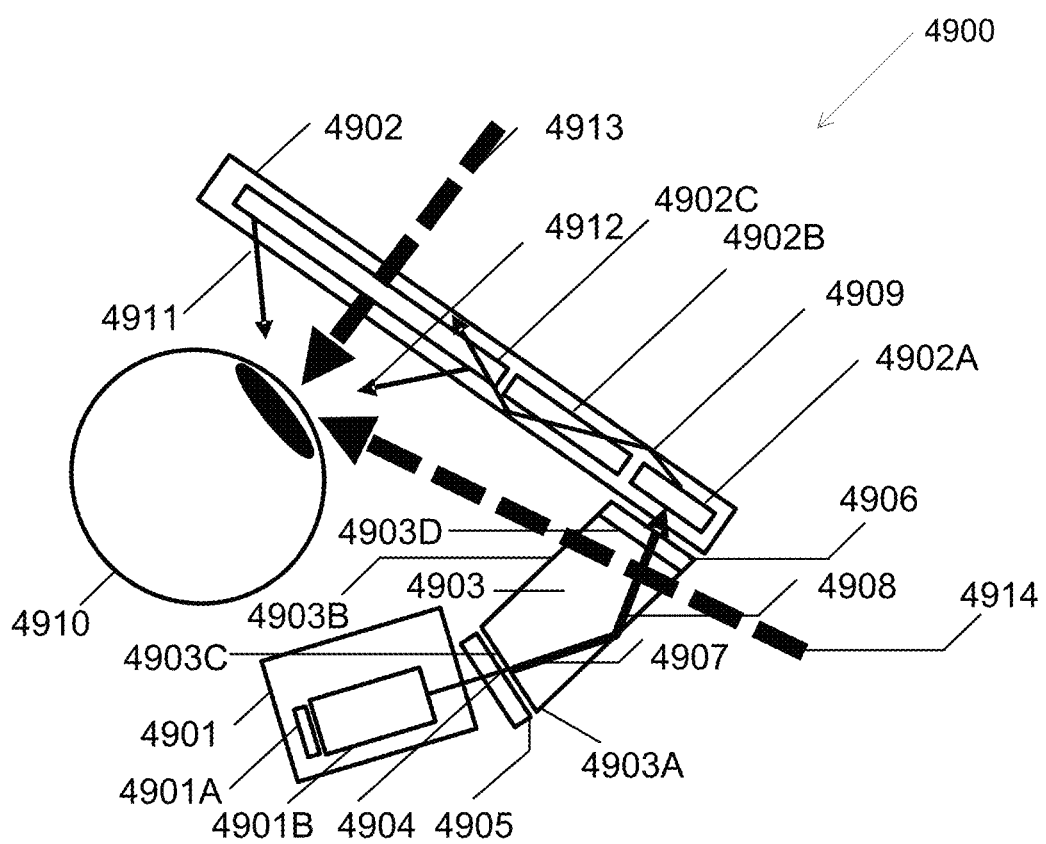
FIG. 49 conceptually illustrates a monocular display utilizing a prism and IIN module in accordance with an embodiment of the invention.

Monocular displays can be implemented using waveguides with properties described above, such as, and including, stacking waveguide layers in order to implement RGB color. As such, in many embodiments, the implemented waveguide can be made up of a stack of waveguide layers. In further embodiments, the waveguide stack includes two waveguide layers implementing a three-color system. FIG. 48 conceptually illustrates such a stack. In other embodiments, the waveguide stack includes three waveguide layers implementing a three-color system. In several embodiments, the waveguide includes dichroic filters for inter-waveguide color management In many embodiments, the monocular display includes a compact PGU optical interface. In some embodiments, the monocular display utilizes a projector as a PGU. In several embodiments, the PGU can be an IIN module composed of several components. FIG. 49 conceptually illustrates a monocular display utilizing a prism and IIN module in accordance with an embodiment of the invention. In the illustrative embodiment, the monocular display 4900 includes an IIN module 4901, a waveguide eyepiece 4902, and prismatic relay optics 4903. In many embodiments, the IIN contains at least the microdisplay panel 4901A illuminated by a light source, which is not shown, and projection optics 4904, which typically includes refractive optics. The IIN module can be coupled to the prismatic relay optics by a mechanical assembly 4905 which provides mechanical support and an optical port to admit light from the IIN module into the prismatic relay optics.

The prismatic relay optics 4903 includes side walls 4903A, 4903B, an input surface 4903C and the output surface 4903D. The reflective surface 4903A can be a TIR surface or can alternatively support a reflection coating. The prismatic relay optics 4903 can guide light from the IIN towards the waveguide eye piece along ray paths that are refracted through the input surface (4903C), reflected at the surface 4903A and refracted through the output surface (4903D). Hence, the prismatic surface 4903A, 4903C, 4903D serve to steer the input beam into the waveguide eyepiece along a path that can be designed to be conformal with any display mounting arrangement while delivering the beam at the correct angle for diffraction at the input grating. When the surface 4903A is configured as a TIR surface, the side walls provide a window for viewing an external scene without obscuration.

Light from the prismatic relay optics can be coupled into the waveguide via the optical interface layer 4906, which in some embodiments provides polarization selectivity. In several embodiments, the optical interface layer provides one of spectral or angular selectivity. In a number of embodiments, the optical interface layer 4906 is a diffractive optical element. In a variety of embodiments, at least one of the transmitting or reflecting surfaces of the prismatic relay optics has optical power. In some embodiments, at least one of the transmitting or reflecting surfaces of the prismatic relay optics supports at least one coating for controlling at least one of polarization, reflection or transmission as a function of wavelength or angle. The image light from the IIN can be expanded in the prism to produce sufficient beam width aperture to enable a high efficiency RKV input aperture—thus preserving efficiency and brightness.

In some embodiments, the waveguide 4902 includes input, fold and output gratings disposes in separate red, green and blue diffracting layers or multiplexed into fewer layer as discussed above or disclosed in the references. For simplicity, the gratings in FIG. 49 are represented by the input grating 4902A, fold grating 4902B, and output grating 4902C. The light path from the projector through the prismatic relay optics and the waveguide is represented by the rays 4907-4909. The output image light viewed by the eye 4910 is represented by the rays 4911, 4912. The rays 4913, 4914 show the transparent of the waveguide to external light forward of the eyepiece and the transparency of the prismatic relay optics to external light in the periphery of the display wearer's field of view. This enhance external field of view capability can be of great importance in safety critical applications such as motorcycle helmet HUDs.

Figure 50:
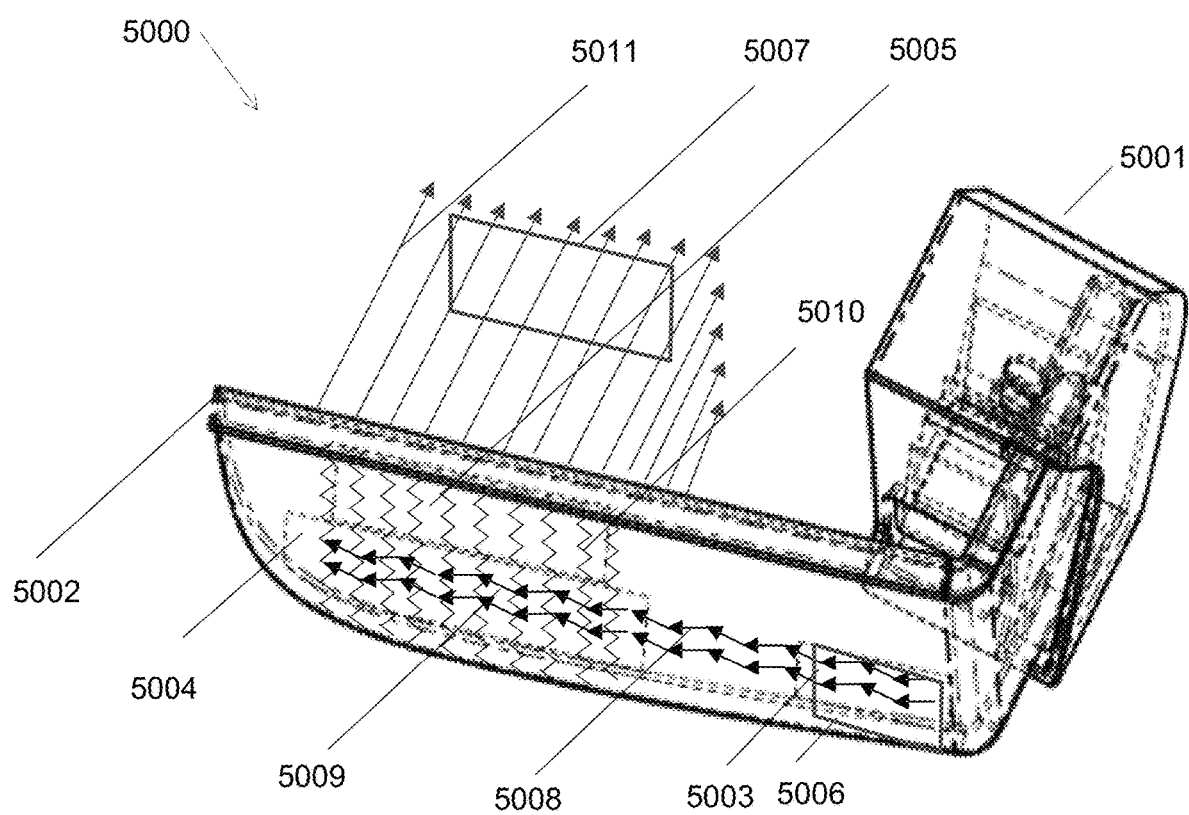
FIG. 50 shows a 3D illustration of a near display having an IIN and waveguide component in accordance with an embodiment of the invention.
Figure 51:
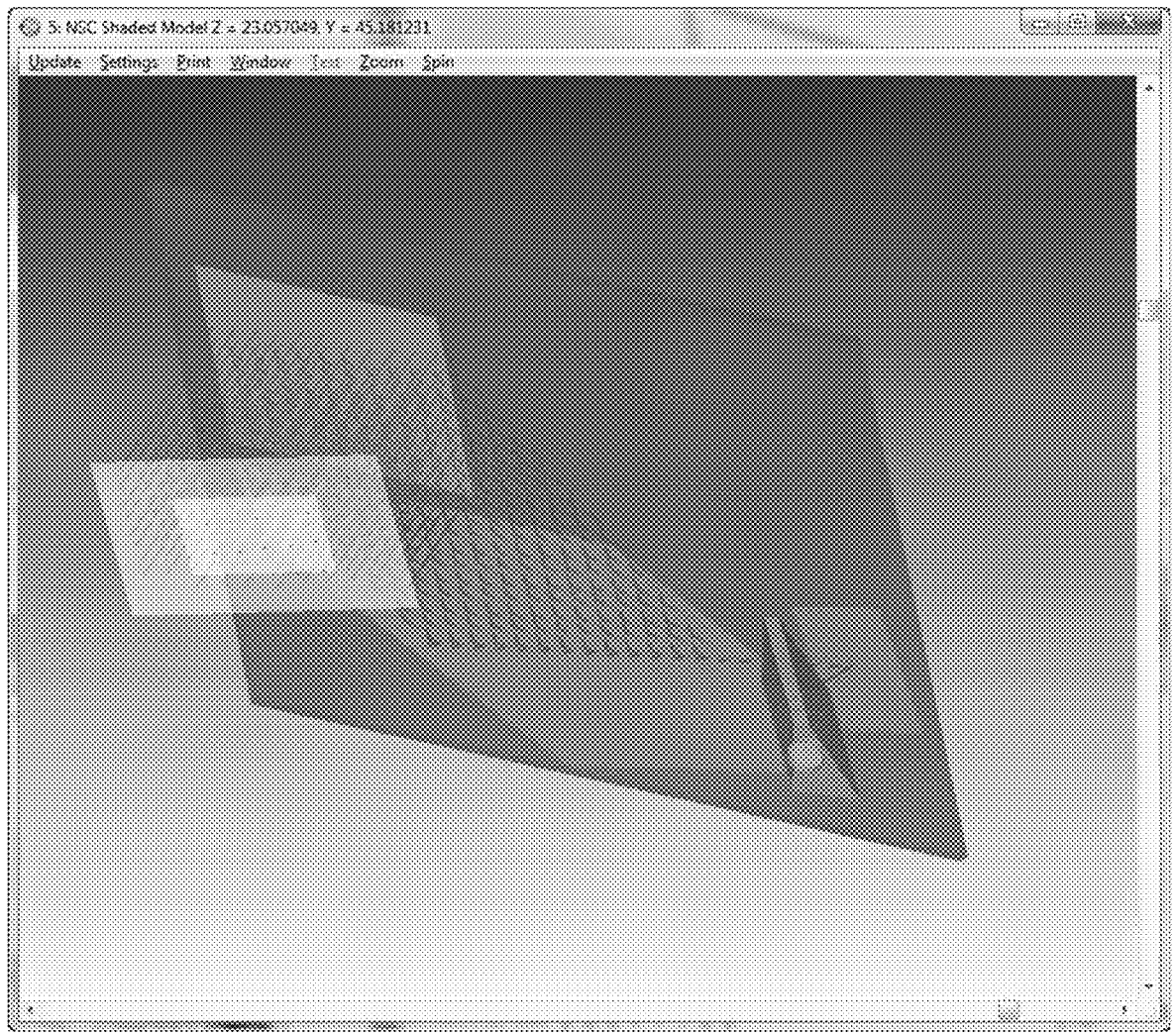
FIG. 51 conceptually illustrates the ray propagation path of a monocular display in accordance with an embodiment of the invention.

Utilizing the techniques and methods as discussed above, monocular displays can be implemented in a wide variety of applications using various designs. FIG. 50 conceptually illustrates one implementation of a monocular display. FIG. 50 shows a 3D illustration of a near display having an IIN and waveguide component. The display 5000 includes an IIN 5001, waveguide 5002 containing in a single layer an input grating 5003, a fold grating 5004, and an output 5005. The waveguide path from entrance pupil 5006 through the input grating, fold grating, and output grating and up to the eye box 5007 is represented by the rays 5008-5011. FIG. 51 conceptually illustrates the ray propagation path of a monocular display in accordance with an embodiment of the invention. In the illustrative embodiment, the ray propagation path from the projector to the eyebox is shown. Although specific monocular display designs are shown in FIGS. 50 and 51, any of a number of designs can be used as appropriate to the specific requirements of a given application.

Near-Eye Head-Up Displays

Waveguides incorporating Bragg gratings similar to those described above can be utilized in a variety of applications including (but not limited to) HUDs in wearable near-eye display applications such as eyeglasses, monocles, and visors. In many embodiments, a waveguide is utilized to direct light incident on the waveguide from one or more projection sources toward one or more lenses, where the light is reflected toward the wearer of the lens. In such embodiments, an important figure of merit is out-couple efficiency of the light in the eyebox. In several embodiments, the waveguides are configured to transmit incident light to maximize out-coupling of light onto the lens and to improve uniformity across the entire field of view (FOV) of the wearable device (or other surface onto which light from the waveguide is projected). As is discussed further below, out-couple efficiency can be maximized by selection of the features of the K-vectors across the output grating of the waveguide and/or implementing polarization recycling. Similarly, the uniformity of illumination across the FOV may be maximized by optimizing RKV slant angle and modulation.

An HUD in accordance with various embodiments of the invention can be implemented to be located within a near-eye display device, such as glasses or monocle. A projection system and a waveguide can be contained within the wearable device and light can be projected from the waveguide onto the lens of the near-eye display. The light can be reflected off the surface of the near-eye display device into a region that is commonly referred to as the eyebox of the HUD. The term eyebox is generally utilized to refer to a region in which the display is visible to the eye of a viewer. The display appears to the viewer as a virtual display on the opposite side of the lens of the near-eye display device to the viewer. The location of the display can be determined based upon projective geometry. Placement of the display within the field of view of the near-eye display device enables the wearer to view the surrounding environment and projected information simultaneously.

Use of flat waveguides that incorporate Bragg gratings can significantly reduce the volumetric requirements of a HUD compared to conventional HUDs implemented using conventional optical components. Furthermore, the field of view of a HUD that can be achieved using a waveguide can be significantly greater despite the reduction in volumetric requirements compared to a conventional HUD.

Near-Eye HUD Waveguides

Waveguides incorporating Bragg gratings can provide significant advantages when used in HUDs including (but not limited to) wide field of view displays and reduced volumetric requirements compared to HUDs implemented using conventional reflective and refractive optical components. In many embodiments, near-eye wearable HUDS are implemented using one or more planar waveguides fabricated to incorporate at least volume Bragg gratings that couple incident light into the waveguide, fold the light within the waveguide and direct light from the waveguide. As noted above, the gratings can provide two dimensional exit pupil expansion.

Figure 52:
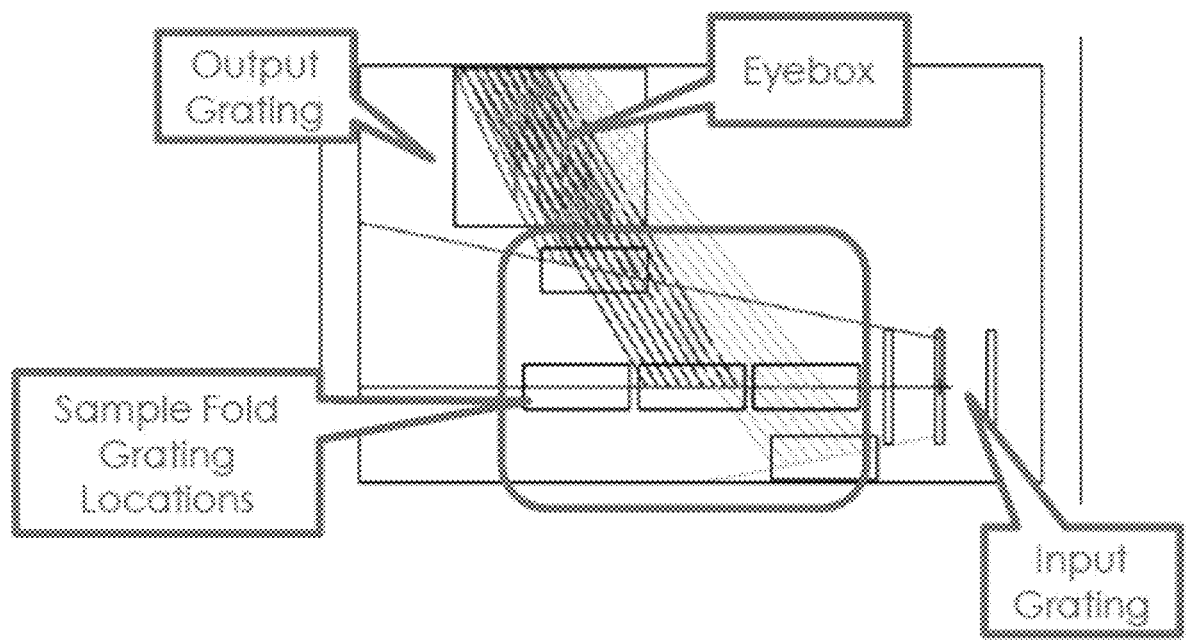
FIG. 52 conceptually illustrates a waveguide assembly including three separate waveguides, an input, fold and output, implemented in accordance with various embodiments of the invention.

A waveguide assembly including three types of gratings, an input, fold and output, implemented in accordance with an embodiment of the invention is illustrated in FIG. 52. The waveguide assembly may be monochromatic, or may include a stack of waveguides that receive light incident on the bottom surface of the waveguide assembly such that each of a Red, Green, and Blue spectral band is coupled into the Red, Green, and Blue waveguides respectively, as shown schematically in FIG. 52. As shown in FIG. 52, input coupling is achieved by one or more input gratings. The one or more input coupling gratings may be of a single or multilayer design, and the multiple layers may be configured to bifurcate the input illumination (this can be accomplished, for example, by maintaining the surface pitch sizes but implementing different grating slanted angles). Such input grating variation can increase the overall couple-in angular bandwidth of the waveguide. Light coupled into a waveguide is diffracted within the waveguide by a fold grating. As noted above, the fold grating may be configured to perform one dimensional pupil expansion. The expansion of the second dimension of the pupil may be achieved in the output grating. In the illustrated embodiments, the gratings may also include a rolled K-vector (RKV) to taper the DE profile of the grating. As is discussed further below, rolling and/or varying the slant of the K-vector across the fold grating can also be implemented improve diffraction efficiency and/or field-of-view uniformity. Each of the input, fold, and output gratings are discussed in additional detail below.

Input Coupling Gratings for Near-Eye Applications

Figure 53A:
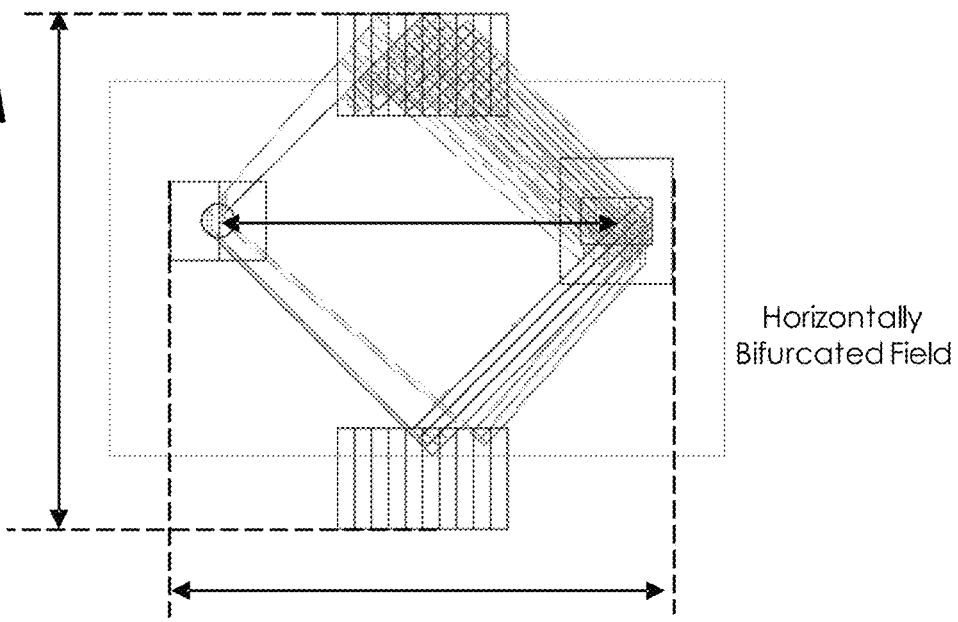
FIGS. 53A-53B conceptually illustrate embodiments of bifurcated input gratings in accordance with various embodiments of the invention.
Figure 53B:
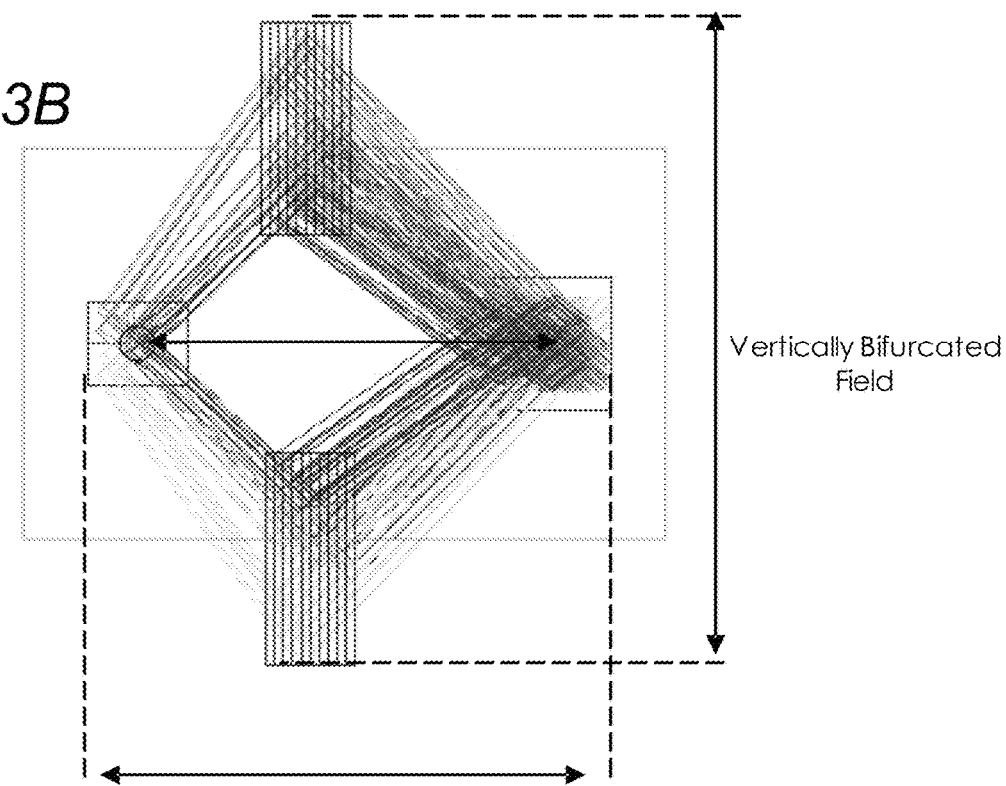
Figure 54:
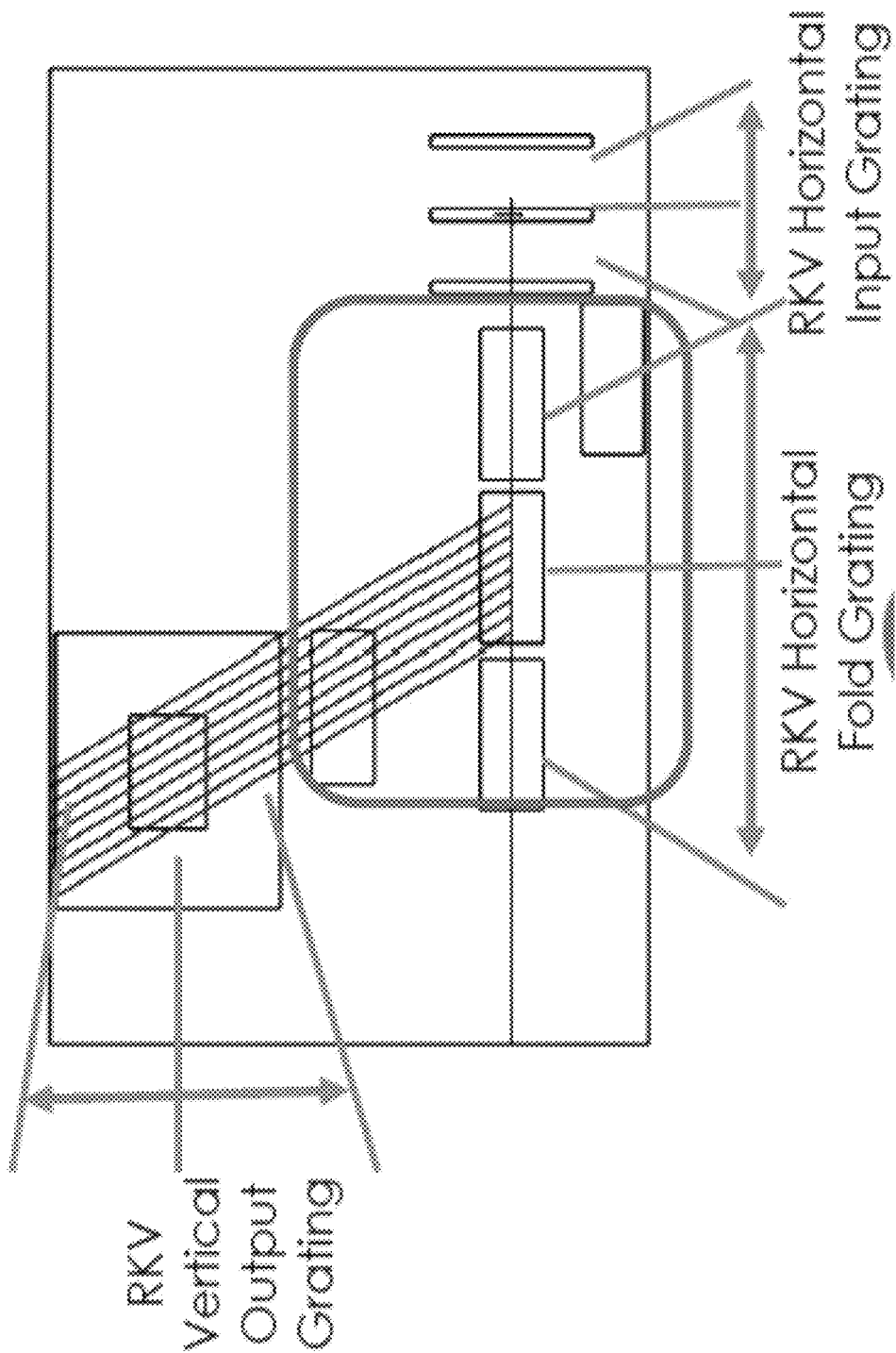
FIG. 54 conceptually illustrates one or more of the gratings, including the input grating, including a rolled K-vector and/or a multiplexed K-vector in accordance with various embodiments of the invention.

Input coupling gratings couple light from one or more illumination sources into a waveguide. Referring again to FIG. 52, the input coupling gratings may be of a single or multilayer design, as will be described in greater detail below. In some such embodiments, the different layers of the input gratings may be configured to bifurcate the light (either or both in a horizontal or vertical plane) to allow for the coupling of different polarizations of light, which can increase the overall couple-in angular bandwidth and efficiency of the waveguide. Embodiments of such bifurcated input gratings are shown in FIGS. 53A and 53B, and are discussed in greater detail below. Each of the input gratings that couple light into the waveguides are plane gratings. In many embodiments, as shown in FIG. 54, one or more of the gratings, including the input grating, can include a rolled K-vector and/or a multiplexed K-vector as appropriate to the requirements of a specific application.

Regardless of the specific input grating design the gratings may be formed in layers of polymer using techniques similar to those described in PCT Application Serial No. PCT/GB2012/000680, the relevant disclosure from which is incorporated by reference herein in its entirety. In many embodiments, the polymer layers that contain the waveguides are separated by layers of glass.

Coupling of light from a projection system into input gratings of a waveguide assembly can be implemented in many different ways. The projector can direct light toward a mirror or prism that reflects the light into the input gratings. In other embodiments, the projector can directly project light into the input gratings, and/or a waveguide can be utilized to direct light from the projection system into the input gratings.

Fold and Output Gratings for Near-Eye Applications

Referring again to FIG. 52, each waveguide in the waveguide assembly includes a fold grating designed for the specific bandwidth of light coupled into the waveguide by the input coupling gratings. The fold and output gratings together provide two dimensional pupil expansion of the light coupled into the waveguide.

Figure 55A:
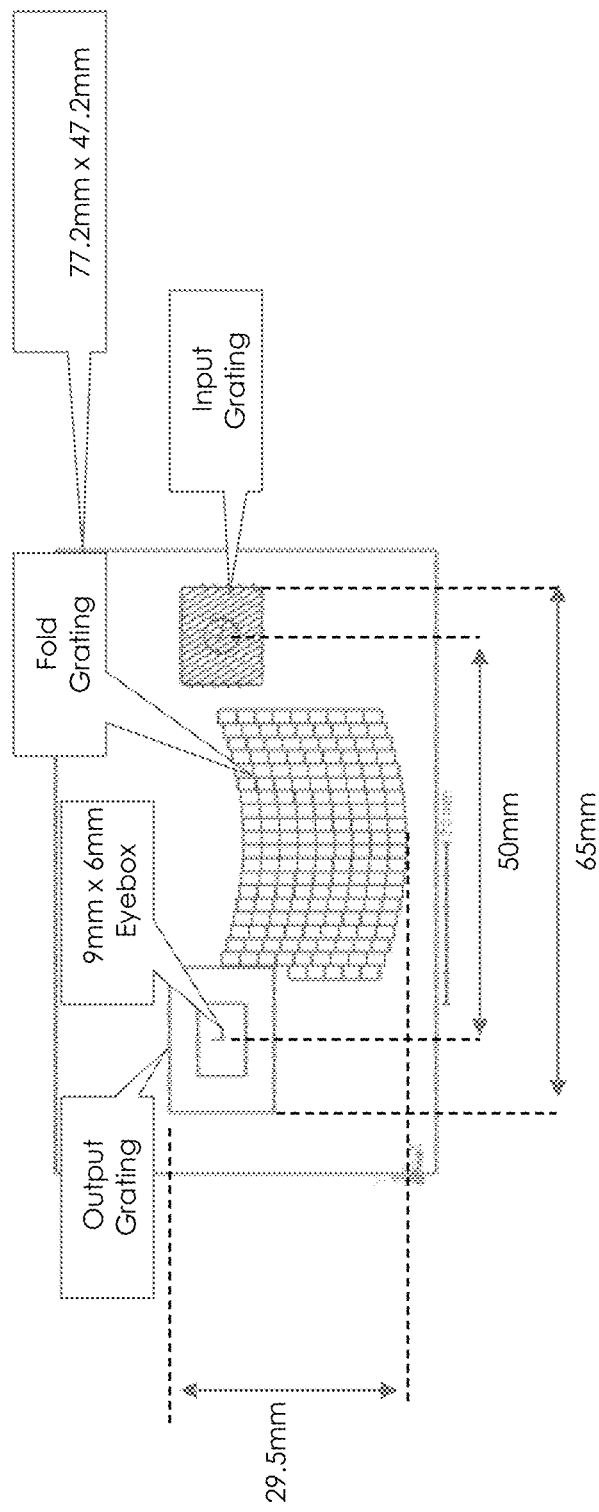
Figure 56B:
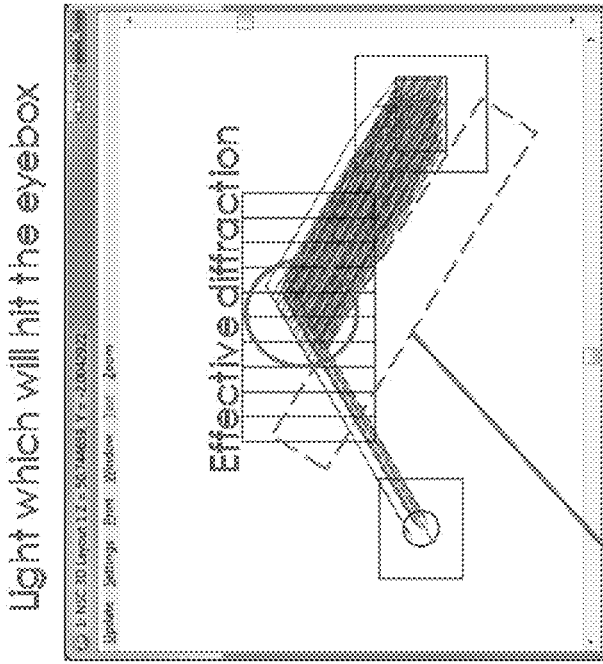
FIGS. 56A and 56B conceptually illustrate diffraction within a waveguide system in accordance with various embodiments of the invention.
Figure 56A:
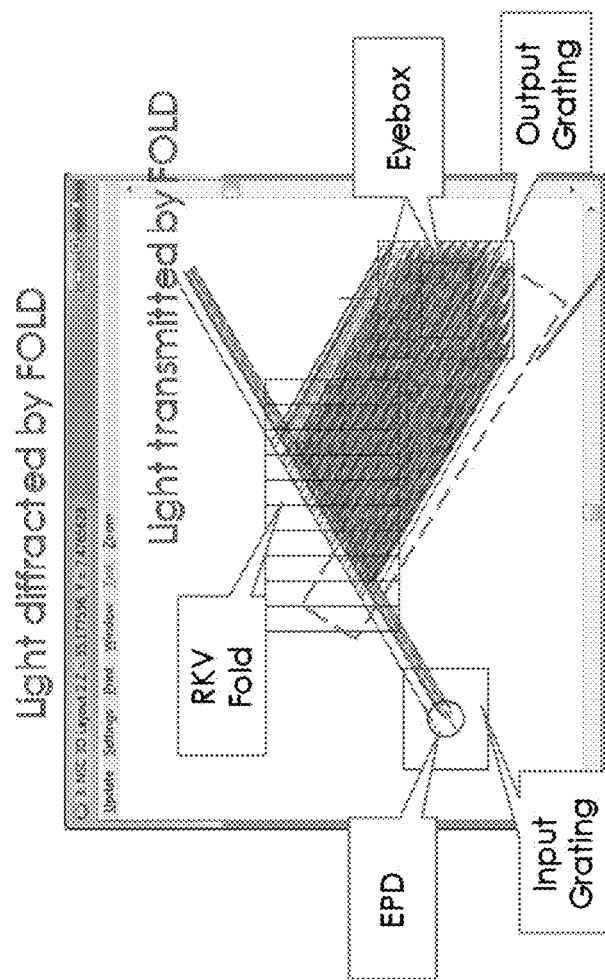

Gratings and exemplary dimensions thereof, according to embodiments capable of supporting 25 degree and 50 degree field of view using an output grating having an aperture size of 25 mm×25 mm at a near-eye relief from the eyebox (reflected via a transparent lens element) are shown in FIG. 55A. As is discussed further below modification of the K-vector and/or slant angle across one or more of the fold and/or output gratings can increase the homogeneity of the display generated by the HUD within an eyebox region. Specific K-vectors that can be utilized within a waveguide in accordance with an embodiment of the invention are illustrated in FIGS. 55B-55D. A conceptual drawing showing effective (e.g., light with will hit the eyebox) and ineffective (e.g., light which will be diffracted by the fold) diffraction within a waveguide system is shown in FIGS. 56A and 56B. The K-vector shown for the fold grating can be varied to modify diffraction efficiency across the grating with the goal of attaining homogeneity of the projected display across the light box. The K-vector and/or the slant angle of the grating can be similarly modified across the output grating to achieve desired characteristics of the HUD system including (but not limited to) increased homogeneity. Furthermore, the K-vector can be modified using a correction function that accounts for distortion introduced by reflection off a curved surface such as (but not limited to) a windshield.

Figure 57A:
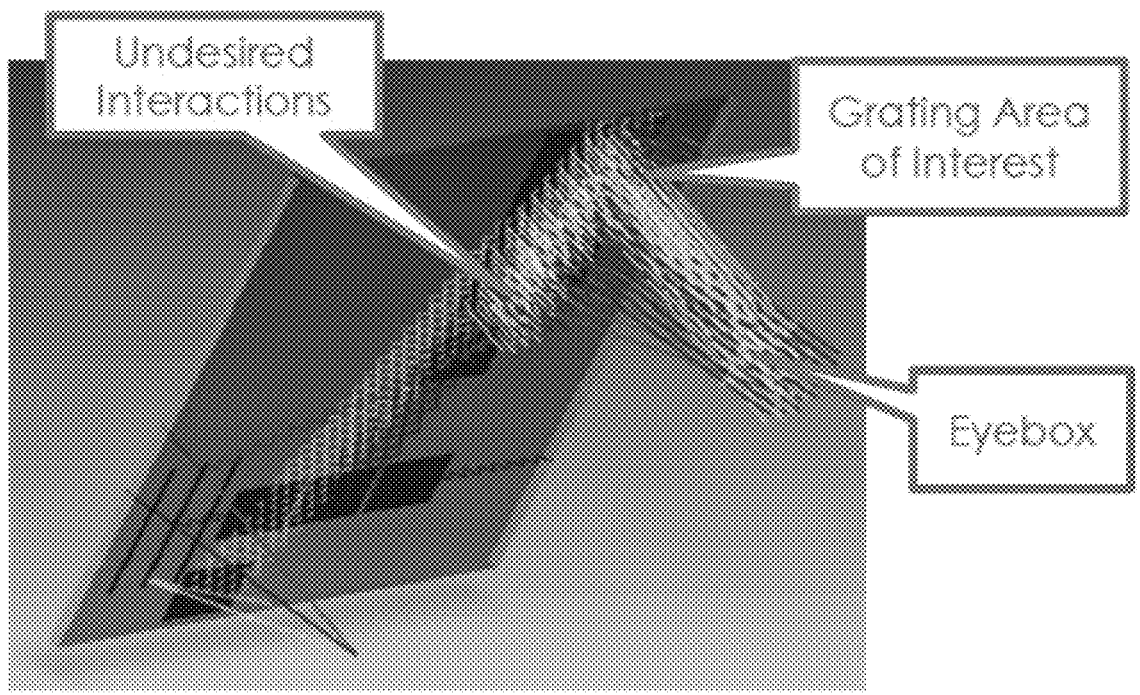

HUD systems in accordance with several embodiments of the invention reflect light off a curved surface such as (but not limited to a wearable lens). Projection of light by a waveguide is conceptually illustrated in FIG. 52. The manner in which projected light can be reflected off a surface into an eyebox region in which a viewer can see the display across a field of view is conceptually illustrated in FIGS. 57A-57C. The ability of the output grating to diffract light across the grating into the eyebox increases the field of view of the display. However, large fields of view pose challenges to the formation of the exit pupil at the eyebox. As shown in FIG. 57A, in the vertical field of view, the rays coming from the top of the waveguide to the eyebox need to propagate across the output grating resulting in losses. Similarly, as shown in FIGS. 57B-57C in the horizontal field of view, the rays coming from the right of the waveguide eyebox need to propagate across the fold grating which also results in losses. As noted above, the field of view of the display can be increased by adding additional waveguides that project light into eyebox region across a wider field of view. The field of view in to which light can be projected is typically limited by the HUD form factor requirements of a given application.

Figure 58:
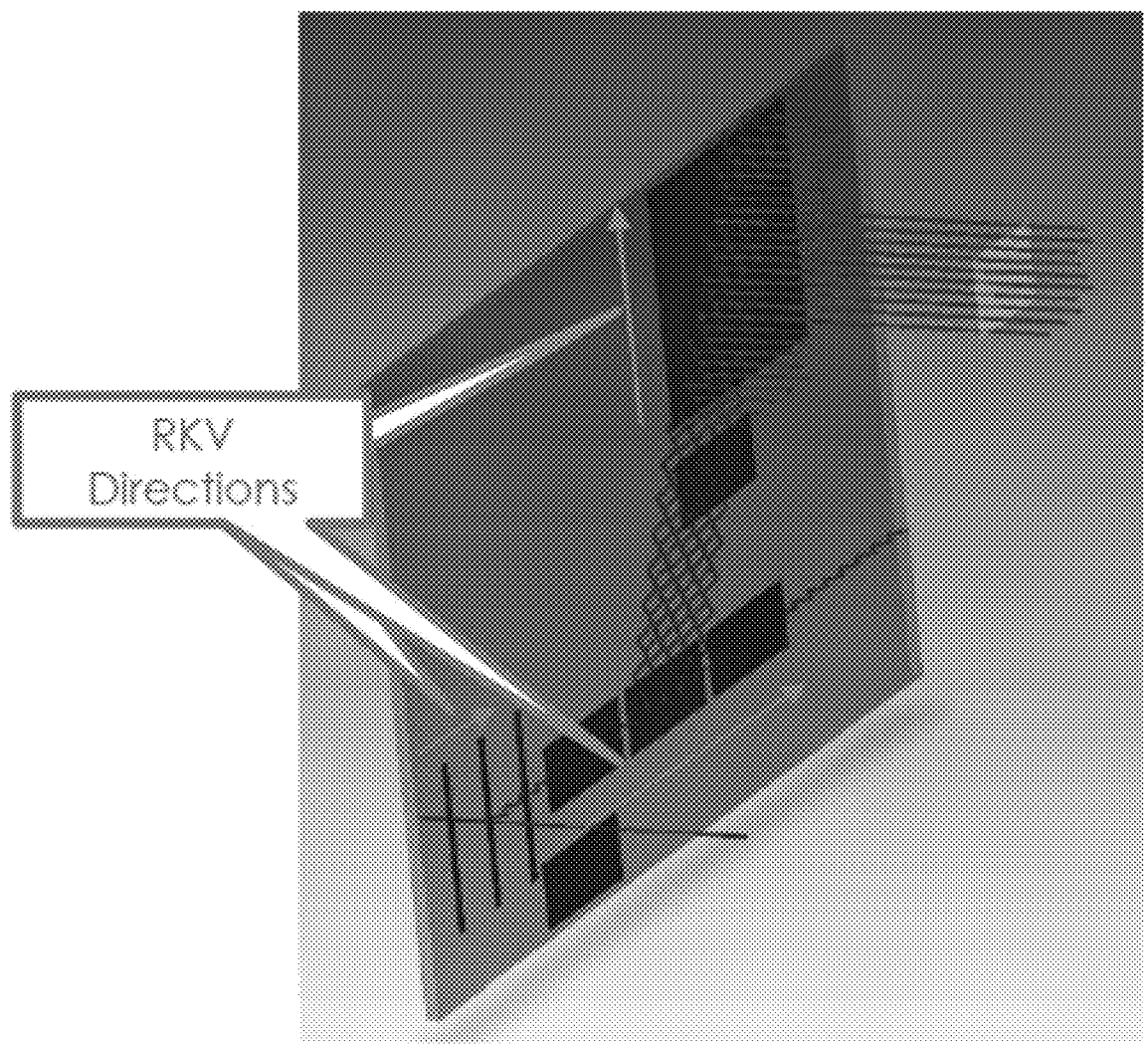
FIG. 58 conceptually illustrates rolled K-vector prescriptions in accordance with various embodiments of the invention.
Figure 59A:
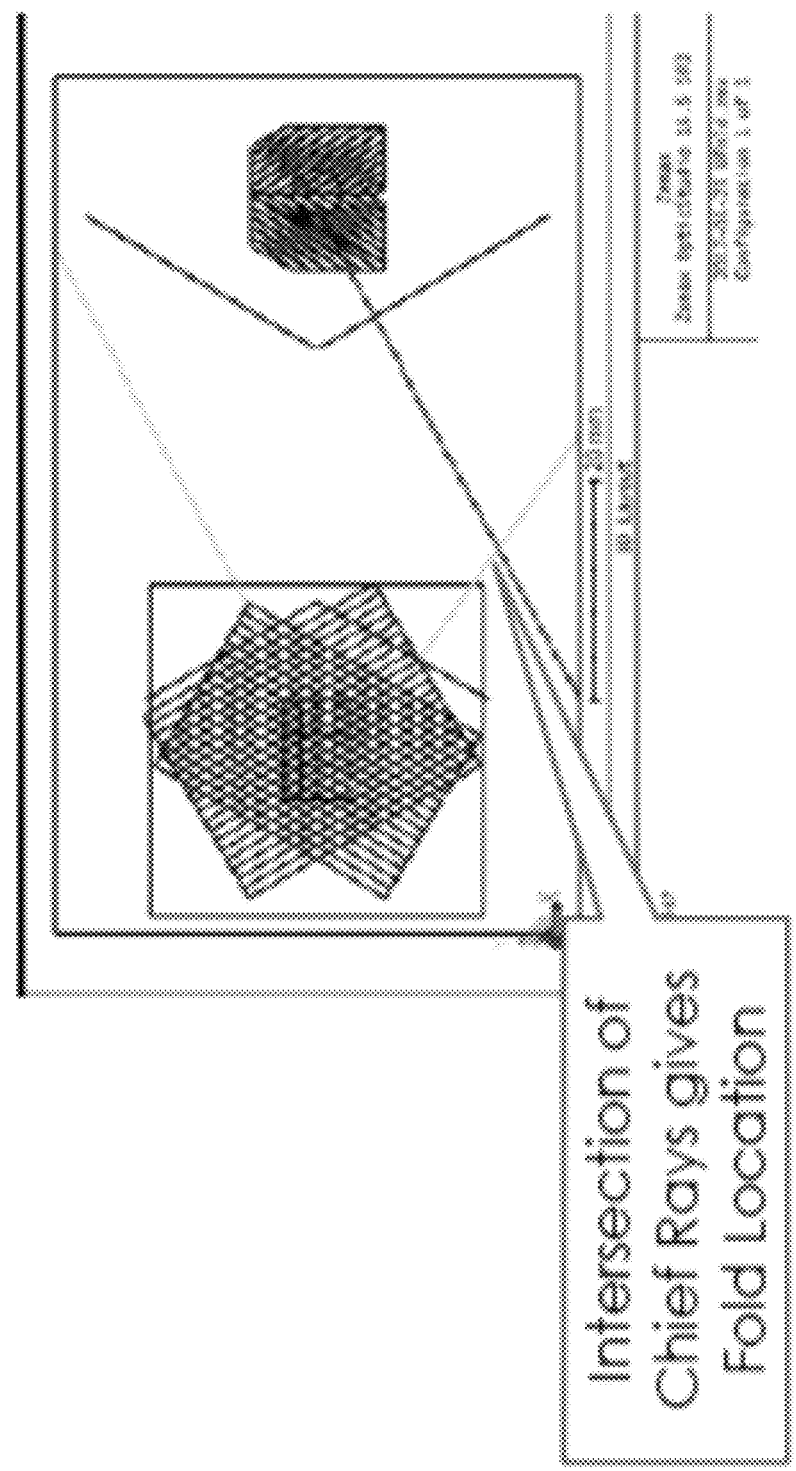
Figure 59E:
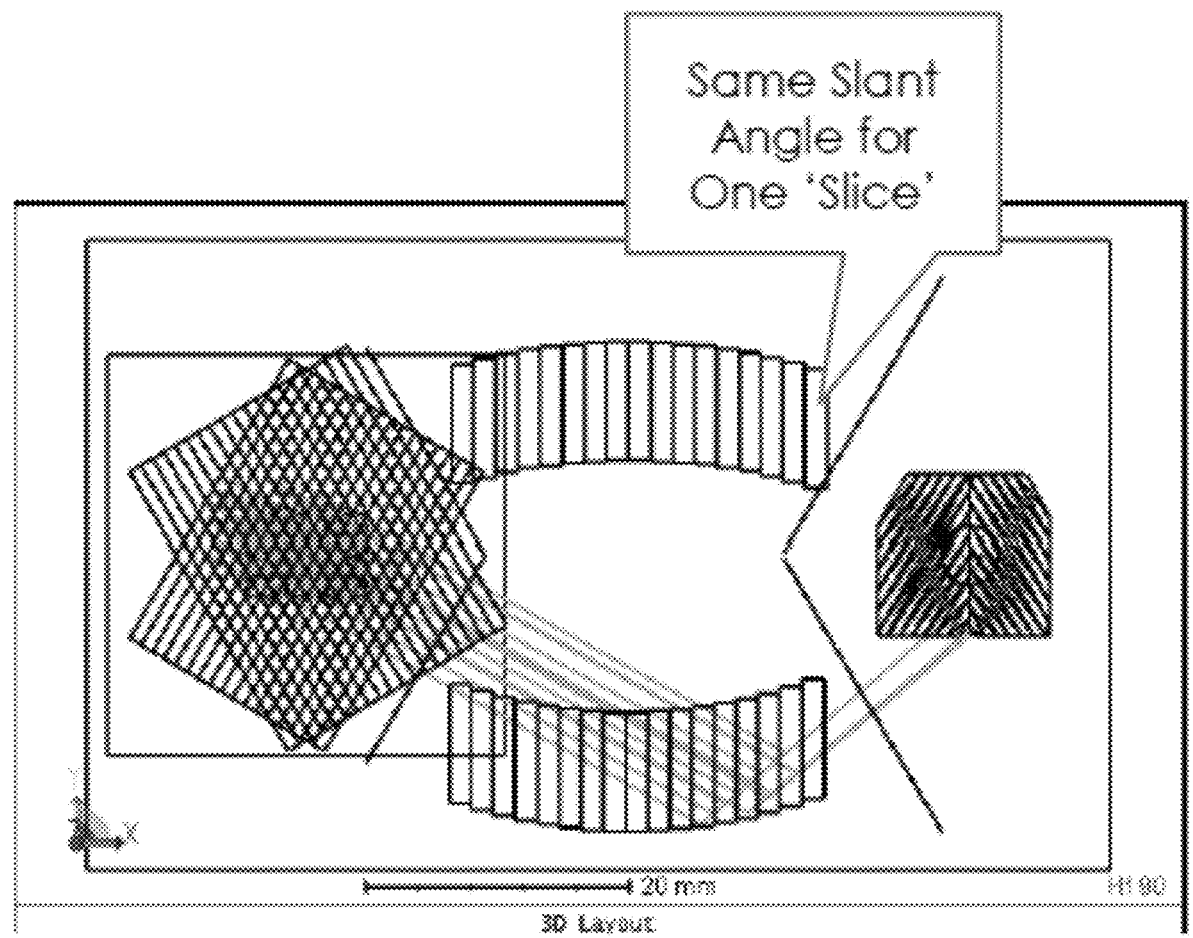

As noted above, the K-vectors and slant angles of the fringes within an output Bragg grating can also be chosen to correct for curvature of the surface onto which the display is projected by the output grating. Rolled K-vector prescriptions for all three gratings in accordance with an embodiment of the invention is illustrated in FIG. 58. The effect of the correction is to cause the input grating to modify the coupling of the light to improve efficiency, to modify the fold RKV for horizontal pupil formation, and to modify the output RKV for vertical pupil formation. As can readily be appreciated, the specific manner in which the K-vector and/or slant angle of a grating is modified across a waveguide to improve diffraction efficiency is largely dependent upon the requirements of a given application.

Referring again to FIG. 52, the path length for light projected into the eyebox from each of the three waveguides have different path lengths and wavelengths. Accordingly, the gratings in each of the waveguides in a waveguide assembly are separately configured for each color channel. While specific waveguide configurations incorporating specific grating implementations are described above, any of a variety of Bragg grating combinations can be utilized within waveguides including (but not limited to) multiplexed K-vector gratings, gratings that include varying slant angles and/or gratings that are electronically switchable as appropriate to the requirements of a given application in accordance with various embodiments of the invention. Moreover, although the figure shows a number of separate fold grating locations, it will be understood that these could be of a continuous nature.

Figure 60:
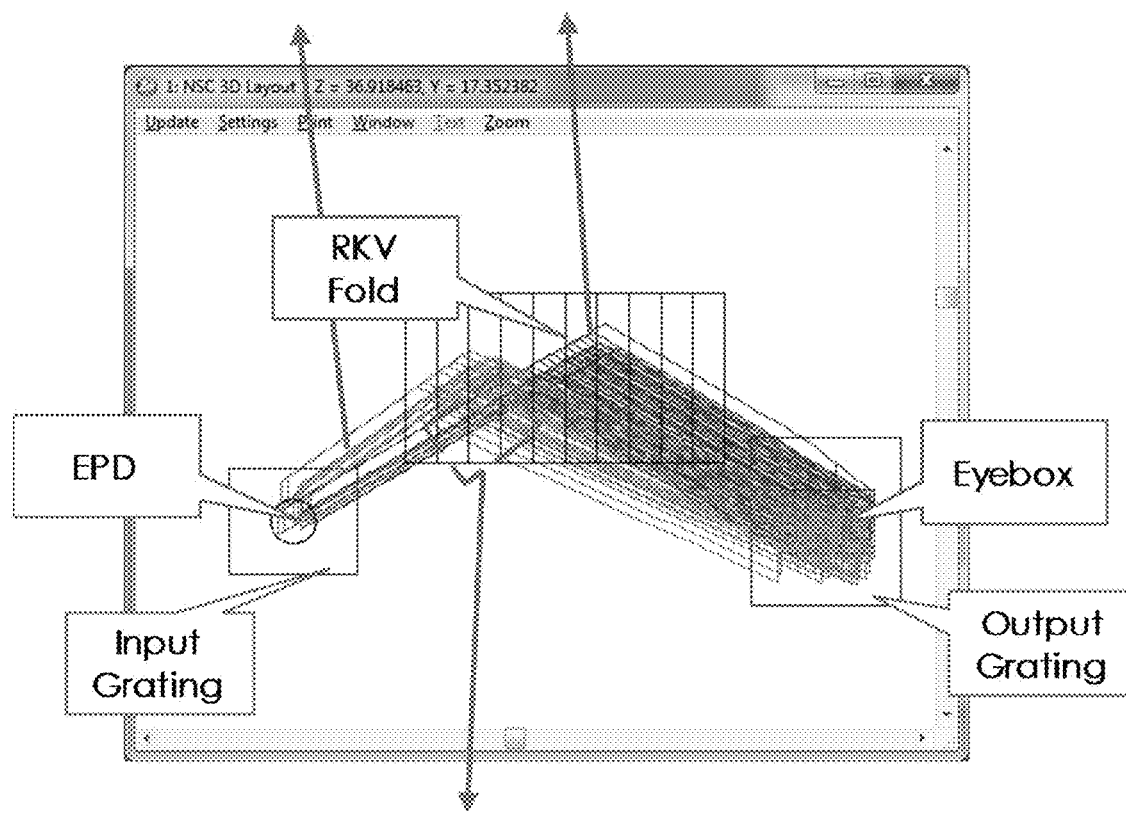
FIG. 60 conceptually illustrates improvements to the FOV and reducing diffraction losses and vignetting in accordance with various embodiments of the invention.
Figure 63B:
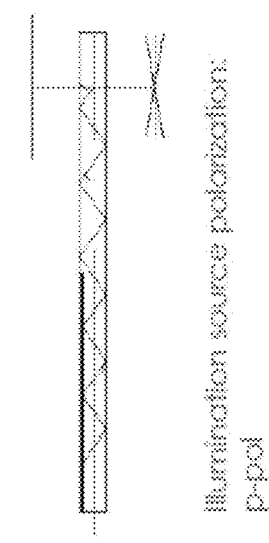
Figure 63C:
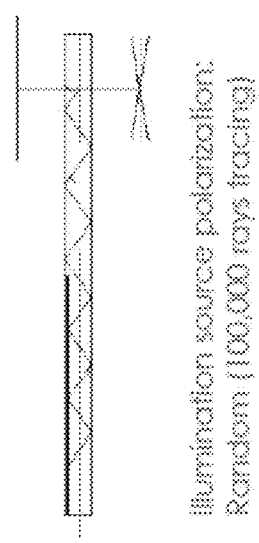
Figure 63D:
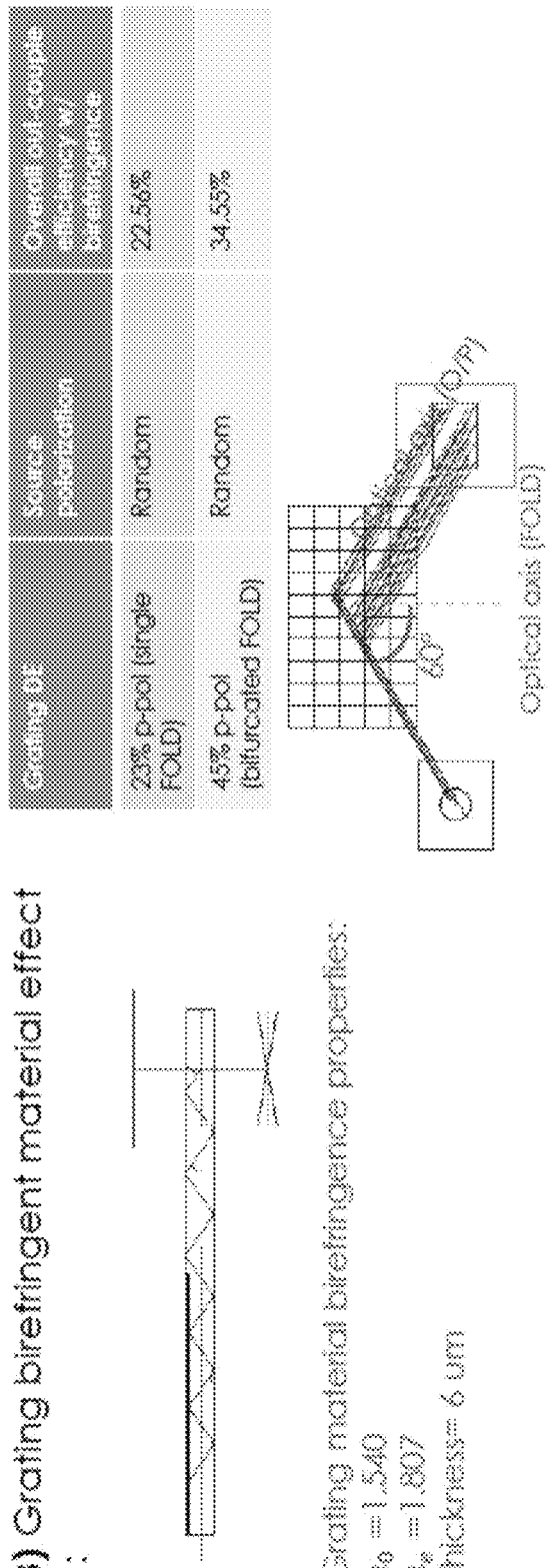
Figure 63F:
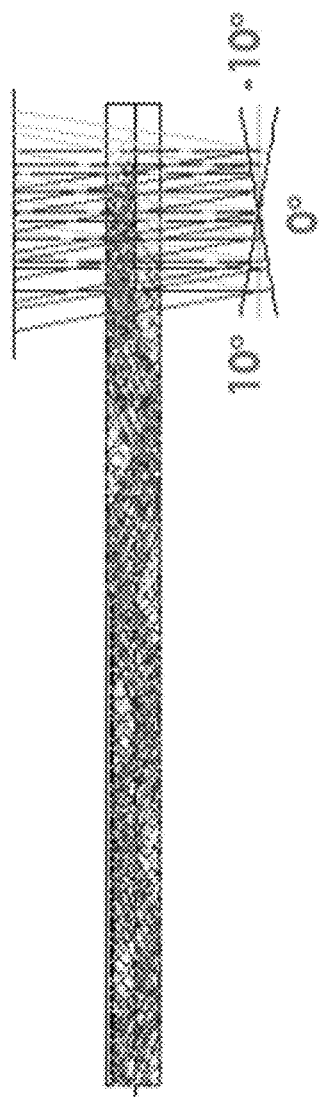

Referring again to FIGS. 59A-59E, the slant angle of the fold grating may be varied with distance from the input coupling grating to address the vertical FOV. The roll that the fold grating can play with respect to improving the FOV and reducing diffraction losses and vignetting can be readily appreciated with respect to the simulations illustrated in FIG. 60. The diffraction losses introduced by the fold grating (as shown in FIGS. 57A-57C) are significantly reduced in the simulation illustrated in FIG. 60. The impact of utilizing a fold grating similar to the grating on diffraction loss and uniformity of FOV across the eyebox of a HUD in accordance with an embodiment of the invention can be appreciated from the simulation shown in FIG. 60.

As shown in FIGS. 59A-59E the vertical and horizontal fields of the fold grating can be bifurcated (as illustrated in FIGS. 61A and 61B) such that the positive and negative fields of the coupled light travel along different paths in the fold grating. Using such a system, it is possible to narrow the fold grating such that the overlap of incoming light can be reduced and efficiency increased. Although specific bifurcation arrangements are shown, it should be understood that any suitable arrangements for bifurcating and narrowing the fold grating maybe implemented in accordance with embodiments.

Polarization Effects

Depending on nature of the grating, light may be p or s polarized, and the nature of that polarization can have an effect on the efficiency of overall coupling efficiency, and therefore overall efficiency of the waveguide embodiments, as shown in FIG. 62. For example, due to the birefringent nature of the RMLM materials used to form waveguides in accordance with embodiments, interactions with the gratings will gradually rotate the polarization of the light into a more circular state, however, each interaction will have its p-component extracted.

Once again it is to be noted that the out-couple efficiency of the light that finally hits the eyebox is the important metric to determine efficiency of the waveguide system. This value can be characterized by a percentage of coupled light. Turning to FIGS. 63A-63F, the effect of polarization on the efficiency of the gratings is considered. In the idealized case (FIG. 63B) where the polarization of light inside the waveguide is always in p-pol direction according to the grating vector the overall efficiency is determined by the diffraction efficiency of the grating (this can be considered the upper limit). In the realistic case (FIG. 63C) where there is random polarization of light within the waveguide, the overall outcouple efficiency drops significantly due to the disability of the grating to diffract s-pol light. Using a birefringent material (FIG. 63D) (where the optical axis is perpendicular to the fringes) the optical axis of the fold grating layer may have a 60° clocking angle compared to light in the propagation direction hence it will act as a thin waveplate and change the polarization of the transmitted light. As a result, some of the s-pol light is rotated to a p-pol state and will get diffracted out resulting in an efficiency enhancement. Note that this effect will not occur in an O/P grating because the optical axis is the same as the light propagation direction. To address this deficiency in the O/P and optimize the gating a QWP film may be applied (FIG. 63E) to recycle the s-pol light thus boosting efficiency. Although specific birefringence values are shown with relation to FIGS. 63A-63D, further optimization of the birefringence (e.g. by biasing the preferred birefringent axis towards the positive field angles), may allow one side of the field of view to be traded off to balance the other.

Figure 64:
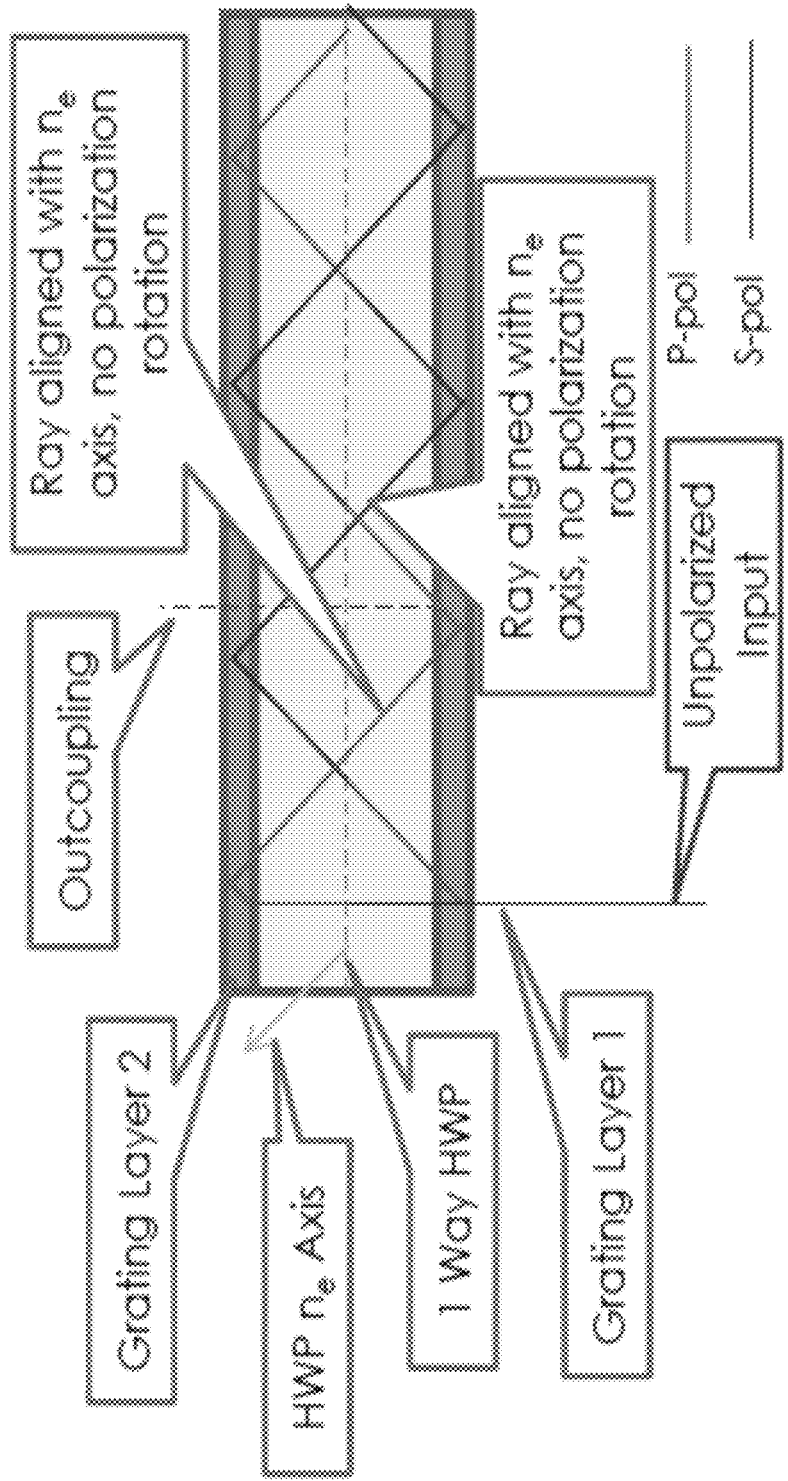
FIG. 64 conceptually illustrates an implementation of a HWP film in accordance with embodiments of the invention.

In addition to these birefringence effects, coatings and films may be implemented in embodiments of the invention to increase the capture of light that might be rejected because of the polarization selectivity of the waveguide. For example, in some embodiments a QWP film may be implemented to suppress odd interactions. In other embodiments, a HWP film may be implemented to collect s-polarized light. Such implementations may be referred to as polarization recycling. A conceptual illustration of an implementation of such a coating is provided in FIG. 64.

Waveguide Architectures to Enhance Efficiency

Embodiments of near-eye waveguide devices may incorporate one or more of the input, output and fold grating structures discussed above. Embodiments may comprise any number of input and output layers, these layers may be bifurcated, and these layers may incorporate other optical features such as QWP or HWP films, MUX gratings, and combinations thereof. Exemplary embodiments of various combinations may be found in FIGS. 46A-46N. Although specific architectures and combinations are shown, it will be understood that other variations may be implemented in accordance with the principals set forth herein.

Figure 65A:
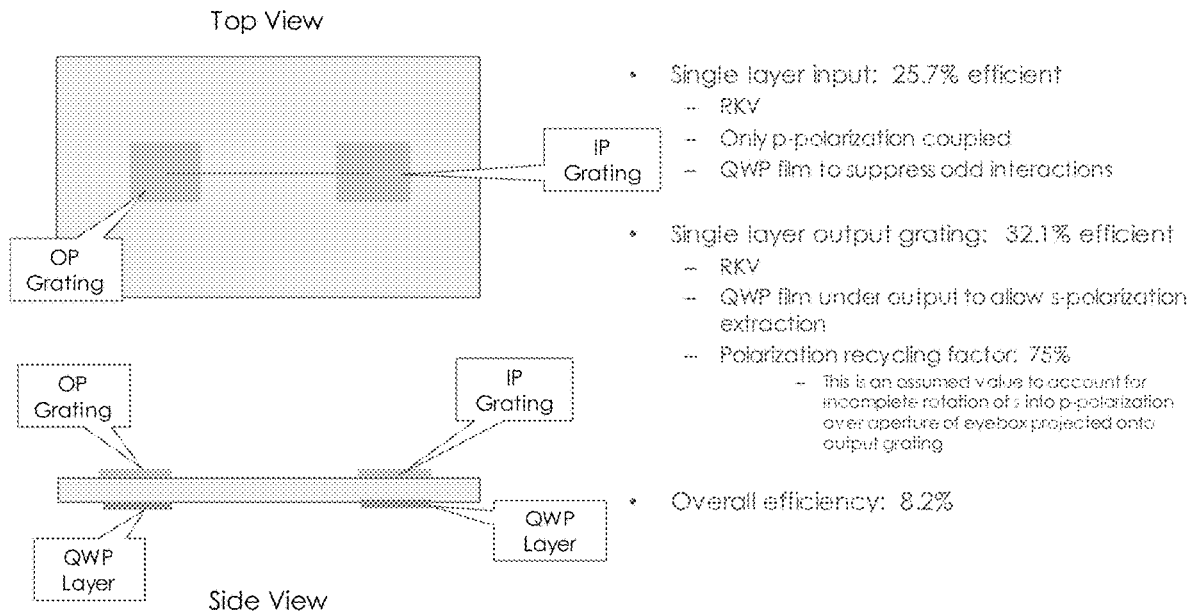
FIGS. 65A-65N conceptually illustrate embodiments of various waveguide architectures in accordance with embodiments of the invention.

FIG. 65A provides a conceptual illustration of a 1-axis expansion waveguide architecture implementing a single layer input and single layer output with QWP films disposed in association with such input and output gratings to suppress odd interactions (input) and allow s-polarization extraction (output).

Figure 65B:
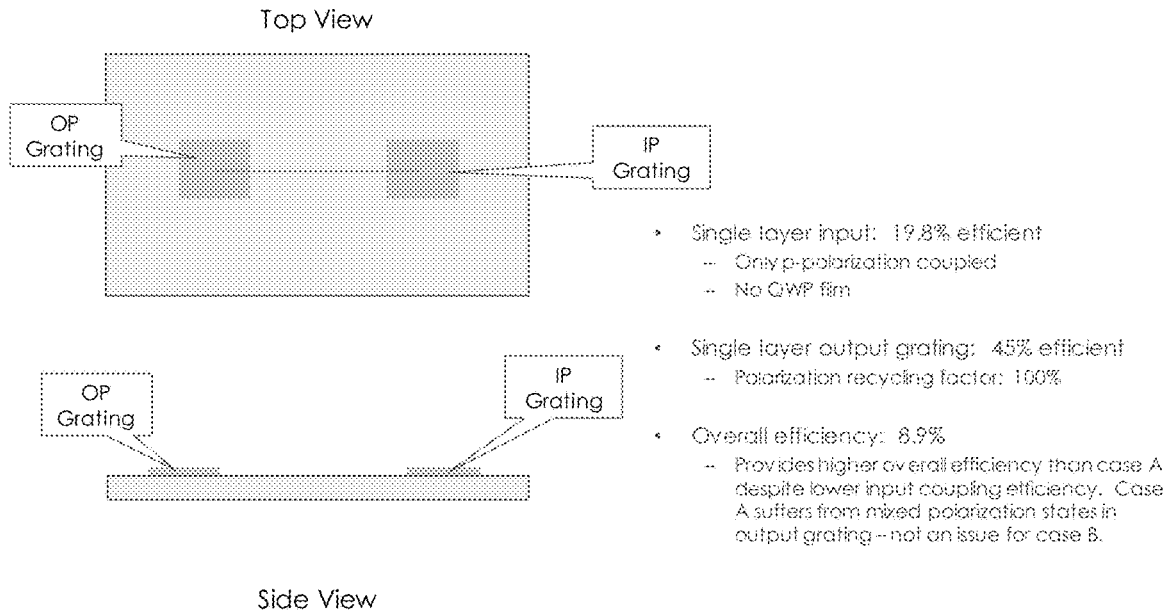

FIG. 65B provides a conceptual illustration of a 1-axis expansion waveguide architecture implementing a single layer input and single layer output without the implementation of polarization recycling films.

Figure 65C:
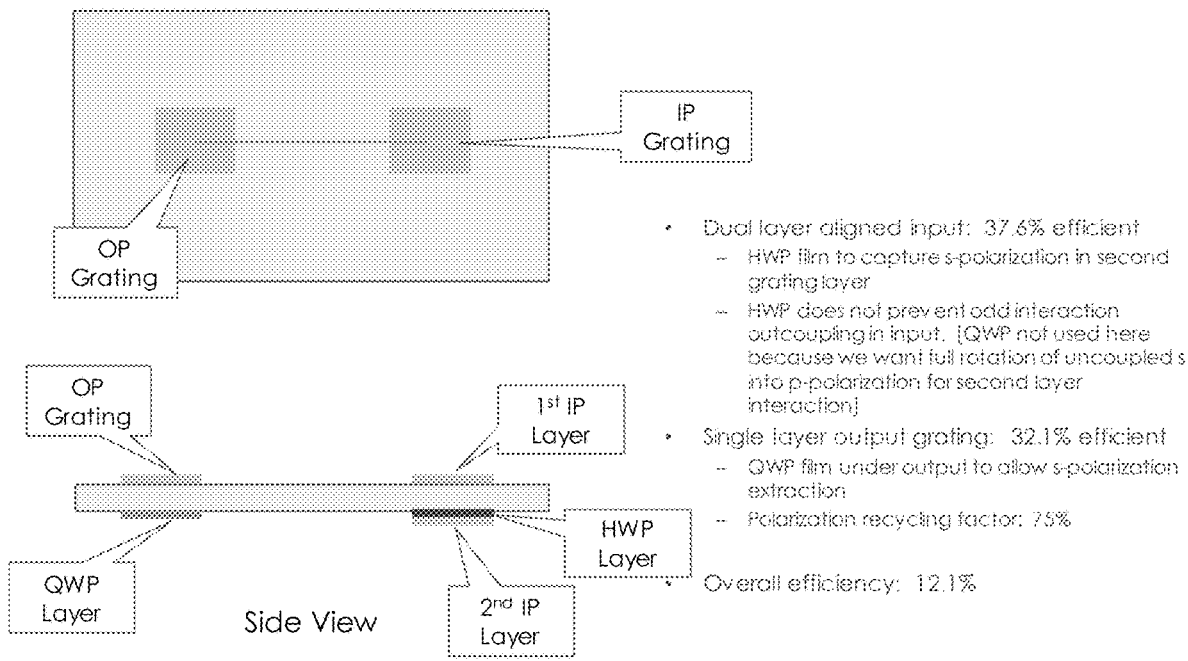

FIG. 65C provides a conceptual illustration of a 1-axis expansion waveguide architecture implementing a dual layer input and single layer output with an HWP film disposed in association with the input grating to capture s-polarization in the second grating layer, and QWP film in association with the output grating to allow s-polarization extraction.

Figure 65D:
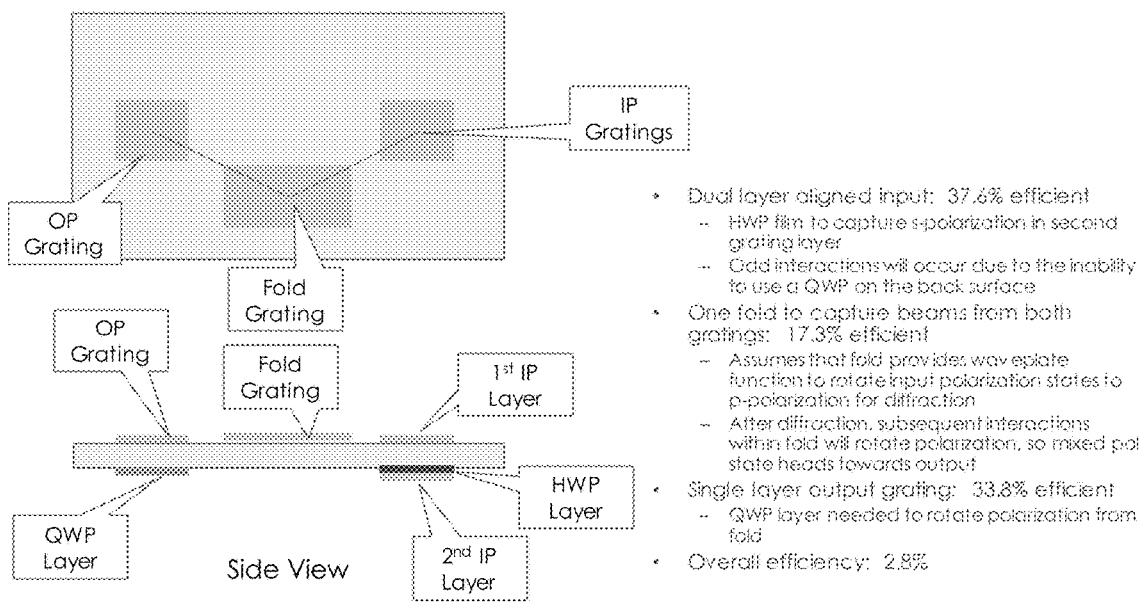

FIG. 65D provides a conceptual illustration of a 2-axis expansion waveguide architecture implementing a dual layer input and single layer output with an HWP film disposed in association with the input grating to capture s-polarization in the second grating layer, and QWP film in association with the output grating to allow s-polarization extraction. This embodiment also implements a fold grating to capture beams from the gratings and rotate the input polarization to p-polarization for diffraction.

Figure 65E:
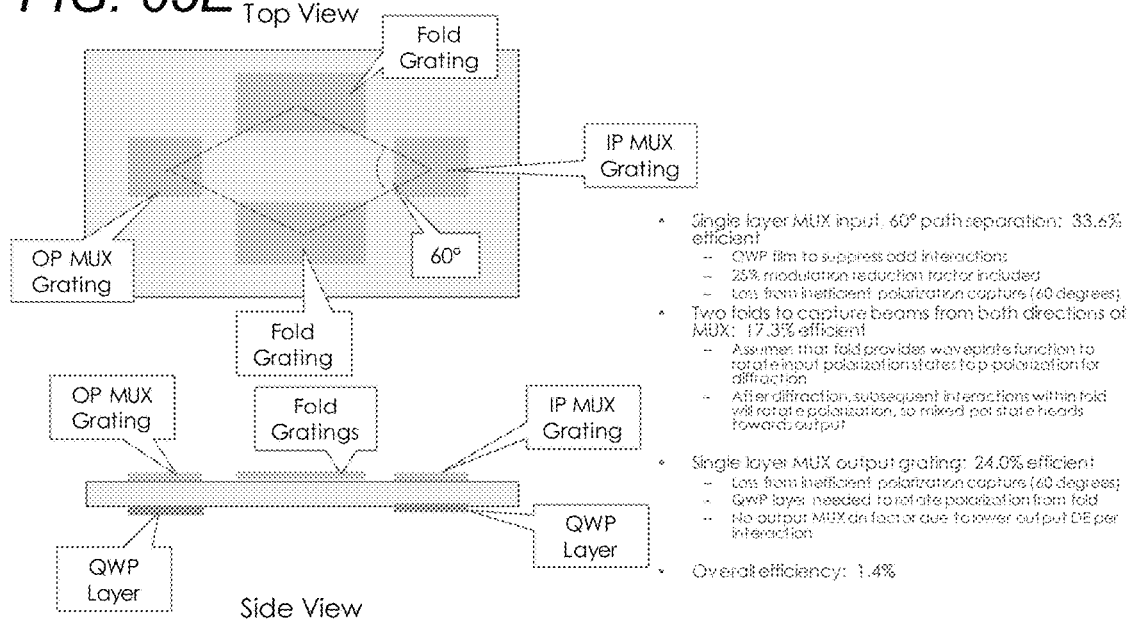

FIG. 65E provides a conceptual illustration of a 2-axis expansion waveguide architecture implementing a single layer MUX input and single layer MUX output at 60° with QWP films disposed in association with the input (to suppress odd interactions) and output gratings (to rotate the polarization from the fold). This embodiment also implements two fold gratings to capture beams from the gratings and rotate the input polarization to p-polarization for diffraction. In this embodiment loss occurs from inefficient capture from the MUX input grating at 60°.

Figure 65F:
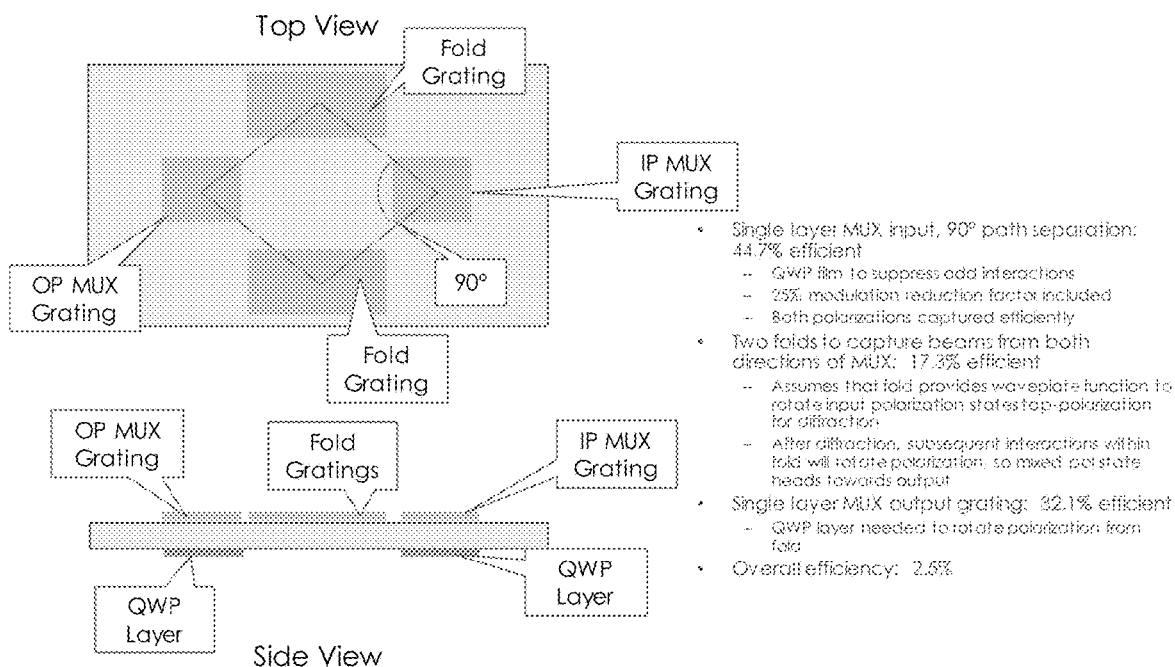

FIG. 65F provides a conceptual illustration of a 2-axis expansion waveguide architecture implementing a single layer MUX input and single layer MUX output both at 90° with QWP films disposed in association with the input (to suppress odd interactions) and output gratings (to rotate the polarization from the fold). This embodiment also implements two fold gratings to capture beams from the gratings and rotate the input polarization to p-polarization for diffraction.

Figure 65G:
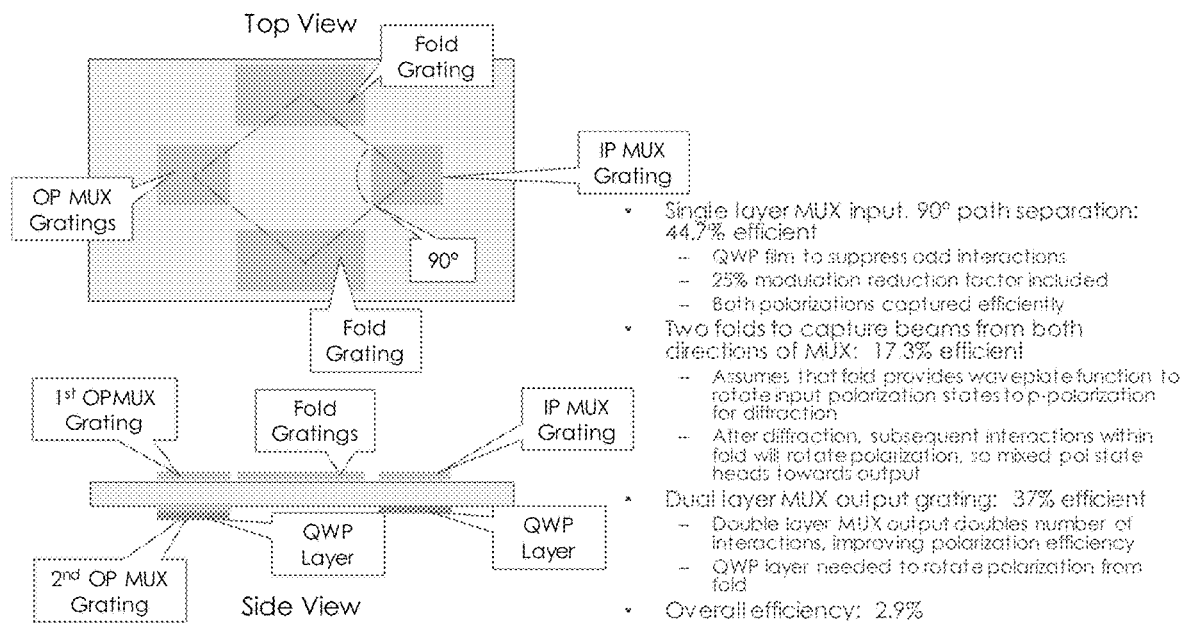

FIG. 65G provides a conceptual illustration of a 2-axis expansion waveguide architecture implementing a single layer MUX input and dual layer MUX output both at 90° with QWP films disposed in association with the input (to suppress odd interactions) and output gratings (to rotate the polarization from the fold). This embodiment also implements two fold gratings to capture beams from the gratings and rotate the input polarization to p-polarization for diffraction. The dual layer output grating doubles the number of interactions, improving polarization efficiency.

Figure 65H:
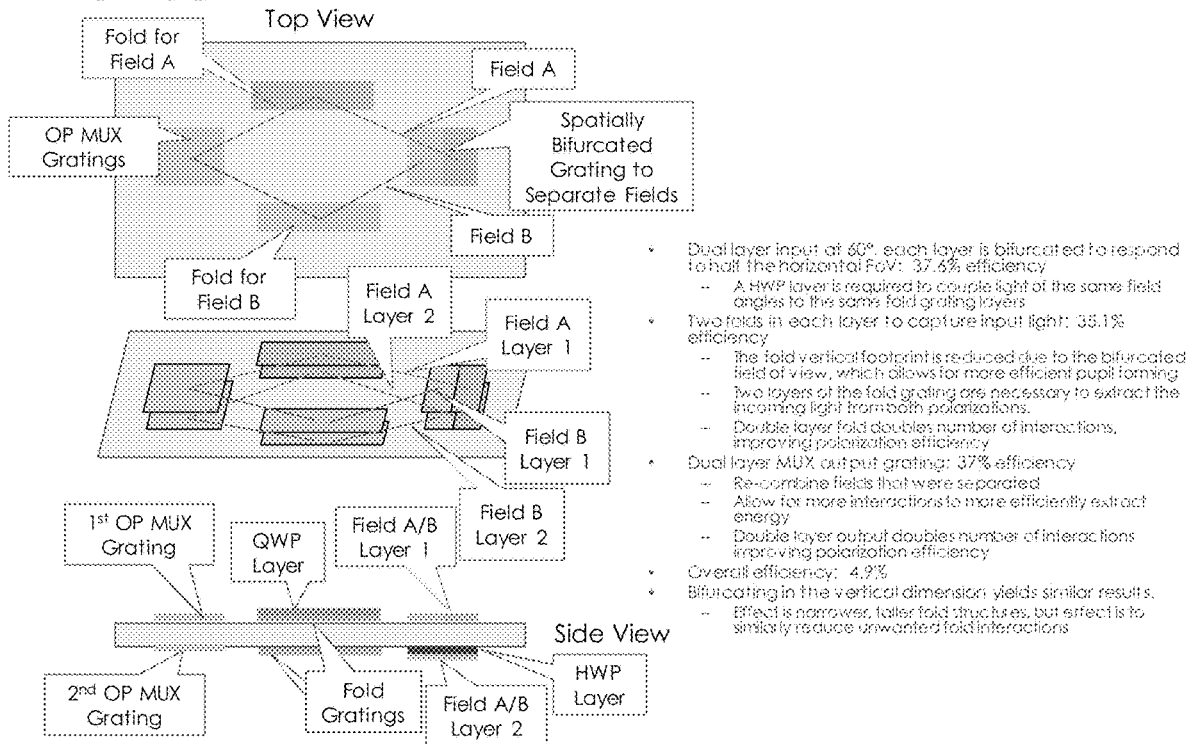

FIG. 65H provides a conceptual illustration of a 2-axis expansion waveguide architecture implementing a bifurcated dual layer input where each layer is bifurcated to respond to half the horizontal FOV, and a dual layer MUX output at 90°. A HWP film is associated with the input grating and is required to couple the light of the same field angles to the same fold grating layers. This embodiment also implements two fold gratings to capture beams from the gratings and rotate the input polarization to p-polarization for diffraction. A QWP film disposed in association with one of the fold gratings to extract the light from both polarizations. The dual layer output grating doubles the number of interactions, improving polarization efficiency.

Figure 65I:
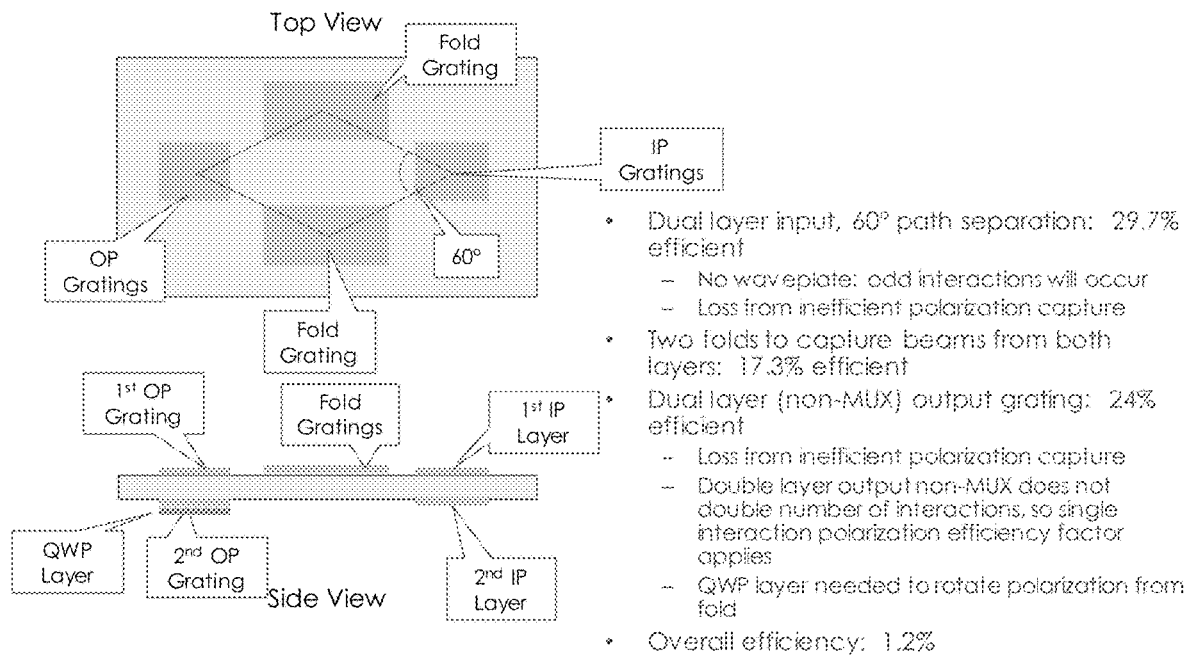

FIG. 65I provides a conceptual illustration of a 2-axis expansion waveguide architecture implementing a dual layer input (at 60°) and output gratings. This embodiment also implements two fold gratings to capture beams from the gratings and rotate the input polarization to p-polarization for diffraction. A QWP film is disposed in association with the output grating to rotate the polarization of the fold.

Figure 65J:
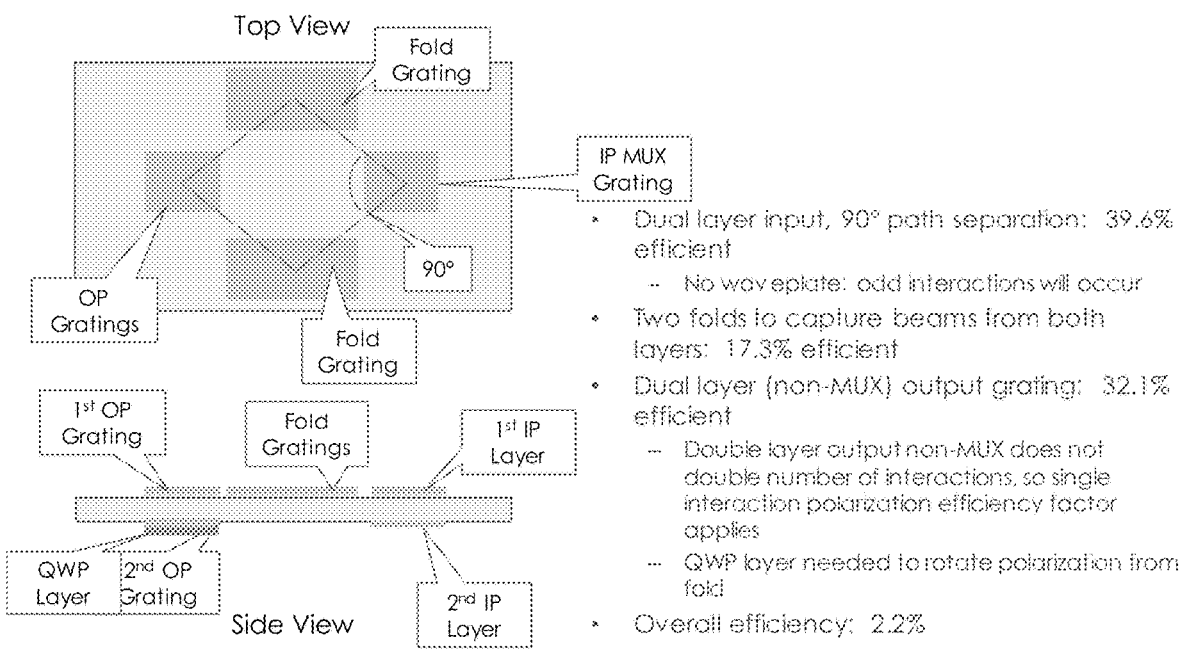

FIG. 65J provides a conceptual illustration of a 2-axis expansion waveguide architecture implementing a dual layer input (at 90°) and output gratings. This embodiment also implements two fold gratings to capture beams from the gratings and rotate the input polarization to p-polarization for diffraction. A QWP film is disposed in association with the output grating to rotate the polarization of the fold.

FIG. 65K provides a conceptual illustration of a 2-axis expansion waveguide architecture implementing a bifurcated single layer input (at 60°) and an output MUX grating. This embodiment also implements two fold gratings on a single layer to capture half the FOV. QWP films are disposed in association with the input and output gratings to suppress odd interactions and rotate the polarization of the fold, respectively.

FIG. 65L provides a conceptual illustration of a 2-axis expansion waveguide architecture implementing a single layer input and output gratings. This embodiment also implements one fold grating to capture beams from both gratings. A QWP film is disposed in association with the output grating to rotate the polarization of the fold.

Figure 65M:
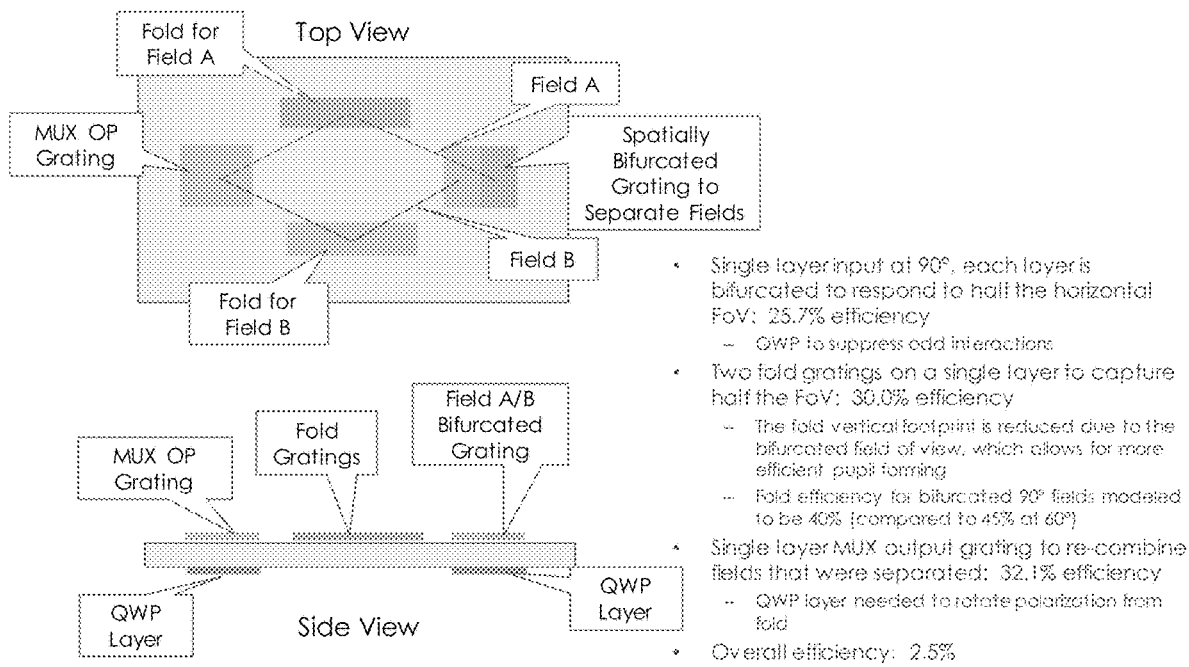

FIG. 65M provides a conceptual illustration of a 2-axis expansion waveguide architecture implementing a bifurcated single layer input (at 90°) and an output MUX grating. This embodiment also implements two fold gratings on a single layer to capture half the FOV. QWP films are disposed in association with the input and output gratings to suppress odd interactions and rotate the polarization of the fold, respectively.

Figure 65N:
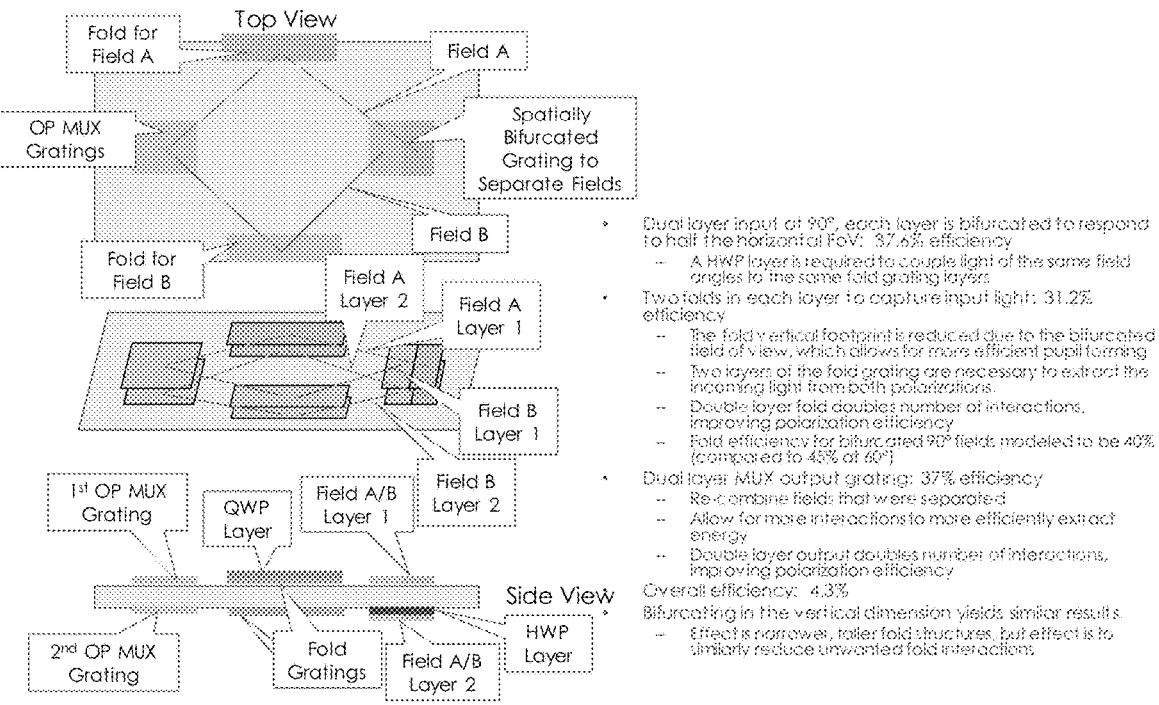

FIG. 65N provides a conceptual illustration of a 2-axis expansion waveguide architecture implementing a bifurcated dual layer input at (90°) where each layer is bifurcated to respond to half the horizontal FOV, and a dual layer MUX output. A HWP film is associated with the input grating and is required to couple the light of the same field angles to the same fold grating layers. This embodiment also implements two fold gratings in each layer to capture beams from the gratings and rotate the input polarization to p-polarization for diffraction. A QWP film disposed in association with one of the fold gratings to extract the light from both polarizations. A HWP is also disposed in association with the input grating to couple light of the same field angles to the same fold grating layers. The dual layer output grating doubles the number of interactions, improving polarization efficiency.

Figure 66A:
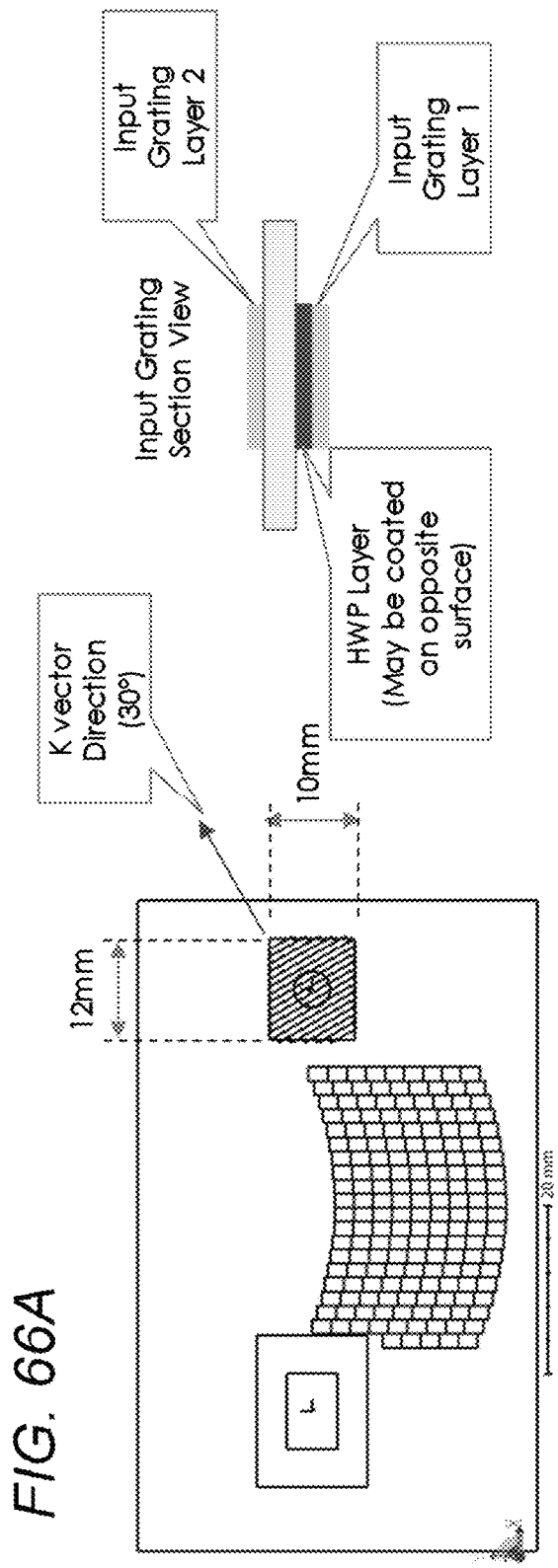
Figure 66B:
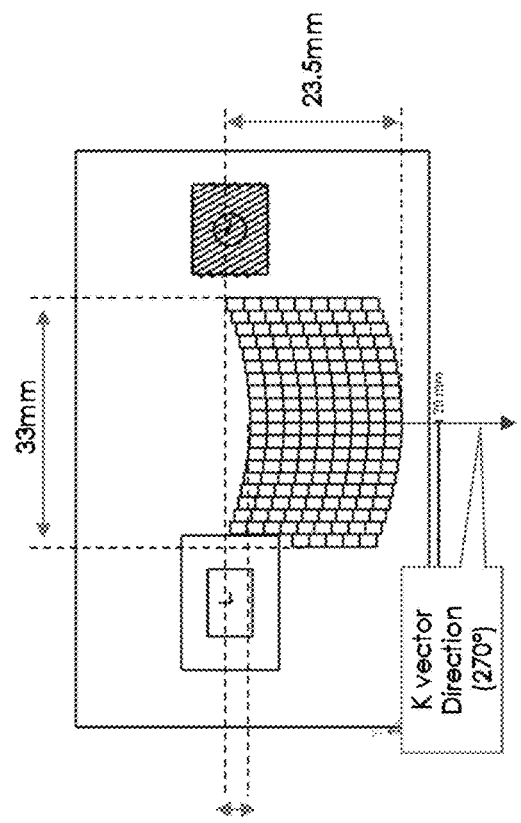

One exemplary embodiment of an implementation of an architecture according to the above is illustrated in FIGS. 66A-66C. As shown, in the embodiment the input grating (FIG. 66A) consists of one RKV grating on each surface of the substrate. Each grating is designed to capture the entire field of view (i.e., not bifurcated). The fold grating (FIG. 66B) consists of a single RKV grating where the RKV slant angle varies going from left to right of grating and the RKV slant angle is constant going from top to bottom of grating. Finally, the output grating (FIG. 66C) consists of one plane grating on each surface of the substrate. Each grating may be provided with a different prescription, and is designed to respond to a certain range field angles.

Methods of Implementing Multiplex Gratings

Figure 67A:
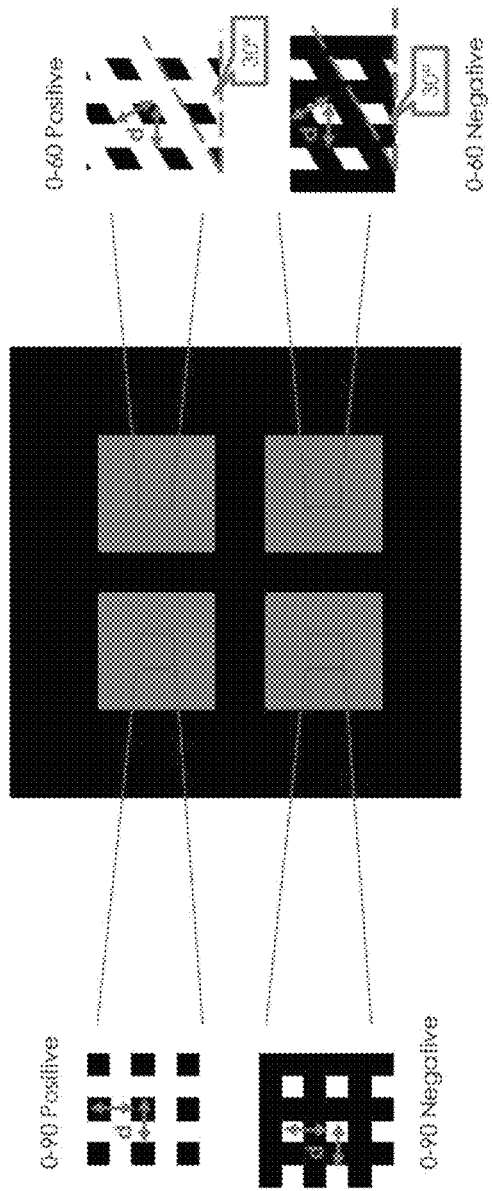
Figure 67B:
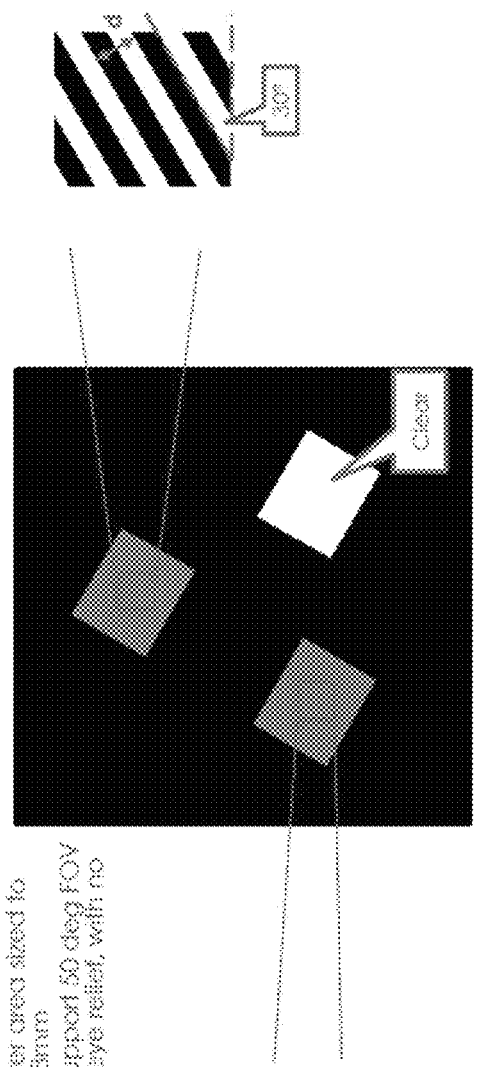
Figure 67C:
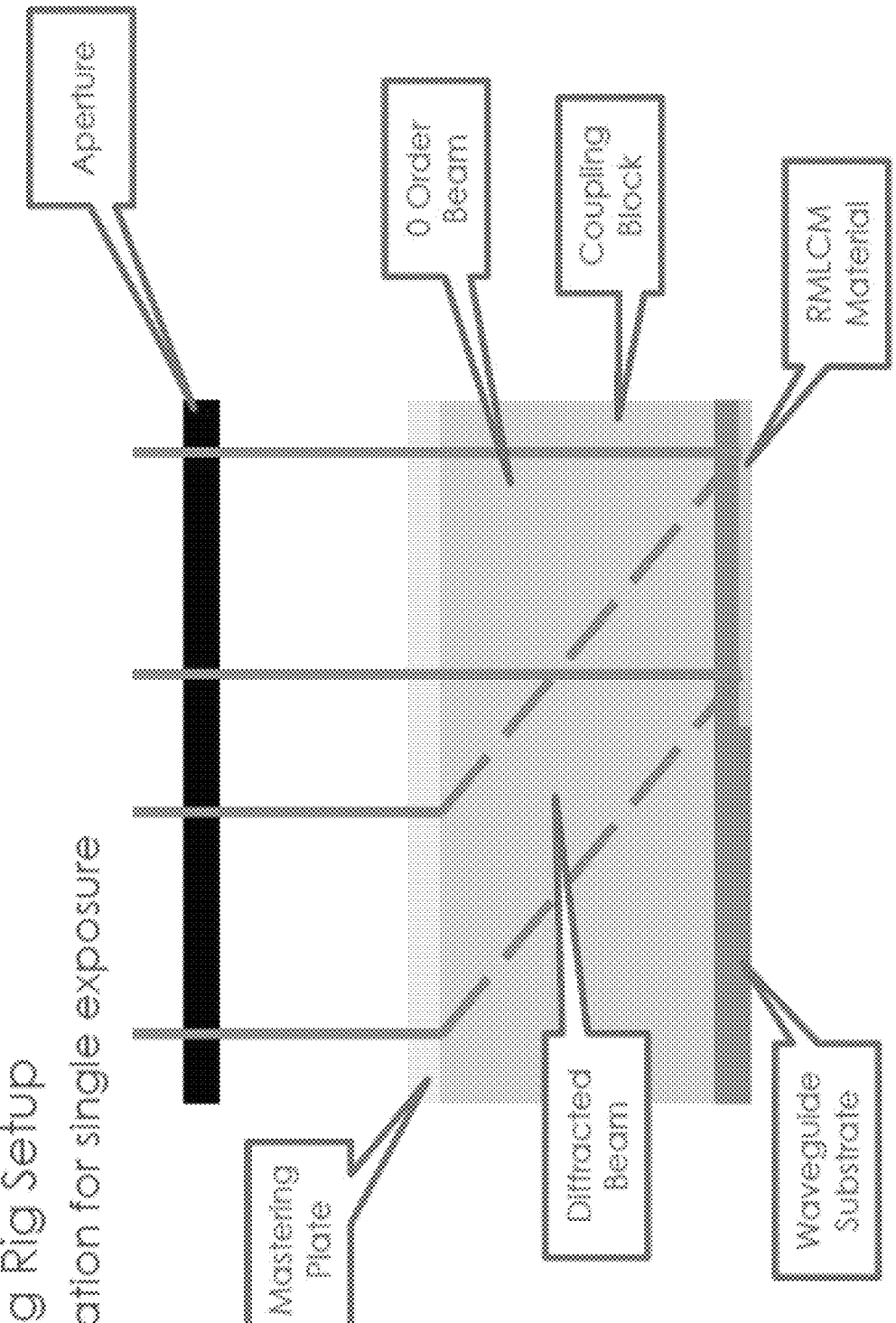

Embodiments are also directed to methods of manufacturing multiplex (MUX) gratings. In many embodiments a multiplex grating comprises multiple prescriptions disposed in the same grating. As shown in FIGS. 67A and 67B in one exemplary embodiment two master plates (67A & 67B) are provided. As shown in FIG. 67C, the mastering plate RMLCM material and waveguide substrate are disposed in relation to each other and a rotatory aperture system (FIG. 67D) is disposed between this mastering rig and the illumination source. During operation (as shown in FIG. 67D) the chopper wheel allows only on pair/set of beams to be incident at one instant in time. This prevents simultaneous exposure of the mastering pairs, which would cause unwanted diffraction grating vectors to be imprinted. It will be understood that the specific mastering patterns and chopper apertures shown are merely exemplary, any suitable arrangement could be provided to allow for the fabrication of desired MUX gratings.

DOCTRINE OF EQUIVALENTS

Although specific systems and methods are discussed above, many different embodiments can be implemented in accordance with the invention. It is therefore to be understood that the present invention can be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents. Although specific embodiments have been described in detail in this disclosure, many modifications are possible (for example, variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

What is claimed is:

1. A waveguide display comprising:
a waveguide comprising a holographic polymer dispersed liquid crystal mixture (HPDLC) layer sandwiched between first and second transparent substrates, wherein the HPDLC layer comprises:
an input grating;
a first fold grating;
a second fold grating;
an output grating; and
an input image node optically coupled to the waveguide; wherein:
the input grating is configured to receive light from the input image node and to cause the light to travel within the waveguide via total internal reflection to the first fold grating and the second fold grating;
the first fold grating and the second fold grating are configured to direct the light towards the output grating;
the output grating is configured to cause the light to exit the waveguide;
at least one of the input grating and the output grating is a multiplexed grating;
the multiplexed gratings provided by at least one of the input grating and the output grating are configured to increase the field of view of the waveguide display by providing a first waveguide path for light forming a first portion of the field of view and a second waveguide path for light forming a second portion of the field of view; and
the input and output gratings each multiplex first and second gratings, wherein the first grating multiplexed into the input grating, the first fold grating and the first grating multiplexed into the output grating together provide a first waveguide path for in-coupling, beam expanding and extracting a first field of view portion, wherein the second grating multiplexed into the input grating, the second fold grating and the second grating multiplexed into the output grating together provide a second waveguide path for in-coupling, beam expanding, and extracting a second field of view portion.

2. The waveguide display of claim 1, wherein the input image node is coupled to the waveguide by an opto-mechanical interface that allows the waveguide to be mechanically disconnected from the input image node.

3. The waveguide display of claim 1, wherein the waveguide is configured to direct light received from the input image node towards a vehicular windshield.

4. The waveguide display of claim 3, wherein the waveguide is configured to distort the light exiting the waveguide such that the distorted light compensates for the curvature of the vehicular windshield.

5. The waveguide display of claim 1, wherein the input grating and the output grating are configured to be reverse reciprocal of each other.

6. The waveguide display of claim 1, wherein the input image node comprises a transparent prism for coupling light into the waveguide.

7. The waveguide display of claim 6, wherein the transparent prism comprises a first surface for coupling light from the input image node into the prism, a second surface for coupling light out of the prism towards the waveguide, a third surface for providing an internal reflection, and a fourth surface opposing the third surface.

8. The waveguide display of claim 7, wherein the third surface is configured to totally internally reflect the light, wherein the third and fourth surfaces provide a window for viewing an external scene.

9. The waveguide display of claim 1, further comprising a second waveguide, wherein the two waveguides are configured to form a binocular waveguide display.

10. The waveguide display of claim 1, wherein the waveguide further comprises a quarter wave coating for rotating polarization of incoming light.

11. The waveguide display of claim 1, wherein each of the first fold grating and the second fold grating is configured to provide pupil expansion in a first direction and the output grating is configured to provide pupil expansion in a second direction different than the first direction.

12. The waveguide display of claim 1, wherein at least one of the input grating, the first fold grating, the second fold grating, and the output grating comprises a rolled K-vector grating.

13. The waveguide display of claim 1, wherein the input image node comprises a light source.

14. The waveguide display of claim 13, wherein the input image node further comprises a microdisplay panel.

15. The waveguide display of claim 1, further comprising an eye tracker.

* * * * *